US008660891B2

(12) United States Patent
Ramer et al.

(10) Patent No.: US 8,660,891 B2
(45) Date of Patent: Feb. 25, 2014

(54) INTERACTIVE MOBILE ADVERTISEMENT BANNERS

(75) Inventors: Jorey Ramer, Cambridge, MA (US);
Adam Soroca, Cambridge, MA (US);
Dennis Doughty, Brookline, MA (US);
Neal J. Karasic, Brighton, MA (US)

(73) Assignee: Millennial Media, Boston, MA (US)

( * ) Notice: Subject to any disclaimer, the term of this patent is extended or adjusted under 35 U.S.C. 154(b) by 1296 days.

(21) Appl. No.: 11/928,990

(22) Filed: Oct. 30, 2007

(65) Prior Publication Data

US 2008/0215428 A1    Sep. 4, 2008

Related U.S. Application Data

(63) Continuation-in-part of application No. 11/553,746, filed on Oct. 27, 2006, now abandoned, and a continuation-in-part of application No. 11/267,940, filed on Nov. 5, 2005, and a continuation-in-part of application No. 11/268,671, filed on Nov. 5, 2005, now Pat. No. 8,103,545, and a continuation-in-part of application No. 11/271,164, filed on Nov. 11, 2005, and a continuation-in-part of application No. 11/274,933, filed on Nov. 14, 2005, now Pat. No. 8,364,521, and a continuation-in-part of application No. 11/274,905, filed on Nov. 14, 2005, and a continuation-in-part of application No. 11/274,884, filed on Nov. 14, 2005, and a continuation-in-part of application No. 11/282,120, filed on Nov. 16, 2005, now Pat. No. 7,660,581, and a continuation-in-part of application No. 11/281,902, filed on Nov. 16, 2005, now abandoned, and a continuation-in-part of application No. 11/335,900, filed on Jan. 18, 2006, now Pat. No. 7,769,764, and a continuation-in-part of application No. 11/335,904, filed on Jan. 19, 2006, now Pat. No. 7,752,209, and a continuation-in-part of application No. 11/337,233, filed on Jan. 19, 2006, now Pat. No. 7,603,360, and a continuation-in-part of application No. 11/337,234, filed on Jan. 19, 2006, (Continued)

(51) Int. Cl.
*G06Q 30/00* (2012.01)

(52) U.S. Cl.
USPC .... 705/14.1; 705/14.12; 705/14.4; 705/14.64

(58) Field of Classification Search
None
See application file for complete search history.

(56) References Cited

U.S. PATENT DOCUMENTS

| 5,521,631 A | 5/1996 | Budow et al. |
| 5,568,030 A | 10/1996 | Nishikawa et al. |

(Continued)

FOREIGN PATENT DOCUMENTS

| JP | 2003/323142 | 11/2003 |
| JP | 2005/71163 | 3/2005 |

(Continued)

OTHER PUBLICATIONS

Intl Searching Authority, "International Search Report", for U.S. Appl. No. PCT/US07/82754, mailed on Mar. 13, 2008.

(Continued)

*Primary Examiner* — Matthew T Sittner
(74) *Attorney, Agent, or Firm* — Millennial Media

(57) ABSTRACT

In embodiments, the present invention provides a method and system for associating an interactive element with a sponsored content, presenting the sponsored content to a mobile communication facility based at least in part on a relevancy to a mobile subscriber characteristic associated with the mobile communication facility, and allowing a user of the mobile communication facility to engage the interactive element within the sponsored content.

1 Claim, 21 Drawing Sheets

Related U.S. Application Data now abandoned, and a continuation-in-part of application No. 11/336,432, filed on Jan. 19, 2006, now Pat. No. 7,860,871, and a continuation-in-part of application No. 11/337,180, filed on Jan. 19, 2006, now Pat. No. 7,577,665, and a continuation-in-part of application No. 11/337,112, filed on Jan. 19, 2006, and a continuation-in-part of application No. 11/347,826, filed on Feb. 3, 2006, and a continuation-in-part of application No. 11/347,825, filed on Feb. 3, 2006, now abandoned, and a continuation-in-part of application No. 11/347,842, filed on Feb. 3, 2006, now abandoned, and a continuation-in-part of application No. 11/355,915, filed on Feb. 16, 2006, now Pat. No. 7,702,318, and a continuation-in-part of application No. 11/387,147, filed on Mar. 21, 2006, now Pat. No. 7,912,458, and a continuation-in-part of application No. 11/413,273, filed on Apr. 27, 2006, now abandoned, and a continuation-in-part of application No. 11/414,168, filed on Apr. 27, 2006, now Pat. No. 7,676,394, and a continuation-in-part of application No. 11/414,740, filed on Apr. 27, 2006, now abandoned, and a continuation-in-part of application No. 11/382,226, filed on May 8, 2006, now abandoned, and a continuation-in-part of application No. 11/382,237, filed on May 8, 2006, now abandoned, and a continuation-in-part of application No. 11/382,243, filed on May 8, 2006, now Pat. No. 8,229,914, and a continuation-in-part of application No. 11/382,246, filed on May 8, 2006, now abandoned, and a continuation-in-part of application No. 11/382,249, filed on May 8, 2006, now abandoned, and a continuation-in-part of application No. 11/382,257, filed on May 8, 2006, now abandoned, and a continuation-in-part of application No. 11/382,260, filed on May 8, 2006, and a continuation-in-part of application No. 11/382,262, filed on May 8, 2006, and a continuation-in-part of application No. 11/382,618, filed on May 10, 2006, and a continuation-in-part of application No. 11/382,637, filed on May 10, 2006, now abandoned, and a continuation-in-part of application No. 11/382,648, filed on May 10, 2006, now abandoned, and a continuation-in-part of application No. 11/382,676, filed on May 10, 2006, now abandoned, and a continuation-in-part of application No. 11/382,684, filed on May 10, 2006, now abandoned, and a continuation-in-part of application No. 11/382,690, filed on May 10, 2006, now abandoned, and a continuation-in-part of application No. 11/382,696, filed on May 10, 2006, now abandoned, and a continuation-in-part of application No. 11/383,236, filed on May 15, 2006, now abandoned, and a continuation-in-part of application No. 11/383,511, filed on May 16, 2006, now abandoned, and a continuation-in-part of application No. 11/422,797, filed on Jun. 7, 2006, now abandoned, and a continuation-in-part of application No. 11/553,567, filed on Oct. 27, 2006, now Pat. No. 7,548,915, and a continuation-in-part of application No. 11/553,578, filed on Oct. 27, 2006, now abandoned, and a continuation-in-part of application No. 11/553,581, filed on Oct. 27, 2006, now abandoned, and a continuation-in-part of application No. 11/553,587, filed on Oct. 27, 2006, now abandoned, and a continuation-in-part of application No. 11/553,598, filed on Oct. 27, 2006, now abandoned, and a continuation-in-part of application No. 11/553,626, filed on Oct. 27, 2006, now abandoned, and a continuation-in-part of application No. 11/553,569, filed on Oct. 27, 2006, now abandoned, and a continuation-in-part of application No. 11/553,659, filed on Oct. 27, 2006, now abandoned, and a continuation-in-part of application No. 11/553,713, filed on Oct. 27, 2006.

(60) Provisional application No. 60/946,132, filed on Jun. 25, 2007, provisional application No. 60/968,188, filed on Aug. 27, 2007, provisional application No. 60/731,991, filed on Nov. 1, 2005, provisional application No. 60/785,242, filed on Mar. 22, 2006, provisional application No. 60/717,151, filed on Sep. 14, 2005, provisional application No. 60/720,193, filed on Sep. 23, 2005.

(56) References Cited

U.S. PATENT DOCUMENTS

| | | |
|---|---|---|
| 5,627,886 A | 5/1997 | Bowman |
| 5,671,436 A | 9/1997 | Morris et al. |
| 5,778,316 A | 7/1998 | Persson et al. |
| 5,825,883 A | 10/1998 | Archibald |
| 5,887,696 A | 3/1999 | Goetz |
| 5,918,014 A | 6/1999 | Robinson |
| 5,943,611 A | 8/1999 | Molne |
| 5,948,061 A | 9/1999 | Merriman et al. |
| 5,963,940 A | 10/1999 | Liddy et al. |
| 5,973,683 A | 10/1999 | Cragun et al. |
| 5,974,398 A | 10/1999 | Hanson et al. |
| 5,996,011 A | 11/1999 | Humes |
| 5,999,975 A | 12/1999 | Kittaka et al. |
| 6,006,225 A | 12/1999 | Bowman et al. |
| 6,009,410 A | 12/1999 | LeMole et al. |
| 6,012,002 A | 1/2000 | Tapping et al. |
| 6,021,397 A | 2/2000 | Jones et al. |
| 6,026,366 A | 2/2000 | Grube |
| 6,029,139 A | 2/2000 | Cunningham et al. |
| 6,045,048 A | 4/2000 | Wilz, Sr. et al. |
| 6,061,658 A | 5/2000 | Chou et al. |
| 6,078,314 A | 6/2000 | Ahn |
| 6,092,100 A | 7/2000 | Berstis et al. |
| 6,097,939 A | 8/2000 | Jacobs et al. |
| 6,101,379 A | 8/2000 | Rahman et al. |
| 6,108,533 A | 8/2000 | Brohoff |
| 6,135,349 A | 10/2000 | Zirkel |
| 6,141,341 A | 10/2000 | Jones et al. |
| 6,178,407 B1 | 1/2001 | Lotvin et al. |
| 6,182,050 B1 | 1/2001 | Ballard |
| 6,185,558 B1 | 2/2001 | Bowman et al. |
| 6,199,099 B1 | 3/2001 | Gershman et al. |
| 6,216,129 B1 | 4/2001 | Eldering |
| 6,226,510 B1 | 5/2001 | Boling et al. |
| 6,233,448 B1 | 5/2001 | Alperovich et al. |
| 6,236,978 B1 | 5/2001 | Tuzhilin |
| 6,236,979 B1 | 5/2001 | Kawabata |
| 6,246,997 B1 | 6/2001 | Cybul et al. |
| 6,247,047 B1 | 6/2001 | Wolff |
| 6,253,188 B1 | 6/2001 | Witek et al. |
| 6,256,739 B1 | 7/2001 | Skopp et al. |
| 6,269,361 B1 | 7/2001 | Davis et al. |
| 6,285,987 B1 | 9/2001 | Roth et al. |
| 6,311,180 B1 | 10/2001 | Fogarty |
| 6,324,519 B1 | 11/2001 | Eldering |
| 6,327,470 B1 | 12/2001 | Ostling |
| 6,327,574 B1 | 12/2001 | Kramer et al. |
| 6,327,576 B1 | 12/2001 | Ogasawara |
| 6,334,109 B1 | 12/2001 | Kanevsky et al. |
| 6,335,927 B1 | 1/2002 | Elliott et al. |
| 6,336,117 B1 | 1/2002 | Massarani |

(56) References Cited

U.S. PATENT DOCUMENTS

| | | |
|---|---|---|
| 6,339,761 B1 | 1/2002 | Cottingham |
| 6,356,905 B1 | 3/2002 | Gershman et al. |
| 6,360,221 B1 * | 3/2002 | Gough et al. ............... 1/1 |
| 6,374,177 B1 | 4/2002 | Lee et al. |
| 6,374,260 B1 | 4/2002 | Hoffert et al. |
| 6,389,467 B1 | 5/2002 | Eyal |
| 6,414,635 B1 | 7/2002 | Stewart et al. |
| 6,446,076 B1 | 9/2002 | Burkey et al. |
| 6,480,837 B1 | 11/2002 | Dutta |
| 6,487,538 B1 | 11/2002 | Gupta et al. |
| 6,490,443 B1 | 12/2002 | Freeny |
| 6,490,450 B1 | 12/2002 | Batni et al. |
| 6,512,919 B2 | 1/2003 | Ogasawara |
| 6,516,416 B2 | 2/2003 | Gregg et al. |
| 6,519,585 B1 | 2/2003 | Kohli |
| 6,526,275 B1 | 2/2003 | Calvert |
| 6,546,002 B1 | 4/2003 | Kim |
| 6,556,997 B1 | 4/2003 | Levy |
| 6,559,828 B1 | 5/2003 | Impio |
| 6,560,651 B2 | 5/2003 | Katz et al. |
| 6,564,327 B1 | 5/2003 | Klensin et al. |
| 6,573,883 B1 | 6/2003 | Bartlett |
| 6,577,861 B2 | 6/2003 | Ogasawara |
| 6,587,835 B1 * | 7/2003 | Treyz et al. ............... 705/14.64 |
| 6,593,944 B1 | 7/2003 | Nicolas et al. |
| 6,597,903 B1 | 7/2003 | Dahm et al. |
| 6,607,136 B1 | 8/2003 | Atsmon et al. |
| 6,615,172 B1 | 9/2003 | Bennett et al. |
| 6,631,372 B1 | 10/2003 | Graham |
| 6,647,269 B2 | 11/2003 | Hendrey et al. |
| 6,651,053 B1 | 11/2003 | Rothschild |
| 6,658,464 B2 | 12/2003 | Reisman |
| 6,664,922 B1 | 12/2003 | Fan |
| 6,665,837 B1 | 12/2003 | Dean et al. |
| 6,698,020 B1 | 2/2004 | Zigmond et al. |
| 6,701,310 B1 | 3/2004 | Sugiura et al. |
| 6,701,317 B1 | 3/2004 | Wiener et al. |
| 6,704,727 B1 | 3/2004 | Kravets |
| 6,704,787 B1 | 3/2004 | Umbreit |
| 6,718,324 B2 | 4/2004 | Edlund et al. |
| 6,718,365 B1 | 4/2004 | Dutta |
| 6,728,731 B2 | 4/2004 | Sarukkai et al. |
| 6,742,047 B1 | 5/2004 | Tso |
| 6,754,833 B1 | 6/2004 | Black et al. |
| 6,760,759 B1 | 7/2004 | Chan |
| 6,775,537 B1 | 8/2004 | Panichkul |
| 6,775,831 B1 | 8/2004 | Carrasco et al. |
| 6,778,834 B2 | 8/2004 | Laitinen et al. |
| 6,778,975 B1 | 8/2004 | Anick et al. |
| 6,799,298 B2 | 9/2004 | deVries et al. |
| 6,804,662 B1 | 10/2004 | Annau et al. |
| 6,813,489 B1 | 11/2004 | Wu et al. |
| 6,813,501 B2 | 11/2004 | Kinnunen et al. |
| 6,826,572 B2 | 11/2004 | Colace et al. |
| 6,829,475 B1 | 12/2004 | Lee et al. |
| 6,832,259 B2 | 12/2004 | Hymel et al. |
| 6,832,353 B2 | 12/2004 | Itavaara et al. |
| 6,834,195 B2 | 12/2004 | Brandenberg et al. |
| 6,842,767 B1 | 1/2005 | Partovi et al. |
| 6,847,969 B1 | 1/2005 | Mathai et al. |
| 6,853,982 B2 | 2/2005 | Smith et al. |
| 6,871,140 B1 | 3/2005 | Florance et al. |
| 6,871,202 B2 | 3/2005 | Broder |
| 6,876,997 B1 | 4/2005 | Rorex et al. |
| 6,892,064 B2 | 5/2005 | Qi et al. |
| 6,892,206 B2 | 5/2005 | Dharap |
| 6,896,188 B1 | 5/2005 | Graham |
| 6,904,408 B1 | 6/2005 | McCarthy et al. |
| 6,907,566 B1 | 6/2005 | McElfresh et al. |
| 6,920,448 B2 | 7/2005 | Kincaid et al. |
| 6,920,488 B1 | 7/2005 | Le Pennec et al. |
| 6,934,684 B2 | 8/2005 | Alpdemir et al. |
| 6,937,998 B1 | 8/2005 | Swartz et al. |
| 6,941,376 B2 | 9/2005 | Mitchell et al. |
| 6,947,930 B2 | 9/2005 | Anick et al. |
| 6,947,976 B1 | 9/2005 | Devitt et al. |
| 6,950,804 B2 | 9/2005 | Strietzel |
| 6,950,994 B2 | 9/2005 | Dharap |
| 6,954,641 B2 | 10/2005 | McKenna et al. |
| 6,954,751 B2 | 10/2005 | Christfort et al. |
| 6,963,867 B2 | 11/2005 | Ford et al. |
| 6,968,178 B2 | 11/2005 | Pradhan et al. |
| 6,968,333 B2 | 11/2005 | Abbott et al. |
| 6,978,263 B2 | 12/2005 | Soulanille |
| 6,978,264 B2 | 12/2005 | Chandrasekar et al. |
| 6,983,272 B2 | 1/2006 | Davis et al. |
| 6,983,280 B2 | 1/2006 | Cheung et al. |
| 6,993,494 B1 | 1/2006 | Boushy et al. |
| 7,003,792 B1 | 2/2006 | Yuen |
| 7,007,239 B1 | 2/2006 | Hawkins et al. |
| 7,020,654 B1 | 3/2006 | Najmi |
| 7,027,987 B1 | 4/2006 | Franz et al. |
| 7,035,811 B2 | 4/2006 | Gorenstein |
| 7,047,033 B2 | 5/2006 | Wyler |
| 7,062,258 B1 | 6/2006 | Sini et al. |
| 7,062,453 B1 | 6/2006 | Clarke |
| 7,071,842 B1 | 7/2006 | Brady, Jr. |
| 7,076,202 B1 | 7/2006 | Billmaier |
| 7,085,555 B2 | 8/2006 | Zellner et al. |
| 7,089,036 B2 | 8/2006 | Prise |
| 7,089,592 B2 | 8/2006 | Adjaoute |
| 7,103,347 B2 | 9/2006 | Chow et al. |
| 7,111,044 B2 | 9/2006 | Lee |
| 7,120,235 B2 | 10/2006 | Altberg et al. |
| 7,130,923 B2 | 10/2006 | Mason |
| 7,136,875 B2 | 11/2006 | Anderson et al. |
| 7,139,372 B2 | 11/2006 | Chakravorty et al. |
| 7,155,405 B2 | 12/2006 | Petrovich |
| 7,155,508 B2 | 12/2006 | Sankuratripati et al. |
| 7,159,194 B2 | 1/2007 | Wong et al. |
| 7,162,493 B2 | 1/2007 | Weiss et al. |
| 7,162,697 B2 | 1/2007 | Markel |
| 7,165,224 B2 | 1/2007 | Pyhälammi |
| 7,184,020 B2 | 2/2007 | Matsui |
| 7,185,088 B1 | 2/2007 | Joy et al. |
| 7,185,286 B2 | 2/2007 | Zondervan et al. |
| 7,188,307 B2 | 3/2007 | Ohsawa |
| 7,191,177 B2 | 3/2007 | Konaka |
| 7,197,321 B2 | 3/2007 | Erskine et al. |
| 7,216,109 B1 | 5/2007 | Donner |
| 7,219,123 B1 | 5/2007 | Fiechter et al. |
| 7,219,309 B2 | 5/2007 | Kaasila et al. |
| 7,221,902 B2 | 5/2007 | Kopra et al. |
| 7,228,327 B2 | 6/2007 | Shuster |
| 7,240,049 B2 | 7/2007 | Kapur et al. |
| 7,243,163 B1 | 7/2007 | Friend et al. |
| 7,277,718 B2 | 10/2007 | Wong |
| 7,281,042 B2 | 10/2007 | Hsu et al. |
| 7,286,651 B1 | 10/2007 | Packingham et al. |
| 7,289,623 B2 | 10/2007 | Lurie |
| 7,295,996 B2 | 11/2007 | Skinner |
| 7,299,050 B2 | 11/2007 | Delaney et al. |
| 7,308,254 B1 | 12/2007 | Rissanen |
| 7,308,261 B2 | 12/2007 | Henderson et al. |
| 7,327,708 B2 | 2/2008 | Komandur et al. |
| 7,330,714 B2 | 2/2008 | Rosenberg |
| 7,330,890 B1 | 2/2008 | Partovi et al. |
| 7,343,157 B1 | 3/2008 | Mitchell |
| 7,356,524 B2 | 4/2008 | Zurek et al. |
| 7,356,572 B2 | 4/2008 | Jiang et al. |
| 7,370,283 B2 | 5/2008 | Othmer |
| 7,373,599 B2 | 5/2008 | Mcelfresh et al. |
| 7,376,714 B1 | 5/2008 | Gerken |
| 7,412,405 B2 | 8/2008 | Huang et al. |
| 7,418,472 B2 | 8/2008 | Shoemaker et al. |
| 7,437,364 B1 | 10/2008 | Fredricksen et al. |
| 7,437,368 B1 | 10/2008 | Kolluri et al. |
| 7,444,337 B2 | 10/2008 | Zhou et al. |
| 7,461,528 B2 | 12/2008 | Taniguchi et al. |
| 7,487,112 B2 | 2/2009 | Barnes, Jr. |
| 7,499,948 B2 | 3/2009 | Smith |
| 7,536,322 B1 | 5/2009 | Selinger et al. |
| 7,540,051 B2 | 6/2009 | Gunderson et al. |
| 7,548,915 B2 | 6/2009 | Ramer et al. |

(56) References Cited

U.S. PATENT DOCUMENTS

| | | |
|---|---|---|
| 7,565,139 B2 | 7/2009 | Neven, Sr. et al. |
| 7,590,759 B2 | 9/2009 | Omar |
| 7,603,106 B2 | 10/2009 | Aaltonen et al. |
| 7,603,349 B1 | 10/2009 | Kraft et al. |
| 7,624,047 B1 | 11/2009 | Round |
| 7,630,986 B1 | 12/2009 | Herz et al. |
| 7,644,400 B2 | 1/2010 | Harris et al. |
| 7,647,024 B2 | 1/2010 | Wang et al. |
| 7,668,950 B2 | 2/2010 | Horowitz et al. |
| 7,693,827 B2 | 4/2010 | Zamir et al. |
| 7,702,318 B2 | 4/2010 | Ramer et al. |
| 7,702,542 B2 | 4/2010 | Aslanian, Jr. |
| 7,707,140 B2 | 4/2010 | Leishman et al. |
| 7,711,743 B2 | 5/2010 | Cavagnaro et al. |
| 7,725,419 B2 | 5/2010 | Lee et al. |
| 7,729,480 B1 | 6/2010 | Packingham et al. |
| 7,729,940 B2 | 6/2010 | Harvey et al. |
| 7,734,684 B2 | 6/2010 | Zeng et al. |
| 7,743,045 B2 | 6/2010 | Guha et al. |
| 7,751,807 B2 | 7/2010 | Lin et al. |
| 7,761,109 B2 | 7/2010 | Allen |
| 7,778,873 B2 | 8/2010 | Crolley |
| 7,783,729 B1 | 8/2010 | Macaluso |
| 7,801,899 B1 | 9/2010 | Spitkovsky |
| 7,813,741 B2 | 10/2010 | Hendrey et al. |
| 7,844,491 B1 | 11/2010 | Haitsuka et al. |
| 7,856,373 B2 | 12/2010 | Ullah |
| 7,860,871 B2 | 12/2010 | Ramer et al. |
| 7,866,871 B2 | 1/2011 | Couzin et al. |
| 7,873,709 B2 | 1/2011 | Lee et al. |
| 7,881,702 B2 | 2/2011 | Heyworth et al. |
| 7,895,077 B2 | 2/2011 | Anand et al. |
| 7,904,341 B2 | 3/2011 | Flinn et al. |
| 7,912,458 B2 | 3/2011 | Ramer et al. |
| 7,920,849 B2 | 4/2011 | Pop |
| 7,929,470 B2 | 4/2011 | Minborg et al. |
| 7,930,342 B2 | 4/2011 | Mattila et al. |
| 7,970,389 B2 | 6/2011 | Ramer et al. |
| 7,983,662 B1 | 7/2011 | Ramer et al. |
| 8,015,184 B2 | 9/2011 | Zito et al. |
| 8,019,770 B1 | 9/2011 | Hartsook et al. |
| 8,027,879 B2 | 9/2011 | Ramer et al. |
| 8,041,717 B2 | 10/2011 | Ramer et al. |
| 8,050,675 B2 | 11/2011 | Ramer et al. |
| 8,069,169 B2 | 11/2011 | Fitzpatrick et al. |
| 8,073,700 B2 | 12/2011 | Jaramillo et al. |
| 8,078,149 B2 | 12/2011 | Miyazawa |
| 8,099,434 B2 | 1/2012 | Ramer et al. |
| 8,103,545 B2 | 1/2012 | Ramer et al. |
| 8,131,271 B2 | 3/2012 | Ramer et al. |
| 8,131,737 B2 | 3/2012 | Ramer et al. |
| 8,156,128 B2 | 4/2012 | Ramer et al. |
| 8,195,133 B2 | 6/2012 | Ramer et al. |
| 2001/0014868 A1 | 8/2001 | Herz et al. |
| 2001/0030234 A1 | 10/2001 | Wiklof |
| 2001/0032133 A1 | 10/2001 | Moran |
| 2001/0036224 A1 | 11/2001 | Demello et al. |
| 2001/0037174 A1 | 11/2001 | Dickerson |
| 2001/0041561 A1 | 11/2001 | Ventulett et al. |
| 2001/0042785 A1 | 11/2001 | Walker et al. |
| 2001/0044758 A1 | 11/2001 | Talib et al. |
| 2001/0047363 A1 | 11/2001 | Peng |
| 2001/0049636 A1 | 12/2001 | Hudda et al. |
| 2001/0049677 A1 | 12/2001 | Talib et al. |
| 2001/0051911 A1 | 12/2001 | Marks et al. |
| 2001/0054001 A1 | 12/2001 | Robinson |
| 2001/0054066 A1 | 12/2001 | Spitzer |
| 2001/0056427 A1 | 12/2001 | Yoon et al. |
| 2002/0002510 A1 | 1/2002 | Sharp |
| 2002/0004825 A1 | 1/2002 | Lindberg |
| 2002/0007303 A1 | 1/2002 | Brookler et al. |
| 2002/0010798 A1 | 1/2002 | Ben-Shaul et al. |
| 2002/0013727 A1 | 1/2002 | Lee |
| 2002/0013785 A1 | 1/2002 | Miyazaki et al. |
| 2002/0029186 A1 | 3/2002 | Roth et al. |
| 2002/0029267 A1 | 3/2002 | Sankuratripati et al. |
| 2002/0035605 A1 | 3/2002 | Mcdowell et al. |
| 2002/0046104 A1 | 4/2002 | Kaddeche et al. |
| 2002/0051521 A1 | 5/2002 | Patrick |
| 2002/0052674 A1 | 5/2002 | Chang et al. |
| 2002/0052781 A1 | 5/2002 | Aufricht et al. |
| 2002/0053076 A1 | 5/2002 | Landesmann |
| 2002/0059387 A1 | 5/2002 | Wolfe |
| 2002/0062310 A1 | 5/2002 | Marmor et al. |
| 2002/0062393 A1 | 5/2002 | Borger et al. |
| 2002/0065713 A1 | 5/2002 | Awada et al. |
| 2002/0069263 A1 | 6/2002 | Sears et al. |
| 2002/0073034 A1 | 6/2002 | Wagner et al. |
| 2002/0073420 A1 | 6/2002 | Yoon |
| 2002/0077084 A1 | 6/2002 | Zellner et al. |
| 2002/0077130 A1 | 6/2002 | Owensby |
| 2002/0077897 A1 | 6/2002 | Zellner et al. |
| 2002/0077908 A1 | 6/2002 | Sakuma et al. |
| 2002/0078045 A1 | 6/2002 | Dutta |
| 2002/0078209 A1 | 6/2002 | Peng |
| 2002/0082049 A1 | 6/2002 | Prise |
| 2002/0083145 A1 | 6/2002 | Perinpanathan |
| 2002/0087408 A1 | 7/2002 | Burnett |
| 2002/0087631 A1 | 7/2002 | Sharma |
| 2002/0091569 A1 | 7/2002 | Kitaura et al. |
| 2002/0103789 A1 | 8/2002 | Turnbull et al. |
| 2002/0103881 A1 | 8/2002 | Granade et al. |
| 2002/0104090 A1 | 8/2002 | Stettner |
| 2002/0105539 A1 | 8/2002 | Gamzon et al. |
| 2002/0107985 A1 | 8/2002 | Hwang et al. |
| 2002/0111172 A1 | 8/2002 | DeWolf et al. |
| 2002/0123330 A1 | 9/2002 | Yen |
| 2002/0123928 A1 | 9/2002 | Eldering et al. |
| 2002/0128903 A1 | 9/2002 | Kernahan |
| 2002/0128908 A1 | 9/2002 | Levin et al. |
| 2002/0142759 A1 | 10/2002 | Newell et al. |
| 2002/0143860 A1 | 10/2002 | Catan |
| 2002/0147638 A1 | 10/2002 | Banerjee et al. |
| 2002/0147652 A1 | 10/2002 | Gheith et al. |
| 2002/0152267 A1 | 10/2002 | Lennon |
| 2002/0161648 A1 | 10/2002 | Mason et al. |
| 2002/0165773 A1 | 11/2002 | Natsuno et al. |
| 2002/0165790 A1 | 11/2002 | Bancroft et al. |
| 2002/0169654 A1 | 11/2002 | Santos et al. |
| 2002/0171691 A1 | 11/2002 | Currans et al. |
| 2002/0177443 A1 | 11/2002 | Tokuyoshi |
| 2002/0178166 A1 | 11/2002 | Hsia |
| 2002/0180782 A1 | 12/2002 | Natsuno |
| 2002/0184183 A1 | 12/2002 | Cherry et al. |
| 2002/0184622 A1 | 12/2002 | Emura et al. |
| 2002/0198791 A1 | 12/2002 | Perkowski |
| 2003/0003929 A1 | 1/2003 | Himmel et al. |
| 2003/0004831 A1 | 1/2003 | Owens |
| 2003/0004984 A1 | 1/2003 | Chou |
| 2003/0006911 A1 | 1/2003 | Smith et al. |
| 2003/0014399 A1 | 1/2003 | Hansen et al. |
| 2003/0014659 A1 | 1/2003 | Zhu |
| 2003/0018521 A1 | 1/2003 | Kraft et al. |
| 2003/0018539 A1 | 1/2003 | La Poutre et al. |
| 2003/0018887 A1 | 1/2003 | Fishman et al. |
| 2003/0020749 A1 | 1/2003 | Abu-Hakima et al. |
| 2003/0022700 A1 | 1/2003 | Wang |
| 2003/0024981 A1 | 2/2003 | Narasimhan |
| 2003/0028889 A1 | 2/2003 | McCoskey et al. |
| 2003/0045273 A1 | 3/2003 | Pyhalammi et al. |
| 2003/0046291 A1 | 3/2003 | Fascenda |
| 2003/0050058 A1 | 3/2003 | Walsh et al. |
| 2003/0050837 A1 | 3/2003 | Kim |
| 2003/0050863 A1 | 3/2003 | Radwin |
| 2003/0050986 A1 | 3/2003 | Matthews et al. |
| 2003/0055725 A1 | 3/2003 | Lee |
| 2003/0055816 A1 | 3/2003 | Paine |
| 2003/0055831 A1 | 3/2003 | Ryan et al. |
| 2003/0058842 A1 | 3/2003 | Bud |
| 2003/0060198 A1 | 3/2003 | Li |
| 2003/0060214 A1 | 3/2003 | Hendrey et al. |
| 2003/0063072 A1 | 4/2003 | Brandenberg et al. |
| 2003/0065805 A1 | 4/2003 | Barnes, Jr. |
| 2003/0078882 A1 | 4/2003 | Sukeda et al. |

(56) References Cited

U.S. PATENT DOCUMENTS

| | | |
|---|---|---|
| 2003/0079222 A1 | 4/2003 | Boykin et al. |
| 2003/0084098 A1 | 5/2003 | Lavin et al. |
| 2003/0088452 A1 | 5/2003 | Kelly |
| 2003/0093311 A1 | 5/2003 | Knowlson |
| 2003/0093314 A1 | 5/2003 | Leung et al. |
| 2003/0097451 A1 | 5/2003 | Bjorksten et al. |
| 2003/0100320 A1 | 5/2003 | Ranjan |
| 2003/0104827 A1 | 6/2003 | Moran et al. |
| 2003/0110225 A1 | 6/2003 | Billadeau |
| 2003/0110503 A1 | 6/2003 | Perkes |
| 2003/0114145 A1 | 6/2003 | Boda et al. |
| 2003/0114157 A1 | 6/2003 | Spitz et al. |
| 2003/0115318 A1 | 6/2003 | Wueste |
| 2003/0125958 A1 | 7/2003 | Alpdemir et al. |
| 2003/0126095 A1 | 7/2003 | Allen |
| 2003/0126126 A1 | 7/2003 | Lee et al. |
| 2003/0130887 A1 | 7/2003 | Nathaniel |
| 2003/0132298 A1 | 7/2003 | Swartz et al. |
| 2003/0135460 A1 | 7/2003 | Talegon |
| 2003/0135581 A1 | 7/2003 | Phelan et al. |
| 2003/0135582 A1 | 7/2003 | Allen et al. |
| 2003/0135825 A1 | 7/2003 | Gertner et al. |
| 2003/0140004 A1 | 7/2003 | O'Leary et al. |
| 2003/0146932 A1 | 8/2003 | Weng et al. |
| 2003/0149793 A1 | 8/2003 | Bannoura et al. |
| 2003/0149937 A1 | 8/2003 | McElfresh et al. |
| 2003/0149938 A1 | 8/2003 | McElfresh et al. |
| 2003/0158776 A1 | 8/2003 | Landesmann |
| 2003/0163833 A1 | 8/2003 | Chiba et al. |
| 2003/0171977 A1 | 9/2003 | Singh et al. |
| 2003/0172042 A1 | 9/2003 | Agui |
| 2003/0172145 A1 | 9/2003 | Nguyen |
| 2003/0187878 A1 | 10/2003 | Sandifer |
| 2003/0187996 A1 | 10/2003 | Cardina et al. |
| 2003/0195009 A1 | 10/2003 | Endo |
| 2003/0197719 A1 | 10/2003 | Lincke et al. |
| 2003/0204447 A1 | 10/2003 | Dalzell et al. |
| 2003/0220866 A1 | 11/2003 | Pisaris-Henderson et al. |
| 2003/0226866 A1 | 12/2003 | Har-Shen |
| 2004/0005894 A1 | 1/2004 | Trossen et al. |
| 2004/0015548 A1 | 1/2004 | Lee |
| 2004/0019478 A1 | 1/2004 | Rucker et al. |
| 2004/0023644 A1 | 2/2004 | Montemer |
| 2004/0023654 A1 | 2/2004 | Jang |
| 2004/0024752 A1 | 2/2004 | Manber et al. |
| 2004/0029567 A1 | 2/2004 | Timmins et al. |
| 2004/0034853 A1 | 2/2004 | Gibbons et al. |
| 2004/0044571 A1 | 3/2004 | Bronnimann et al. |
| 2004/0054569 A1 | 3/2004 | Pombo et al. |
| 2004/0059708 A1 | 3/2004 | Dean et al. |
| 2004/0068552 A1 | 4/2004 | Kotz et al. |
| 2004/0073538 A1 | 4/2004 | Leishman et al. |
| 2004/0073574 A1 | 4/2004 | Shimizu et al. |
| 2004/0073915 A1 | 4/2004 | Dureau |
| 2004/0077337 A1 | 4/2004 | Vestergaard et al. |
| 2004/0116070 A1 | 6/2004 | Fishman et al. |
| 2004/0117195 A1 | 6/2004 | Bodin |
| 2004/0117302 A1 | 6/2004 | Weichert et al. |
| 2004/0122735 A1 | 6/2004 | Meshkin |
| 2004/0128197 A1 | 7/2004 | Bam et al. |
| 2004/0133848 A1 | 7/2004 | Hunt et al. |
| 2004/0137886 A1 | 7/2004 | Ross et al. |
| 2004/0158630 A1 | 8/2004 | Chang et al. |
| 2004/0167928 A1 | 8/2004 | Anderson et al. |
| 2004/0170155 A1 | 9/2004 | Omar et al. |
| 2004/0181591 A1 | 9/2004 | Yu et al. |
| 2004/0193698 A1 | 9/2004 | Lakshminarayana |
| 2004/0198386 A1 | 10/2004 | Dupray |
| 2004/0199422 A1 | 10/2004 | Napier et al. |
| 2004/0199575 A1 | 10/2004 | Geller |
| 2004/0203630 A1 | 10/2004 | Wang |
| 2004/0203854 A1 | 10/2004 | Nowak |
| 2004/0214557 A1 | 10/2004 | Liao et al. |
| 2004/0218562 A1 | 11/2004 | Orava et al. |
| 2004/0220926 A1 | 11/2004 | Lamkin et al. |
| 2004/0225562 A1 | 11/2004 | Turner |
| 2004/0225647 A1 | 11/2004 | Connelly et al. |
| 2004/0230461 A1 | 11/2004 | Talib et al. |
| 2004/0230503 A1 | 11/2004 | Lucas |
| 2004/0230574 A1 | 11/2004 | Kravets |
| 2004/0230636 A1 | 11/2004 | Masuoka et al. |
| 2004/0235459 A1 | 11/2004 | Juntunen |
| 2004/0243569 A1 | 12/2004 | Burrows |
| 2004/0249700 A1 | 12/2004 | Gross |
| 2004/0249768 A1 | 12/2004 | Kontio et al. |
| 2004/0254859 A1 | 12/2004 | Aslanian, Jr. |
| 2004/0259553 A1 | 12/2004 | Delaney et al. |
| 2004/0260689 A1 | 12/2004 | Colace et al. |
| 2004/0267611 A1 | 12/2004 | Hoerenz |
| 2005/0015406 A1 | 1/2005 | Sambhus et al. |
| 2005/0021110 A1 | 1/2005 | Maschke et al. |
| 2005/0027591 A9 | 2/2005 | Gailey et al. |
| 2005/0027666 A1 | 2/2005 | Beck et al. |
| 2005/0027700 A1 | 2/2005 | Turner et al. |
| 2005/0033771 A1 | 2/2005 | Schmitter et al. |
| 2005/0041647 A1 | 2/2005 | Stinnie |
| 2005/0043989 A1 | 2/2005 | Shifrin |
| 2005/0049908 A2 | 3/2005 | Hawks |
| 2005/0052341 A1 | 3/2005 | Henriksson |
| 2005/0060381 A1 | 3/2005 | Huynh et al. |
| 2005/0064852 A1 | 3/2005 | Baldursson |
| 2005/0065917 A1 | 3/2005 | Anick et al. |
| 2005/0065950 A1 | 3/2005 | Chaganti et al. |
| 2005/0065995 A1 | 3/2005 | Milstein et al. |
| 2005/0068169 A1 | 3/2005 | Copley et al. |
| 2005/0070276 A1 | 3/2005 | McGarry |
| 2005/0071325 A1 | 3/2005 | Bem |
| 2005/0071741 A1 | 3/2005 | Acharya et al. |
| 2005/0071766 A1 | 3/2005 | Brill et al. |
| 2005/0075097 A1 | 4/2005 | Lehikoinen et al. |
| 2005/0075932 A1 | 4/2005 | Mankoff |
| 2005/0076014 A1 | 4/2005 | Agarwal et al. |
| 2005/0080786 A1 | 4/2005 | Fish et al. |
| 2005/0085239 A1 | 4/2005 | Cedervall |
| 2005/0086109 A1 | 4/2005 | McFadden et al. |
| 2005/0086112 A1 | 4/2005 | Shkedi |
| 2005/0097204 A1 | 5/2005 | Horowitz et al. |
| 2005/0105513 A1 | 5/2005 | Sullivan et al. |
| 2005/0107953 A1 | 5/2005 | Sugla |
| 2005/0108178 A1 | 5/2005 | York |
| 2005/0114312 A1 | 5/2005 | Mosescu |
| 2005/0119936 A1 | 6/2005 | Buchanan et al. |
| 2005/0125723 A1 | 6/2005 | Griswold et al. |
| 2005/0131762 A1 | 6/2005 | Bharat et al. |
| 2005/0137939 A1 | 6/2005 | Calabria et al. |
| 2005/0144065 A1 | 6/2005 | Calabria et al. |
| 2005/0144073 A1 | 6/2005 | Morrisroe et al. |
| 2005/0144251 A1 | 6/2005 | Slate |
| 2005/0144297 A1 | 6/2005 | Dahlstrom et al. |
| 2005/0149395 A1 | 7/2005 | Henkin et al. |
| 2005/0149398 A1 | 7/2005 | Mckay |
| 2005/0149399 A1 | 7/2005 | Fukunaga et al. |
| 2005/0149922 A1 | 7/2005 | Vincent |
| 2005/0154716 A1 | 7/2005 | Watson et al. |
| 2005/0154717 A1 | 7/2005 | Watson et al. |
| 2005/0154796 A1 | 7/2005 | Forsyth et al. |
| 2005/0154996 A1 | 7/2005 | Othmer |
| 2005/0159164 A1 | 7/2005 | Leedom |
| 2005/0164704 A1 | 7/2005 | Winsor |
| 2005/0165666 A1 | 7/2005 | Wong et al. |
| 2005/0171863 A1 | 8/2005 | Hagen |
| 2005/0171936 A1 | 8/2005 | Zhu |
| 2005/0171940 A1 | 8/2005 | Fogg et al. |
| 2005/0177593 A1 | 8/2005 | Solomon |
| 2005/0185060 A1 | 8/2005 | Neven |
| 2005/0187971 A1 | 8/2005 | Hassan et al. |
| 2005/0188056 A1 | 8/2005 | Kangas et al. |
| 2005/0190747 A1 | 9/2005 | Sindhwani et al. |
| 2005/0191936 A1 | 9/2005 | Marine et al. |
| 2005/0198095 A1 | 9/2005 | Du et al. |
| 2005/0203806 A1 | 9/2005 | Jacobs et al. |
| 2005/0203888 A1 | 9/2005 | Woosley et al. |
| 2005/0208930 A1 | 9/2005 | Zmrzli |
| 2005/0210391 A1 | 9/2005 | Othmer |

(56) References Cited

U.S. PATENT DOCUMENTS

| | | |
|---|---|---|
| 2005/0216334 A1 | 9/2005 | Mehrabani-Farsi |
| 2005/0221802 A1 | 10/2005 | Hosono |
| 2005/0221834 A1 | 10/2005 | Kangas et al. |
| 2005/0221843 A1 | 10/2005 | Friedman et al. |
| 2005/0222989 A1 | 10/2005 | Haveliwala et al. |
| 2005/0223000 A1 | 10/2005 | Davis et al. |
| 2005/0227676 A1 | 10/2005 | De Vries et al. |
| 2005/0227679 A1 | 10/2005 | Papulov |
| 2005/0232210 A1 | 10/2005 | Karaoguz et al. |
| 2005/0233742 A1 | 10/2005 | Karaoguz et al. |
| 2005/0233755 A1 | 10/2005 | Jacovi et al. |
| 2005/0234768 A1 | 10/2005 | Wald et al. |
| 2005/0234891 A1 | 10/2005 | Walther et al. |
| 2005/0234929 A1 | 10/2005 | Ionescu et al. |
| 2005/0240472 A1 | 10/2005 | Postrel |
| 2005/0240477 A1 | 10/2005 | Friday et al. |
| 2005/0240557 A1 | 10/2005 | Rorex et al. |
| 2005/0240580 A1 | 10/2005 | Zamir et al. |
| 2005/0245241 A1 | 11/2005 | Durand et al. |
| 2005/0246132 A1 | 11/2005 | Olin et al. |
| 2005/0246415 A1 | 11/2005 | Belfiore et al. |
| 2005/0251444 A1 | 11/2005 | Varian et al. |
| 2005/0256766 A1 | 11/2005 | Garcia et al. |
| 2005/0262428 A1 | 11/2005 | Little et al. |
| 2005/0266166 A1 | 12/2005 | Halsey et al. |
| 2005/0266889 A1 | 12/2005 | Kuhl et al. |
| 2005/0272452 A1 | 12/2005 | Khoury et al. |
| 2005/0273351 A1 | 12/2005 | Chudnovsky et al. |
| 2005/0273779 A1 | 12/2005 | Cheng et al. |
| 2005/0282559 A1 | 12/2005 | Erskine et al. |
| 2005/0286694 A1 | 12/2005 | Son |
| 2005/0289113 A1 | 12/2005 | Bookstaff |
| 2006/0004594 A1 | 1/2006 | Doliov |
| 2006/0004627 A1 | 1/2006 | Baluja |
| 2006/0004739 A1 | 1/2006 | Anthony et al. |
| 2006/0004850 A1 | 1/2006 | Chowdhury |
| 2006/0010466 A1 | 1/2006 | Swix et al. |
| 2006/0010699 A1 | 1/2006 | Tamura |
| 2006/0012677 A1 | 1/2006 | Neven, Jr. et al. |
| 2006/0015201 A1 | 1/2006 | Lapstun et al. |
| 2006/0019716 A1 | 1/2006 | Pell et al. |
| 2006/0020593 A1 | 1/2006 | Ramsaier et al. |
| 2006/0020596 A1 | 1/2006 | Liu et al. |
| 2006/0022048 A1 | 2/2006 | Johnson |
| 2006/0026013 A1 | 2/2006 | Kraft |
| 2006/0026067 A1 | 2/2006 | Nicholas et al. |
| 2006/0031387 A1 | 2/2006 | Hamzeh et al. |
| 2006/0031405 A1 | 2/2006 | Goldman et al. |
| 2006/0036491 A1 | 2/2006 | Leung et al. |
| 2006/0036501 A1 | 2/2006 | Shahbazi et al. |
| 2006/0036565 A1 | 2/2006 | Bruecken |
| 2006/0041472 A1 | 2/2006 | Lukose et al. |
| 2006/0041556 A1 | 2/2006 | Taniguchi et al. |
| 2006/0046712 A1* | 3/2006 | Shamp et al. ............ 455/426.1 |
| 2006/0046838 A1 | 3/2006 | Paulsen et al. |
| 2006/0059107 A1 | 3/2006 | Elmore et al. |
| 2006/0059129 A1 | 3/2006 | Azuma et al. |
| 2006/0064346 A1 | 3/2006 | Steenstra et al. |
| 2006/0069746 A1 | 3/2006 | Davis et al. |
| 2006/0069998 A1 | 3/2006 | Artman et al. |
| 2006/0073810 A1 | 4/2006 | Pyhalammi et al. |
| 2006/0074883 A1 | 4/2006 | Teevan et al. |
| 2006/0080224 A1 | 4/2006 | Schuelke et al. |
| 2006/0085251 A1 | 4/2006 | Greene |
| 2006/0085750 A1 | 4/2006 | Easton, Jr. et al. |
| 2006/0094406 A1 | 5/2006 | Cortegiano |
| 2006/0095281 A1 | 5/2006 | Chickering et al. |
| 2006/0095410 A1 | 5/2006 | Ostrover et al. |
| 2006/0099963 A1 | 5/2006 | Stephens |
| 2006/0099964 A1 | 5/2006 | Barrese et al. |
| 2006/0100928 A1 | 5/2006 | Walczak et al. |
| 2006/0100998 A1 | 5/2006 | Edwards et al. |
| 2006/0106674 A1 | 5/2006 | Muller |
| 2006/0106710 A1 | 5/2006 | Meek et al. |
| 2006/0112179 A1 | 5/2006 | Baumeister et al. |
| 2006/0122879 A1 | 6/2006 | O'Kelley |
| 2006/0123014 A1 | 6/2006 | Ng |
| 2006/0123053 A1 | 6/2006 | Scannell, Jr. |
| 2006/0129541 A1 | 6/2006 | Morgan et al. |
| 2006/0143080 A1 | 6/2006 | Garg et al. |
| 2006/0149624 A1 | 7/2006 | Baluja et al. |
| 2006/0149625 A1 | 7/2006 | Koningstein |
| 2006/0155597 A1 | 7/2006 | Gleason |
| 2006/0155706 A1 | 7/2006 | Kalinichenko et al. |
| 2006/0161778 A1 | 7/2006 | Stirbu |
| 2006/0167747 A1 | 7/2006 | Goodman et al. |
| 2006/0171340 A1 | 8/2006 | Maeda et al. |
| 2006/0178930 A1 | 8/2006 | Kim |
| 2006/0178932 A1 | 8/2006 | Lang |
| 2006/0178986 A1 | 8/2006 | Giordano et al. |
| 2006/0184417 A1 | 8/2006 | Van der Linden et al. |
| 2006/0190328 A1 | 8/2006 | Singh et al. |
| 2006/0190331 A1 | 8/2006 | Tollinger et al. |
| 2006/0190439 A1 | 8/2006 | Chowdhury et al. |
| 2006/0200384 A1 | 9/2006 | Arutunian et al. |
| 2006/0212350 A1 | 9/2006 | Ellis et al. |
| 2006/0212451 A1 | 9/2006 | Serdy et al. |
| 2006/0217110 A1 | 9/2006 | Othmer |
| 2006/0218576 A1 | 9/2006 | Johnson et al. |
| 2006/0224447 A1 | 10/2006 | Koningstein |
| 2006/0230427 A1 | 10/2006 | Kunkel et al. |
| 2006/0235938 A1 | 10/2006 | Pennell et al. |
| 2006/0236257 A1 | 10/2006 | Othmer et al. |
| 2006/0236258 A1 | 10/2006 | Othmer et al. |
| 2006/0242007 A1 | 10/2006 | Leong et al. |
| 2006/0242017 A1 | 10/2006 | Libes et al. |
| 2006/0242129 A1 | 10/2006 | Libes et al. |
| 2006/0253427 A1 | 11/2006 | Wu et al. |
| 2006/0256130 A1 | 11/2006 | Gonzalez |
| 2006/0258397 A1 | 11/2006 | Kaplan et al. |
| 2006/0259357 A1 | 11/2006 | Chiu |
| 2006/0259365 A1 | 11/2006 | Agarwal et al. |
| 2006/0259434 A1 | 11/2006 | Vilcauskas, Jr. et al. |
| 2006/0259479 A1 | 11/2006 | Dai |
| 2006/0271425 A1 | 11/2006 | Goodman et al. |
| 2006/0271438 A1 | 11/2006 | Shotland et al. |
| 2006/0277271 A1 | 12/2006 | Morse et al. |
| 2006/0282314 A1 | 12/2006 | Zamanian et al. |
| 2006/0287919 A1 | 12/2006 | Rubens et al. |
| 2006/0287936 A1 | 12/2006 | Jacobson |
| 2006/0288015 A1 | 12/2006 | Schirripa et al. |
| 2006/0293065 A1 | 12/2006 | Chew et al. |
| 2006/0294025 A1 | 12/2006 | Mengerink |
| 2006/0294084 A1 | 12/2006 | Patel et al. |
| 2006/0294094 A1 | 12/2006 | King et al. |
| 2006/0294225 A1 | 12/2006 | Grecco et al. |
| 2007/0005570 A1 | 1/2007 | Hurst-Hiller et al. |
| 2007/0005584 A1 | 1/2007 | Feng et al. |
| 2007/0005587 A1 | 1/2007 | Johnson et al. |
| 2007/0006098 A1 | 1/2007 | Krumm et al. |
| 2007/0011078 A1 | 1/2007 | Jain et al. |
| 2007/0011240 A1 | 1/2007 | Altberg et al. |
| 2007/0016473 A1 | 1/2007 | Anderson et al. |
| 2007/0022442 A1 | 1/2007 | Gil et al. |
| 2007/0027744 A1 | 2/2007 | Carson et al. |
| 2007/0027751 A1 | 2/2007 | Carson et al. |
| 2007/0027753 A1 | 2/2007 | Collins |
| 2007/0027759 A1 | 2/2007 | Collins et al. |
| 2007/0027839 A1 | 2/2007 | Ives |
| 2007/0027857 A1 | 2/2007 | Deng et al. |
| 2007/0032240 A1 | 2/2007 | Finnegan et al. |
| 2007/0033210 A1 | 2/2007 | Baudino et al. |
| 2007/0033530 A1 | 2/2007 | Motoyama et al. |
| 2007/0033531 A1 | 2/2007 | Marsh |
| 2007/0043730 A1 | 2/2007 | Wisely |
| 2007/0050244 A1 | 3/2007 | Stevens |
| 2007/0050248 A1 | 3/2007 | Huang et al. |
| 2007/0055566 A1 | 3/2007 | Gaughan et al. |
| 2007/0055938 A1 | 3/2007 | Herring et al. |
| 2007/0060173 A1 | 3/2007 | Ramer et al. |
| 2007/0061146 A1 | 3/2007 | Jaramillo et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |

(56) References Cited

U.S. PATENT DOCUMENTS

| | | |
|---|---|---|
| 2007/0061229 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061300 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0066341 A1 | 3/2007 | Silverbrook et al. |
| 2007/0067267 A1 | 3/2007 | Ives |
| 2007/0067297 A1 | 3/2007 | Kublickis |
| 2007/0067329 A1 | 3/2007 | Kamvar et al. |
| 2007/0067824 A1 | 3/2007 | Silverbrook et al. |
| 2007/0073656 A1 | 3/2007 | Bandi |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0073989 A1 | 3/2007 | Sharma et al. |
| 2007/0075915 A1 | 4/2007 | Cheon et al. |
| 2007/0078832 A1 | 4/2007 | Ott, IV et al. |
| 2007/0078851 A1 | 4/2007 | Grell et al. |
| 2007/0079331 A1 | 4/2007 | Datta et al. |
| 2007/0083408 A1 | 4/2007 | Altberg et al. |
| 2007/0083611 A1 | 4/2007 | Farago et al. |
| 2007/0088838 A1 | 4/2007 | Levkovitz et al. |
| 2007/0088851 A1 | 4/2007 | Levkovitz et al. |
| 2007/0094042 A1 | 4/2007 | Ramer et al. |
| 2007/0100648 A1 | 5/2007 | Borquez et al. |
| 2007/0100650 A1 | 5/2007 | Ramer et al. |
| 2007/0100651 A1 | 5/2007 | Ramer et al. |
| 2007/0100652 A1 | 5/2007 | Ramer et al. |
| 2007/0100653 A1 | 5/2007 | Ramer et al. |
| 2007/0100690 A1 | 5/2007 | Hopkins |
| 2007/0100805 A1 | 5/2007 | Ramer et al. |
| 2007/0100806 A1 | 5/2007 | Ramer et al. |
| 2007/0100834 A1 | 5/2007 | Landry et al. |
| 2007/0106564 A1 | 5/2007 | Matotek et al. |
| 2007/0112739 A1 | 5/2007 | Burns et al. |
| 2007/0113243 A1 | 5/2007 | Brey |
| 2007/0118533 A1 | 5/2007 | Ramer et al. |
| 2007/0118739 A1 | 5/2007 | Togashi et al. |
| 2007/0123223 A1 | 5/2007 | Letourneau et al. |
| 2007/0135084 A1 | 6/2007 | Ido et al. |
| 2007/0136261 A1 | 6/2007 | Taboada et al. |
| 2007/0143348 A1 | 6/2007 | Rosenberg |
| 2007/0160035 A1 | 7/2007 | Altberg et al. |
| 2007/0168354 A1 | 7/2007 | Ramer et al. |
| 2007/0185768 A1 | 8/2007 | Vengroff et al. |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0202900 A1 | 8/2007 | Inselberg |
| 2007/0203887 A1 | 8/2007 | Dynin |
| 2007/0233730 A1 | 10/2007 | Johnston et al. |
| 2007/0239724 A1 | 10/2007 | Ramer et al. |
| 2007/0244900 A1 | 10/2007 | Hopkins et al. |
| 2007/0250711 A1 | 10/2007 | Storey |
| 2007/0260635 A1 | 11/2007 | Ramer et al. |
| 2007/0265911 A1 | 11/2007 | Rondeau |
| 2007/0274506 A1 | 11/2007 | Schundler |
| 2007/0276829 A1 | 11/2007 | Wang et al. |
| 2007/0288427 A1 | 12/2007 | Ramer et al. |
| 2007/0294725 A1 | 12/2007 | Cohen et al. |
| 2008/0004884 A1 | 1/2008 | Flake et al. |
| 2008/0009268 A1 | 1/2008 | Ramer et al. |
| 2008/0046314 A1 | 2/2008 | Chung et al. |
| 2008/0052157 A1 | 2/2008 | Kadambi et al. |
| 2008/0070209 A1 | 3/2008 | Zhuang et al. |
| 2008/0071743 A1 | 3/2008 | Jhaveri et al. |
| 2008/0076402 A1 | 3/2008 | Jeong |
| 2008/0082518 A1 | 4/2008 | Loftesness |
| 2008/0103879 A1 | 5/2008 | Armstrong |
| 2008/0103900 A1 | 5/2008 | Flake et al. |
| 2008/0109317 A1 | 5/2008 | Singh |
| 2008/0120173 A1 | 5/2008 | Papulov |
| 2008/0133330 A1 | 6/2008 | Ullah |
| 2008/0153513 A1 | 6/2008 | Flake et al. |
| 2008/0162260 A1 | 7/2008 | Rohan et al. |
| 2008/0188207 A1 | 8/2008 | Lee |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215429 A1 | 9/2008 | Ramer et al. |
| 2008/0215475 A1 | 9/2008 | Ramer et al. |
| 2008/0215623 A1 | 9/2008 | Ramer et al. |
| 2008/0231642 A1 | 9/2008 | Okita |
| 2008/0242279 A1 | 10/2008 | Ramer et al. |
| 2008/0248809 A1 | 10/2008 | Gower |
| 2008/0249855 A1 | 10/2008 | Collins et al. |
| 2008/0270220 A1 | 10/2008 | Ramer et al. |
| 2008/0271120 A1 | 10/2008 | Parkes et al. |
| 2008/0289235 A1 | 11/2008 | Free |
| 2008/0290987 A1 | 11/2008 | Li |
| 2009/0003952 A1 | 1/2009 | Schmauder |
| 2009/0005040 A1 | 1/2009 | Bourne |
| 2009/0006338 A1 | 1/2009 | Ives et al. |
| 2009/0017805 A1 | 1/2009 | Sarukkai et al. |
| 2009/0029687 A1 | 1/2009 | Ramer et al. |
| 2009/0030952 A1 | 1/2009 | Donahue et al. |
| 2009/0055435 A1 | 2/2009 | Kiviluoto et al. |
| 2009/0076906 A1 | 3/2009 | Kansal et al. |
| 2009/0076914 A1 | 3/2009 | Coueignoux |
| 2009/0076917 A1 | 3/2009 | Jablokov et al. |
| 2009/0106115 A1 | 4/2009 | James et al. |
| 2009/0172728 A1 | 7/2009 | Shkedi et al. |
| 2009/0177542 A1 | 7/2009 | Haberman et al. |
| 2009/0187820 A1 | 7/2009 | Stinson et al. |
| 2009/0192866 A1 | 7/2009 | Karnam et al. |
| 2009/0197616 A1 | 8/2009 | Lewis et al. |
| 2009/0199085 A1 | 8/2009 | Park |
| 2009/0203361 A1 | 8/2009 | Huang et al. |
| 2009/0222329 A1 | 9/2009 | Ramer et al. |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0247140 A1 | 10/2009 | Gupta et al. |
| 2009/0254824 A1 | 10/2009 | Singh |
| 2009/0271407 A1 | 10/2009 | Hawkins et al. |
| 2009/0276303 A1 | 11/2009 | Singhal |
| 2010/0100446 A1 | 4/2010 | Kim |
| 2010/0121782 A1 | 5/2010 | Noser et al. |
| 2010/0153211 A1 | 6/2010 | Ramer et al. |
| 2010/0159904 A1 | 6/2010 | Colligan et al. |
| 2010/0208997 A1 | 8/2010 | Xie et al. |
| 2010/0218036 A1 | 8/2010 | Buchhop et al. |
| 2010/0222036 A1 | 9/2010 | Wormald et al. |
| 2010/0227594 A1 | 9/2010 | De Vries |

(56) References Cited

U.S. PATENT DOCUMENTS

| | | |
|---|---|---|
| 2010/0257037 A1 | 10/2010 | Matz et al. |
| 2010/0299192 A1 | 11/2010 | Aslanian, Jr. |
| 2010/0312643 A1 | 12/2010 | Gil |
| 2010/0332315 A1 | 12/2010 | Kamar et al. |
| 2011/0029394 A1 | 2/2011 | Nordberg |
| 2011/0035284 A1 | 2/2011 | Moshfeghi |
| 2011/0159902 A1 | 6/2011 | Ramer et al. |
| 2011/0177799 A1 | 7/2011 | Ramer et al. |
| 2011/0202874 A1 | 8/2011 | Ramer et al. |
| 2011/0238517 A1 | 9/2011 | Ramalingam et al. |
| 2011/0258046 A1 | 10/2011 | Ramer et al. |
| 2011/0258049 A1 | 10/2011 | Ramer et al. |
| 2011/0270661 A1 | 11/2011 | Heiser, II et al. |
| 2011/0275393 A1 | 11/2011 | Ramer et al. |
| 2011/0276374 A1 | 11/2011 | Heiser, II et al. |
| 2011/0312310 A1 | 12/2011 | Ramer et al. |
| 2011/0313853 A1 | 12/2011 | Ramer et al. |
| 2011/0313862 A1 | 12/2011 | Ramer et al. |
| 2011/0320264 A1 | 12/2011 | Ramer et al. |
| 2011/0320265 A1 | 12/2011 | Ramer et al. |
| 2011/0320266 A1 | 12/2011 | Ramer et al. |
| 2011/0320267 A1 | 12/2011 | Ramer et al. |
| 2011/0320268 A1 | 12/2011 | Ramer et al. |
| 2011/0320269 A1 | 12/2011 | Ramer et al. |
| 2011/0320270 A1 | 12/2011 | Ramer et al. |
| 2011/0320271 A1 | 12/2011 | Ramer et al. |
| 2011/0320279 A1 | 12/2011 | Ramer et al. |
| 2011/0320280 A1 | 12/2011 | Ramer et al. |
| 2011/0320281 A1 | 12/2011 | Ramer et al. |
| 2011/0320282 A1 | 12/2011 | Ramer et al. |
| 2012/0004984 A1 | 1/2012 | Ramer et al. |
| 2012/0004985 A1 | 1/2012 | Ramer et al. |
| 2012/0004986 A1 | 1/2012 | Ramer et al. |
| 2012/0004987 A1 | 1/2012 | Ramer et al. |
| 2012/0004988 A1 | 1/2012 | Ramer et al. |
| 2012/0004989 A1 | 1/2012 | Ramer et al. |
| 2012/0004990 A1 | 1/2012 | Ramer et al. |
| 2012/0004991 A1 | 1/2012 | Ramer et al. |
| 2012/0004992 A1 | 1/2012 | Ramer et al. |
| 2012/0004993 A1 | 1/2012 | Ramer et al. |
| 2012/0004994 A1 | 1/2012 | Ramer et al. |
| 2012/0004995 A1 | 1/2012 | Ramer et al. |
| 2012/0004996 A1 | 1/2012 | Ramer et al. |
| 2012/0004997 A1 | 1/2012 | Ramer et al. |
| 2012/0004998 A1 | 1/2012 | Ramer et al. |
| 2012/0004999 A1 | 1/2012 | Ramer et al. |
| 2012/0005000 A1 | 1/2012 | Ramer et al. |
| 2012/0005001 A1 | 1/2012 | Ramer et al. |
| 2012/0005002 A1 | 1/2012 | Ramer et al. |
| 2012/0005003 A1 | 1/2012 | Ramer et al. |
| 2012/0005004 A1 | 1/2012 | Ramer et al. |
| 2012/0005005 A1 | 1/2012 | Ramer et al. |
| 2012/0005006 A1 | 1/2012 | Ramer et al. |
| 2012/0005007 A1 | 1/2012 | Ramer et al. |
| 2012/0005008 A1 | 1/2012 | Ramer et al. |
| 2012/0005009 A1 | 1/2012 | Ramer et al. |
| 2012/0005010 A1 | 1/2012 | Ramer et al. |
| 2012/0005011 A1 | 1/2012 | Ramer et al. |
| 2012/0005012 A1 | 1/2012 | Ramer et al. |
| 2012/0005013 A1 | 1/2012 | Ramer et al. |
| 2012/0005014 A1 | 1/2012 | Ramer et al. |
| 2012/0005020 A1 | 1/2012 | Ramer et al. |
| 2012/0010945 A1 | 1/2012 | Ramer et al. |
| 2012/0010946 A1 | 1/2012 | Ramer et al. |
| 2012/0010947 A1 | 1/2012 | Ramer et al. |
| 2012/0010948 A1 | 1/2012 | Ramer et al. |
| 2012/0010949 A1 | 1/2012 | Ramer et al. |
| 2012/0010950 A1 | 1/2012 | Ramer et al. |
| 2012/0010951 A1 | 1/2012 | Ramer et al. |
| 2012/0010952 A1 | 1/2012 | Ramer et al. |
| 2012/0010953 A1 | 1/2012 | Ramer et al. |
| 2012/0010954 A1 | 1/2012 | Ramer et al. |
| 2012/0010955 A1 | 1/2012 | Ramer et al. |
| 2012/0010956 A1 | 1/2012 | Ramer et al. |
| 2012/0010957 A1 | 1/2012 | Ramer et al. |
| 2012/0010958 A1 | 1/2012 | Ramer et al. |
| 2012/0010959 A1 | 1/2012 | Ramer et al. |
| 2012/0010960 A1 | 1/2012 | Ramer et al. |
| 2012/0010961 A1 | 1/2012 | Ramer et al. |
| 2012/0010962 A1 | 1/2012 | Ramer et al. |
| 2012/0010963 A1 | 1/2012 | Ramer et al. |
| 2012/0010964 A1 | 1/2012 | Ramer et al. |
| 2012/0010965 A1 | 1/2012 | Ramer et al. |
| 2012/0010966 A1 | 1/2012 | Ramer et al. |
| 2012/0010967 A1 | 1/2012 | Ramer et al. |
| 2012/0010968 A1 | 1/2012 | Ramer et al. |
| 2012/0010969 A1 | 1/2012 | Ramer et al. |
| 2012/0010970 A1 | 1/2012 | Ramer et al. |
| 2012/0010971 A1 | 1/2012 | Ramer et al. |
| 2012/0010972 A1 | 1/2012 | Ramer et al. |
| 2012/0010973 A1 | 1/2012 | Ramer et al. |
| 2012/0010974 A1 | 1/2012 | Ramer et al. |
| 2012/0010975 A1 | 1/2012 | Ramer et al. |
| 2012/0010976 A1 | 1/2012 | Ramer et al. |
| 2012/0010977 A1 | 1/2012 | Ramer et al. |
| 2012/0010978 A1 | 1/2012 | Ramer et al. |
| 2012/0010979 A1 | 1/2012 | Ramer et al. |
| 2012/0010980 A1 | 1/2012 | Ramer et al. |
| 2012/0010981 A1 | 1/2012 | Ramer et al. |
| 2012/0010982 A1 | 1/2012 | Ramer et al. |
| 2012/0010983 A1 | 1/2012 | Ramer et al. |
| 2012/0010984 A1 | 1/2012 | Ramer et al. |
| 2012/0010985 A1 | 1/2012 | Ramer et al. |
| 2012/0010986 A1 | 1/2012 | Ramer et al. |
| 2012/0010987 A1 | 1/2012 | Ramer et al. |
| 2012/0010988 A1 | 1/2012 | Ramer et al. |
| 2012/0010989 A1 | 1/2012 | Ramer et al. |
| 2012/0010990 A1 | 1/2012 | Ramer et al. |
| 2012/0010991 A1 | 1/2012 | Ramer et al. |
| 2012/0016739 A1 | 1/2012 | Ramer et al. |
| 2012/0016740 A1 | 1/2012 | Ramer et al. |
| 2012/0016750 A1 | 1/2012 | Ramer et al. |
| 2012/0016751 A1 | 1/2012 | Ramer et al. |
| 2012/0036010 A1 | 2/2012 | Ramer et al. |
| 2012/0041819 A1 | 2/2012 | Ramer et al. |
| 2012/0059711 A1 | 3/2012 | Ramer et al. |
| 2012/0059718 A1 | 3/2012 | Ramer et al. |
| 2012/0066057 A1 | 3/2012 | Ramer et al. |
| 2012/0066198 A1 | 3/2012 | Ramer et al. |
| 2012/0066199 A1 | 3/2012 | Ramer et al. |
| 2012/0083252 A1 | 4/2012 | Lapstun et al. |
| 2012/0150853 A1 | 6/2012 | Tang |
| 2012/0215607 A1 | 8/2012 | Brereton, II et al. |

FOREIGN PATENT DOCUMENTS

| | | |
|---|---|---|
| KP | 2005/50016 | 5/2005 |
| KR | 10200101116966 | 1/2001 |
| KR | 10-2001-0108011 | 7/2001 |
| KR | 2001078607 A | 8/2001 |
| KR | 10200101116966 | 12/2001 |
| KR | 0366120 | 12/2002 |
| KR | 1020050050016 | 5/2005 |
| KR | 10-2008-0065589 | 7/2008 |
| KR | 10-0858273 B1 | 9/2008 |
| WO | 00/77978 A2 | 12/2000 |
| WO | WO-2004/021218 A2 | 3/2004 |
| WO | WO-2004057883 A2 | 7/2004 |
| WO | WO-2005/062794 A2 | 7/2005 |
| WO | WO-2005/094094 A1 | 10/2005 |
| WO | WO-2006/017364 A1 | 2/2006 |
| WO | 2006/049424 A1 | 5/2006 |
| WO | WO-2006/104895 A2 | 5/2006 |
| WO | WO-2007033358 A2 | 3/2007 |
| WO | WO-2007033358 A3 | 3/2007 |
| WO | WO-2008052205 A2 | 5/2008 |
| WO | WO-2008052205 A3 | 5/2008 |
| WO | WO-2009/002999 A2 | 12/2008 |
| WO | WO-2009/002999 A3 | 12/2008 |

(56) References Cited

FOREIGN PATENT DOCUMENTS

| WO | WO-2011094734 A1 | 4/2011 |
|----|------------------|--------|
| WO | WO-2011094734 A3 | 8/2011 |

OTHER PUBLICATIONS

ISR, "PCT//US06/35976_092407", U.S. Appl. No. PCT/US06/35976, International Search Report,(Sep. 24, 2007).
"The Popularity of 'Get It Now' from Verizon Soars as Customers Download 12 million Applications", *Verizon Wireless*, (Jun. 5, 2003),all.
"Using Your Treo 600 Smartphone by PalmOne", *Includes setup information and instructions for most tasks*, 2004, 1-174.
"Nokia gives cell phones new address", by Ben Charny Posted on *ZDNet News*: Nov. 5, 2003 8:31:00 PM.
"Nokia 9500 Communicator User Guide", *Nokia Corporation*, 2005.
""AdWords" Wikipedia Article, revised Oct. 25, 2005", accessed via http://www.wikipedia.org/_History tab, all.
"Business Editors/High-Tech Writers", *Business 2.0 Uses Internet Keywords to Link Magazine Readers to Online Content;U Publication Integrates Internet Keywords Within Content, Easing Information Gathering for Readers.* Business Wire Sep. 26, 2000, p. 1.
*Mobile Commerce: Need to leave the country? Now you can do it faster . . . ; New travel deals search expands world of WAP. M2 Presswire.*, (Jun. 7, 2005),1.
Hyoguchi, K. *Advertising strategies tap cell phones. The Nikkei Weekly* (Japan), (Oct. 6, 2003),1-3.
"Unisource in GSM trial of Mobile Electronic banking and shopping", *Mobile Communications*, (Mar. 20, 1997).
"Unisource Announces Trial Using GSM for Fast and Secure Money Transactions on the Internet", Findarticles.com, (Mar. 11, 1997),1-3.
Resnick, et al., "PICS:Internet Access Controls Without Censorship", *Communications of the ACM*,vol. 39(10), (Oct. 1996),pp. 87-93.
Gourley, et al., "HTTP: The Definitive Guide", O'Reilly,Chapter-9,(Sep. 1, 2002),1-4 pgs.
"Mobile Commerce: Need to leave the country? Now you can do it faster . . . ; New travel", M2 Presswire XP008096285 Jun. 7, 2005.
"U.S. Appl. No. 11/382,696 FOA", Jul. 6, 2010, all.
"U.S. Appl. No. 12/905,197, NFOA Dec. 8, 2010", Webb Docket No. 5807-102935 Dec. 8, 2010, all.
"U.S. Appl. No. 11/928,909, Non-Final Office Action mailed Dec. 16, 2010", , 46.
"U.S. Appl. No. 11/929,059, Non-Final Office Action mailed Sep. 23, 2010", , 41 pgs.
"U.S. Appl. No. 11/929,096, Non-Final Office Action mailed Jan. 3, 2011", , 52.
"U.S. Appl. No. 11/929,129, Non-Final Office Action mailed Nov. 26, 2010", , 51.
"U.S. Appl. No. 11/929,328, Non-Final Office Action mailed Nov. 19, 2010", , 38.
"U.S. Appl. No. 12/576,887 NFOA", Sep. 29, 2010, all.
"U.S. Appl. No. 12/847,624, NFOA", Dec. 8, 2010, all.
"U.S. Appl. No. 11/282,120", *Notice of Allowance Rec'd* Dec. 7, 2009, all.
"Cal/Vision.com Helps Wireless Users Make Sense of Dollars and Cents", *Wireless Today*. Mar. 6, 2000, all.
"Korean Office Action", Provisional Rejection for Korean Patent Appl. No. 10-22008-7008835 Dec. 21, 2010, all.
Hyoguchi, K, "'Advertising strategies tap cell phones'", *The Nikkei Weekly* (Japan) XP008096219 Oct. 6, 2003, 1-3.
"U.S. Appl. No. 12/795,860 NFOA", U.S. Appl. No. 12/705,860 Mar. 10, 2011, all.
"U.S. Appl. No. 12/905,271, NFOA, Jan. 31, 2011", U.S. Appl. No. 12/905,271 Jan. 31, 2011, all.
"U.S. Appl. No. 11/274,884 Final OA Apr. 1, 2011", U.S. Appl. No. 11/274,884 Apr. 1, 2011, all.
"U.S. Appl. No. 11/387,147, Notice of Allowance mailed Feb. 4, 2011", , 12.

"U.S. Appl. No. 11/929,272, Non-Final Office Action mailed Nov. 5, 2010", , 41.
"U.S. Appl. No. 12/114,006, Non-Final Office Action mailed Mar. 25, 2011", , 45.
"U.S. Appl. No. 11/271,164, Final Office Action mailed Mar. 18, 2011", , 20.
"U.S. Appl. No. 12/976,584", May 5, 2011, all.
"U.S. Appl. No. 11/267,940", Apr. 15, 2011, all.
"PCT/US2010/026633 ISR", Documentation not provided, search documents in Korean. Oct. 28, 2010, all.
"U.S. Appl. No. 11/929,308", Apr. 19, 2011.
"U.S. Appl. No. 11/337,112, Non-Final Office Action mailed Jun. 8, 2011", , 24.
"U.S. Appl. No. 11/382,262, Non-Final Office Action mailed Jun. 7, 2011", , 34.
"U.S. Appl. No. 11/382,618, Non-Final Office Action mailed May 24, 2011", , 11.
"U.S. Appl. No. 11/928,937, Notice of Allowance mailed Jun. 14, 2011", , 19.
"U.S. Appl. No. 12/762,036, Notice of Allowance mailed May 9, 2011", , 5.
"U.S. Appl. No. 12/905,197, Notice of Allowance mailed May 5, 2011", , 8.
"U.S. Appl. No. 11/928,960, Final Office Action mailed Apr. 27, 2011", , 74.
"U.S. Appl. No. 12/576,887, Final Office Action mailed Jun. 3, 2011", , 63.
"Mobile Search Engines White Paper", Sonera MediaLab, Nov. 15, 2002, 10 pages.
Foong, Cynthia Wong Kwai, "Mobile Device Agents for Delivering Context Aware Information in Targeted Advertising", Jul. 2004, 148 pages, available online at <http://library.must.edu.my/v3/Catalog-Databases/MUST-Theses/2004/General/Cynthia-FinalThesis.pdf>.
Google AdWords, "A New Addition to the Quality Score", posted by Sarah, Inside AdWords, Dec. 8, 2005, 1 page.
Google Ad Words, "Quality Score Updates", posted by Sarah, Inside AdWords, Feb. 14, 2007, 2 pages.
Google AdWords, "The Next Generation of Keyword Evaluation", posted by Jon, Inside AdWords, Jul. 14, 2005, 1 page.
Peddie, Jon, "Jon Peddie Research. Digital Content Creation (DCC) Market to See Growth on Several Fronts", http://jonpeddie.com/press-releases/details/digital_content_creation_dcc_market_to_see_growth_on_severaUronts_says~o/ Dec. 24, 2011 335 Aug. 11, 2005, 1-2.
"U.S. Appl. No. 13/236,642, Non-Final Office Action mailed Mar. 6, 2012", U.S. Appl. No. 13/236,642 364 Mar. 6, 2012, 1-96.
"U.S. Appl. No. 12/539,395, Final Office Action mailed Mar. 6, 2012", U.S. Appl. No. 12/539,395 365 Mar. 6, 2012, 1-23.
"U.S. Appl. No. 13/363,236, Non-Final Office Action mailed Mar. 2, 2012", U.S. Appl. No. 13/363,236 362 Mar. 2, 2012, 1-5.
"U.S. Appl. No. 13/235,509, Non-Final Office Action mailed Feb. 7, 2012", U.S. Appl. No. 13/235,509 350 Feb. 7, 2012, 94.
"2009-534917, First Office Action—Japanese", JP-SN:2009-534917 351 Feb. 6, 2012, all.
"U.S. Appl. No. 11/929,272, Final Office Action mailed Feb. 28, 2012", U.S. Appl. No. 11/929,272 360 Feb. 28, 2012, 11.
"U.S. Appl. No. 11/929,016, Non-Final Office Action mailed Feb. 17, 2012", U.S. Appl. No. 11/929,016 358 Feb. 17, 2012, 31.
"U.S. Appl. No. 13/235,507, Non-Final Office Action mailed Feb. 14, 2012", U.S. Appl. No. 13/235,507 355 Feb. 14, 2012, 94.
"U.S. Appl. No. 12/400,153, Final Office Action mailed Feb. 14, 2012", U.S. Appl. No. 12/400,153 356 Feb. 14, 2012, 20.
"U.S. Appl. No. 12/905,271, Non-Final Office Action mailed Feb. 14, 2012", U.S. Appl. No. 12/905,271 354 Feb. 14, 2012, 23.
"U.S. Appl. No. 13/235,478, Non-Final Office Action mailed Feb. 13, 2012", U.S. Appl. No. 13/235,478 353 Feb. 13, 2012, 91.
"U.S. Appl. No. 12/400,185, Non-Final Office Action mailed Feb. 10, 2012", U.S. Appl. No. 12/400,185 352 Feb. 10, 2012, 18.
"U.S. Appl. No. 13/236,631, Non-Final Office Action mailed Feb. 1, 2012", U.S. Appl. No. 13/236,631 349 Feb. 1, 2012, 98.
"U.S. Appl. No. 13/235,494, NFOA, Dec. 1, 2011", U.S. Appl. No. 13/235,494 333 Dec. 1, 2011, all.

(56) References Cited

OTHER PUBLICATIONS

"U.S. Appl. No. 13/235,496, NFOA", U.S. Appl. No. 13/235,496 323 Dec. 2, 2011, 68.
"U.S. Appl. No. 13/235,492, NFOA", U.S. Appl. No. 13/235,492 318 Nov. 28, 2011.
"U.S. Appl. No. 13/235,481, NFOA", U.S. Appl. No. 13/235,481 320 Nov. 25, 2011, 67.
"U.S. Appl. No. 13/235,488, NFOA", U.S. Appl. No. 13/235,488 310 Nov. 15, 2011, 67.
"U.S. Appl. No. 13/235,490, NFOA", U.S. Appl. No. 13/235,490 308 Nov. 15, 2011, 68.
"U.S. Appl. No. 13/235,485, NFOA", U.S. Appl. No. 13/235,485 305 Nov. 14, 2011, 67 Pgs.
, "U.S. Appl. No. 13/235,498, NFOA", U.S. Appl. No. 13/235,498 306 Nov. 14, 2011, 67 Pgs.
"U.S. Appl. No. 13/235,497, NFOA", U.S. Appl. No. 13/235,497 307 Nov. 14, 2011, 67 Pgs.
"U.S. Appl. No. 13/235,495, Non-Final Office Action mailed Nov. 30, 2011", U.S. Appl. No. 13/235,495 319 Nov. 30, 2011, 11.
"U.S. Appl. No. 13/235,479, Non-Final Office Action mailed Nov. 28, 2011", U.S. Appl. No. 13/235,479 315 Nov. 28, 2011, 11.
"U.S. Appl. No. 13/235,482, Non-Final Office Action mailed Nov. 28, 2011", U.S. Appl. No. 13/235,482 316 Nov. 28, 2011, 11.
"U.S. Appl. No. 13/235,483, Non-Final Office Action mailed Nov. 28, 2011", U.S. Appl. No. 13/235,483 317 Nov. 28, 2011, 11.
"U.S. Appl. No. 13/235,463 ,NFOA", U.S. Appl. No. 13/235,463 309 Nov. 14, 2011.
"U.S. Appl. No. 13/219,598 Non Final Office Action mailed Nov. 1, 2011", U.S. Appl. No. 13/219,598 297 Nov. 1, 2011, 67 pages.
"U.S. Appl. No. 13/219,703, Non-Final Office Action mailed Jan. 31, 2012", U.S. Appl. No. 13/219,703 348 Jan. 31, 2012, 79.
"U.S. Appl. No. 12/905,197, Notice of Allowance mailed Jan. 19, 2012", U.S. Appl. No. 12/905,197 344 Jan. 19, 2012, 39.
"U.S. Appl. No. 13/226,475, Non-Final Office Action mailed Jan. 6, 2012", U.S. Appl. No. 13/226,475 345 Jan. 6, 2012, 17.
"U.S. Appl. No. 13/166,972, NFOA", U.S. Appl. No. 13/166,972 285 Aug. 18, 2011, 3.
"U.S. Appl. No. 13/231,941, Non-Final Office Action mailed Mar. 15, 2012", U.S. Appl. No. 13/231,941 366 Mar. 15, 2012, 1-97.
"U.S. Appl. No. 13/232,995, Non-Final Office Action mailed Mar. 15, 2012", U.S. Appl. No. 13/232,995 367 Mar. 15, 2012, 1-92.
"U.S. Appl. No. 13/235,511, Non-Final Office Action mailed Mar. 14, 2012", U.S. Appl. No. 13/235,511 368 Mar. 14, 2012, 1-95.
"U.S. Appl. No. 13/235,512, Non-Final Office Action mailed Mar. 14, 2012", U.S. Appl. No. 13/235,512 369 Mar. 14, 2012, 1-95.
"EP Appl No. 08796001.9", SN-ER: 08796001.3 359 Feb. 3, 2012, all.
"U.S. Appl. No. 12/537,814, NFOA", U.S. Appl. No. 12/537,814 339 Jan. 13, 2012, 81 Pgs.
"U.S. Appl. No. 13/235,481, NOA", U.S. Appl. No. 13/235,481 340 Jan. 11, 2012, 9.
"U.S. Appl. No. 12/486,502, NFOA", U.S. Appl. No. 12/486,502 336 Jan. 9, 2012, 89.
"U.S. Appl. No. 13/235,479, NoA", U.S. Appl. No. 13/235,479 337 Jan. 9, 2012, 9.
"U.S. Appl. No. 13/295,066, Non-Final Office Action mailed Jan. 24, 2012", U.S. Appl. No. 13/295,066 347 Jan. 24, 2012, 6.
"Appl. Korean Serial No. 10-2008-7008835", KR-10-2008-7008835 338 Jan. 10, 2012, all.
"U.S. Appl. No. 11/337,112, Final Office Action mailed Mar. 5, 2012", U.S. Appl. No. 11/337,112 363, 27.
"U.S. Appl. No. 11/929,308, Notice of Allowance mailed Mar. 2, 2012", U.S. Appl. No. 11/929,308 361, 37 pages.
"U.S. Appl. No. 12/976,584, Non-Final Office Action mailed Mar. 21, 2012", U.S. Appl. No. 12/976,584 370, 30.
"U.S. Appl. No. 13/219,598, Non-Final Office Action mailed Feb. 9, 2012", U.S. Appl. No. 13/219,598 357, 9.
"U.S. Appl. No. 13/235,482, Non-Final Office Action mailed Mar. 22, 2012", U.S. Appl. No. 13/235,482 372, 16.

"U.S. Appl. No. 12/400,166, Final Office Action mailed Mar. 20, 2012", U.S. Appl. No. 12/400,166 371, 36.
Oracle Communications, "Mobile Advertising: Buy in or Lose Out", An Oracle White Paper, Sep. 2008, pp. 1-11.
U.S. Appl. No. 13/235,502, filed Dec. 7, 2011, all.
"U.S. Appl. No. 13/235,519 NFOA", U.S. Appl. No. 13/235,519 Dec. 1, 2011, all.
"U.S. Appl. No. 11/274,933, NFOA,", Jun. 20, 2011, 1-18.
"U.S. Appl. No. 11/382,243 NFOA", U.S. Appl. No. 11/382,243 May 22, 2009, 1-17.
"U.S. Appl. No. 11/382,243, NOA & Fees Due, Jul. 13, 2011", U.S. Appl. No. 11/382,243 Notice of Allowance and Fees Due, 31 pages.
"U.S. Appl. No. 11/928,877, Final Office Action mailed Jul. 22, 2011", , 19.
"U.S. Appl. No. 11/267,940, Final Office Action mailed Dec. 21, 2011", , 46.
"U.S. Appl. No. 11/274,933, Final Office Action mailed Dec. 29, 2011", , 33.
"U.S. Appl. No. 11/929,096, Final Office Action mailed Oct. 11, 2011", , 17 Pgs.
"U.S. Appl. No. 12/976,584, Final Office Action mailed Dec. 1, 2011", , 26.
"U.S. Appl. No. 11/268,671, Notice of Allowance Mailed Aug. 15, 2011", , 19.
"U.S. Appl. No. 11/274,884 Non Final Office Action mailed Nov. 1, 2011", , 23 pages.
"U.S. Appl. No. 11/928,819, Final Office Action mailed Jul. 20, 2011", , 18.
"U.S. Appl. No. 11/928,909, Final Office Action mailed Aug. 11, 2011", , 15.
"U.S. Appl. No. 11/929,129, Final Office Action mailed Aug. 10, 2011", , 18.
"U.S. Appl. No. 11/929,272, Non-Final Office Action mailed Jul. 18, 2011", U.S. Appl. No. 11/929,272, 20.
"U.S. Appl. No. 11/929,328, Notice of Allowance mailed Jul. 29, 2011", , 24.
"U.S. Appl. No. 11/929,328, Notice of Allowance mailed Oct. 5, 2011", , 10.
"U.S. Appl. No. 12/134,033, Non Final Office Action mailed Jul. 21, 2011", , 50.
"U.S. Appl. No. 12/400,096, Non-Final Office Action mailed Sep. 30, 2011", , 58.
"U.S. Appl. No. 12/400,138, Non-Final Office Action mailed Sep. 30, 2011", , 60.
"U.S. Appl. No. 12/400,153, Non-Final Office Action mailed Jun. 22, 2011", , 46.
"U.S. Appl. No. 12/400,166, Non-Final Office Action mailed Jun. 28, 2011", , 57.
"U.S. Appl. No. 12/400,185, Non-Final Office Action mailed Jul. 12, 2011", U.S. Appl. No. 12/400,185, 55.
"U.S. Appl. No. 12/483,790, Notice of Allowance mailed Aug. 17, 2011", , 25.
"U.S. Appl. No. 12/499,585, Non-Final Office Action mailed Sep. 30, 2011", , 63.
"U.S. Appl. No. 12/719,588, Non-Final Office Action mailed Sep. 9, 2011", , 54.
"U.S. Appl. No. 12/770,414, Notice of Allowance mailed Nov. 7, 2011", , 37.
"U.S. Appl. No. 12/847,624, Notice of Allowance mailed Jul. 25, 2011", , 19.
"U.S. Appl. No. 13/031,504, Non-Final Office Action mailed Sep. 30, 2011", , 71.
"U.S. Appl. No. 13/069,983, Non-Final Office Action mailed Nov. 30, 2011", , 77.
"U.S. Appl. No. 13/182,988 Non-Final Office Action mailed Nov. 18, 2011", , 75.
"U.S. Appl. No. 13/235,461, Non-Final Office Action mailed Dec. 22, 2011", , 3.
"U.S. Appl. No. 13/235,504, Non-Final Office Action mailed Nov. 23, 2011", , 80.
"U.S. Appl. No. 13/235,508, Non-Final Office Action mailed Nov. 23, 2011", , 3.

(56) References Cited

OTHER PUBLICATIONS

"U.S. Appl. No. 13/021,452, Non-Final Office Action mailed Dec. 27, 201196", , 96.

"U.S. Appl. No. 11/929,016, Final Office Action mailed Jul. 31, 2011", U.S. Appl. No. 11/929,016 , 23.

"U.S. Appl. No. 11/929,039, Final Office Action mailed Jun. 24, 2011", , 21 pgs.

"U.S. Appl. No. 11/929,081, Final Office Action mailed Jun. 28, 2011", U.S. Appl. No. 11/929,081 , 26.

"U.S. Appl. No. 11/929,171, Final Office Action mailed Jul. 6, 2011", U.S. Appl. No. 11/929,171 , 39.

"U.S. Appl. No. 12/533,689, Final Office Action mailed Nov. 7, 2011", , 34 PGS.

"U.S. Appl. No. 12/839,065, Final Office Action mailed Nov. 16, 2011", , 24 PGS.

"U.S. Appl. No. 12/905,271, Final Office Action mailed Sep. 26, 2011", , 17.

"U.S. Appl. No. 13/036,899, Final Office Action mailed Dec. 7, 2011", , 36 Pgs.

"U.S. Appl. No. 13/235,459, Non-Final Office Action mailed Dec. 21, 2011", , 7.

"U.S. Appl. No. 11/271,164 Non-Final Office Action mailed on Nov. 10, 2011".

"U.S. Appl. No. 11/274,905 Final Office Action mailed Oct. 19, 2011", , 17.

"U.S. Appl. No. 11/382,618 Final Office Action mailed on Nov. 9, 2011", , 46.

"U.S. Appl. No. 12/771,314 Non-Final Office Action mailed Oct. 24, 2011", , 59.

"International Application Serial No. PCT/US2011/023316, Search Report and Written Opinion mailed Nov. 28, 2011", , 12.

Garmin, "Garmin nuvi 300/350 personal travel assistant", Owner's manual, available online at <http://www.tramsoft.ch/downloads/garmin/nuvi350_owners-manual.pdf>, 2005-2006, 79 pages.

Garmin, "Garmin nuvi Personal Travel Assistant Owner's manual", Sep. 2005, 68 pages.

Ishikawa et al., "Speech-Activated Text Retrieval System for Multimodal Cellular Phones", Proceedings of IEEE International Conference on Acoustics, Speech and Signal Processing, (ICASSP '04), 2004, pp. I-453-I-456.

"ISR PCT/US2008/068108", International Search Report, (Dec. 29, 2008).

"WO-PCT/US2008/068108", Written Opinion, (Dec. 29, 2008).

* cited by examiner

INTERACTIVE MOBILE ADVERTISEMENT BANNERS

CROSS-REFERENCE TO RELATED APPLICATIONS

This application claims the benefit of the following commonly-owned U.S. Provisional Patent Applications, each of which is incorporated herein by reference in its entirety: App. No. 60/946,132 filed on Jun. 25, 2007 and entitled "BUSINESS STREAM: EXPLORING NEW ADVERTISING OPPORTUNITIES AND AD FORMATS," and App. No. 60/968,188 filed on Aug. 27, 2007 and entitled "MOBILE CONTENT SEARCH."

This application is a continuation-in-part of the following U.S. Patent Applications: U.S. patent application Ser. No. 11/267,940 filed on Nov. 5, 2005 entitled "MANAGING SPONSORED CONTENT FOR DELIVERY TO MOBILE COMMUNICATION FACILITIES"; U.S. patent application Ser. No. 11/268,671 filed on Nov. 5, 2005 entitled "MANAGING PAYMENT FOR SPONSORED CONTENT PRESENTED TO MOBILE COMMUNICATION FACILITIES"; U.S. patent application Ser. No. 11/271,164 filed on Nov. 11, 2005 entitled "MANAGING SPONSORED CONTENT BASED ON DEVICE CHARACTERISTICS"; U.S. patent application Ser. No. 11/274,933 filed on Nov. 14, 2005 entitled "PRESENTATION OF SPONSORED CONTENT ON MOBILE COMMUNICATION FACILITIES"; U.S. patent application Ser. No. 11/274,905 filed on Nov. 14, 2005 entitled "MANAGING SPONSORED CONTENT BASED ON GEOGRAPHIC REGION"; U.S. patent application Ser. No. 11/274,884 filed on Nov. 14, 2005 entitled "MANAGING SPONSORED CONTENT BASED ON TRANSACTION HISTORY; U.S. patent application Ser. No. 11/282,120 filed on Nov. 16, 2005 entitled "MANAGING SPONSORED CONTENT BASED ON USAGE HISTORY" U.S. patent application Ser. No. 11/281,902 filed on Nov. 16, 2005 entitled "MANAGING SPONSORED CONTENT BASED ON USER CHARACTERISTICS"; U.S. patent application Ser. No. 11/335,900 filed on Jan. 18, 2006 entitled "MOBILE ADVERTISEMENT SYNDICATION"; U.S. patent application Ser. No. 11/335,904 filed on Jan. 19, 2006 entitled "PRESENTING SPONSORED CONTENT ON A MOBILE COMMUNICATION FACILITY"; U.S. patent application Ser. No. 11/337,233 filed on Jan. 19, 2006 entitled "LOCATION INFLUENCED SEARCH RESULTS"; U.S. patent application Ser. No. 11/337,234 filed on Jan. 19, 2006 entitled "MOBILE COMMUNICATION FACILITY CHARACTERISTIC INFLUENCE SEARCH RESULTS"; U.S. patent application Ser. No. 11/336,432 filed on Jan. 19, 2006 entitled "USER HISTORY INFLUENCED SEARCH RESULTS"; U.S. patent application Ser. No. 11/337,180 filed on Jan. 19, 2006 entitled "USER CHARACTERISTIC INFLUENCED SEARCH RESULTS"; U.S. patent application Ser. No. 11/337,112 filed on Jan. 19, 2006 entitled "USER TRANSACTION HISTORY INFLUENCED SEARCH RESULTS"; U.S. patent application Ser. No. 11/347,826 filed on Feb. 3, 2006 entitled "PREVENTING MOBILE COMMUNICATION FACILITY CLICK FRAUD"; U.S. patent application Ser. No. 11/347,825 filed on Feb. 3, 2006 entitled "SEARCH QUERY ADDRESS REDIRECTION ON A MOBILE COMMUNICATION FACILITY"; U.S. patent application Ser. No. 11/347,842 filed on Feb. 3, 2006 entitled "MULTIMODAL SEARCH QUERY PROCESSING"; U.S. patent application Ser. No. 11/355,915 filed on Feb. 16, 2006 entitled "PRESENTATION OF SPONSORED CONTENT BASED ON MOBILE TRANSACTION EVENT"; U.S. patent application Ser. No. 11/387,147 filed on Mar. 21, 2006 entitled "INTERACTION ANALYSIS AND PRIORITIZATION OF MOBILE CONTENT"; U.S. patent application Ser. No. 11/414,168 filed on Apr. 27, 2006 entitled "DYNAMIC BIDDING AND EXPECTED VALUE"; U.S. patent application Ser. No. 11/414,740 filed on Apr. 27, 2006 entitled "EXPECTED VALUE AND PRIORITIZATION OF MOBILE CONTENT"; U.S. patent application Ser. No. 11/382,226 filed on May 8, 2006 entitled "MOBILE SEARCH SUBSTRING QUERY COMPLETION"; U.S. patent application Ser. No. 11/382,237 filed on May 8, 2006 entitled "IMPLICIT SEARCHING FOR MOBILE CONTENT"; U.S. patent application Ser. No. 11/382,243 filed on May 8, 2006 entitled "MOBILE CONTENT SPIDERING AND COMPATIBILITY DETERMINATION"; U.S. patent application Ser. No. 11/382,246 filed on May 8, 2006 entitled "CREATION OF A MOBILE SEARCH SUGGESTION DICTIONARY"; U.S. patent application Ser. No. 11/382,249 filed on May 8, 2006 entitled "MOBILE PAY-PER-CALL CAMPAIGN CREATION"; U.S. patent application Ser. No. 11/382,257 filed on May 8, 2006 entitled "MOBILE PAY-PER-CALL CAMPAIGN CREATION" U.S. patent application Ser. No. 11/382,260 filed on May 8, 2006 entitled "AUTHORIZED MOBILE CONTENT SEARCH RESULTS"; U.S. patent application Ser. No. 11/382,262 filed on May 8, 2006 entitled "INCREASING MOBILE INTERACTIVITY"; U.S. patent application Ser. No. 11/382,618 filed on May 10, 2006 entitled "MOBILE COMPARISON SHOPPING"; U.S. patent application Ser. No. 11/382,637 filed on May 10, 2006 entitled "MOBILE SEARCH RESULT CLUSTERING"; U.S. patent application Ser. No. 11/382,648 filed on May 10, 2006 entitled "MOBILE SEARCH SERVICE DISCOVERY"; U.S. patent application Ser. No. 11/382,676 filed on May 10, 2006 entitled "MOBILE COMPARISON SHOPPING"; U.S. patent application Ser. No. 11/382,684 filed on May 10, 2006 entitled "MOBILE SEARCH SERVICE INSTANT ACTIVATION"; U.S. patent application Ser. No. 11/382,690 filed on May 10, 2006 entitled "PHYSICAL NAVIGATION OF A MOBILE SEARCH APPLICATION"; U.S. patent application Ser. No. 11/382,696 filed on May 10, 2006 entitled "MOBILE SEARCH SERVICES RELATED TO DIRECT IDENTIFIERS"; U.S. patent application Ser. No. 11/383,236 filed on May 15, 2006 entitled "LOCATION BASED PRESENTATION OF MOBILE CONTENT"; U.S. patent application Ser. No. 11/383,511 filed on May 16, 2006 entitled "MOBILE CAMPAIGN CREATION"; U.S. patent application Ser. No. 11/422,797 filed on Jun. 6, 2007 entitled "PREDICTIVE TEXT COMPLETION FOR A MOBILE COMMUNICATION FACILITY"; U.S. patent application Ser. No. 11/553,567 filed on Oct. 27, 2006 entitled "CONTEXTUAL MOBILE CONTENT PLACEMENT ON A MOBILE COMMUNICATION FACILITY"; U.S. patent application Ser. No. 11/553,578 filed on Oct. 27, 2006 entitled "BEHAVIOR-BASED CONTENT PLACEMENT ON A MOBILE COMMUNICATION FACILITY"; U.S. patent application Ser. No. 11/553,581 filed on Oct. 27, 2006 entitled "MOBILE PAYMENT FACILITATION"; U.S. patent application Ser. No. 11/553,587 filed on Oct. 27, 2006 entitled "MOBILE CONTENT CROSS-INVENTORY YIELD OPTIMIZATION"; U.S. patent application Ser. No. 11/553,598 filed on Oct. 27, 2006 entitled "MOBILE PAY PER CALL"; U.S. patent application Ser. No. 11/553,626 filed on Oct. 27, 2006 entitled "MOBILE WEBSITE ANALYZER"; U.S. patent application Ser. No. 11/553,569 filed on Oct. 27, 2006 entitled "ACTION FUNCTIONALITY FOR MOBILE CONTENT SEARCH RESULTS"; U.S.

patent application Ser. No. 11/553,659 filed on Oct. 27, 2006 entitled "CLIENT LIBRARIES FOR MOBILE CONTENT"; and U.S. patent application Ser. No. 11/553,713 filed on Oct. 27, 2006 entitled "ON-OFF HANDSET SEARCH BOX," the entire contents of which are incorporated herein by reference.

This application is a continuation-in-part of U.S. patent application Ser. No. 11/413,273 filed on Apr. 27, 2006 entitled "CALCULATION AND PRESENTATION OF MOBILE CONTENT EXPECTED VALUE" which claims the benefit of the following U.S. Provisional Patent Applications: U.S. Provisional Patent Application No. 60/717,151 filed Sep. 14, 2005 entitled "SEARCH CAPABILITIES FOR MOBILE COMMUNICATIONS DEVICES," and U.S. Provisional Patent Application No. 60/720,193 filed on Sep. 23, 2005 entitled "MANAGING WEB INTERACTIONS ON A MOBILE COMMUNICATION FACILITY," the entire contents of which are incorporated herein reference.

This application is a continuation-in-part of U.S. patent application Ser. No. 11/553,746 filed on Oct. 27, 2006 entitled "COMBINED ALGORITHMIC AND EDITORIAL-REVIEWED MOBILE CONTENT SEARCH RESULTS" which claims the benefit of the following U.S. Provisional Patent Applications: U.S. Provisional Patent Application No. 60/731,991 filed on Nov. 1, 2005 entitled "MOBILE SEARCH" and U.S. Provisional Patent Application No. 60/785,242 filed on Mar. 22, 2006 entitled "AUTOMATED SYNDICATION OF MOBILE CONTENT," the entire contents of which are incorporated herein reference.

FIELD OF THE INVENTION

This disclosure relates to the field of mobile communications and more particularly to improved methods and systems for interactive mobile advertisements.

BACKGROUND

Online search driven by Web-based search engines has proven to be one of the most significant uses of computer networks such as the Internet. Computer users can employ a variety of search tools to search for content using different user interfaces and search methods. In some circumstances, mobile device users can also access Internet search tools to search for content. However, users of many mobile devices such as cell phones encounter difficulties using search technologies intended for conventional online use. Difficulties include the inability to display appropriate content, difficulty entering queries and taking other suitable actions such as navigation in an environment adapted to full screen displays, full-sized keyboards, and high-speed network connections. Furthermore, Internet search engines are currently unable to optimally deliver search results for a mobile communication facility because these search engines are specifically designed for the Internet and not mobile uses. A need exists for improved search capabilities adapted for use with mobile communication devices.

SUMMARY

In embodiments, the present invention may provide a method and system for associating an interactive element with a sponsored content, presenting the sponsored content to a mobile communication facility based at least in part on a relevancy to a mobile subscriber characteristic associated with the mobile communication facility, and allowing a user of the mobile communication facility to engage the interactive element within the sponsored content.

In embodiments, the interactive element may be a game, a search facility, text box, and the like.

In embodiments, the mobile subscriber characteristic may be a demographic, a user profile, billing information, and the like.

In embodiments, the present invention may provide a method and system for associating an interactive element with a sponsored content, presenting the sponsored content to a mobile communication facility based at least in part on a relevancy to contextual information associated with a website, and allowing a user of the mobile communication facility to engage the interactive element within the sponsored content.

In embodiments, the contextual information may be a link structure, an inbound link, an outbound link, a link, a text, a keyword, a meta data, and the like.

In embodiments, the present invention may provide a method and system for associating an interactive element with a sponsored content, presenting the sponsored content to a mobile communication facility based at least in part on a relevancy to a user transaction associated with the mobile communication facility, and allowing a user of the mobile communication facility to engage the interactive element within the sponsored content.

In embodiments, the user transaction may be an online product purchase, an ad conversion, and the like.

In embodiments, the present invention may provide a method and system for associating an interactive element with a sponsored content, presenting the sponsored content to a mobile communication facility based at least in part on a relevancy to a usage history associated with the mobile communication facility, and allowing a user of the mobile communication facility to engage the interactive element within the sponsored content.

In embodiments, the usage history may be a browse history, an ad conversion history, wireless carrier data, and the like.

In embodiments, the present invention may provide a method and system for associating an interactive element with a sponsored content, presenting the sponsored content to a mobile communication facility based at least in part on a relevancy to a location associated with the mobile communication facility, and allowing a user of the mobile communication facility to engage the interactive element within the sponsored content.

In embodiments, the location may be a location history, a previous location, a current location, a location determined according to location coordinates of a particular mobile communication facility, a location determined by a user entered location, a location that is a plurality of geographic regions, a location determined according to a distance from a specified location, and the like.

BRIEF DESCRIPTION OF THE FIGURES

The invention and the following detailed description of certain embodiments thereof may be understood by reference to the following figures.

DETAILED DESCRIPTION

The methods and systems disclosed herein relate to the domain of mobile communication facilities and to the domain of searches for content.

Figure 1:
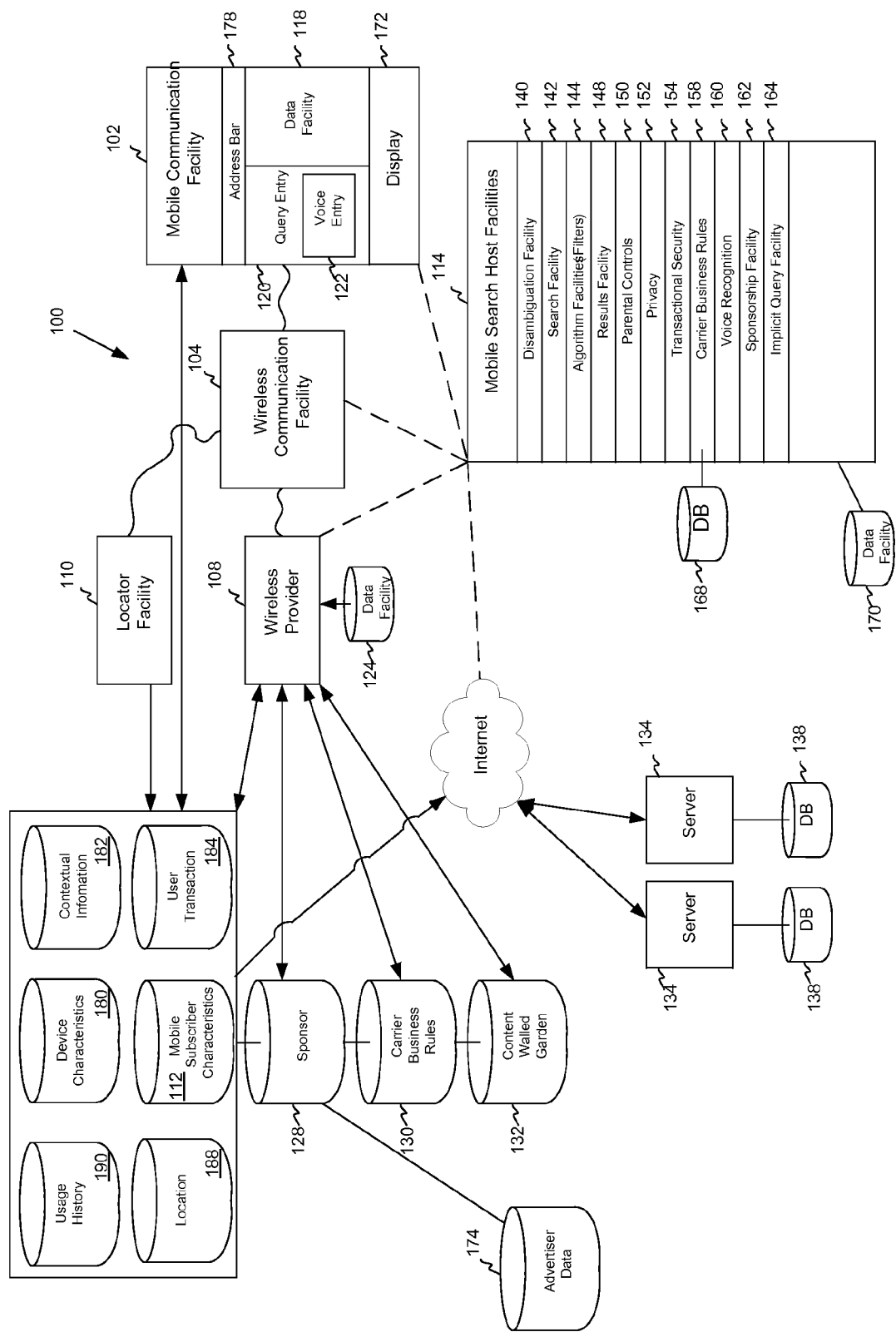
FIG. 1 illustrates a wireless platform.

FIG. 1 represents a wireless search platform 100 for facilitating the access to and integration of multiple data sources and data types for presentation on a mobile communication facility 102. The wireless search platform 100 includes a plurality of computer applications, devices, components, facilities, and systems, as well as a plurality of data facilities, including various data sources. The foregoing may be centrally located or geographically dispersed, may be locally and/or remotely interconnected, and may consist of distinct components or be integrated into combined systems. In the illustrated embodiment, the wireless search platform 100 architecture facilitates the processing of user-initiated queries entered into a query entry system 120 of a mobile communication facility 102. The mobile communication facility 102 may transmit this query to or via a wireless communication facility 104 for further processing and/or routing to data sources and/or processing facilities, such as one or more servers, such as HTTP servers or other servers that are suitable for handling data that are transmitted over computer networks. In embodiments, the wireless communication facility 104 may be linked to a locator facility 110 that generates information about the location of the user (including geographic location, proximity to other locations, network location, or other location information). The locator facility 110 may enable linkage of other information, such as information about a user query, with information about the user's geographic location at the time the query was initiated.

The wireless communication facility 104 may link directly to a wireless provider 108 such as a corporation or carrier providing the user's cellular phone service (e.g., Verizon, AT&T, Sprint, etc) or other wireless communication service. The wireless provider 108 may, in turn, have a number of proprietary databases from which it can obtain information that may be relevant to a user, such as to operate appropriately in response to a query entered by a user. For example, the wireless provider 108 may have access to a database containing carrier business rules 130 describing the proper handling of user queries. The wireless provider 108 may have access to a database containing the mobile subscriber characteristics 112 (e.g., age, address, customer history, call volumes, call histories, patterns in call histories, etc.) that, in turn, are linked to the Internet and through which it can access additional servers 134 and data sources 138. The wireless provider 108 may also have access to a "content walled garden" database 132 containing information from the wireless provider's 108 business partners from which the wireless provider 108 derives additional advertising or profit sharing revenues, such as content relating to cell phone offers, content relating to other services provided by the wireless provider, premium content that is paid for by the user, or content suitable for a mobile communication facility (such as a ringtone). The wireless provider 108 may also link the user query with sponsor information residing in a sponsor database 128 or with another data facility 124.

The wireless search platform 100 may include mobile search host facilities 114. The mobile search host facilities 114 may include one or more facilities for disambiguation 140, searching 142, algorithms/filters 144, results 148, parental controls 150, privacy 152, transactional security 154, carrier business rules 158, voice recognition 160, sponsorship 162, and/or implicit query 164, either alone or in combination. A search may be initiated on a phone idle screen (which may be coupled with one or more implicit queries), a Wireless Access Protocol ("WAP") site, a mobile storefront, or from a highlighted selection of text (e.g., from a website, email, SMS, or other format), or the search may be triggered by other website or local (e.g., cellular phone or other wireless device) activity. The mobile search host facilities 114 may link to additional databases 168 and data facilities 170. The mobile search host facilities may be accessed through the Internet, through the wireless provider 108, through the wireless communication facility 104, through other mobile communication facilities 104, or directly from the mobile communication facility 102. As indicated with the dashed lines on FIG. 1, the mobile search host facilities 114, either separately or in combination, may reside locally on the mobile communication facility 102, on the wireless communication facility 104, or on the wireless provider 108, or may be accessible externally through a network, or otherwise accessible, to perform the functions described herein.

The wireless search platform 100 illustrated in FIG. 1 may contain a mobile communication facility 102. The mobile communication facility 102 may be a device (e.g., a cellular phone, Blackberry, wireless electronic mail device, personal digital assistant, or device combining a number of these devices) utilizing a mobile communications protocol, system or technology, such as the advanced mobile phone system (AMPS), code division multiple access (CDMA), wideband code division multiple access (W-CDMA), global system for mobile communications (GSM), universal mobile telecommunications system (UTMS), integrated digital enhanced network (iDEN), and/or time division multiple access (TDMA). The mobile communication facility 102 may be a device utilizing one or more chipsets, such as the BREW chipset and/or operating system, and/or Bluetooth technologies.

In embodiments the mobile communication facility 102 may be any device capable of wireless communication, including, but not limited to a mobile phone, cell phone, satellite phone, walkie-talkie, handheld device, personal digital assistant (PDA), mobile network appliance, or an email, instant messaging, or chat device. The phone embodiment of the mobile communication facility 102 may be a cellular phone, satellite phone, a straight phone (i.e. "candy bar" phone), flip phone (i.e., "clamshell phone"). sliding top phone, wireless phone, 3G phone, global positioning system (GPS) phone, MP3 phone, music phone, or other mobile phone operating system utilizing MIDP compatible software, Symbian, or another proprietary operating system (e.g., Nokia, Sony Ericsson, Motorola, LG, Samsung, Sanyo, or Toshiba). The PDA embodiment of the mobile communication facility 102 may be a combination PDA/phone, and/or a GPS PDA, and may utilize operating systems including Palm, Windows, PocketPC, Psion, and/or PocketLinux. The mobile network appliance embodiment of the mobile communication facility 102 may be a web appliance, network appliance, or a GPS network appliance. Email, instant messaging, and chat device embodiments of the mobile communication facility 102 may include appliances, such as the Blackberry, Treo, or SideKick. The device may also, or instead, include a portable computer such as a laptop computer wireless coupled to a data network using, e.g., WiFi, WiMax, or cellular data communications.

The mobile communication facility 102 may facilitate the collection of data from data sources as a result of a query entry 120 or voice entry 122. Query entry 120 may be accomplished through the use of a numeric key pad entry, full mobile device keyboard entry (e.g., that found on a Blackberry or Treo device), partial mobile device keyboard entry (e.g., that found on a Blackberry device with only one key for every two letters), stylus/handwriting entry, bar code scanner (either 2D bar code or 3D bar code: "Quick Response Code"), or photographic entry using cellular phone-camera; through other navigational facilities (e.g., a stylus, arrow keys, scroll wheel, etc.); or through access to a computer network, such as through a physical connection (e.g., Ethernet or other network cable, wire, or the like), or through infrared, RF, Bluetooth or other wireless query entry. In embodiments, communication to the mobile communication facility may be compressed at the server and uncompressed at the mobile communication facility to accelerate data communication over a slow network.

Referring to FIG. 1, a mobile communication facility may be adapted with an address bar 174. The address bar 174 may be generated using a client application interface, for example. The address bar may be presented in a graphical user interface on a display associated with the mobile communication facility 102. The address bar 174 may be provided to allow a user to enter a URL, website, key words, search terms and the like. In embodiments, the user is presented with an address bar 174 and the user may enter a known URL (e.g. www.jumptap.com) into the address bar. Once entered, the user may initiate a process to facilitate the connection of the mobile communication facility 102 with the website associated with the URL. For example, the process may involve searching the Internet for a website with the entered URL. Once located, the website may be loaded and displayed on a display associated with the mobile communication facility 102.

The voice entry 122 function of the mobile communication facility may be used through the speaker-receiver device of the mobile communication facility 102 or by use of the standard SMS lexicon and syntax, and it may be adaptive to individual users' voice commands and usage patterns that are stored on and accessed from the mobile subscriber characteristics database 112. The voice entry 122 function may permit voice dialing, voice memo, voice recognition, speech recognition, or other functions related to audible input.

The mobile communication facility 102 may operate using a variety of operating systems, including, Series 60 (Symbian), UIQ (Symbian), Windows Mobile for Smartphones, Palm OS, and Windows Mobile for Pocket PC's. The display type used by the mobile communication facility 102 may be a black and white LCD, grayscale LCD, color LCD, color STN LCD, color TFT/TFD LCD, plasma, LED, OLED, fluorescent backlit, LED backlit, projection, flat screen, passive matrix, active matrix, or touch screen. The screen size may be small, medium, or large. In addition, the mobile communication facility 102 may have a secondary display, such as that situated on the outside of a clamshell-type cellular phone, that is visible to the user when the primary display is not, due to the clamshell phone being closed. In embodiments the mobile communication facility 102 may have more than one secondary display.

The mobile communication facility 102 may include one or more ports, slots, or similar facilities to accommodate expansion cards, such as a MultiMediaCard (MMC), a MMC/Secure Digital (SD), an RS-MMC 3v, an RS-MMC 1.8v/MMCmobile, miniSD, TransFlash/microSD, a USB-based memory device, SIM card, or a Memory Stick Duo. The mobile communication facility 102 may also accommodate high-speed data communications by utilizing GPRS, EGPRS (EDGE), 1xRTT, 1xEV-DO r0, WCDMA (UMTS), or iDEN protocols. Additional features of the mobile communication facility 102 may include any of the following: a hard drive, GPS/location capability, GAIT, an FM radio, infrared technology, an integrated PDA, Java (J2ME), MMS, music player, poly or mono ringtone capability, predictive text entry, push-to-talk technology, ringer ID, ringer profiles, side keys, speaker phone, SyncML, text keyboard, text messaging, text messaging templates, to-do list generation, touch screen, USB ports, WiFi technology, and wireless Internet. The mobile communication facility 102 may also contain a data facility 118 for the storage of PIM data, IM logs, MMS logs, SMS logs, email logs, downloaded media, and a suggestion and results cache. The mobile communications facility 102 may include an operating system that is capable of running applications, such as multimedia applications, word processing applications, and the like.

The mobile communication facility 102 may transmit and/or receive data to/from the wireless communication facility 104, mobile subscriber characteristics database 112, and/or any of the mobile search host facilities 114 by utilizing an internal antenna, a stub antenna, a patch antenna, an antenna array, a stub/extendable antenna, or an extendable antenna.

The mobile communication facility 102 may have an embedded camera enabling it to capture and transmit graphic data to the wireless communication facility 104, mobile subscriber characteristics database 112, and/or any of the mobile search host facilities 114. The resolution of the camera may be any of the following, or any other suitable camera resolution: CIF (352×288), VGA (640×480), SVGA (800×600), 1+ megapixels, 2+ megapixels, or 3+ megapixels. The graphic capabilities of the mobile communication facility 102 may also include EMS picture messaging, picture ID, video capture, video calling, video messaging, PictBridge, and/or streaming multimedia.

The mobile communication facility 102 may have the hardware and/or software components enabling use of the mobile communication facility 102 via an optical mouse and/or wired mouse.

The wireless search platform 100 illustrated in FIG. 1 may contain a wireless communication facility 104. The wireless communication facility 104 may be, for example, a cellular telephone tower that routes the user's query. It may be associated with a wireless provider 108, a locator facility 110, or mobile search host facilities 114. The wireless search platform 100 may include a wireless provider 108.

The wireless search platform 100 illustrated in FIG. 1 may contain a locator facility 110 enabling the collection of geographic or other location data on users of mobile communication facilities 102. A locator facility 110 may be based upon (i) a Cell-sector System that collects information pertaining to cell and sector ID's, (ii) the Assisted-Global Positioning Satellite (A-GPS) technology utilizing a GPS chipset in the mobile communication facility 102, (iii) standard GPS technology, (iv) Enhanced-Observed Time Difference (E-OTD) technology utilizing software residing on a server and within the mobile communication facility 102 that uses signal transmission of time differences received by geographically dispersed wireless communication facilities 104 to pinpoint a user's location, (v) Time Difference of Arrival (TDOA), (vi) Time of Arrival (TOA), (vii) Angle of Arrival (AOA), (viii) TDOA-AOA, (ix) triangulation of cellular signals, (x) triangulation based on receipt of broadcast TV signals, (xi) location based on dead reckoning, (xii) location based on proximity to known locations (including locations of other mobile communications facilities 102), (xiii) map-based location, or any combination of any of the foregoing, as well as other location facilities known to those of skill in the art.

In embodiments, the mobile communication facility 102 may use a locator facility 110 (e.g. GPS system) to locate itself in its present location, or locations of interest to the user, whether explicitly stated or determined by PIM data, location history, or previous searches. In embodiments, the location may be transmitted back to the locator facility 110 for dissemination, processing, etc. Geographic information systems may also be used to determine a location point in a polygon, a location radius search, route calculation, points of interest, and/or geocoding and reverse geocoding. In embodiments, a user's location may also be self-entered into the wireless platform by the user. For example, the user may type in (or speak through a voice recognition system) an address, zip code, or other location information.

In an embodiment, a GPS system may be used as the locator facility. The GPS system consists of a group of satellites (>20) carrying atomic clocks that orbit the Earth twice a day. Earth-based observatories record orbital data related to the motion of the satellites. In order to determine global positioning, a GPS receiver (e.g. one disposed inside of the mobile communication facility) must communicate with four of the GPS satellites. The receiver computes its distance from each of the four satellites to determine its latitude, longitude, elevation, and time of day. The receiver computes the distance to each of the four satellites by calculating the difference between local time and the time the satellite signals were sent and then decodes the satellites' locations from their radio signals and an internal database. The location of the GPS receiver is located at the intersection of the four spheres created by the four satellites, where each radius is equal to the time delay between the satellite and the receiver multiplied by the speed of the radio signals. The differences permit calculation of three hyperboloids of revolution of two sheets, the intersection point of which gives the precise location of the receiver. If the elevation of the receiver is known, it is possible to compute precise location using only three satellites.

The wireless search platform 100 illustrated in FIG. 1 may contain a data facility containing mobile subscriber characteristics 112 pertaining to individual users of a mobile communication facility 102. This data may include, but is not limited to, data collected by the wireless provider 108 when an individual opens a wireless account, such as age, sex, race, religion, area code, home address, work address, billing address, credit card information, passwords, family information (e.g., mother's maiden name), birthplace, driver's license number, employer, position, annual income, income bracket, items purchased, friends and family information (including any of the foregoing types of information) and the like. The mobile subscriber characteristics facility 112 may continually, or periodically, update data for individual users, for example, bill amount(s), average bill total, payment history, on-time payment history, on-line usage amount, duration of on-line interactions, number of on-line interactions, family status and family information, number of children, shopping habits (e.g., views of or purchases of goods and services) click stream information, device type and device version, device characteristics, usage patterns (including those based on location, time of day, or other variables), device and/or subscriber unique identifiers, content viewing history, content presented for viewed by/not viewed by user, content and programs downloaded, videos, music, and audio listened to and/or downloaded, television watched, timing and duration of viewing/downloading, transaction history, and any other user or user defined characteristics. The purchase of physical goods may be facilitated by a wireless provider 108 by having the wireless provider 108 collect the user's credit card information as part of the billing cycle and adding goods transactions automatically to the wireless provider's bill to the user.

The mobile subscriber characteristics 112 database may also track data related to phone usage and location. For example, data collected could include a history of phone calls made, phone calls received, the mobile subscriber characteristics of the persons calling or called by the user, the duration of calls, a history of communications made via phone, Internet, email, instant messaging, or chat (and the entities communicated with by these technologies), history of phone calls made linked with geographic/location information at the time of each call, log of phone numbers, and a history of clicks and clickthroughs (or other keystroke or user interface equivalents thereof, including voice-initiated actions) made using the mobile communication facility 102.

In embodiments, the device characteristics 180 associated with a mobile communication facility 102 as described herein, may be recorded and stored within a separate database. The device characteristics database 180 may be further associated with other elements of the wireless platform 100 including, but not limited to a wireless provider 108, contextual information database 182, mobile subscriber characteristics database 112, user transaction database 184, usage history database 190, location database 188, sponsor data 128, advertiser data 128, carrier business rules database 130, content walled garden database 132, a locator facility 110, the Internet, third party server 134 and an associated database 138, or some other wireless communication facility 104.

In embodiments, the user transactions 184 associated with a mobile communication facility 102 as described herein, may be recorded and stored within a separate database. In addition to other examples provided herein elsewhere, the user transaction database 184 may include, but is not limited to, an online purchase, an offline purchase, an advertisement conversion, a coupon redemption, content interaction, a transfer of funds from a bank account, a transfer of funds from a PayPal, BillPay or similar online banking account, an item placement in an online shopping cart, a stage at which an incomplete item purchase was terminated, a ratio of item views to item purchases associated with the mobile communication facility 102, or some other data related to a transaction. A transaction may be an economic transaction or a non-economic transaction. A non-economic transaction may include, but is not limited to, completing an enrollment, completing a survey, joining a group, subscribing to a free RSS feed, or some other type of non-economic transaction. The user transactions 184 may be further associated with other elements of the wireless platform 100 including, but not limited to a wireless provider 108, contextual information database 182, mobile subscriber characteristics database 112, device characteristics database 180, usage history database 190, location database 188, sponsor data 128, advertiser data 128, carrier business rules database 130, content walled garden database 132, a locator facility 110, the Internet, third party server 134 and an associated database 138, or some other wireless communication facility 104.

In embodiments, the usage history 190 associated with a mobile communication facility 102 as described herein, may be recorded and stored within a separate database. In addition to other examples provided herein elsewhere, the usage history 190 may include, but is not limited to, a browse history, URL's visited on the mobile communication facility, an advertisement conversation, a text message sent, a text message received, an email sent, and email received, an outgoing call, an incoming call, a call's duration, a conference call's participants, accessing a folder on the mobile communication facility 102, downloading a content, uploading a content, or some other usage action, event, or history. The usage history 190 may be further associated with other elements of the wireless platform 100 including, but not limited to a wireless provider 108, contextual information database 182, mobile subscriber characteristics database 112, device characteristics database 180, user transaction database 184, location database 188, sponsor data 128, advertiser data 128, carrier business rules database 130, content walled garden database 132, a locator facility 110, the Internet, third party server 134 and an associated database 138, or some other wireless communication facility 104.

In embodiments, the usage history 190 associated with a mobile communication facility 102 as described herein, may be recorded and stored within a separate database. In addition to other examples provided herein elsewhere, the location may be a previous location; a current location; coordinates of a mobile communication facility; location determined by GPS, triangulation, Wi-Fi triangulation, and the like; location determined by a user entering a region, a state, a city, or the like; location determined according to a distance from a specified location, a location associated with a mobile content; and the like. The location database 188 may be further associated with other elements of the wireless platform 100 including, but not limited to a wireless provider 108, contextual information database 182, mobile subscriber characteristics database 112, device characteristics database 180, user transaction database 184, usage history database 190, sponsor data 128, advertiser data 128, carrier business rules database 130, content walled garden database 132, a locator facility 110, the Internet, third party server 134 and an associated database 138, or some other wireless communication facility 104.

In embodiments, the contextual information 182 associated with website and other content accessed using a mobile communication facility 102 as described herein, may be recorded and stored within a separate database. In addition to other examples provided herein elsewhere, the contextual information may be a link structure, an inbound link, an outbound link, a text, a keyword, keyword combination, metadata, anchor text, or some other type of contextual information. The contextual information may be provided by a server associated with a wireless carrier. The server may be a WAP server, a mobile application gateway, a WAP gateway, a proxy, a webserver, or some other type of server. The contextual information 182 may be further associated with other elements of the wireless platform 100 including, but not limited to a wireless provider 108, usage history database 190, mobile subscriber characteristics database 112, device characteristics database 180, user transaction database 184, location database 188, sponsor data 128, advertiser data 128, carrier business rules database 130, content walled garden database 132, a locator facility 110, the Internet, third party server 134 and an associated database 138, or some other wireless communication facility 104.

FIG. 1 illustrates a sponsorship facility 174 associated with a sponsor database 128 according to the principles of the present invention. A sponsorship facility 174 may be provided by a corporation, an individual, or some other entity sponsoring results as described herein.

The wireless search platform 100 illustrated in FIG. 1 may contain mobile search host facilities 114. Within the mobile search host facility 114 there may be other facilities, including, but not limited to, a disambiguation facility 140, search facility 142, algorithm facility 144, results facility 148, parental control facility 150, privacy facility 152, transactional security facility 154, carrier business rules facility 158, voice recognition facility 160, sponsorship facility 162, and/or an implicit query facility 164. The mobile search host facility 114 may also link to another data facility 170.

The disambiguation facility 140 may complete or provide more meaning to ambiguous active user inputs. The disambiguation facility 140 may include SMS lingo translation, single word initial substring completion, multiple word substring completion, stem completion (e.g., single into plural format, verb into gerund), thesaurus lookups for homonyms or synonyms, spell check algorithms, spell check tables, phonetic spelling algorithms, phonetic spelling tables, phone number keypad to word conversion (including completion of possible substrings from number sequence), frequency-based algorithms, semantic analysis algorithms, location-based algorithms or other algorithms or facilities for reducing ambiguity as to the meaning of a query or partial query entered by a user.

The search facility 142 may initiate a search, such as by causing a query (optionally a disambiguated query) to be executed on a search facility, such as a search engine. The search engine might be a search facility that is based on Boolean search logic, categories of results, term frequencies, document frequencies, documents selected by other users who have entered similar queries, link structures of possible results, or any other known search facilities using any other known search algorithm.

A mobile search service (e.g. as disclosed herein) may be accessed by a user through a user interface of a mobile communication facility 102 such as a mobile phone, a cellular phone, satellite phone, a GSM phone or other phone type. The mobile communication facility 102 may need to be activated to access the mobile search service. A mobile communication facility 102 may be activated by a user taking an action. The action may be different for different phone embodiments of a mobile communication facility 102. For example, a flip or folding phone may be activated by unfolding or flipping open the phone. In another example, a straight phone may be activated by depressing a key on the phone keypad for a predetermined length of time. A sliding top or twist top phone may be activated by sliding or twisting open (respectively) the top to reveal a user interface of the phone. Other phone methods of activating a phone based on the phone embodiment are also possible. A phone may be activated by turning on the phone. Turing on the phone may include attaching a battery to the phone, plugging the phone into a power source such as a desktop charger or an automobile charger, switching the phone power switch, depressing a key on a phone user interface for a minimum time, and the like. A phone may be activated by unlocking the phone which may include a user entering an activation code into the phone through the phone user interface, or by speaking the activation code into the phone microphone.

Activating a phone may enable a user to have access to one or more features and functions of the phone such as making a call, answering a call, navigating menus of the user interface, using a mobile search service, and the like. Some features and functions may require a user to first activate the feature or function through the user interface, such as reviewing call history. Other features may be activated immediately when the phone is activated. As an example, a user can often immediately enter a telephone number to initiate a call without first activating a call feature of the phone.

In embodiments, a mobile search service (e.g. as disclosed herein) may be activated immediately when a phone is activated. A mobile search service, accessed through a search box 908 of a mobile communication facility 102 user interface, may be activated at the time a phone is activated such that a user can immediately enter a search item in the search box 908. As an example, immediately after a user flips open a flip phone, a mobile search service search box 908 may be presented and activated such that a query entry 120 through the user interface may be entered in the search box 908. To further this example, a user may flip open their flip phone and immediately enter the name of their local sports team through the phone user interface. The mobile search service may provide search results through the phone user interface. In addition to the search box 908 receiving input from the user interface immediately after the phone is activated, the mobile search service search box 908 may also receive voice entry 122.

The mobile search service search box 908 and entries it is receiving may be presented on the display of the phone which may also include an indicator, controlled through the user interface, of the current state of the keypad and voice entry mode of the phone. In embodiments, the indicator may indicate when the phone is enabled to place and receive phone calls and when it is enabled to access the mobile search service. The indicator may be an aspect of the search box 908, or a separate indication on the display of the phone. As an example, the search box 908 may display reduced contrast entries in the box, such as graying out the entry, when the phone state enables placing and receiving calls. In another example, the search box 908 may include a blinking cursor at the point of entry when the phone is enabled to access the mobile search service. A phone call/search service state indicator may be beneficial when a mobile communication facility 102 has been activated such that the user interface display is active but the phone has not yet completed an initialization operation such as connecting to a wireless network. In an example, a mobile search service search box 908 may be presented immediately upon activating the phone but may be activated in close temporal proximity, such as within 5 seconds of activating the phone.

Upon activation, the mobile search service search box 908 may be predetermined either as a network search box, a wireless carrier's walled garden content 132 search box, or other mobile content search box. Alternatively, a user may select, through a feature of the user interface, whether the search box 908 type upon activation. Alternatively, the user selection may be temporary, wherein the mobile search service search box 908 returns to the predetermined selection the next time the phone is activated. The mobile search service search box 908 may be related to a search vertical which may be a general search, or may be related to a vertical search of one or more of the following: ring tones, images, games, a yellow pages, weather, a white pages, news headlines, WAP sites, web sites, movie show times, sports scores, stock quotes, flight times, maps, directions, a price comparison, WIFI hotspots, package tracking, hotel rates, fantasy sports stats, horoscopes, answers, a dictionary, area codes, zip codes, entertainment, blogs, and other mobile content associated with a search vertical.

A mobile communication facility 102 may rely on a network for connection to external resources. A network may at times experience poor communication or complete lack of communication. Such an event may compromise a substantial benefit of searching for mobile content with the mobile communication facility 102. However, by managing the resources of the mobile communication facility 102 such that it retains critical, relevant, current, timely, popular, or otherwise characterized information (such as mobile content), the mobile communication facility 102 may retain at least a portion of the benefit even when the network connecting to the mobile communication facility 102 is out. Furthermore, by differentiating between content located on and off the mobile communication facility 102, and providing search boxes for both, content may be more efficiently delivered for presentation to the user.

When connected to a network, a mobile communication facility 102 may use the resources of the mobile search host facilities 114 such as the search facility 142 to execute mobile content queries. Alternatively, or cooperatively to the search facility 142, the mobile communication facility 102 may utilize an internet search facility, such as a search engine. A wireless provider 108 may also provide query search capabilities such that information available to the wireless provider 108 such as mobile subscriber characteristics 112, advertiser data 174, walled garden 132 content, and the like may be searched based on a query entered by a user on an mobile communication facility 102.

When disconnected from a network, these resources, mobile content, data, characteristics, and the like may not be available to a mobile communication facility 102 to complete a search query. Therefore a mobile communication facility 102 may include search capability and functionality to search local resources to complete a search query. The local search query functionality may supplement a network or remote search or may operate independently of the network even if the network is connected and fully operational.

Local search query functionality may also be useful for finding information that a network resource may not access. Information stored locally on the mobile communication facility 102 such as cached content, data files, configuration data, programs, deleted item, private items, and the like may be searchable from a local search query facility.

Local searching may be useful to find mobile content if the mobile content, or a reference to it, can be found locally. Therefore, providing a searchable store of mobile content may be beneficial to the effectiveness of local mobile content searching. Local storage may include any an all storage capability and facilities herein disclosed for the mobile communication facility 102 including removable storage devices that may connect to one or more external ports of the and data facility 118.

Information stored locally that may facilitate a local search may originate from the user or an external source. The external source may be a network as herein described. The information from the network may include mobile content that has been provided to the mobile communication facility 102 as a response to a search query, as sponsored content associated with a web page, as an RSS feed, or other reasons. The information stored locally may be the content provided to the mobile communication facility 102 or it may be header data, metadata, or search query results such a list of websites.

Maintaining the information in the local storage resources to facilitate useful and relevant responses to a search query may be performed by a cache facility as herein described. Such a cache facility may provide storage and maintenance of information retrieved from the network (such as mobile content) such that the cached information is updated from time to time to maintain its relevance and value. When the mobile communication facility 102 is not connected to a network, the local search facility may present local results to the user. However, it may record the query as entered so that when the mobile communication facility 102 is on-line again, the query can be provided to the network resources such that the information stored locally can be updated. This may facilitate maintaining the local information such that it has a relevance (because it satisfies a recent user search query) to the user.

A local search facility may also provide a more timely response to a search query than a network resource since there is no need for network communication to provide a reply to the search query. This may allow a user to review and interact with search query results while a network search is proceeding. Given that search results may change quickly at least in part due to the dynamic nature of mobile content, search results from local storage may be identified as such to the user. The local results may also be identified in other ways to facilitate a user's understanding of the results. For example, a local result that was last updated more than a minimum amount of time, such as 2 days, may be identified by highlighting the item on the mobile communication facility 102 display with a contrasting color such as yellow. If the results are older than a maximum time, such as a week, they may be highlighted with red. In this way, the user can review the query results, identify the local results, and identify the age of the local results. The user interface of the mobile communication facility 102 may offer an update results selection for local results when the facility 102 is connected to a network.

When connected to a network, and a user selects a local result, the mobile communication facility 102 may automatically use a corresponding link downloaded from the search results of the network resources. This may facilitate a user accessing the latest mobile content associated with a local search result. As an example, a user may search for nearby movie theaters to see what is playing tonight. The local search result may present a name of a movie theatre and a link to access the theatre movie listing. The link may direct the user to the current movie listing on the website instead of an older listing associated with the link stored in cache on the mobile communication facility 102.

The foregoing describes some options for integrating local information with network search results using a local search facility. An alternative to the foregoing may include the network search facility performing the search on the network resources as well as the locally stored information and mobile content on the mobile communication facility 102. By the network search facilities searching all available content, including the content on the mobile communication facility 102, the search results presented to the user will integrate local and network in a unified updated presentation.

Mobile search results, as herein described, may include one or more lists to content that are associated with the search query. A user may interact with the search results, such as selecting a result and receiving further information, through a user interface of the mobile communication facility 102. An aspect of the present invention may facilitate a user with other actions associated with a search result such as making a purchase, previewing content, saving a result, and the like. Methods and systems for facilitating these and other actions that may be associated with a search result are described below.

Action commands presented to a user of a mobile communication facility 102 may be associated with a search result based on an aspect of the search result. The action commands may be presented to the user through the user interface of the mobile communication facility 102, and the user may access the action command through a feature of the user interface. An action command may present additional search results or action commands to the mobile communication facility 102.

A mobile search platform 100 may respond to a search query from a mobile communication facility 102 by using a search facility 142 as herein described. The search results generated by the search facility 142 may include aspects such as keywords, HTML links, metadata, and the like that may be used in associating an action command with the search result. The search facility 142 may examine one or more of these aspects to determine what action command would provide the user with the best result of interacting with the search result. By example, the search facility 102 may associate a "bid" action command with a search result that includes a link to bid on an item in an on-line auction. In another example, a search result that contains keywords that provide an address may have a "map" action command associated with it.

Since search results may closely match a search query, aspects of the search query may also affect the action command associated with a search result. A search query may be broad such that a search facility 142 may return general results with general action commands. For example, a search of "guitars" may return a wide variety of results including types of guitars, concert information, guitar songs, guitar technology, on-line guitar auctions, musical instrument stores, and the like. A result to such a broad search query may have an associated action command that provides more detail about the result, thereby facilitating a user finding relevant results. Alternatively, a search query may be specific, or the search facility 142 may provide specific, relevant results to a search query. The search facility 142 may associate aspects of the search query with other information such as mobile subscriber characteristics 112, carrier business rules 130, or user search history and preferences to identify relevant results that may have a specific associated action command. A result of such a specific query may have a specific associated action command. In an example, a result associated with a specific guitar offered for sale from a local music store may have an associated "purchase" action command.

Another aspect of the search result that an action command may be based on is the source of the search result. This may include the website from which the search results was generated, the wireless service provider 108 that generated the search result, a provider of search services, the mobile communication facility 102, and the like. Each of the plurality of sources of the search result may associate an action command with a search result based on preferences, business arrangements, or other criteria that may at least be partially different for each source. The action command presented may result in the same end action by the user (such as ordering the guitar in the example above). However, the action command may direct an aspect associated with the action differently for each source. Continuing the example above of a "purchase" action command being presented to the mobile communication facility 102, a result provided by a website may include an action command to purchase the guitar directly from the manufacturer of the guitar. A result provided by a provider of search services may include an action command to purchase the guitar from an affiliate or distributor of the guitar manufacturer.

A website may include action commands to be associated with search results that match aspects of the website content. The action commands may be included in the website content, metadata, header information, HTML links, and the like. The mobile search platform 100 may identify one of the action commands included with a website to be associated with a search result based on aspects of the search query. Websites may include HTML links that result in actions such as purchases, registration, login, contact, service, repair, and the like. The search facility 142 of the mobile search platform 100 may associate an action command related to an HTML link on a website with a search result. In an example, a search query for "on-site guitar repair" may generate a search result for a guitar repair provider website that may include a link to scheduling an on-site repair. An action command to facilitate scheduling an on-site repair may be associated with the search result.

Alternatively, a website may include action commands for use with a mobile communication facility 102. The search facility 162 may include a search result with an associated action command taken from website with a mobile action commands.

The action command may be presented to the user through any aspect of the user interface of the mobile communication facility 102 herein described such as a visual display, an audio output, a vibration, an external port, and the like. Similarly, the user may interact with the action command through any aspect of the user interface of the mobile communication facility 102 herein described such as a keypad, a touch screen, microphone, external port, and the like.

An action command may be associated with each search result presented such that as each search result is selected, such as through highlighting or scrolling a displayed result, the action command associated with the selected search result is available to the user. The user may interact with the user interface of the mobile communication facility 102 in a variety of ways as herein described. In this way, the action command may be accessed by the user through a plurality of inputs, such as sequential inputs. In an example, the user may provide a first input, such as selecting a search result. This first input may make an action command associated with the selected search result available to the user such that a second user input may access the action command. The second user input may be pressing a send button on the user interface of the mobile communication facility 102 and the action may make a call. A variety of first and second user inputs as may be envisioned by one of average skill in the art are herein incorporated.

The action command may be associated with a search result through a sponsorship facility 162. The sponsorship facility 162 may associate a search result with an action command based on sponsors 128 bidding to have an action command associated with a search result. Sponsors 128 may bid to have an action command associated with a search result based on one or more aspects of the search such as an aspect of the search query, an aspect of the search result, an aspect of the mobile communication facility 102, an aspect of the user of the mobile communication facility 102, and the like. The sponsorship facility 162 may select a sponsored action command from high bidder based on a relevance of the aspects specified by the sponsor 128 with the search result. In an example, a plurality of sponsors 128 may bid to have an action command to purchase tickets to an event associated with a search result associated with the event. When a search query generates a search result associated with the event, the action command from the highest bidding sponsor 128 may be associated with the search result and presented to the mobile communication facility 102.

Alternatively, one sponsor may be offering tickets to the event, while another may be offering items associated with the event. The mobile search platform 100 may select an action command from a sponsor 128 based on a relevance to the search result over a bid amount. If the search query was directed at items associated with the event, the mobile search platform 100 may associate the action command from the item sponsor instead of the ticket sponsor with the search result.

An action command may include presenting additional information to the mobile communication facility 102. In the example above, the action command associated with the search result generated from a search query for the event may be to present a plurality of action commands to the user. At least one of the plurality of action commands may be a sponsored action command as herein described. The plurality of action commands may be presented to the mobile communication facility 102 such that the sponsored action command from the highest bidding sponsor is presented first. In a list of action commands, the sponsored action command from the highest bidding sponsor may be at the top of the list. In a sequential presentation of action commands, the sponsored action command from the highest bidding sponsor may be the first action command presented. Other orderings of presenting the sponsored action commands are possible such as based on relevance to the search result, based on location, and many other aspects associated with the mobile search platform 100. All such orderings are herein included.

Associating an action command to a search result may be performed through an action command provider that is separately associated with the mobile search platform 100. The mobile search platform 100 may provide a search result to an action command provider and receive back an action command for association with the search result. The mobile search platform 100 may provide additional information such as user demographics, mobile communication facility 102 type, mobile communication facility 102 location and other information as may be beneficial in receiving a relevant action command.

Action commands may include making a purchase, previewing content, finding content related to the search result, placing a phone call associated with the search result, mapping a location, forwarding the search result, and saving the search result. The forwarded search result may be sent to an email address. Examples of some of these action commands are now presented.

An action command associated with a search result may facilitate a user previewing content associated with the search result. In an example, a search result may be associated with a photo sharing webpage. An action command associated with the search result may be to display a thumbnail or a plurality of thumbnails of photos, thereby providing a preview of the content available on the webpage. In another example, a search result may be associated with an investment research website. The action command associated with the search result may be to download a demonstration of the website, thereby allowing a user to preview the content of the website in an annotated demonstration. In another example, a search result may be associated with an independent film producer. An action command associated with the search result may be to present a portion of one or more of the film producer's films to the mobile communication facility 102. In this way the user can preview the content (films) of the website. Similarly, audio, a book, a new clothing line, and the like may be previewed through an action command.

An action command associated with a search result may facilitate a user forwarding the search result. The search result may be forwarded through email, test message, instant message, voice mail, video mail, message broadcast, and any other for of communicating with the mobile communication facility 102 as herein described. In an example, an action command associated with any search result may be to forward the search result to another mobile communication facility 102 by email. By accessing the action command through the user interface of the mobile communication facility 102, the user may be prompted to input or select the destination name from a list of email names.

An action command associated with a search result may facilitate bidding on an item associated with the search result. In an example, a user may search for a used bicycle on an on-line auction website. The result may include one or more auction listing for a used bicycle. The action command associated with this search result may facilitate a user entering a bid for the item. The command may allow a user to enter a bid amount and password and the mobile communication facility 102 may provide any additional identifying information about the user to the on-line auction site to accept the bid An action command associated with a search result may facilitate rating the search result. In an example, the action command may accept numeric input from the mobile communication facility 102, such as a cell phone number keypad to rate the search result relevance to the search query. User rating of search results may facilitate providing search results that have greater relevance to the user. The action command may also delete a search result from the search results if the user rates it below a predetermined value, such as below 3 out of 10.

An action command associated with a search result may facilitate storing the search result. In an example, the action command may facilitate a user saving a search result such as in a favorite storage, or a follow-up list, or other storage that may be associated with the mobile communication facility 102 or the mobile search facility 100.

In embodiments, the search box may be presented upon activating the phone and the search box may be adapted to relate to a specific search methodology. For example, the search box may be adapted to provide localized or personalized (e.g. searching in relation to mobile subscriber characteristics and the like as described herein). The search box may also be adapted to target results based on time of day. For example, the search user interface may be adapted to produce localized results and the keywords, filters, algorithms or other search parameters identifying the relevant local results may change as a result of the time of day. So if the user opens his flip phone and is presented with the search box, he may perform a search and the results may be localized and they may be tailored to the time of day. At 6:00 pm the search results may pertain, at least in part, to dinner options, while a search run at 8:00 pm may relate to entertainment. In embodiments, the default search methodology preferences are settable by the user. The user may be able to set the type of search that he would like to perform as a default when presented with the search facility upon activation of the phone. The user may also be presented with options (e.g. menu options) through which he can select a new search temporary search methodology.

The algorithm facility 144 may receive a user's input in the form of a problem and evaluate that problem by applying the set of all potential solutions available within the search space. At its most basic, the algorithm facility 144 may apply naïve/uninformed search algorithms consisting of the most intuitive solution(s) available within the search space. Alternatively, the algorithm facility 144 may also employ informed search algorithms based on heuristics that utilize intelligence about the elements of the search space in order to minimize search time and resource allocation of the algorithm facility 144. The algorithm may serve to promote or demote content for display 172 to the user based upon the frequency of queries, the frequency of clicks or clickthroughs, the velocity of queries; the site of the search launch, storefront visit, or mobile website; community tagging; mobile user scoring; or it may be based upon domain restrictions (e.g., only "espn.com").

An algorithm may be designed to create an index for information specific to the mobile communication facility 102. For example, the algorithm may look only for mobile tags (e.g., WML, xHTML—MP, MIME types, such as text, WAP, and/or WML, or mobile specific headers). An algorithm may also determine the aesthetic compatibility between the content and the capabilities of the display 172 of the mobile communication facility 102, including factors such as page width, page weight (e.g., the number of images and byte size), screen resolution and color capabilities, font types and sizes, client-side rendering capabilities, page complexity (e.g., features incompatible or specific to a mobile communication facility 102), and the like. This compatibility information may also be blended with other information, such as popularity data (e.g., WAP gateway, editorial scoring, and/or traffic market data).

The algorithm facility 144 may contain a collaborative filtering protocol, category filtering, a recommendation system and/or other process facilities for analyzing, refining, or filtering user input and/or search results. A collaborative filter may employ a two step process. During the first step, other users are identified who have similar rating patterns as those of the active user. Secondly, the ratings obtained from these similar users provide the empiric basis for predicting information of relevance to the active user. The collaborative filter can be both an inclusive and an exclusive process, gathering relevant information for the active user or removing incongruent information from the predictive information set.

A collaborative filtering protocol generally involves the collection of preference data from a large group of users. This preference data may be analyzed statistically to identify subgroups, or characteristics of subgroup members, with similar preference profiles. Various weighted average, fuzzy logic, or other techniques may be used to summarize or model a preference subgroup, and a preference function may be created using the model/summary. This function may then be used to match new users to an appropriate preference subgroup. In embodiments, such information may be collected from many individual mobile subscriber characteristic data sets, and data may be collected from many mobile communication facility users. For example, a wireless provider 108 may collect preference data from a large group of its customers. In embodiments, the data may be collected from non-mobile users and may relate to preference information collected from other on-line or off-line activities.

User preferences may be derived from user behavior or other implicit characteristics, or explicitly defined by a mobile communication facility user, or some combination of these. If users were to explicitly state their preferences (e.g. for types of restaurants, books, e-commerce, music, news, video, formats, audio, etc.), the explicit preference information may be stored in the mobile subscriber characteristic data bases associated with their phones. Users may implicitly register a preference through activity such as purchasing a product online, visiting a site on line, making a phone call from a mobile communication facility, making a phone call from another facility, viewing content, or engaging or not engaging in other activities. For example, if the user looks at a product and decides not to purchase the product, one can draw an inference that the user is not interested in the product, and this inference may be used as part of a collaborative filtering algorithm. In addition, inferences may be drawn from the types of establishments the user has been calling recently on the mobile communication facility. If he or she has been calling auto dealerships repeatedly over the past two weeks, an inference can be drawn that the user is presently looking for auto goods and/or services. Implicit preferences of users may also be collected by recording all pages that are visited by users and the frequency and/or duration of each visit. Using a binary coding scheme in which visited pages are coded "1" and unvisited pages "0," one may create user-based preference vectors and analyze statistically for both intra-user and inter-user cluster preferences or similarities. Other coding techniques may group certain sites along dimensions of commonality, with navigation behavior analyzed using any number of Euclidean or other distance and/or matching techniques. In embodiments, user preference data may be collected from within the mobile subscriber characteristics database. In embodiments, user preference data may be collected from outside of the mobile subscriber characteristics database. In embodiments, off-line behavior may also be used to characterize the preferences of the user.

An implicit mobile search query may be automatically generated from a mobile communication facility 102 based at least on one parameter in order to deliver relevant mobile content to a mobile communication facility 102, wherein the relevance may be based in part on information relating to a mobile communication facility 102.

The automatic generation of the search query may be an implicit search. This implicit search may not require user manipulation of a mobile communication facility command. For example, a user may not need to select a menu item, depress a button, select a touch screen icon, issue a voice command, or explicitly employ other commands associated with a mobile communication facility 102.

In embodiments, the automatic generation of a search query may also be accomplished by a server 134.

In embodiments, a parameter may be used to determine, in part, the relevancy of a mobile content. A parameter may be information relating to a mobile communication facility 102. This information may relate to a user characteristic. User characteristics may include a user's age, sex, race, religion, area code, zip code, home address, work address, billing address, credit information, family information, income information, birth date, birthplace, employer, job title, length of employment, and other information associated with user characteristics. For example, the user characteristic, employer, may be used to determine, in part, the relevancy of news headlines within a search result derived from an automatically generated search query of news headlines. If the user's employer was an automotive manufacturer, news headlines relating to autoworker layoffs may be determined to be more relevant than headlines relating to currency fluctuations in China, and, thus, prioritized for delivery to the user's mobile communication facility 102. Similarly, the parameter of the user's employer might also result in the generation of a search query relating to the employer's current stock price, and result in delivery of that information to the user's mobile communication facility 102.

In embodiments, a parameter may also relate to a user history, a user transaction, a geographic location, geographic proximity, a user device, a time, and or other user characteristics. For example, parameters relating to a user may include age (27), sex (male), previous user transactions (purchase of a jazz recording), and geographic location (New York City). The automatically generated search may return search results that are ranked, ordering, indexed, and or prioritized by their relevance to a user characteristic or plurality of user characteristics. In this example, the fact that the user is a young, male, located in New York City with a history of purchasing jazz recordings, may result in the prioritization of relevant content for delivery to the user's mobile communication facility 102, such as, retail establishments selling jazz recordings, retail establishments selling jazz recordings within New York City, retail establishments selling jazz recordings within walking distance of the user, and so forth.

In embodiments, a parameter may also include a mobile communication facility characteristic, which may be selected from the group consisting of display capability, display size, display resolution, processing speed, audio capability, video capability, cache size, storage capability, memory capacity, and other mobile communication facility characteristics. The information relating to a mobile communication facility 102 may be provided by a wireless operator, a wireless service provider 108, a telecommunications service provider, or other providers associated with a mobile communication facility 102. To further the previous example of the user who is a jazz aficionado, if a new video is available of a jazz artist in concert, the automatically generated query may determine whether the user's mobile communication facility 102 has appropriate video capability, and if so offer the user the opportunity to download the video.

In embodiments, relevant mobile content may be locally cached on a mobile communication facility 102. The locally cached information may be loaded prior to new content associated with a new search query. The locally cached information may be associated with an expiration, which may be a date, a time, a previous usage of the locally cached information, or other characteristics governing expiration of the locally cached information. For example, using the parameters of geographic location and time, the automatically generated search query may return results containing the current day's weather conditions for that location. These results might be locally cached on a mobile communication facility 102 with an expiration of 11:59 pm on that same day. In embodiments, the prior viewing of a cached content, such as a video, may be used to determine a permitted future use of the content. For example, a cached concert video from a jazz artist may be allowed to play five times on a mobile communication facility 102 after which time it expires and requires the user to purchase the video in order to view it again.

In embodiments, relevance may be based at least in part on a statistical association. The relevance may be a score. The statistical association may relate to an association between the mobile content and the information relating to a mobile communication facility 102. The information relating to a mobile communication facility 102 may include a user history, a user transaction, a geographic location, geographic proximity, a user device, a time, a user characteristic, or a mobile communication facility characteristic. A user characteristic may be selected from the group consisting of age, sex, race, religion, area code, zip code, home address, work address, billing address, credit information, family information, income information, birth date, birthplace, employer, job title, length of employment, and other user characteristics. A mobile communication facility characteristic may be selected from the group consisting of display capability, display size, display resolution, processing speed, audio capability, video capability, cache size, storage capability, memory capacity, and other mobile communication facility characteristics. For example, a mobile communication facility 102 may be associated with the parameters of a geographic location (San Francisco), a user history (previous calls to Chinese restaurants), and a time (7 pm). The mobile communication facility 102 may automatically generate a search query and prioritize the presentation of content based on the relevancy of the content to a restaurant, or a Chinese restaurant, or having the location of San Francisco, or being open for business at 7 pm, or some combination of these.

In embodiments, the information relating to a mobile communication facility 102 may be provided by a wireless operator, a wireless service provider 108, a telecommunications service provider, or other providers associated with a mobile communication facility 102.

In embodiments, a basic implementation of a collaborative filtering algorithm entails tracking the popularity of a product, service, business, transaction, or website by recording the total number of users in the set that rate it favorably (which may include a degree of favorability) or by recording the number of users that repeatedly visit the site. In essence, this algorithm assumes that what previous users liked, new users will like. In embodiments, a weighted averaging process is implemented to carve out subgroups of users who all highly ranked a product that has an overall unpopular rating with the overall user dataset.

A more robust collaborate filtering procedure, sometimes referred to as the K-nearest neighbor algorithm, uses a "training data set" that is based upon previous users' behavior to predict a variable of interest to members of a "target data set" comprised of new users. In addition to user preference data, the training data set may have additional predictor variables, such as might be contained in a mobile subscriber characteristics database (e.g., age, income, sex, date or place of birth, etc.). Variables of interest may include type of product purchased, amount of purchase, and so forth. For each row (single user data) in the target data set, the algorithm locates the "K" closest members of the training data set. Closeness, or distance, as used by the algorithm is generally a Euclidean Distance measure. Next, the algorithm finds the weighted sum of the variable of interest for the K nearest neighbors, where the weights are the inverse of the calculated distances. This process is then repeated for all remaining rows in the target set. From this information, models may be derived for future prediction. As the user population increases, the training data set may be updated to include new rows and thus capture any changes in user preference for use in revising the prediction model.

Other methods that may also be used successfully for statistical clustering of user preference groups include the weighted majority, Bayesian prediction, Pearson product correlation, and factor analysis.

In addition to the description of collaborative filtering summarized above, the following text may be referenced for more information relating to collaborative filtering and is incorporated herein by reference: Nakamura, A. and Abe, N., 1998. *Collaborative Filtering using Weighted Majority Prediction Algorithms in: Proceedings of ICML '98*, 395-403. Morgan Kaufman Eds. (see Appendix A).

In addition to, or instead of collaborative filtering, or other preferential treatment of various information as determined by other methods, non-preferential or objective type data may be employed to further target search results about the user of a mobile communication facility 102. For example, a location of the user may be determined through a GPS system (or other location based service), and this location may be used to filter results with or without the use of a collaborative filter. In embodiments, elements such as time of day, type of device, activities associated with time of day, activities associated with location, invoice activity, and the like may be used to further refine a search. In an embodiment, such information may be used in a category style filter (i.e. a filter designed to include or exclude results based on the data). In embodiments, such information may be used by a collaborative filter algorithm. In embodiments, such information may be used to filter results without being considered in the collaborative filter algorithm.

In embodiments, data used in the process of obtaining search results, refining search queries, making corrections, making suggestions, disambiguating search queries, categorizing results, performing explicit or implicit searches, filtering, collaboratively filtering, or performing other processes defined herein may be stored in a database (e.g. a relational database). In embodiments, the data may be mined, associating, linked, extracted, or otherwise manipulated or used. For more information relating to the association and mining of such data, refer to the following document, incorporated herein by reference: *Integrating Association Rule Mining with Relational Database Systems: Alternatives and Implications*, by Sunita Sarawagi, Shiby Thomas, Rakesh Agrawal, published by the IBM Almaden Research Center (see Appendix B).

A recommendation system may use information from a user's profile to make predictions regarding other information/products that might interest the user. Data used in the recommendation system may be obtained through the use of explicit and implicit data collection. Explicit collection refers to data collected from users who, for example, are directly rating items, ranking products, stating preferences, listing favorites or least favorites, etc. Implicit collection refers to data collected as, for example, a byproduct of user behavior, such as products viewed in an online store or products purchased. The recommendation system may compare the collected data to similar data collected from others and calculates a list of recommended items for the active user.

Suggestions may be generated for display 172 based upon each keystroke the user enters into the mobile communication facility 102. Suggestions may be cached locally on the mobile communication facility 102 and blended with the performance of server updates in order to optimize the overall performance of the wireless platform 100. Updates may also be provided to the cache memory of the mobile communication facility 102 without requiring a user keystroke. Additional suggestions may be supplied to users by ranking content based upon popularity, the frequency of query activity, frequency within content, the acceleration of the frequency of content, the frequency of purchases, the sales conversion rate, as well as any changes that occur to any of these metrics. Suggestion lists can also be derived by "de-duping" with frequent terms, such as "Tyra Banks out of 1, 2, 3," and categorizing, for instance, by title, artist, or a yellow pages-type taxonomy or other subject matter organization. The suggestions may be specific to a mobile communication facility 102, mobile subscriber characteristic 112, result facilities, carrier business rules 130, and/or search algorithm facilities 144. Suggestions may be dynamically displayed in a Java or BREW application. Suggestions may also be presented in a browser. For example, if a user types BR SP as their query, the responding WAP page may ask the user if they intended on entering Britney Spears or Bruce Springsteen. Then the user may click on the link of the intended query.

Recommendations may be specific to a mobile communication facility 102, mobile subscriber characteristic 112, result facilities, carrier business rules 130, and/or sponsor facilities 144. Providing a recommendation to the user about other relevant content may be done either during search result display 172 or after a search item has been selected. The relationships between items may be based on transactions, searches, and query behaviors and may include cross-selling products (e.g., recording artists within the same genre) or offering users additional products and services (e.g., offering a taxi service following a user's purchase of movie tickets in an urban setting). Query classification may use a yellow pages-type taxonomy (e.g., restaurants or physicians, or for inferring that a five digit number is a postal zip code) and may be specific to a mobile communication facility 102, mobile subscriber characteristic 112, delivery facility, disambiguation facility 140, and/or parental controls 150. The wireless platform 100 may also use keyword mapping to a query classification based upon a taxonomy. For example, a user query of "screwdriver" may map onto the category "hardware." This keyword mapping may be specific to a mobile communication facility 102, mobile subscriber characteristic 112, delivery facility, disambiguation facility, and/or parental controls.

The results facility 148 may include general content and services, specific content catalogs, carrier premium content, carrier portal content, device based results, or home computer desktop search results. The general content and services provided in the results facility 148 could be podcasts, websites, general images available online, general videos available online, websites transcoded for MCF, or websites designed for mobile browser facilities. Specific content catalogs may include travel, driving directions, results displayed on a map, white and yellow page telephone directories, movie show times and reviews, comparison shopping and product reviews, weather, stock quotes, general knowledge questions, word definitions, a thesaurus, restaurant reviews and reservations, WiFi hotspot locations, horoscopes, area codes, zip codes, sports scores, flight times, fantasy sports statistics, drink recipes, pick-up lines, jokes, information within a physical store (e.g., inventory), a mobile wallet, an encyclopedia, adult content, gambling content, and FAQ's. The carrier premium content provided in the results facility 148 may include ringtones (monophonic, polyphonic, or real tones), ringback, music streaming, MP3, video, games, screensavers, images designed for cell phones, mobile books, or other mobile applications. Carrier portal content includes news, such as the current top stories, entertainment, business, technology, and finance, and sports, weather, stock quotes, and account information. Device based results provided in the results facility 148 may include messaging, such as SMS MMS and instant messaging, email, chat, PIM (address book), and monetary services for a mobile wallet. Finally, home computer desktop search results may include text documents, Portable Document Format ("PDF") documents, maps in various formats including annotated maps, or a similar facility, spreadsheets, presentations, photos and images, web pages, email, IM, and chat.

Ordering and displaying search results may be based upon a mobile communication facility 102, mobile subscriber characteristic 112, delivery facility, disambiguation facility, parental controls 150, search algorithm facilities 144, carrier business rules 158, and/or a sponsorship facility 162. The ordering of content for display may also be based upon the amount of content available within a category. The display 172 may be changed based upon the screen size of the mobile communication facility 102, and sounds or other multimedia content may adapt to capabilities of the mobile communication facility 102. Ordering and display of content may be organized by the type of content, the artist, the date, or concept (e.g., Jaguar as a car, or jaguar as an animal), and other categories may derive from deduction within the mobile search host facilities 114. In addition to ordering, content may be emphasized or deemphasized by weighting within the display 172. For example, weighting may occur through the use of size, motion, lack of symmetry, use of garish colors, sounds, multimedia, or other means of accenting content. For sponsored links, there may be opportunities for yield optimization (e.g., clicks multiplied by the bid cost).

The parental controls 150 function may be set up by the wireless provider 108 at the time that the user account is created. A web-based interface may be used for changing or modifying the parent controls and for entering/changing the password protection. Alternatively, the parental controls may also be managed via an interface contained within the mobile communication facility 102.

The privacy facility 152 may include one or more facilities for protecting user privacy, such as an encryption facility for encrypting sensitive user data. The privacy facility 152 may also include a facility for protecting the user from undesired content, such as unwanted commercial email, spam, spyware, viruses, or the like. A privacy facility may, for example, filter such content prior to revealing results or may, in other embodiments, suggest modified queries that are less likely to reveal a user's confidential information or that are less likely to return undesired content. A privacy facility 152 may also function in a manner similar to a secure channel, such as via VPN, with a wireless provider 108. This secure channel may permit sensitive information to be shared securely.

The transactional security facility 154 may contain additional privacy and parental control settings, transactional security settings for the protection of wireless shopping, and the management of digital rights. In embodiments such a facility may include password-based security, a public-key/private-key facility, or other suitable security protocol for ensuring the authenticity of the participants in a transaction that is executed using the mobile communications facility 102.

The carrier business rules 158 of the wireless provider 108 may be associated with, or included in, the mobile search host facilities 114. These rules may govern what content users may access (e.g., walled garden vs. non-walled garden), where within the user interface sponsor logos and links are placed, which sponsor facilities are included, rules for the inventory of advertisements, rules allowing categories of transactions by users (e.g., based on access conditions, employer controls, parental controls, or the like) and managing auctions. In the instance of duplicate information occurring in a search result, the preferred provider's content may be given priority over others.

In addition to voice recognition 160 residing on the mobile communication facility 102, it may be contained within the mobile search host facilities 114 and use both software algorithms and hardware-based solutions for accurate voice recognition.

The sponsorship facility 162 stores premium content from sponsors that pay the wireless provider 108 to display this content to relevant users. Sponsors' information may link to a web site visited by the user (i.e., pay-per-click), or link to a call (i.e., pay-per-call). Sponsor information may include information that is text only, graphic information in the form of photographs, graphic art designs, or video, as well as various combinations of these. Sponsor information may also take the form of an interactive software application (i.e., a game), or special ringtones (e.g., jamtones). Sponsor information may be displayed to users based on the relation of the sponsor information and user search queries, results lists, items or categories, and the websites visited by the user. Web pages may display content for syndicated ads or links for syndicated ads. Furthermore, the wireless search platform 100 illustrated in FIG. 1 may contain the sorts of sponsor information described above in a separate database 128.

The implicit query facility 164 provides for the display of relevant content to users based on user activities other than explicit search queries. For example, in GPS data the locator facility 110 may indicate that the cell phone user is in the vicinity of a sponsor's restaurant. In addition, the clock contained in the mobile communication facility 102 and/or the wireless communication facility may indicate that it is mid-evening. A predictive algorithm could merge this information and make the implicit query that the user is interested in restaurants in his immediate vicinity at which he could purchase dinner, and then push content (ads, phone numbers, menus, reviews) to his mobile communication facility 102 for immediate display. Other implicit queries could similarly be based upon a user's parental controls 150, the carrier business rules 158, results facility 148, and so forth, either alone or in combination.

The wireless search platform 100 illustrated in FIG. 1 may contain a server 134 and database 138 connected to the Internet. Databases 138 connected to the wireless platform 100 over the Internet may store information, such as individual business websites with which the user transacts.

The wireless search platform 100 illustrated in FIG. 1 may contain a database storing wireless carrier business rules 130. The carrier business rules 130 may prioritize advertising content (see walled garden content 132 below) based on the financial interests of the wireless provider 108 or the importance of the sponsor 128. Additional carrier business rules 130 may include those described herein and in the documents incorporated by reference herein.

The wireless search platform 100 illustrated in FIG. 1 may contain a database storing "walled garden" content 132. Walled garden content 132 may be content from which the wireless provider 108 derives additional revenues based, for example, on user clickthroughs or content downloads (e.g. ringtones, wall paper, ringbacks, music, videos). Because of this additional revenue, the wireless provider 108, through its carrier business rules 130, may ensure that this advantageous content is given priority over search results that are equally relevant but do not have financial benefits for the wireless provider 108.

Figure 2:
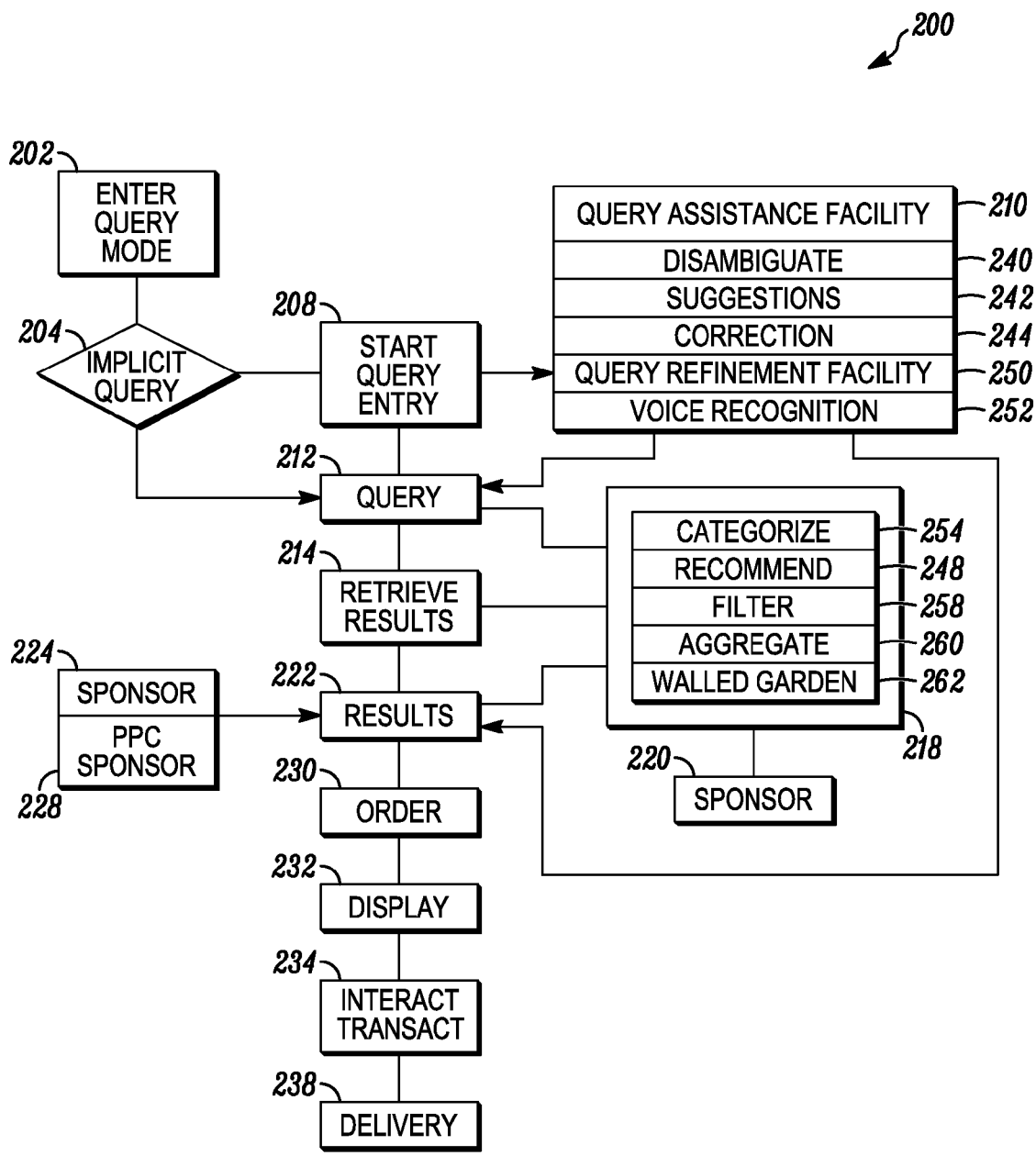
FIG. 2 illustrates a method for entering a search query, manipulating the query, and delivering search results.

FIG. 2 is a schematic diagram 200 showing a plurality of processes for handling a user query and producing a delivered result to the user. In the illustrated embodiment, the query mode 202 is entered. The query mode may be in the form of an explicit query entered by an active user, or it may be an implicit query initiated not by the user but by some characteristic related to the user and/or his behaviors (e.g., his GPS location). The start of the query entry 208 made explicitly by the user may be paired with additional information derived from a related implicit query 204. Depending on the clarity of the query entry 208, the query may need correction 244, disambiguation 240, or redirection 250. The query entry 208 may also be paired with recommendations 248, suggestions 242, or categorized 254 prior to further processing. If the start of the query entry 208 is made by voice, rather than text, it may be aligned with a voice recognition 252 program. Any or all of the processes used to optimize the search may be refined with information relating to the mobile communication facility, such as, for example, mobile subscriber characteristic information, location, time, filter algorithms, and the like.

Once the initial explicit and/or implicit query is made, the query 212 is processed and the initial results retrieved 214. Both the query 212 and the initial retrieved results 214 may undergo additional filtering 258 and aggregation 260. Walled garden content 262 and sponsored content 220 may also attach to the query 212 and present tailored results 222 to the user. The results 222 may also, in turn, trigger the posting of additional sponsor 224 messages and advertisements. Information from pay-per-click (PPC) sponsors 228 may link to the results, making it possible for the user to quickly learn about sponsors' services, phone numbers, addresses, hours of operation, sales, and so forth. If the start of the query entry 208, for example, undergoes redirection 250, it may either be routed back to the query stage 212 or immediately present the user with the results 222 based upon the query. Once results are retrieved, but prior to display 172, the content may be tested for compatibility with the user's mobile communication facility 102 by using a spider to run mock compatibility trials during which it emulates the processing characteristics of a broad array of commercially available wireless communication facilities, including the user's mobile communication facility 102 type, in order to determine the content within the result set that is compatible with the user's mobile communication facility 102.

The query results 222 may be ordered 230 prior to display 232 based, for example, upon the sponsor 224, mobile subscriber characteristics, information relating to the mobile communication facility, location, carrier rules, filter results, and/or walled garden 262 priorities. Once the results 222 are displayed 232, the user may initiate interactions/transactions 234 with the information (e.g., placing a call, click on a link, or an online order) that is then delivered 238 wirelessly through the wireless platform 100 described in FIG. 1.

Referring back to FIG. 1, a wireless communication facility 104 may be an equipment enclosure, antenna, antenna support structure, and any associated facility used for the reception or transmittal of a radio frequency, microwave, or other signal for communications. An antenna may include a system of poles, panels, rods, reflecting discs or similar devices used for the transmission or reception of radio frequency signals. An antenna may be an omni-directional antenna (such as a "whip" antenna) that transmits and receives radio frequency signals in a 360-degree radial pattern, a directional antenna (such as a "panel" antenna) that transmits and receives radio frequency signals in a specific directional pattern of less than 360 degrees, or a parabolic antenna (such as a "dish" antenna), a bowl-shaped device for the reception and/or transmission of radio frequency communication signals in a specific directional pattern. Other antennae that may be included in a wireless communication facility are accessory antenna devices, such as test mobile antennas and global positioning antennas which are less than 12 inches in height or width, excluding the support structure.

One or more wireless providers 108 may mount equipment on a single wireless communication facility 104.

Other examples of devices that may comprise a wireless communication facility include a lattice tower, a wireless communication support structure which consists of metal crossed strips or bars to support antennas and related equipment, a monopole which is a wireless communication facility 104 consisting of a support structure, and related equipment, including all equipment ancillary to the transmission and reception of voice and data. Such equipment may include, but is not limited to, cable, conduit and connectors, stanchions, monopoles, lattice towers, wood poles, or guyed towers.

A wireless provider 108 may include any for-profit, non-profit, or governmental entity offering wireless communication services. A wireless provider 108 may include services utilizing a broad array of wireless technologies and/or spectra, including, but not limited to, Cellular, Advanced Wireless Services (AWS) Spectrum, Broadband PCS, Narrowband PCS, Paging, Wireless Communications (WCS), Wireless Medical Telemetry (WMTS), Specialized Mobile, Private Land Mobile, Maritime Mobile, Low Power Radio Service (LPRS), Dedicated Short Range Communications (DSRC), 218-219 MHz, 220 MHz, 700 MHz Guard Bands, Air-Ground, Amateur, Aviation, Basic Exchange Telephone, Broadband Radio Service (BRS), Citizens Band (CB), Commercial Operators License Program, Educational Broadband Service (EBS), Family Radio Service (FRS), General Mobile Radio, Industrial/Business Radio Pool, Intelligent Transportation Systems (ITS), Instructional Television Fixed (ITFS) See Educational Broadband Service, Lower 700 MHz, Medical Implant Communications (MICS), Microwave, Millimeter Wave 70-80-90 GHz, Multipoint Distribution (MDS/MMDS), Multi-Use Radio Service (MURS), Offshore, Personal Locator Beacons (PLB), Personal Radio, Public Safety, Radio Control Radio Service (R/C), and Rural services.

A locator facility may work with the mobile communication facility 102 in identifying the current geographic or other location of the mobile communication facility. A locator facility 110 may, for example, be used to locate the geographic location of a wireless device through the use of geographically-tagged personally identifiable data or personally identifiable data. Geographically-tagged personally identifiable data describes personally identifiable data that is linked to a particular location through use of location-based services. Personally identifiable data is information that can be used to identify a person uniquely and reliably, including but not limited to name, address, telephone number, e-mail address and account, or other personal identification number, as well as any accompanying data linked to the identity of that person (e.g., the account data stored by the wireless provider 108). In addition to or as an alternative to geographic location, a locator facility 110 may identify other locations, such as proximity to other users, proximity to a network location, or position relative to other users (e.g., in a line).

As described above, mobile subscriber information may be stored in an accessible form in a mobile subscriber characteristics database 112. The information may be accessible directly from a mobile communication facility 102, from the wireless provider 108, or from another user and or handler of the information. In addition, the mobile subscriber database 112 may be loaded with information relating to a mobile communication facility 102, a user of the mobile communication facility (e.g. a customer of the wireless service provider 108), and a wireless service provider 108 or other source of useful information. The mobile subscriber information may be used in conjunction with a search for information on a mobile communication facility 102. For example, the mobile subscriber information may be used to help better assess the desired search targets of a user using a mobile communication facility. In embodiments, the user may perform a search based on key words (or disambiguated, corrected, suggested or other terms as described herein), and some or all of the mobile subscriber characteristic information may be used in addition to the key words as a way of refining or customizing the search to the particular user. For example, the user's age, location, time of day, past mobile communication facility transactions (e.g. phone calls, clicks or click-throughs) may be used to predict what the user is more interested in. In embodiments, the information that is predicted as valuable may be listed at the top of the search results; they may be the only results produced or they may be highlighted in some way. The mobile subscriber characteristic information may be used in connection with an algorithm facility 144 for example. The mobile subscriber characteristic information may be used in connection with a category filter or other filter used to refine search results according to such information.

By way of another example, the mobile subscriber information stored in the mobile subscriber characteristics database 112 may be used in an implicit search as described in further detail herein. The wireless provider may gain information pertaining to the user's location, time of day, likes and dislikes (e.g. through interpretation of other transactions, phone activity or web activity, related to the mobile communication facility 102), and the wireless provider may facilitate the downloading of apparently relevant information to the mobile communication facility in anticipation of the user's desire for such information. For example, a location facility 110 may locate the mobile communication facility. The location may be associated with the time of day at which the location was obtained. The location information may be associated with the other mobile subscriber characteristic information through a phone number associated with the mobile communication facility. The location may be Harvard Square in Cambridge, Mass. The time may be 6:30 p.m. and the user may have called Chinese restaurants ten times over the past two months at about this same time. This may be determined based on previous queries or by history of phone calls that may then be reverse-searched to check for relevance to future queries.

With this information, the system may make an inference that the user is interested in dinner at a Chinese restaurant and download information pertaining to such in the area of Harvard Square. In addition, information pertaining to dinner categories or other results may be presented. In embodiments, this collection of user relevant information may be used in connection with sponsor information stored in the sponsor database 128, and some or all of the results presented to the user may be sponsored information. The sponsor information may be the result of a search result auction based on the user relevant information, or the sponsor information may be related to local restaurants wherein the sponsored link is a pay per call sponsored link, for example.

There are many ways in which the mobile subscriber characteristic information can be used in a mobile communication facility search for information, whether it is an explicit, implicit, or other form of search, and several such embodiments are presented in more detail below.

As described above, the sponsor database 128 may store sponsor information in an accessible form in the sponsor database 128 to be used in the searching for information, presentation of information, accessing of information, or other activity associated with the mobile communication facility 102. In embodiments, the sponsor information may be used to present syndicated sponsor links, advertising, content, or other information on the mobile communication facility 102.

A sponsored result may be presented to the user of a mobile communication facility 102 as a result of an auction for advertising space on the mobile communication facility 102. The auction may be keyword based, term based, phrase based, algorithm based, or some other system of associating information, a site, content, and the like with a search query or inquiry. For example, the user of a mobile communication facility 102 may conduct a network search by entering a search query, and the query, or some related form of the query (e.g., a disambiguation of the query, correction of the query, suggestion related to the query), may be processed through an auction in which the highest bidder for the auction receives an elevated right to advertise its content. The content may be presented as a sponsored link on a display associated with the mobile communication facility. The sponsored link may be highlighted, prioritized, or otherwise presented. In embodiments, the sponsored information may be presented on a site visited by the mobile communication facility user. For example, the user may click on a link other than the sponsored link. Once the website content is displayed on the mobile communication facility, information relating to the sponsored link may also be displayed, offering another chance for the user to click on the sponsored link.

In embodiments, a user of the mobile communication facility 102 may perform a search for information, or a search for relevant information may be performed in anticipation of the user desiring such information (e.g., an implicit search) and included in the results presented may be a sponsored link, content, or other information. The sponsored content may be the result of an auction (e.g., a keyword based auction, algorithm based auction, location based auction, mobile subscriber characteristics based auction, or combination auction wherein information, such as from the search query, is combined with other information, such as location or mobile subscriber characteristics), and it may be presented and displayed on a display associated with the mobile communication facility in a prioritized manner, highlighted manner, exclusive manner, or presented in some other manner.

In embodiments, sponsor information may be presented to a mobile communication facility 102 as the result of an auction. In embodiments sponsor information may be presented as a pay-per-call link or content. In a pay-per-call embodiment, there may not have been an auction for the right to post the information on the mobile communication facility 102. The information may have been presented because it appeared relevant or for some other reason. In such situations, the user of the mobile communication facility may be presented with a special phone number associated with the sponsor. When the special number is called, the receiver of the call (e.g., a vendor of goods or services) is presented with an option to receive the call and pay a commission to the poster of the information (e.g., the wireless service provider) or decline the call. In another somewhat similar scenario, the vendor may be allowed to accept the first call for free, or pay for/billed for the call later, but have to accept such charges in the future if referrals are desired. The user of the mobile communication facility 102 may store the sponsored or referred phone number in an address book of the mobile communication facility 102, and every time the number is called, the wireless service provider may be paid for the referral. In embodiments, the referral/sponsor fee may go down with use, go up with use, or remain stable with use. In embodiments, the referral/sponsor fee may change with time or other parameters. In embodiments, a pay per call number is the result of an auction process. Advertising syndication may be segmented by mobile communication facility 102, mobile subscriber characteristics 112, delivery facilities, and/or parental controls 150.

An aspect of the present invention relates to a syndication program where mobile content may be added to a website when the website is presented to a mobile communication facility (e.g. a cell phone). Such syndication may be decided by the wireless operator, wireless service provider, telecommunications provider or may be at the decision of the website owner through an opt-in process. The opt-in process may involve signing up with a wireless provider, mobile search provider, or other related entity. The opt-in process may also involve the insertion of a tag on the website. Mobile content may automatically be added to website pages for a specified URL or plurality of URLs. The addition of mobile content may be done without an indication on the page of where mobile content should be placed. A tag or other coded information may be included in the website to indicate where on the site the mobile content should be placed when delivered to a mobile communication facility. The syndication process may be context based relevancy, behavioral based relevancy or it may be based on a combination of the two techniques to associate relevant mobile content with the site. A server application (e.g. a WAP server application, WAP Gateway, Mobile Application Gateway, and the like) may automatically add mobile content to a website when delivering it to a mobile communication facility whether or not the website is tagged. The mobile content may involve a web content placement auction or other process for determining which content will be associated with keywords, topics, websites, and the like during the presentation.

Automatic syndication of mobile content to a website may be based at least in part on using contextual information associated with the website in order to determine the relevancy of mobile content that is available for syndication. Contextual information that may be associated with a website may include keywords, terms, or phases located on the website, the inbound links to the website, the outbound links from the website, click patterns and clickthroughs associated with the website (including click patterns and clickthroughs associated with sponsored content appearing on the website), metadata, website usage patterns including time, duration, depth and frequency of website usage, the website host, search verticals relating to the website, and other indicia of website context.

The contextual information relating to a website may be associated with mobile content that is available for syndication and presentation to the website based at least in part on relevance. Mobile content available for syndication may derive from a pool of mobile content sponsors participating in a contextual syndication program provided by a wireless operator, wireless service provider, telecommunications provider, mobile search provider, and the like. Alternatively, mobile content available for syndication may derive from outside of a contextual syndication program and be used for generating a mobile sponsor campaign for presentation to a potential participant in a contextual syndication program.

The relevancy of the contextual information associated with a website and the mobile context available for syndication may be indicated through the use of a relevancy score. The relevancy score may be a numerical summary of the statistical association between contextual website data parameters and mobile content parameters. The relevancy score may be a proprietary score assigned to a mobile content by a wireless operator, wireless service provider, mobile search provider, or telecommunications service provider. The contextual data parameters associated with websites may be standardized in a list. Mobile content may receive a relevancy score for each element in the contextual data parameters list. For example, a mobile content, such as a ringtone download advertisement, may receive a relevancy score for each of a plurality of websites. "Entertainment" websites may receive a higher relevancy score than the "Weather" websites. Similarly, the contextual information of an inbound link relating to "Music" may receive a higher relevancy score than an inbound link relating to "Pets." A mobile content relating to a ringtone derived from a popular Chinese-language song may receive a higher relevancy score for the contextual information of "Server Host=China" than for "Server Host=Argentina." Contextual information parameters "Keyword=Ringtone" or "Keyword=Music Download" could also be scored as highly relevant to syndicated mobile content relating to ringtones, and so forth. The relevancy scores of a syndicated mobile content may be stored in a mobile content relevance dictionary.

A program of automatically syndicating mobile content to a website may be based upon the relevance of the mobile content to the contextual information associated with the website. The automation of syndicating mobile content may be based at least in part on associating electronic information associated with a website (e.g. metadata). Contained within the metadata may be information regarding the relevance of the website's contextual data parameters with mobile content data parameters. Examples of only a few of the many examples of how a metadata may contain relevance information include: metadata indicating relevance to the website (e.g., "Ringtones"), metadata indicating the minimum relevancy score associated with a contextual data parameter that is required for syndicating a mobile content to the website, and the like. The metadata may communicate with the mobile content relevance dictionary in order to identify, receive and present relevant mobile content to a website.

In embodiments, an entity associated with a website may be able to opt into an automated syndication program. The opt-in may be done in association with a wireless operator, wireless service provider, mobile search provider, or telecommunications provider. The opt-in may be done through a self-service website, through an entity conducting the automated syndication program, through a ground mailed solicitation, phone call solicitation, through a website tag, and the like. Once an entity associated with a website has opted into the program, the automated syndication program may associate an electronic tag within the entity's website in order to commence the automated syndication. The automated syndication program may operate in conjunction with a WAP server, WAP Gateway, Mobile Application Gateway, remote server, a server that is serving pages to a mobile communication facility (e.g. phone), and the like. In embodiments, the opt-in process involves tagging the target website with a syndication indication tag. For example, a website operator may tag the website (and each of its associated pages) with a syndication indication tag indicating that it is to be syndicated when presented to a mobile communication facility (e.g. phone). The tag may also indicate the position of the mobile content on the page. Opt-in websites may choose not to insert a tag and allow the mobile content to appear automatically on the page. A server application designed for downloading the website to the mobile communication facility (e.g. a WAP server, WAP gateway, Mobile Application Gateway, and the like) may read websites looking for the syndication indication tag or may associate the website location with a database of URLs that have requested to participate (opt-in). Once the server confirms the site is to include syndicated mobile content, the server may automatically add mobile content to the website. The process of tagging the site may involve going to a wireless provider site or mobile search provider site to obtain the proper tag. In embodiments, the tag may be provided by any number of different entities or sources. For example, the tag may be provided by a third party tagging website. In embodiments, the format of the tag may be known and a site administrator may insert the tag.

The automated syndication program may be a flat fee, revenue sharing, or no-fee service program offered to an entity of a website. The automated syndication program may involve a split fee service program offered to an entity of a website in which the entity shares revenues with the wireless operator, wireless service provider, telecommunications provider, mobile search provider conducting the automated syndication program, server service provider and/or other entities involved in the transaction. Fees may be derived from sponsors of mobile content participating in the automated syndication program. The fees derived from the sponsors of mobile content, competitive bidding process, auction, flat fee service, or the like. The fee structure and bidding may be based on the relevancy score associated with a data parameter.

In embodiments, a website may be tagged for syndication and there may be no fee, a flat fee, a revenue sharing arrangement or other arrangement made when a server application syndicates the webpage. The content used to syndicate the website may have been provided through the an auction or other such arrangement and the fees received for the syndication application may be shared with a number of entities including the site owner, the wireless provider delivering the site to the mobile communication facility, the server operator and/or other entities involved in the transaction.

Alternatively, mobile content syndicated to a website may include a search box that may allow for searching the website alone or a set of content broader than the website alone.

As described above for an automatic syndication program based upon contextual information associated with a website, so too may an automatic syndication program be based upon behavioral information relating to a user of a mobile communication facility. Within an automated syndication program based upon behavioral information, the relevancy scores of mobile content may be based on a user's behavioral data parameters including, but not limited to, at least one of a user history, transaction history, geographic location, user device, time, mobile subscriber characteristic, mobile communication facility characteristic and/or other such user information as described herein. A mobile communication facility may be a phone, a mobile phone, a cellular phone, and a GSM phone.

While many of the embodiments herein have been described in connection with a syndicated website, it should be understood that the techniques apply to other forms of network content as well. For example, the techniques may be used for the syndication of a webpage, portion of a webpage, an image, video, movie, skin, graphical user interface, program interface, web content, downloadable content and other such content.

In embodiments, the carrier rules database includes information relating to search techniques, search methodologies, locations for searchable content, walled garden rules, out of garden rules, out-of-network searching rules, in-network searching rules, search result presentation rules, sponsor presentation rules, sponsor search rules, sponsor rules, content presentation rules, and other information and rules pertaining to the search, display, ordering, and/or presentation of information on the mobile communication facility 102.

Carrier business rules may provide guidance on how, for example, a search term is to be disambiguated or corrected, what search terms should be suggested as a result of an entered or submitted query, how results and in what order results should be presented, or how sponsors should be selected and or presented. The carrier business rules may provide guidance about when to search in-network databases (e.g., walled garden content 132) and when to search out-of network databases (e.g., database 138 through server 134). For example, a wireless provider 108 may want to cause users of mobile communication facilities 102 to order music, videos, ringtones, wallpaper, screensavers, and the like from an in-network database of walled garden content 132, while the wireless provider may want current news to come from an out-of-network source. The wireless provider may then set these rules and store them in a carrier business rules database 130. These rules can then be accessed by the wireless provider (or optionally from the mobile communication facility 102 or other related facility) during the search, presentation, or ordering, or other parameter according to the present invention.

A walled garden database 132 may be associated with a wireless provider and a mobile communication facility 102 according to an aspect of the present invention. The walled garden 132 refers to subset of carrier business rules 130 that determine the type of access to wireless content that a user is permitted. The walled garden may limit the scope of permitted content to a pre-defined content set that is determined by the wireless provider 108. For example, a wireless provider 108 may license content from third parties and offer the provider's subscribers a bundled package of the licensed content, while restricting access to other content. The wireless provider 108 may direct the content layout, authentication, royalty tracking and reporting, billing, quality of service, etc. through the provider's carrier business rules, or this function may be outsourced to a third party. The walled garden 132 permits a wireless provider 108 to offer its subscribers a suite of content as part of the subscriber's wireless basic account, thereby eliminating the need for the subscriber to individually pay for discrete licensed products within the licensed content package. The walled garden 132 restricts the choice of content that is available to subscribers. Typically, the wireless provider 108 is compensated for content distribution in a form of revenue split between itself and the licensed content providers.

Related to the walled garden 132 model of content distribution is the gated garden model. In the gated garden, the wireless provider 108 may create a virtual toll gate through which third parties may offer their proprietary content to the wireless provider's subscribers. In exchange, the wireless provider 108 shares in the revenues derived from its subscribers' accessing the third party content. Unlike the walled garden 132, in the gated garden model the wireless provider 108 typically does not assume responsibility for the content or customer service related to problems accessing the content.

The algorithm facility 144 may perform algorithms of all types including algorithms for combining information relating to a search, ordering results from a search, or displaying results, sponsoring results, and the like. For example, an algorithm facility may include an algorithm to define how to incorporate the mobile subscriber characteristics into a search query entered on the mobile communication facility 102. The algorithm may, for example, determine what information to use in combination with a search query, what information to use in an implicit search, what weight to provide to the various parts of the search (e.g. location receives a high weight in an implicit search), what sponsors are acceptable, how results should be ordered, how results should be displayed (e.g., highlighted), and/or determine other parameters related to the search. An algorithm facility 144 may also include sponsorship algorithms, algorithms related to auctions, algorithms related to pay per click, algorithms related to pay per call, or other algorithms related to the development of a search as described herein.

The algorithm facility 144 may be a software tool used for evaluating a number of possible solutions based upon a user query. The set of all possible solutions may be called the search space. In general, uninformed searching may employ brute force searching or "naïve" search algorithms for relatively simple, direct traversal of the search space. By contrast, informed search algorithms may use heuristics to apply knowledge about the structure of the search space during a search. Potential algorithms that may be used in the algorithm facility 142 include, but are not limited to, the uninformed search, informed search, tree search, list search, adversarial search, constraint satisfaction, genetic search, probabilistic search, simulated annealing, string search, taboo search, and/or federated search.

A parental control facility 150 may be a software-based means of restricting access to certain types of (user-defined) objectionable content. The parent control facility 150 may include multi-level and/or dynamic web filtering technology to filter and block out inappropriate content. The parental control facility 150 may link to other features of the wireless search platform 100 or mobile communication facility 102. For example, the parental control facility 150 may, upon blocking objectionable content, send an email notification or cell phone alert about inappropriate web browsing, instant messaging, and chat sessions, etc. Comprehensive log reports can summarize a child's activities. The parental control facility 150 may also include the means to control the total time that a user is permitted to use a mobile communication facility 102 or the Internet, filter web based email accounts, block objectionable pop up ads, etc.

A voice recognition facility 160 may be a software component enabling a machine or device (e.g., a cellular phone) to understand human spoken language and to carry out spoken commands. Typically, a human voice is received by the device and converted to analog audio. The analog audio may in turn be converted into a digital format using, for example, an analog-to-digital converter, which digital data may be interpreted using voice recognition techniques. Generally this is done through the use of a digital database storing a vocabulary of words or syllables, coupled with a means of comparing this stored data with the digital voice signals received by the device. The speech patterns of a unique user may be stored on a hard drive (locally or remotely) or other memory device, and may be loaded into memory, in whole or in part, when the program is run. A comparator may use, for example, correlation or other discrete Fourier transform or statistical techniques to compare the stored patterns against the output of the analog-digital converter.

The capacity of a voice recognition facility 160, such as vocabulary, speed, and length of digital samples that can be analyzed, may be constrained by hardware capabilities of the voice recognition facility 160, such as memory capacity, sampling rates, and processing speed, as well as the complexity of algorithms used for comparisons.

An implicit query facility 164 may automatically generate context-sensitive queries based on a user's current activities, characteristics, and/or the user's device characteristics. For example, the implicit query facility 164 may retrieve Internet links, music files, e-mails, and other materials that relate to an active user's query, but which the user did not specifically query. Other data linked to the user's mobile communication facility 102, for example geographic location obtained from the locator facility 110, may be used to initiate an implicit query for stores in the user's general facility that, based on the user's previous Internet usage, are of likely interest to the user. An implicit query facility may gather and download content onto the mobile communication facility 102 in anticipation of a mobile communication facility user's desire for such information. This technique of providing results in advance of the search query may be used to increase speed of content delivery, for example.

A client application interface may be associated with a mobile communication facility 102. The client application interface may be a software program operating through a processor (and operating system) on the mobile communication facility, and the program may facilitate processes used in the mobile communication facility and/or generate information through the display 172. The client application interface may perform a number of functions associated with the processes and devices as described herein. For example, the client application interface may produce the search query entry facility, operate in association with a voice activation facility, operate in association with transmission and reception circuitry on the mobile communication facility, operate in association with mobile host facilities 114, produce a graphical user interface on the mobile communication facility, or perform other functions related to the mobile communication facility and/or systems and processes as disclosed herein. The client application interface may perform several functions, such as producing a graphical user interface on the mobile communication facility. Another function may be expanding a line item (e.g. a category, a download configuration or option, etc.) when a cursor or other interface is hovering on the item or otherwise interacting with the item. Another function may be to represent a hierarchy by a visual cue (e.g. with an arrow, multifaceted arrow, plus sign, or the like) with the sub-items appearing below when the visual cue is selected. Another function may be representing a hierarchy as line items with selection scrolling in another screen with the sub-items. Another function may be to provide instrumentation to allow for tracking of user clicks just as web pages would be tracked for click patterns. Another function may be using a camera associated with the mobile communication facility to track phone movement as a method for navigating on the screen (e.g. scrolling up/down & left/right on a picture, map, or text to facilitate selection of an item, or the like). Another function may be to provide smooth visual transitions (e.g. hierarchy screen movements and expanding line item) which may provide further visual indication, thereby increasing usage and sales. Another function may be to provide tool tips for icons. The tool tips may be presented after a predetermined hover time is achieved or there may be a visual cue near an action icon, for example. Another function may be to download suggestions in the background while cached suggestions are already displayed. Another function may be to download suggestions to display next to cached suggestions. Another function may be to cache results (e.g. operate similarly to suggestions). Another function may be to operate with preinstalled cached suggestions. Another function may be to perform software update notification, wherein the user may have the option to update. Another function may be to present notifications. Such notifications may be phased in to prevent millions of handsets from trying to update at the same time, for example. The client application interface may be designed to handle multiple mobile communication facility variations without requiring different versions of the software. The client application interface may generate a gradient shading and/or dithering to give color depth without putting a bitmap in the application. This may be provided to reduce the application size to facilitate downloads (e.g. increase speed of downloads). Another function may be to provide multi-lingual support. Another function may be to allow a user to send to a friend results or an item result (e.g. this may apply to any of the delivery facilities presented herein). Another function may be to provide pagination for results to increase page load speed and minimize network costs. Another function may be to search history stored locally to allow quick access from every list screen. The client application interface may be designed to incorporate carrier branding and the carrier branding may be in color and a logo may be presented. Another function may be to provide different data transfer modes to allow for different mobile communication facilities, carrier network speeds, user data plans, or other situations. Another function may be to provide a thin visual cue for background network activity without taking significant screen real-estate and allowing for continued interactivity of application. Another function may be to provide a skinnable search application whose arrangement and/or appearance may be customized, or the client application interface may be locally skinnable. Another function may be to provide a dynamic font selection and display based on information relating to the mobile communication facility 102. Another function may be to provide a dynamic screen reformatting based on information relating to the mobile communication facility 102. Another function may be to provide for entry of a general topic with categories and associated results displayed to allow for selection of the rest of the query without having to type in the entire query on a limited Query Entry Facility 120. Another function may be to provide or associate with a dynamic cache size based on information relating to the mobile communication facility capabilities. Another function may be to pre-download information through search experience (e.g. downloading results in background before selecting content type). Another function may be to provide high speed and low speed network communication based on changing data usage pattern or on other factors (e.g. processing more transactions in the background when the mobile communication facility is associated with a slow network). Another function may be to provide query composition using a combination of suggestions. The client application interface may perform other functions as needed on the mobile communication facility in connection with the functions and facilities outlined herein as well as other conventional functions of the mobile communication facility 102. Another function may be to use dynamic memory management, specifically using more or less memory for previous screens, pre-fetched information or cached data based on the capabilities of the device, and based on the other memory demands of the device, such as other applications or content on the phone. Another function may be to automatically update the application, with the user's permission. This particular function may be deployed in a phased manner that does not force all devices do not require updating at the same time.

In a wireless search platform 100, a mobile communication facility 102 may include a cache such as a cache memory, or a portion of a memory organized as a cache. The memory may be a hard drive, a static memory, or a non-volatile memory. The memory may be permanently installed in the mobile communication facility 102, or may be removable such as a memory card.

The cache may contain suggestions, such as mobile content, which may be accessed and presented on a display of the mobile communication facility 102 as a result of an action by a user of the mobile communication facility 102. The cached information may also be accessed and presented as a result of an action by a provider of services to the mobile communication facility 102, or by an automated application running on the mobile communication facility 102. Suggestions may be cached locally on the mobile communication facility 102 and blended with the performance of network updates to facilitate optimizing the overall performance of the wireless platform 100.

Data stored in the cache may be input directly by the user (e.g. a user name, address, search query). Alternatively the data stored in the cache may be transferred from the mobile network from a server 134, wireless provider 108, or a mobile search host facility 114. The cached data may be compressed prior to transmission to the mobile communication facility 102, and may be decompressed after receipt on the mobile communication facility 102. The data may be decompressed upon receipt, or may be decompressed as the data is accessed to be presented.

The cached data may be mobile content such as sponsored content, a sponsored link, a sponsored call, downloadable content, an audio stream, a video, a graphic element, an index such as a yellow pages or a white pages. Caching mobile content facilitates fast access and display of the content when needed to reply to a user query or input.

A client application interface of the mobile communication facility 102 may download suggestions in the background while cached suggestions are displayed. Another client application interface function may be to download and display network suggestions next to cached suggestions. The client application interface may cache search results (e.g. operate similarly to caching suggestions), or it may operate with preinstalled cached suggestions.

Suggestions, information, and mobile content to be downloaded to the mobile communication facility 102 may be generated by a server 134 or mobile search host facility 114 by ranking content based upon popularity, the frequency of query activity, frequency within content, the acceleration of the frequency of content, the frequency of purchases, the sales conversion rate, as well as any changes that occur to any of these metrics.

Suggestions may be retrieved from the cache in response to a query input by the user. If the cache cannot provide a full list of suggestions, a request may be sent to a server 134 or a mobile search host facility 114. However, a request for suggestions may be sent by the mobile communication facility 102 independent of the amount of relevant suggestions in the cache. This facilitates keeping the cached suggestions updated. These updated suggestions may be displayed along with the cached suggestions, and then the updated suggestions may be cached to speed up future suggestions. The updated suggestions may supplement or replace the previously cached suggestions. The previously cached suggestions may be replaced if the new suggestions are ranked higher.

Suggestions, content, and other information cached on the mobile communication facility 102 may be identified with a date stamp or time stamp of caching. A function of the client application interface may be to request updates to cached information based on the age of the cached information. As an example such a function may ensure that cached suggestions are updated every 48 hours or sooner.

To effectively use the cache memory resources of the mobile communication facility 102, a server may reply to a request for an update of cached suggestions with information that indicates the cached suggestions no longer rank high enough relative to other suggestions or user characteristics to continue to be stored on the mobile communication facility 102. In such an example, the client application interface may delete the appropriate cached information such that it will not appear in response to future searches or queries, freeing up the memory for other uses. Upon detecting a query to which the server indicates cached information is obsolete, the server 134 may also download new suggestions, information, content, or the like to the mobile communication facility 102 for caching.

Suggestions, mobile content, or information may be downloaded to the cache of a mobile communication facility 102 through an explicit search, or through an implicit search. An example of an explicit search includes a user entering a search query in the user interface of a mobile communication facility 102 and requesting a search. An implicit search includes search activity performed either as a result of a query by the client application interface of the mobile communication facility 102 without a user query entry, or by one or more applications running on the server 134 or the mobile search host facility 114. Implicit searches may be triggered based on a schedule, based on a change in location of a mobile communication facility 102, and based on the age of the cached information in the mobile communication facility 102 cache memory. As an example, a user's location may change such as when a user travels to a different city. This change in location may trigger an implicit search of local restaurants meeting a criteria established based on prior user behavior, perhaps including other users' behavior upon entering this location.

The presentation of information, such as cached suggestions, may be the result of user search query. If there is a matching relationship between the search query and the previously downloaded results in the mobile communication facility 102 cache, the previously downloaded results may be presented. The user may perceive this as a very fast search or a high bandwidth connection because the search results are presented from a memory of the mobile communication facility 102.

Cached suggestions may also be presented to a user even if the user cannot connect to the wireless network, enabling the user to gain access to important network information which has been cached on the user's mobile communication facility 102.

The cached information may be presented in categorized groups, in thumbnail format, or in a preview format such as an audible ring tone preview, a text excerpt, a video excerpt, or an audio file excerpt.

A client application interface may process or cause processes to occur in the background. For example, in embodiments, results may be presented to the mobile communication facility 102 as they are retrieved without waiting for the entire result set to be retrieved. In embodiments, certain results may be presented and displayed while other results are in the process of being presented or displayed. This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is presented.

Figure 3:
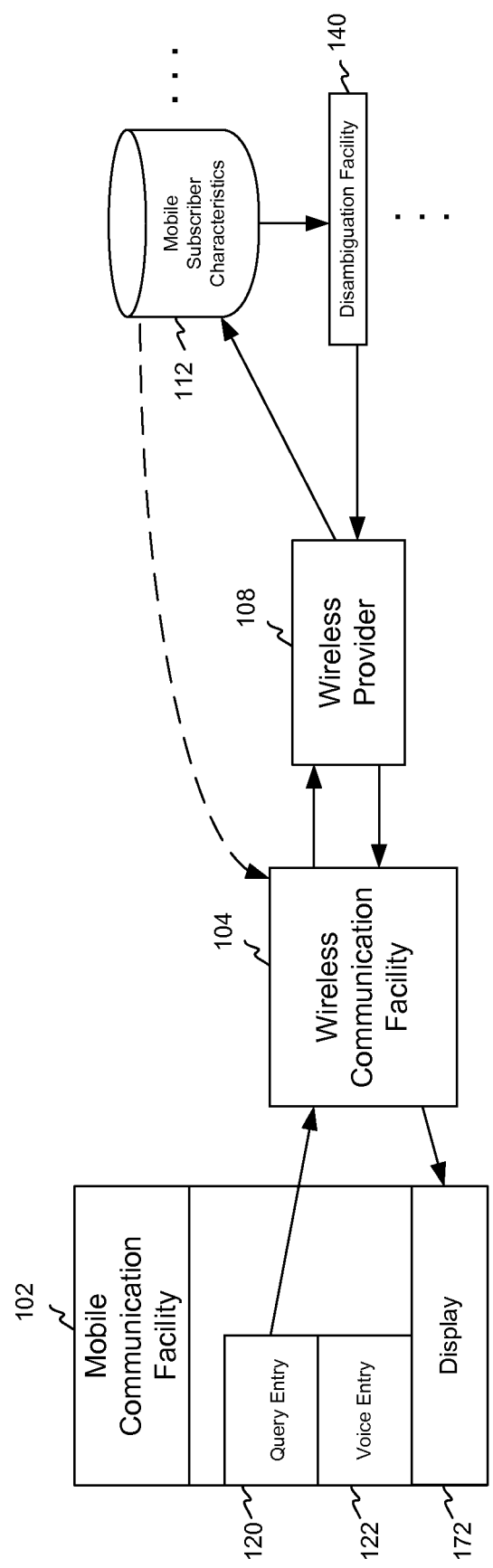
FIG. 3 illustrates sample elements involved in disambiguating a search query.

FIG. 3 illustrates a generalized disambiguation process for a disambiguation facility 140 associated with a mobile communication facility 102 and a data source, such as a mobile subscriber characteristics database 112, according to an aspect of the present invention. The disambiguation facility 140 is a means for deriving greater clarity from ambiguous user queries. As depicted in the FIG. 3 schematic, a query entry 120 may be processed through a wireless communication facility 104 and/or wireless provider 108 to a disambiguation facility 140. Although the example provided in FIG. 3 shows a disambiguation facility 140 linked to a mobile subscriber characteristics database 112, the disambiguation facility 140 may link to any number of other data sources (e.g., carrier business rules 130, content walled garden 132, etc.). Similarly, disambiguation may proceed through facilities other than a disambiguation facility 140 (e.g., a parent controls facility 150 or algorithm facility 144). As shown in FIG. 3, the disambiguation facility 140 may receive the query from the wireless communication facility 104 or the wireless provider 108 and link the query to information known about the user that is stored in the mobile subscriber database 112 (e.g., age, sex, past Internet usage, etc.). This additional information, coupled with the original query entry 120, may permit an unambiguous query to be processed. For example, a user may enter a query entry 120 of "Royals." This query entry 120 may be processed through the wireless communication facility 104 or a wireless provider 108 to a disambiguation facility 140 that is linked to a mobile subscriber database 112 containing, among other data, the user's residence of Kansas City, Mo. The disambiguation facility 140 may link this demographic information to the query entry 120 "Royals" and predict (i.e., disambiguate) that the user is more likely seeking information pertaining to the Kansas City Royals baseball team than information about the family of Swedish Royals. Disambiguation may include part-of-speech disambiguation, word sense disambiguation, phrase identification, named entry recognition, or full sentential parsing. Part-of-speech disambiguation refers to the process of assigning a part-of-speech tag (e.g., noun, verb, adjective) to each word in a query. By assigning the part-of-speech tag to each word, the device can draw inferences about each word by virtue of its context. For example, the word "house" may be a noun or a verb. By tagging this word with an appropriate part-of-speech tag, additional information about the user query, and its ultimate goal, may be derived. Word sense disambiguation refers to the process of sorting words that have multiple meanings. Phrase identification refers to the process of relating each word to others within a phrase to derive the context of individual words. Named entity recognition generally refers to recognition of proper nouns that refer to specific names, places, countries, etc. Full sentential parsing is the process of decomposing a sentence into smaller units and identifying the grammatical role of each and its relation to the other units. These and other techniques may be employed within the disambiguation facility 140 to infer a user's intended meaning for a search or search string.

Figure 4:
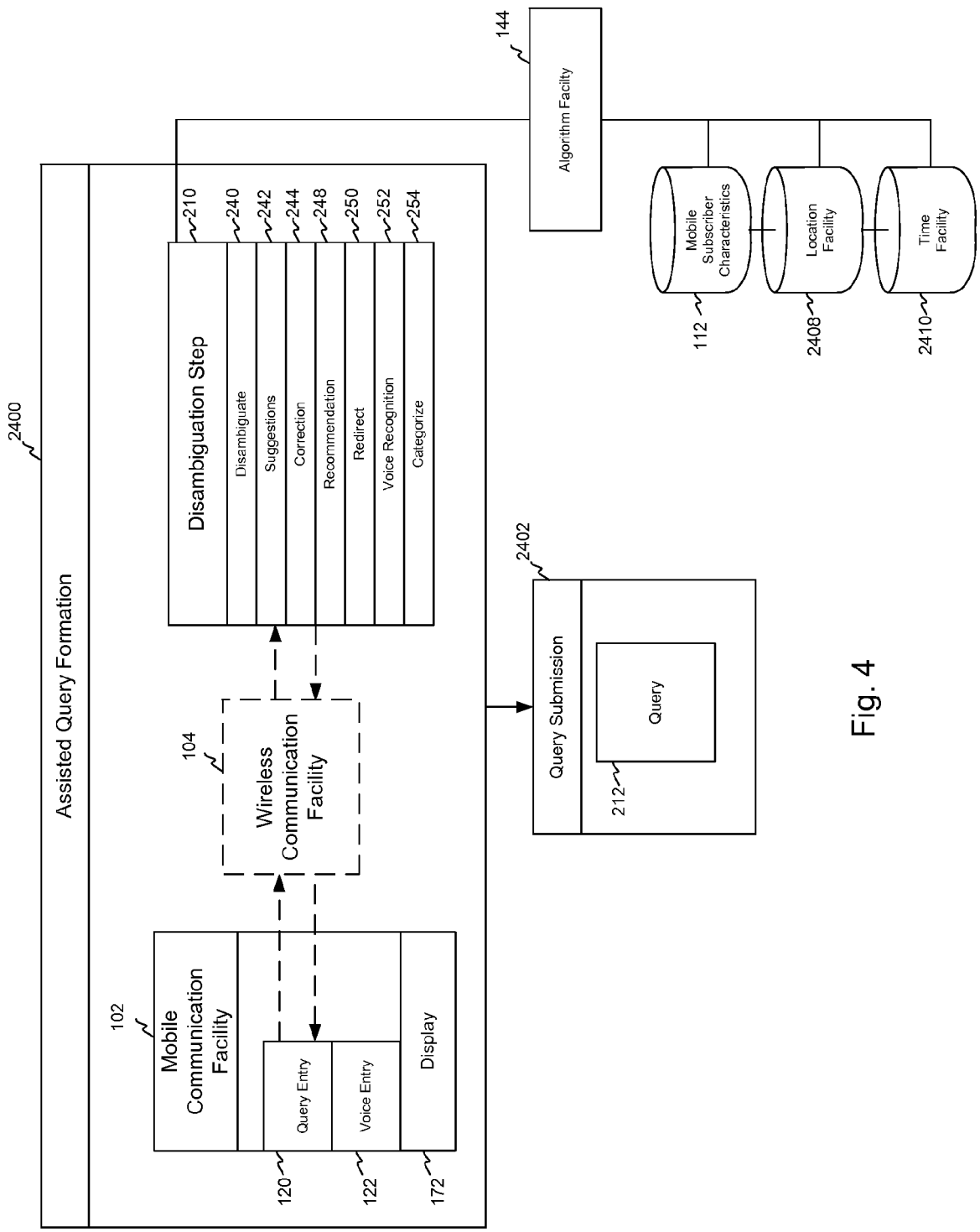
FIG. 4 illustrates a generalized method for disambiguating a search query.

FIG. 4 depicts an interactive process between the mobile communication facility 102 and the query assistance facility 210 that may be used for assisted query formation 2400. Once a user submits a query entry 120 to the mobile communication facility 102, a process of correction 244 may be necessary for assisted query formation 2400 that is sufficient to yield intelligible and useful result set(s). This process may occur on the client side 102 and/or within the mobile communication facility 104. As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112, location information 2408, or time information 2410 may also be used with the correction 244 process.

For example, a user may provide a query entry 120 "Coltrain" that is sent through a wireless communication facility 104 so that the query assistance facility 210 may begin. Because the query assistance facility 210 is linked to other data sources, as part of the correction 244 process, information from the filter algorithm facility 144 may be linked to the query entry 120 to provide more information to be used in the process of producing a more useful search query. In this example, the user's filter algorithm facility 144 may use information such as a history of online purchases, product names, numbers, purchase amounts, and purchase dates and times. Within the databases associated with the filter algorithm facility 144 there may be a history of many recent purchases of compact discs recorded by the saxophonist, John Coltrane. Because the original user query entry 120, "Coltrain" is not a known word, the query assistance facility 210 may predict a correction 244, taking into account user-specific data contained in the purchase history of the filter algorithm facility 144, such as that the user seeks information pertaining to "Coltrane," as opposed to "Coal Train" or "Soul Train," etc. In various embodiments, or particular user searches within one embodiment, the query assistance facility 210 may involve one of these additional data facilities, a plurality of the data facilities, or none of the data facilities.

It is possible that a user's query entry 120 returns a null result set or an improbable result set. In this case, the search facility, in conjunction with the mobile communication facility 102, could automatically trigger correction 244 and iteratively cycle through alternative query entries 120 until a non-null or higher probability result set is delivered.

In embodiments, additional recommendations may be made following a user's query entry based upon the information related to the mobile communication facility. For example, mobile subscriber characteristics, carrier business rules, or sponsor information, in conjunction with the query entry, may suggest relevant recommendations for the user. The recommendations may be paired with the query entry search results or presented prior to, or following, the display of the search results.

A user's prior search activities and search results may also be used to create recommendations for the user. Prior search activities may include transactions, search queries, visits to websites, and other acts initiated by the user on the mobile communication facility. The geographic location of the mobile communication facility may foster recommendations including, but not limited to, sponsor information (e.g. products and services) in the user's current geographic vicinity. The current time may be used independently or in conjunction with other information to create user recommendations. For example, the independent fact that it is noon, may create recommendations for restaurants serving lunch. This information may be further filtered by the location of the mobile communication facility to recommend only those restaurants that are in the user's immediate vicinity and further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation, food, theater, sports, entertainment, movies, corporations, work, banks, post offices, mail facilities; location of and directions to gas stations, taxis, buses, trains, cars, airports, baby sitters, and other service and goods providers such as drug stores, drive through restaurants, bars, clubs; times of movies and entertainment; news; and local information.

Various aspects of the assisted query formulation 2400 may be activated or de-activated under user or provider control. For example, a user with a particular search, such as a phone number for a particular individual, may wish to suppress corrections or suggestions that might be generated with assisted query formulation 2400, which might otherwise try to replace a correct, but unusual, name spelling with more conventional or popular subject matter. Thus in one aspect, a user interface for an assisted query formation system may include controls for selectively activating various ones of the tools available to the system. The tools may include, for example, the recommendations, predictions, disambiguations, categorizations, and the like discussed above. In another aspect, a service provider such as the wireless provider 108 or mobile communication facility 102 described above may offer selected ones of the tools as value-added services that may be provided to select customers, such as full-service or premium customers, or offered on an a la carte basis individually or in packages. In such embodiments, query assistance may be requested by a customer using, e.g., a web site, cellular phone data access, or telephone voice access, and may be requested on a subscription basis, such as recurring monthly, or on a daily or per search basis.

Figure 5:
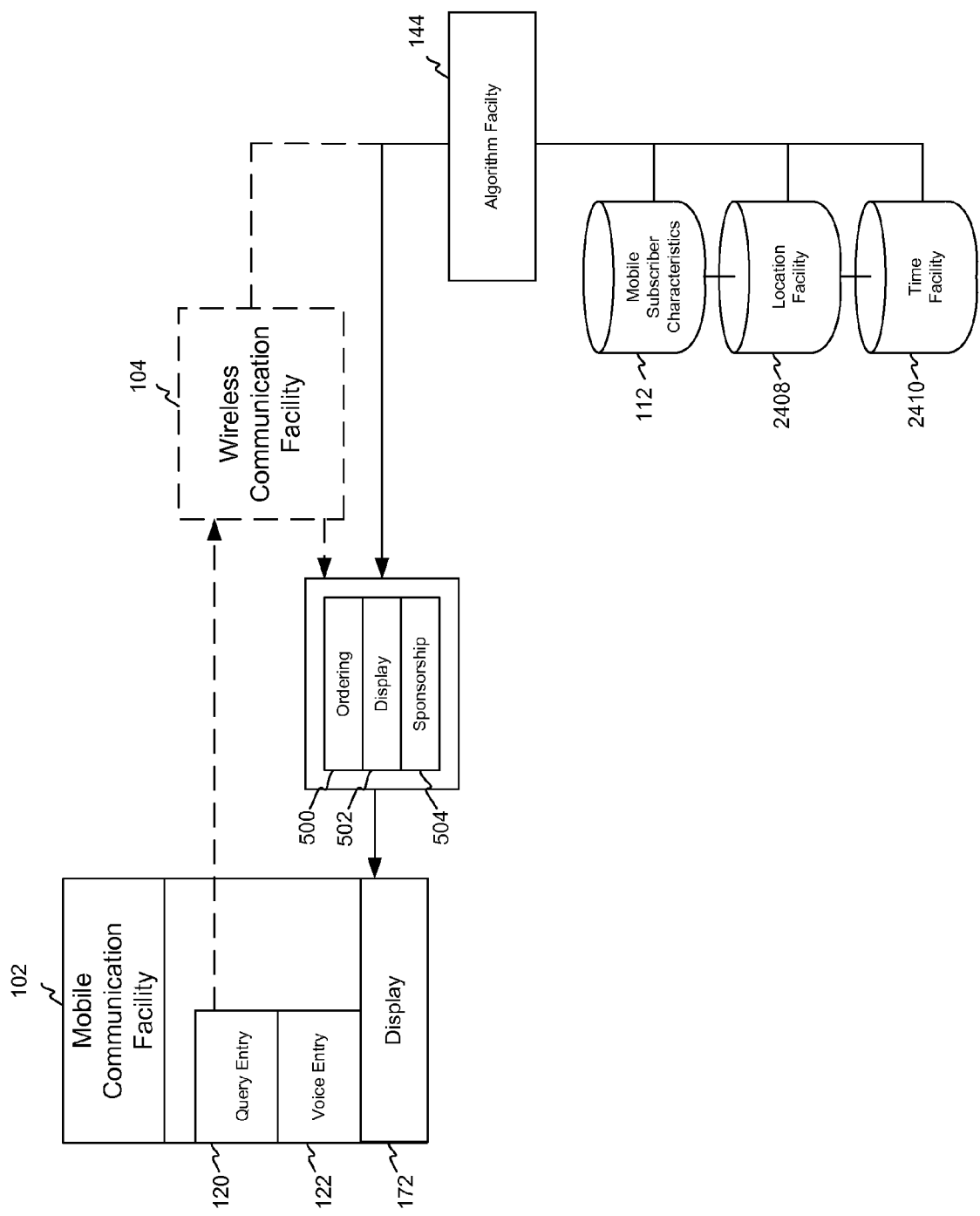
FIG. 5 illustrates a generalized method for ordering, displaying, and adding sponsorship information to search results.

FIG. 5 shows a generalized process for the ordering 500, displaying 502, and sponsorship 504 prioritization of query results based upon the association of a query entry 120 with additional data sources, such as a mobile subscriber characteristics database 112, a filter algorithm facility 144, a location database 2408, and/or a time data 2410. The ordering 500, display 502, and sponsorship 504 prioritization may involve one of these additional data facilities, a plurality of the data facilities, or none of the data facilities as appropriate.

In embodiments, the methods and systems disclosed herein can be adapted to provide an optimized search based on mobile subscriber characteristics 112, including any of the characteristics 112 described herein and in the documents incorporated by reference herein. Thus, these methods and systems may include providing a search function adapted for a mobile device and adapting the search function based on characteristics of the subscriber of the mobile device, wherein the subscriber characteristics are derived at least in part from a mobile subscriber data facility that is maintained by a carrier of mobile device services.

In embodiments the adapted search function may be an implicit query, an active query, a disambiguation action, a retrieval function, a filtering function, a presentation function, a routing function, or another function or action related to initiation, processing, or completion of a search or presentation of search results.

In one embodiment the search function is adapted based on age. The age-adapted search function may be an implicit query, an active query, a disambiguation action, a retrieval function, a filtering function, a presentation function, a routing function, or another function or action relating to the initiation, processing, or completion of a search. For example, a mobile communication facility 102 may have an implicit query 204 running, so that upon viewing a user interface of the mobile communication facility 102, the user sees results of a query that is automatically pre-formulated for the user. The implicit query 204 may be based on the age of the user, such as running the query most frequently run by persons of similar age on the same day. For example, a teenager might have an implicit query 204 that relates to a music group or movie, an adult might have an implicit query that relates to major new headlines, and a retired person might have an implicit query that relates to information relevant to financial markets. An age-adapted search function may also operate in connection with an active query; for example, a given query may return results that are age-appropriate, age-filtered, age-ranked, or age-disambiguated. For example, entering "Pink" might return results for Pink Floyd if the user is over age 30, while it might return results for the female artist Pink if the user is under 30. A user might be prompted to resolve such an ambiguity, or the ambiguity might be automatically resolved for the user. Thus, an age-adapted search function may be provided for a mobile communication facility. In embodiments, the age of the user may be obtained from a mobile subscriber data facility that stores mobile subscriber characteristics 112.

In one embodiment the search function is adapted based on gender. The gender-adapted search function may be an implicit query, an active query, a disambiguation action, a retrieval function, a filtering function, a presentation function, a routing function, or another function or action relating to the initiation, processing, or completion of a search. Gender may be determined by reference to a database that stores mobile subscriber characteristics 112, such as a database of a carrier of wireless services. A gender-adapted search function may, for example, inform an implicit query 204, such as presenting results of the searches that are most popular for that gender for that day. Similarly, results may be disambiguated by a disambiguation process 210 that is informed by gender. For example, the search process might run a query on a database of female-oriented sites if the user is female while running a query on male-oriented sites if the user is male. Similarly, a disambiguation process 210 may filter results based on gender. For example, a query such as "uprights" might return results for vacuum cleaners for a female user while returning results for football kickers for a male user.

In one embodiment the search function is adapted based on ethnicity. The ethnicity-adapted search function may be an implicit query, an active query, a disambiguation action, a retrieval function, a filtering function, a presentation function, a routing function, or another function or action relating to the initiation, processing, or completion of a search. For example, an implicit query 204 may generate results that are most popular among members of an ethnic group. A search or query formation process may search for results that relate to a targeted ethnic group. A disambiguation process 210 (either upon query formation or upon result retrieval or presentation) may disambiguate based on ethnicity. For example, a query related to "paris" might return results for Paris, France, for a French person, while returning results for Paris Hilton for an American. Ethnicity information may be obtained from a database of mobile subscriber characteristics 112, or it might be entered by the user in the user interface.

In one embodiment the search function is adapted based on religion or cultural affinity. The religion-adapted search function may be an implicit query, an active query, a disambiguation action, a retrieval function, a filtering function, a presentation function, a routing function, or another function or action relating to the initiation, processing, or completion of a search. The information may be obtained from a mobile subscriber characteristics 112 database, either obtained by a carrier based on application or transactions, or inferred based on past behavior or searches of the user. The religion-adapted search function may, for example, run implicit queries that are most popular among members of the same religious affiliation. A religion-adapted disambiguation facility may disambiguate queries based on religious affiliation. For example, a query for "Muhammed" might return information about the prophet for members of Islamic religions, while it might return information about the boxer for those who don't have religious affiliations.

In one embodiment the search function is adapted based on area code. The area code-adapted search function may be an implicit query, an active query, a disambiguation action, a retrieval function, a filtering function, a presentation function, a routing function, or another function or action relating to the initiation, processing, or completion of a search. For example, a user with a given area code could receive implicit query results based on other searches by members of the same area code. Also, queries may be disambiguated or results filtered, sorted, or presented based on area code (or other location information). For example, a user entering "Paris" in the 270 area code might receive results for Paris, Tenn.; a user entering "Paris" in the 310 area code might receive results for Paris, Hilton; and a user entering the same word in the 617 area code might receive results for Paris, France.

In one embodiment the search function is adapted based on home address. The address-adapted search function may be an implicit query, an active query, a disambiguation action, a retrieval function, a filtering function, a presentation function, a routing function, or another function or action relating to the initiation, processing, or completion of a search. As with the area code-adapted search function example above, the implicit query, disambiguation, or results can be varied based on the location of the user's home address (information that can be obtained from, for example, a carrier's database of mobile subscriber characteristics 112).

In one embodiment the search function is adapted based on work address. The work-address-adapted search function may be an implicit query, an active query, a disambiguation action, a retrieval function, a filtering function, a presentation function, a routing function, or another function or action relating to the initiation, processing, or completion of a search. For example, a user may see results of an implicit query 204 that is the same as other queries from the user's employer, such as press releases that mention the employer. A disambiguation facility 210 may resolve ambiguity (including with help of the user) based on work address. For example, a user with a work address at a location of General Electric might receive search results on that company when entering the term "light" in a search engine, while a user with a different work address might receive results relating to lighting products. Again, the work address information may be obtained from a database of mobile subscriber characteristics 112, such as maintained by a carrier of wireless services.

In one embodiment the search function is adapted based on billing address. The billing-address-adapted search function may be an implicit query, an active query, a disambiguation action, a retrieval function, a filtering function, a presentation function, a routing function, or another function or action relating to the initiation, processing, or completion of a search. The billing address information may be obtained from a database of mobile subscriber characteristics 112, such as may be maintained by a carrier of wireless services. The billing-address-adapted search function may, for example, present implicit query results similar to those of other users with the same billing address (such as queries relevant to the business enterprise that exists at that billing address). Similarly, queries may be disambiguated or results filtered, sorted, presented, or routed based on billing address. For example, a user with a billing address at a location of a large company may be presented with results that relate to that company, while a user with a residential address as the billing address may receive results that are tailored to users in the general area of that location.

In embodiments, information about the user's home address, area code, billing address, or other location information may be combined with information about a user's current location as determined by a location facility 110, such as to determine whether a user is in proximity to the user's home or workplace. If so, a user may receive query results suitable for one of those environments (such as receiving work-related information while at work and consumer information while at home). If the user is far from home and work, then the user may receive (by implicit query, or as a result of a search) results that are pertinent to travel in the location where the user is located, such as hotel, car rental, and restaurant information. Similarly, an away-from-home user may have an implicit query formed, or a partial query disambiguated, based on the user's status as a traveler. For example, a partial entry for "hot" might return shopping bargains for a user close to home, while it might return hotels for a user who is traveling.

In one embodiment the search function is adapted based on credit card information. The credit card information-adapted search function may be an implicit query, an active query, a disambiguation action, a retrieval function, a filtering function, a presentation function, a routing function, or another function or action relating to the initiation, processing, or completion of a search. The credit card information may be obtained from a database of mobile subscriber characteristics 112 or from a credit card provider. The information may include information relating to current balances, credit limits, or the like. For example, an implicit query may present results based on the available credit balance for a user, such as presenting searches or results for expensive goods for a user who has a low balance and high credit limit, while presenting searches or results for financial counselors for users who have high balances and low credit limits.

In one embodiment the search function is adapted based on passwords. The password-adapted search function may be an implicit query, an active query, a disambiguation action, a retrieval function, a filtering function, a presentation function, a routing function, or another function or action relating to the initiation, processing, or completion of a search. Thus, a mobile search facility may include a password-protected search capability, such as allowing searches for certain types of content only if the user enters the correct password. For example, walled garden content like ringtones or video clips might be available only if the user enters a password that is stored in the database of mobile subscriber characteristics 112.

In one embodiment the search function is adapted based on family information (e.g., mother's maiden name, number of siblings, marital status, or the like). The family information-adapted search function may be an implicit query, an active query, a disambiguation action, a retrieval function, a filtering function, a presentation function, a routing function, or another function or action relating to the initiation, processing, or completion of a search. For example, an implicit search may be running that presents searches or results that are similar to those recently run by family members or friends of the user. A disambiguation process 210 may operate based on family information, such as resolving ambiguity in queries based on searches conducted by family members, or based on the status of the family. Similarly, results may be filtered, sorted, presented, or routed based on family information. For example, a search for the term custody might lead to results on child custody for a divorced user, while it might reveal information on trust and custody accounts for a married user.

In one embodiment the search function is adapted based on birthplace. The birthplace adapted search function may be an implicit query, an active query, a disambiguation action, a retrieval function, a filtering function, a presentation function, a routing function, or another function or action relating to the initiation, processing, or completion of a search. Thus, an implicit search based on birthplace may include searches or results that are similar to those of other users with the same birthplace or users currently located in proximity to the birthplace. Similarly, results may be filtered or queries disambiguated based on birthplace. For example, entering "derby" may retrieve results relating to horse racing for users born in Kentucky, while it may retrieve results relating to hats for users born elsewhere.

In one embodiment the search function is adapted based on driver's license information. The license-information-adapted search function may be an implicit query, an active query, a disambiguation action, a retrieval function, a filtering function, a presentation function, a routing function, or another function or action relating to the initiation, processing, or completion of a search. License information may include age and address information, which may be used as contemplated by the various age- and location-based search function examples provided herein. License information may also include height, weight, hair color, eye color, vision status, and the like. For example, a user may be presented results that are similar to those of persons of similar appearance.

In one embodiment the search function is adapted based on employment data. The position-adapted search function may be an implicit query, an active query, a disambiguation action, a retrieval function, a filtering function, a presentation function, a routing function, or another function or action relating to the initiation, processing, or completion of a search. The employment data may be obtained from a database of mobile subscriber characteristics 112, such as that maintained by a carrier of wireless services. The employment data may, for example, indicate a user's status as an officer of a company, as an employee of a certain type (e.g., sales and marketing, supply chain management, finance, human resources, or the like) or level (e.g., associate, manager, vice-president, etc.), length of employment, or other status. For example, an implicit query 204 may present results similar to those for searches run by users holding similar positions in other companies. Similarly, a query may be disambiguated, or a result retrieved, sorted, filtered, presented, or routed, based on the user's position. For example, a sales manager entering "incentive" might receive information on promotions related to his employer's products, while a human resources manager might receive information relating to employee incentive stock options.

In one embodiment the search function is adapted based on employer. The employer-adapted search function may be an implicit query, an active query, a disambiguation action, a retrieval function, a filtering function, a presentation function, a routing function, or another function or action relating to the initiation, processing, or completion of a search. An employer-adapted implicit query may show results similar to those for other searches run by employees of the same employer on the same day or in recent days. An employer-adapted disambiguation facility 204 may resolve ambiguities as to the query or results based on the status of the employer, and an employer-adapted search function may retrieve, sort, present, or route results based on employer characteristics, such as obtained from a database of mobile subscriber characteristics 112. For example, a user whose employer is the United States Patent Office might receive information on processing patents in response to a query on "application", while a Microsoft employee might receive information on software applications in response to the same query.

In one embodiment the search function is adapted based on annual income. The annual income adapted search function may be an implicit query, an active query, a disambiguation action, a retrieval function, a filtering function, a presentation function, a routing function, or another function or action relating to the initiation, processing, or completion of a search. Annual income may be obtained from a database of mobile subscriber characteristics 112, such as that maintained by a carrier of wireless services. An implicit query 204 may thus present results that are for searches by incomes of similar annual income, or searches that are designed to fit the demographic characteristics for that annual income. For example, middle-income individuals may be presented results for mid-sized, value-based cars, while high-income individuals may be presented results for luxury items, vacations, or the like. A disambiguation facility 204 may resolve ambiguities about queries, and a search function may retrieve, sort, present, or route results based on annual income. For example, a query for "boat" might run a query or reveal results for commuter boat schedules for individuals of middle income but might run a query or reveal results for yachts for high-income individuals.

As with annual income-adapted searches, in one embodiment the search function is adapted based on income bracket. The income-bracket adapted search function may be an implicit query, an active query, a disambiguation action, a retrieval function, a filtering function, a presentation function, a routing function, or another function or action relating to the initiation, processing, or completion of a search.

In one embodiment the search function is adapted based on items purchased. The items-purchased-adapted search function may be an implicit query, an active query, a disambiguation action, a retrieval function, a filtering function, a presentation function, a routing function, or another function or action relating to the initiation, processing, or completion of a search. Items purchased may be obtained from a database maintained by a carrier, such as showing transactions made using a mobile communication facility 102. For example, implicit queries may be run and results presented based on transaction history, such as presenting results for peripherals and software applications for individuals who have recently purchased a computer, or the like. Similarly, queries may be disambiguated, or search results retrieved, sorted, presented, or routed based on items purchased by a user. For example, a user who has recently purchased a car and who enters "car" in a user interface may receive information about registering the car, obtaining insurance, or the like, while a user who has recently shopped for, but not purchased, a car may receive results showing ratings of cars.

In one embodiment the search function 142 is adapted based on friends and family information (including any of the foregoing types of information as stored in a database of mobile subscriber characteristics 112). The friend-and-family information-adapted search function 142 may be an implicit query 164, an active query, a disambiguation action, a retrieval function, a filtering function, a presentation function, a routing function, or another function or action relating to the initiation, processing, or completion of a search. For example, a user may be presented implicit query 164 results similar to those of family members or friends. A user query may be disambiguated, or search results retrieved, sorted, presented, or routed based on friends and family information.

For example, a user entering "sister" in a user interface may receive results obtained by a sister's most recent searches, while a user who does not have friends and family might receive results relating to nuns.

In one embodiment the search function 142 is adapted based on bill amount(s). The bill-amount-adapted search function 142 may be an implicit query 164, an active query, a disambiguation action, a retrieval function, a filtering function, a presentation function, a routing function, or another function or action relating to the initiation, processing, or completion of a search. For example, a user whose bill is declining may be presented with offers to obtain more mobile services, while a user whose bill is very high might receive information about making choices that will reduce the cost of wireless services.

In one embodiment the search function 142 is adapted based on average bill total. The average bill-adapted search function 142 may be an implicit query 164, an active query, a disambiguation action, a retrieval function, a filtering function, a presentation function, a routing function, or another function or action relating to the initiation, processing, or completion of a search. For example, a user whose current bill exceeds the average may be presented with results relating to saving money, while a user whose current bill is less than the average may be presented with opportunities to purchase other services or content, such as walled garden content 132.

In one embodiment the search function 142 is adapted based on payment history. The payment-history-adapted search function 142 may be an implicit query 164, an active query, a disambiguation action, a retrieval function, a filtering function, a presentation function, a routing function, or another function or action relating to the initiation, processing, or completion of a search. For example, a user who is up-to-date on payments may receive offers for additional services, while a user who is delayed may receive reminders or may receive results that relate to managing debt. Similarly, users whose payment histories are favorable may be presented with results that relate to more expensive goods and services.

In one embodiment the search function 142 is adapted based on on-time payment history. The on-time payment-history adapted search function 142 may be an implicit query 164, an active query, a disambiguation action, a retrieval function, a filtering function, a presentation function, a routing function, or another function or action relating to the initiation, processing, or completion of a search. For example, users with very good records of making payments on time may be presented with more favorable offers, such as incentives or promotions, based on the prediction that their payment histories will continue to be favorable.

In one embodiment the search function 142 is adapted based on on-line usage amount. The on-line usage amount-adapted search function 142 may be an implicit query 164, an active query, a disambiguation action, a retrieval function, a filtering function, a presentation function, a routing function, or another function or action relating to the initiation, processing, or completion of a search. The usage amount may be obtained from a database maintained by a wireless service provider. On-line usage amount may be used to generate implicit query 164 results. For example, heavy users may be presented with results similar to other heavy users (such as more specialized types of results), while less heavy users may be presented with more general results, such as news headlines. Queries may be disambiguated, or results retrieved, sorted, presented or routed, based on on-line usage amount. For example, a heavy on-line user entering "blog" may be sent to the day's most popular blogs, while a light user might be presented with more general results describing the blogging phenomenon.

In one embodiment the search function 142 is adapted based on duration of on-line interactions. The duration-adapted search function 142 may be an implicit query 164, an active query, a disambiguation action, a retrieval function, a filtering function, a presentation function, a routing function, or another function or action relating to the initiation, processing, or completion of a search. For example, in an implicit query 164 204, a user with a history of long interactions may be presented with a more complex or extensive result set, while a user with a history of short interactions may be presented only with basic information. Similarly, a disambiguation facility 204 or a search function 142 that retrieves, sorts, presents, or routes results may do so based on duration of on-line interactions. For example, a user whose interactions are long may be presented with long articles, scientific research, or the like, while a user with shorter duration interactions may be presented only with news headlines or the like. Similarly, for example, a short-duration user entering "football" may receive a list of the day's scores, while a long-duration user may receive articles on football.

In one embodiment the search function 142 is adapted based on number of on-line interactions. The interaction-adapted search function 142 may be an implicit query 164, an active query, a disambiguation action, a retrieval function, a filtering function, a presentation function, a routing function, or another function or action relating to the initiation, processing, or completion of a search. For example, in an implicit query 204, a user with a history of many interactions may be presented with more results, while a user with few interactions may be presented only with the most pertinent results. Similarly, a disambiguation facility 204 or a search function 142 that retrieves, sorts, presents, or routes results may do so based on number or frequency of on-line interactions, such as indicated by a database of a wireless provider 108. For example, a user whose interactions are many may be presented with long result sets, while a user with fewer interactions may be presented only with the most relevant results. Similarly, for example, a frequent user entering "Peter" may receive only information relating to uses of that name in the day's news, while a less frequent visitor might receive more general results, ranging from Peter the Great to Pete Townsend to Peter Rabbit.

In one embodiment the search function 142 is adapted based on family status and family information. The family-information adapted search function 142 may be an implicit query 164, an active query, a disambiguation action, a retrieval function, a filtering function, a presentation function, a routing function, or another function or action relating to the initiation, processing, or completion of a search. For example, an implicit search may present results about dating or relationships to a single user, while a married user may receive results relating to child rearing. Similarly, a disambiguation process 210 or a search function 142 that retrieves, sorts, presents, or routes results may use family status and family information. For example, a single user entering "love" may receive results relating to dating and relationships, while a married user might receive information relating to anniversaries.

In one embodiment the search function 142 is adapted based on number of children. The number-of-children-adapted search function 142 may be an implicit query 164, an active query, a disambiguation action, a retrieval function, a filtering function, a presentation function, a routing function, or another function or action relating to the initiation, processing, or completion of a search. The number of children may be obtained from a database of mobile subscriber characteristics 112, such as that maintained by a wireless provider 108. An implicit query 204 may run based on number of children. For example, a childless user may receive results based on other factors, while a user with four children might receive implicit query 204 results that relate to childrearing or to educational funding products. Similarly, queries may be disambiguated, or results returned, sorted, presented, or routed based on number of children. For example, a user with children entering the term "cold" might receive health-related information relating to outbreaks of the common cold, while a user with no children might receive general weather information.

In one embodiment the search function 142 is adapted based on shopping habits (e.g., views of or purchases of goods and services made with a technology like Mobile Lime). The shopping-habit-adapted search function 142 may be an implicit query 164, an active query, a disambiguation action, a retrieval function, a filtering function, a presentation function, a routing function, or another function or action relating to the initiation, processing, or completion of a search. For example, a user who shops frequently for music may be presented with music-oriented content in an implicit search 204, while the implicit search may present different items to other users whose shopping habits are different. Similarly, queries may be disambiguated, or results returned, sorted, presented, or routed, based on shopping habits. For example, a frequent book purchaser may be presented with Stephen King books upon entering "King" in a query interface, while a frequent music purchaser may be presented with results related to Elvis Presley.

In one embodiment the search function 142 is adapted based on click stream information. The click stream-adapted search function 142 may be an implicit query 164, an active query, a disambiguation action, a retrieval function, a filtering function, a presentation function, a routing function, or another function or action relating to the initiation, processing, or completion of a search. The click stream information may be stored on the mobile communication facility 102 or in a remote location, such as a database or server maintained by a wireless provider 108 or an entity operating on behalf of a wireless provider 108. A click stream-adapted search function 142 may run implicit queries 204 based on past behavior, such as running queries for new cars if the user has recently viewed cars with the mobile communications facility 102. Similarly, queries may be disambiguated, or results returned, sorted, presented, or routed, based on click stream information. For example, a user entering a partial URL into a query facility may be directed to a recently visited web site, while another user would be directed to a process for resolving ambiguity. Click stream information may be used to infer a wide range of behaviors and characteristics. Thus, the other embodiments described herein may take place in combination with deriving one or more mobile subscriber characteristics 112 from click stream information. For example, if click stream information shows that a user has visited twenty female-oriented sites, then the information can be used to infer the gender of the user, after which various embodiments of gender-adapted search function 142s described herein are enabled.

In one embodiment the search function 142 is adapted based on device type. The device type-adapted search function 142 may be an implicit query 164, an active query, a disambiguation action, a retrieval function, a filtering function, a presentation function, a routing function, or another function or action relating to the initiation, processing, or completion of a search. For example, implicit queries may be run to retrieve results that are suitable for the type of device and filter out other results. For example, if a mobile communications facility 102 does not have a video rendering capability, then video-related results can be filtered out of the process. Similarly, queries may be disambiguated, or results retrieved, sorted, presented, or routed based on device type. For example, a user may be presented with results of walled garden content 132 that is consistent with a device. Upon entering a query, a user may receive results that are filtered to include content items that are viewable/downloadable for the device and to exclude other content. Device type, which may be obtained from the database of mobile subscriber characteristics 112, may also be used to infer other items. For example, a particular device may be most popular with a particular age or gender of users, in which case the results can be adapted in a manner similar to that described in connection with the age-adapted search function 142 described herein.

In one embodiment the search function 142 is adapted based on device version. The device version-adapted search function 142 may be an implicit query 164, an active query, a disambiguation action, a retrieval function, a filtering function, a presentation function, a routing function, or another function or action relating to the initiation, processing, or completion of a search. The device version may be retrieved from a database of mobile subscriber characteristics 112, such as that maintained by a wireless provider 108. For example, implicit queries may be run to retrieve results that are suitable for the particular version of a device and filter out other results. For example, if a mobile communication facility 102 does not have a video rendering capability, then video-related results can be filtered out of the process. Similarly, queries may be disambiguated, or results retrieved, sorted, presented, or routed based on device version. For example, a user may be presented with results of walled garden content 132 that is consistent with the correct version of a device. Upon entering a query, a user may receive results that are filtered to include content items that are viewable/downloadable for the version of the device and to exclude other content. Device version, which may be obtained from the database of mobile subscriber characteristics 112, may also be used to infer other items. For example, a particular device version may be most popular with a particular age or gender of users, in which case the results can be adapted in a manner similar to that described in connection with the age-adapted search function 142 described herein.

In one embodiment the search function 142 is adapted based on device characteristics. The device characteristics-adapted search function 142 may be an implicit query 164, an active query, a disambiguation action, a retrieval function, a filtering function, a presentation function, a routing function, or another function or action relating to the initiation, processing, or completion of a search. The device characteristics may be retrieved from a database of mobile subscriber characteristics 112, such as that maintained by a wireless provider 108. Characteristics may include the type of device, applications running on the device (e.g., capability to show photos, render video, play music, or the like). For example, implicit queries may be run to retrieve results that are suitable for the particular characteristics of a version of a device and filter out other results. For example, if a mobile communications facility 102 does not have a photo imaging capability, then photo-related results can be filtered out of the process. Similarly, queries may be disambiguated, or results retrieved, sorted, presented, or routed based on device characteristics. For example, a user may be presented with results of walled garden content 132 that is consistent with the correct characteristics of a device. Upon entering a query, a user may receive results that are filtered to include content items that are viewable and/or downloadable for the characteristics of the device and to exclude other content. For example, a user with a device that plays .mp3 files may receive music files upon entering a query for "bruce", while a user without music capabilities may receive web search results related to Bruce Springsteen. Device characteristics, which may be obtained from the database of mobile subscriber characteristics 112, may also be used to infer other items. For example, particular device characteristics may be most popular with a particular age of user or gender, in which case the results can be adapted in a manner similar to that described in connection with the age-adapted search function 142 described herein.

In one embodiment the search function 142 is adapted based on usage patterns (including those based on location, time of day, or other variables). The usage-pattern-adapted search function 142 may be an implicit query 164, an active query, a disambiguation action, a retrieval function, a filtering function, a presentation function, a routing function, or another function or action relating to the initiation, processing, or completion of a search. For example, if a user frequently searches for restaurants on weekends, then an implicit query 204 may run restaurant searches on weekends. Similarly, the same query (e.g., "rest" may return restaurant-related results on weekends, while revealing results related to restructured text during work hours (particularly if the usage pattern indicates that the user is a software engineer). Thus, a disambiguation process 210 or a search function 142 to retrieve, sort, present, or route results may use usage patterns to accomplish those functions. Usage patterns may be obtained from a database of mobile subscriber characteristics 112, such as that maintained by a wireless provider 108. A wide range of usage patterns may be used to assist with formation of queries (implicit and explicit) and with retrieval and organization of results. The algorithm facility 144 may include one or more modules or engines suitable for analyzing usage patterns to assist with such functions. For example, an algorithm facility 144 may analyze usage patterns based on time of day, day of week, day of month, day of year, work day patterns, holiday patterns, time of hour, patterns surrounding transactions, patterns surrounding incoming and outgoing phone calls, patterns of clicks and clickthroughs, patterns of communications (e.g., Internet, email and chat), and any other patterns that can be discerned from data that is collected by a wireless provider 108 or Internet service provider. Usage patterns may be analyzed using various predictive algorithms, such as regression techniques (least squares and the like), neural net algorithms, learning engines, random walks, Monte Carlo simulations, and others. For example, a usage pattern may indicate that a user has made many work-related phone calls during a holiday (such as by determining that the user was located at work and making calls all day). Such a user may be presented preferably with content that is related to a vacation, such as showing hotels, rental cars, or flight promotions in an implicit query 164, or preferentially presenting such items in response to explicit queries (including disambiguating partial queries or ambiguous queries). For example, such a user might receive hotel information in response to entering the partial query "hot," while another user receives weather information. In one such embodiment the search function 142 is adapted based on phone usage. The phone usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on device and/or subscriber unique identifiers. The identifier-adapted search function 142 may be an implicit query 164, an active query, a disambiguation action, a retrieval function, a filtering function, a presentation function, a routing function, or another function or action relating to the initiation, processing, or completion of a search. Here, as with usage-pattern-adapted search functions 142, the identifier may be used to identify the user in the search facility 142, allowing targeted queries, disambiguation, and results.

In one embodiment the search function 142 is adapted based on content viewing history. The viewing-history-adapted search function 142 may be an implicit query 164, an active query, a disambiguation action, a retrieval function, a filtering function, a presentation function, a routing function, or another function or action relating to the initiation, processing, or completion of a search. Viewing history may be obtained by a local facility on the mobile communication facility 102, such as a database or cache on a cellular phone, or it may be obtained at a central facility, such as an Internet server, or a central office for phone services. Such data may be retrieved, for example, from a database of mobile subscriber characteristics 112. Viewing history may be analyzed, in embodiments, by an algorithm facility 144, such as to infer behavior based on content viewing patterns. In embodiments viewing history may include content viewed using a mobile communication facility 102. In other embodiments viewing history may include history with respect to other content provided by the same entity that is the wireless provider 108. For example, such a provider may provide television content via DSL or cable, Internet content to a home, or other content. Viewing histories for all such content may be analyzed to assist with improving search function 142s, including assisting with development of implicit queries, resolving ambiguities with explicit queries, and retrieving, sorting, filtering, presenting, and routing search results. For example, if a database of mobile subscriber characteristics 112 shows that a particular viewer watched the first six episodes of "24" but missed the seventh episode, then a search for the element "24" may retrieve online sources for the seventh episode, while another user entering a similar query might receive general information about the show or information about 24-hour fitness centers. Viewing history should be understood to encompass all types of interactions with content, such as downloading, listening, clicking through, sampling or the like, including all types of content, such as text, data, music, audio, sound files, video, broadcast content, and the like.

In one embodiment the search function 142 is adapted based on content presented for viewed by/not viewed by user. The declined-content-adapted search function 142 may be an implicit query 164, an active query, a disambiguation action, a retrieval function, a filtering function, a presentation function, a routing function, or another function or action relating to the initiation, processing, or completion of a search. Information about declined content may be obtained from a database of mobile subscriber characteristics 112, such as that maintained by a wireless provider 108, which may also be a provider of various other content sources that have been presented and declined (such as by explicitly declining an option to view content or by implicitly declining—ignoring—the content, such as upon repeated opportunities to view it). Wireless providers 108 frequently have access to such viewing histories, because the same carriers also provide television, Internet, and other content sources. Declined content can be analyzed, with an algorithm facility 144, to assist with forming implicit queries, resolving explicit queries, and with retrieving, sorting, filtering, presenting, and routing results.

For example, if a user has consistently declined, or failed to view, music-oriented programming content (whether on a cellular phone, TV, or Internet), then a query for the term "U2" might return information on Soviet-era spy planes, notwithstanding that for other users such a query would return content related to the rock group U2. As in analysis of usage patterns, a wide range of algorithms, including learning algorithms, regression analyses, neural nets, and the like may be used to understand patterns in declined content that assist with handling queries and results.

In one embodiment the search function 142 is adapted based on content and programs downloaded. The download-history-adapted search function 142 may be an implicit query 164, an active query, a disambiguation action, a retrieval function, a filtering function, a presentation function, a routing function, or another function or action relating to the initiation, processing, or completion of a search. Downloaded content and programs may be determined from a database of mobile subscriber characteristics 112, such as based on cellular phone usage, television viewing, Internet usage, email usage or the like. Such content and programs may be analyzed and used in the manner described above for usage pattern-adapted search functions 142. In one such embodiment the search function 142 is adapted based on videos, music, and audio listened to and/or downloaded. Again, the content-action-adapted search function 142 may be an implicit query 164, an active query, a disambiguation action, a retrieval function, a filtering function, a presentation function, a routing function, or another function or action relating to the initiation, processing, or completion of a search. In another such embodiment the search function 142 is adapted based on television watched. The television viewing-adapted search function 142 may be an implicit query 164, an active query, a disambiguation action, a retrieval function, a filtering function, a presentation function, a routing function, or another function or action relating to the initiation, processing, or completion of a search. In another such embodiment the search function 142 is adapted based on television subscriptions. The subscription-adapted search function 142 may be an implicit query 164, an active query, a disambiguation action, a retrieval function, a filtering function, a presentation function, a routing function, or another function or action relating to the initiation, processing, or completion of a search. In one such embodiment the search function 142 is adapted based on timing and duration of viewing/downloading. The view/download timing- and duration-adapted search function 142 may be an implicit query 164, an active query, a disambiguation action, a retrieval function, a filtering function, a presentation function, a routing function, or another function or action relating to the initiation, processing, or completion of a search.

In embodiments, the search facility 142 may be a high-volume, scalable, redundant search engine specifically tuned for mobile content. The engine may be implemented in Java and deployed in a two-tier architecture in which the presentation logic runs on web servers which format the results returned by passing the actual search requests off to search servers. Search servers may use proprietary algorithms that blend results from full-text metadata indices with results from 3rd-party (partner) APIs. The search engine may be accessed via a query API. A query is a set of words, possibly restricted to specific fields, coupled with restrictions on content type, category, and format.

In embodiments, the search facility 142 may use a ranking algorithm which incorporates a number of features, including one or more of full-text relevance (using, e.g., term frequency/inverse document frequency or "TFIDF", or variants and enhancements thereto), word order and proximity scores, number of words matching scores (with thresholds), popularity (overall and within-demographic), editorial boosts, and field-by-field boosts. The wireless provider 108 may control the editorial boosts.

In an aspect of the invention, mobile content may be reviewed to generate a relevance that can be used to determine if the content should be presented to a mobile communication facility 102. The relevance may alternatively be used to determine if at least some portion of content presented to the mobile communication facility 102 should be presented to the user of a mobile communication facility 102. Mobile content may relate to one or more of blogs, sports, gambling, social networking, travel, news, community, education, product, service, government, and the like. In an example, mobile content that relates to gambling may be prevented from being presented to a mobile communication facility 102 that is being used by a government employee.

The review of mobile content may be an algorithmic review. The algorithmic review may include a review of inbound links to the mobile content, outbound links from the mobile content, text of the mobile content, keywords of the mobile content, a link structure of the mobile content, metadata associated with the mobile content, and other aspects of mobile content that may be herein described.

Outbound links in the mobile content may be reviewed to determine a relevance as part of an algorithmic review. Outbound links may link to mobile content that has been blacklisted, whitelisted, or not yet reviewed. An outbound link to blacklisted content may be edited such that the link presented to the mobile communication facility 102 is disabled. Alternatively the link may not be presented to the mobile communication facility 102. If an outbound link is to whitelisted mobile content, it may be included in content presented to the mobile communication facility 102. A review of mobile content with outbound links to blacklisted content may result in the reviewed mobile content to be blacklisted.

If an outbound link of reviewed mobile content points to mobile content that has not yet been reviewed, the outbound link may be followed such that the linked content may be reviewed. If the linked content is determined to be inappropriate or blacklisted, then the mobile content containing the outbound link may be blacklisted.

Text in the mobile content may be reviewed to determine relevance as part of an algorithmic review. Text may be parsed and compared to a list of words and phrases to determine relevance. Text may also be processed using language processing techniques such as those employed by Microsoft Natural Language Processor to derive a context of the text. The derived context may be compared to known contexts to determine relevance. A variety of known search algorithms may be applied in an algorithmic review of mobile content text to determine relevance of the text. Techniques such as word stubbing, word aliasing, misspelling variants, and the like may also be applied to an algorithmic review of mobile content text.

Mobile content keywords or metadata may be reviewed to determine relevance as part of an algorithmic review. Keywords and/or metadata may represent critical aspects of the content because they may be visible to search engines and web crawlers. As an example, a website that contains one or more keywords associated with radical political activism may be detected by an algorithmic review seeking these keywords. The website may be blacklisted, whitelisted, or assigned a relevance score based on these keyword matches.

A relevance as generated from a review of mobile content may be represented by a score such as a number within a range. The range of relevance scores may extend from whitelisted content to blacklisted content with the relevance score indicating the degree to which the mobile content contains aspects that prevent it from being whitelisted. Blacklisted mobile content may be prevented from being presented to the mobile communication facility 102. Whitelisted mobile content may be allowed to be fully presented to the mobile communication facility 102.

A relevance score may be a composite of a review of one or more aspects of the mobile content. For example, each aspect may be reviewed and assigned a value such as 0 for a whitelisted aspect and 1 for a blacklisted aspect. In an example with 10 aspects of a website reviewed, a first mobile content with a relevance score of 2 may indicate mobile content with few aspects that may not be whitelisted while a second mobile content with a relevance score of 8 may indicate mobile content that has a high percentage of blacklisted aspects. A user may identify a maximum relevance score associated with mobile content to be presented to the mobile communication facility 102. In this example, if a user set a maximum relevance score for presentation of mobile content to 4, the first mobile content would be presented while the second mobile content would not be presented. Additionally, the user may indicate a maximum relevance score associated with content to be whitelisted for presentation to the mobile communication facility 102. If the user sets a maximum relevance score for whitelisting to 2, then the first mobile content would be whitelisted. However, if the user set the maximum relevance score for whitelisting to 1, both the first and the second mobile content would not be whitelisted.

A user of a mobile communication facility 102 may identify a policy or preference associated with determining which mobile content may be presented to a mobile communication facility 102. A wireless provider 108 may apply this personal policy or preference when reviewing mobile content for presentation to the user's mobile communication facility 102. As an example, a personal policy or preference may identify foreign language mobile content to be excluded from search results to be presented to the mobile communication facility 102.

A wireless provider 108 may have a content policy that determines appropriateness for mobile content to be presented to mobile communication facilities 102. The content policy may allow a user of a mobile communication facility 102 to select one or more aspects of appropriateness to be applied to mobile content presented to the user's mobile communication facility 102. As an example, a user may select an aspect of appropriateness associated with adult matter. In the example, mobile content with adult matter would be prevented from being presented to the mobile communication facility 102. Therefore content that is determined to be inappropriate may not be presented to the mobile communication facility 102 through the wireless provider 108.

Editorial review of mobile content may be combined with algorithmic review. Editorial review may identify aspects of mobile content, such as links, images, video, audio, and other aspects. Mobile content may be presented to a mobile communication facility 102 based on a relevance that is determined by a combined algorithmic and editorial review. Editorial review of mobile content may be performed by the wireless provider 108 or some other entity. Editorial review may also include substitutions that may improve the usefulness of a mobile communication facility 102. In an example, links to websites with relevant content that is not appropriate for presentation to a particular mobile communication facility 102 due to its display characteristics may be replaced by links to websites with relevant content that are appropriate for presentation to the mobile communication facility 102.

In embodiments, the search facility 142 may be optimized for mobile input methods by using, for example, partial word matching, suggestions, and mobile communication facility 102 compatibility. Partial word matching coupled with popularity scoring may provide the best possible results for the user. Partial word matching may also work for multiple word phrases. Thus, a search for "ro st" may suggest results matching "Rolling Stones". A suggestion is a recommended search string. For example, for the query string "piz" a suggestion could be "pizza". Suggestions may permit users to enter the wanted search terms with the fewest number of characters. Suggestions may be provided by the engine and cached locally for performance enhancement.

In embodiments, the mobile communication facility 102 may customize the search engine results to the capabilities of the mobile communication facility 102. For example, the search engine may not present search results that are inappropriate for the device (e.g., a ringtone that is incompatible). When compatibility information cannot be determined, results that require particular hardware or software may receive lower rankings or scores. The recommendation engine may also, or instead, use the device type as one of the attributes when calculating recommendations.

In embodiments, content may be segregated such that the search facility 142 may take contextual queues based on where the user enters the search experience. For example, users entering search from the ringtone area may receive ringtone-restricted results. In addition, the wireless provider 108 may have multiple content partners and may wish to restrict the search to certain content partners in certain situations. For example, the wireless provider 108 may wish to provide a search box in an entertainment section which only searches content from a specific partner, where a search box in the travel section would search different content. The search facility 142 may limit results to a specific partner or set of partners.

The mobile content may, from the perspective of the wireless search platform 100, originate from a webpage. In this disclosure, the term webpage should be interpreted as broadly as possible, to include all instances, formats, types, and variants of data. Thus, a webpage may, for example and without limitation, comprise an HTML or DHTML file; a result provided to a computing device by a Web service, such as via SOAP or RPC-XML; information received via an RSS feed; data received via an e-mail protocol such as IMAP, POP3, or SMTP; content received via a peer-to-peer information sharing facility; an SMS message; a table in a relational database, or an entry therein; any information that may be received by, produced by, presented by, and/or adapted to be presented by the mobile communications facility 102; and so forth. A webpage identifier may identify the webpage. For example and without limitation, this identifier may be a name; a URL; a URI; a DOI; a permalink; a message identifier; a unique identifier; a globally unique identifier; a temporary identifier; a persistent identifier; and the like.

The first step in the method for indexing mobile content may comprise finding a webpage that contains the content. The finding process may be performed once, periodically, from time to time, in response to a manual input, automatically, and so forth. In embodiments, an instance of the additional or remote server 134 may provide the finding process and/or the webpage. Generally, any computing facility associated with the wireless search platform 100 may provide the finding process and/or the webpage. In cases where the finding process involves a manual input, the provider of the finding process may both have a human user and provide a user interface to the user, wherein this user provides the manual input via this user interface. A concrete and tangible end result of finding the webpage may be receiving one or more webpage identifiers at the provider of the finding process.

In embodiments, the finding process may comprise spidering. An autonomous agent or software agent may provide the spidering. This agent may be a web crawler, a web spider, an ant, and the like. For example, spidering may begin with the agent retrieving a webpage at a known URL. That webpage may contain hyperlinks or reference to other webpages. Spidering may continue with the agent retrieving the other webpages, which may also contain hyperlinks or references to other webpages. Spidering may continue with the agent retrieving those webpages may likewise be processed by the agent. Many other examples and embodiments of spidering will be appreciated from this disclosure and such examples and embodiments are intended to be encompassed by the present invention.

In embodiments, the finding process may include processing gateway data (e.g. WAP gateway data, mobile server gateway data, server gateway data, and/or wireless provider gateway data). Gateway data may be associated with a WAP gateway, or other such facility, the wireless communication facility 104, the additional or remote server 134, or any other server or facility associated with the wireless search platform 100. The gateway data may include any message that is communicated between the mobile communication facility 102 and a facility, server, or data source, wherein during the communication the message is converted between a WAP data format and an HTTP data format, for example. The gateway data may also include any data associated with a WAP gateway. Such data may without limitation be associated with a configuration, an uptime, a capability, a network, a protocol, the wireless provider 108, the wireless communication facility 104, the mobile communication facility 102, the mobile search host facility 114, the additional or remote server 134, and so forth. It should be appreciated that some or all of the information that is received or transmitted by the finding process may be the WAP gateway data. Thus, finding the webpage that contains the content may be achieved by processing the WAP gateway data.

In embodiments, the finding process may comprise self-submission. A provider of the webpage may submit an identifier of the webpage to the provider of the finding process. This self-submission may involve a manual input, with the user of the webpage provider entering a webpage identifier for the webpage into the provider's user interface. Alternatively, the self-submission may be automatic, with the webpage provider automatically submitting the webpage identifier to the provider of the finding process. Additionally or alternatively, the provider of the webpage may submit a set of identifiers. For example, the set may comprise a site map, which may include identifiers of a plurality of webpages associated with a Web site. The provider of the webpage may provide any of these webpages. The set of identifiers may be represented in a flat arrangement; a hierarchical arrangement; a relational arrangement; an object-relational arrangement; or any other arrangement. Without limitation, the set of identifiers may be embodied as a flat file, an XML file, or any other file or representation of data. Many other examples of self-submission will be appreciated.

In certain embodiments of the finding process that include self-submission, a payment may be associated with providing the webpage identifier or set of webpage identifiers to the provider of the finding process. In particular, an enterprise or business entity that is associated with the provider of the webpage may provide the payment to an enterprise or business entity that is associated with the provider of the finding process. This payment may be a one-time payment to allow unlimited submissions; a one-time payment to allow a certain number of submissions; a per-use payment that occurs each time a submission is made and that may vary depending upon an aspect of the submission; a periodic or subscription-oriented payment to allow unlimited submission during a limited period of time; a periodic or subscription-oriented payment to allow a certain number of submissions during a limited period of time; and so forth. The payment may be optional, required, prepaid, delayed, complete, partial, credited, debited, negotiated, fixed in amount, dynamic in amount, and so forth. In one example, the payment may be related to a paid inclusion service creates an index of mobile content, wherein the mobile content originates from webpages that are identified in submissions that are associated with a payment.

After the finding process receives the webpage identifier, the finding process may note the mobile content originating from the identified webpage. This noting may include determining and storing a URI, a MIME type, a file size, a resolution, a fidelity, a compression format, a file format, a digital rights management (DRM) restriction, or any other feature or aspect of the mobile content. A concrete and tangible result of this noting may be a mobile content profile, which is a data element that includes indications of these features and aspects.

The mobile content may be a sponsored link, a sponsored call, a downloadable instance of content, an audio stream, a video file, a video stream, a graphic element, a result of a search query, and so forth. In the case that the content is the result of a search query, the search query may be initiated by the mobile communication facility 102, which may without limitation a type of phone, mobile phone, cellular phone, GSM phone, and the like.

The next step in the method for indexing mobile content may comprise determining compatibility of the mobile content based upon the type of the mobile communication facility 102. Determining compatibility may be provided by a determining process of the method for indexing mobile content. The determining process may be performed when mobile content is found, in serial with the finding process. In this case, a step in the finding process may provide to the determining process the mobile content profile associated with the mobile content. Alternatively, the determining process may be performed from time to time, no sooner than when individual items are found but otherwise in no particular temporal relation to the finding process. In this case, a step in the finding process may place into a queue the mobile content profile associated with the mobile content. From this queue, a step in determining process may retrieve the mobile content profile. In embodiments, an instance of the additional or remote server 134 may provide the determining process. Generally, any computing facility associated with the wireless search platform 100 may provide the determining process. The computing facility (or additional or remote server 134) that provides the determining process may or may not be the same facility or server 134 that provides the finding process.

The determining process may compare the mobile content profile to capabilities and properties associated with the type of mobile communication facility 102. These capabilities and properties may be related to the mobile content profile or to elements thereof. The capabilities and properties may be embodied as a data element, which may be provided by the additional or other server 134; its database 138; the wireless provider data facility 124; the additional data facility 170; the data facility 118; or any other data facility, computing facility, or element of the wireless search platform 100. When comparing the mobile content profile to the capabilities and properties, the determining process may test to see if all of the capabilities and properties match the mobile content profile. If the result of this test is negative, the determining process may test to see if there exists a method for adapting a kind of mobile content that is associated with the profile into a second kind of mobile content that is associated with a second profile, wherein the second profile does match all of the capabilities and properties. If the result of this test is also negative, then the determining process may return a negative result. Otherwise, the determining process may return an affirmative result. When applicable, the affirmative result comprises a code or other indication of the method for adapting the content. In any case, the affirmative result comprises the mobile content profile. A concrete and tangible result of the determining process is the returned result.

The capabilities and properties that are related to the mobile content profile may be associated with a MIME type. The MIME type may conform to RFC 1521, RFC 1522, RFC 1550, RFC 1590, RFC 1847, RFC 2045, RFC 2046, RFC 2049, RFC 2387, RFC 3023, or any subsequent RFC that obsoletes these RFC, all of which are hereby included by reference. The MIME type may indicate that the mobile content is comprises any of the past, present, or future IANA registered MIME media types, including those that have been requested but not approved, all of which may be described at the Web site located at http://www.iana.org/assignments/media-types/, the content of which is hereby included by reference. In embodiments, the MIME type may indicate a content type of text/vnd.wap.wml or text/HTML.

The capabilities and properties that are related to the mobile content profile may be associated with a mobile communication facility identifier, such as a browser identification string; a mobile subscriber characteristic; or user agent string. In embodiments, the user agent string may be a textual or binary representation of a brand and/or model identifier of the mobile communication facility 102; a name and/or version of an application; a name and/or version of a host operating system; a host operating language; a compatibility flag; a version token; a platform token; and the like.

In embodiments, the browser identification string may identify a Web browser or WAP-enabled application in the mobile communication facility 102; the mobile subscriber characteristic may be a call history of a mobile subscriber who is associated with the mobile communication facility 102; the user agent string may identify a user agent (such as an e-mail agent or client) in the mobile communication facility 102; the name and/or version of an application may be those of an application in the mobile communication facility 102; the name and/or version of a host operating system may be those of the operating system in the mobile communication facility 102; the compatibility flag, version token, and platform token may be structural elements of the user agent string.

The capability and properties that are related to the mobile content profile may be associated with a Wireless Universal Resource File (WURFL), or any criterion specified therein; a browser; an operating system; an element of usability; and the like.

In embodiments the element of usability may be a W3C mobile content standard; support of XHTML; adherence to a metadata guideline (which may be related to a title, a description, a keyword, and so on); a text emphasis rule (which may be related to a bolded text element, an italicized text element, an underlined text element, and so on); an image use guideline (which may be an image height, an image width, an image resolution, a number of images within a plurality of images, image formatting, a sequential image download order of a set of images, and so forth); a page weight rule (which may relate to reducing a total page size to ten or fewer kilobytes, reducing table size, reducing text by removing comments associated with a page, minimizing page formatting by inserting a tab or space or paragraph delimiter, shortening a file name, shortening a CSS class name, shortening a CSS ID name, and so forth); and so on.

The final step in the method for indexing mobile content may comprise producing an index of the mobile content. Producing the index may be provided by an index production process of the method for indexing mobile content. The index production process may be performed when the determining process returns an affirmative result, in serial with the determining process. In this case, a step in the determining process may provide to the index production process the affirmative result. Alternatively, the index production process may be performed from time to time, no sooner than when the determining process returns the affirmative result but otherwise in no particular temporal relation to the production process. In this case, a step in the determining process may place into a queue the affirmative result. From this queue, a step in index production process may retrieve the affirmative result. In embodiments, an instance of the additional or remote server 134 may provide the index production process. Generally, any computing facility associated with the wireless search platform 100 may provide the index production process. The computing facility (or additional or remote server 134) that provides the index production process may or may not be the same facility or server 134 that provides the finding process or the determining process.

Based at least in part upon the affirmative result, the index production process may automatically generate an index of the mobile content that is associated with the mobile content profile of the affirmative result. In various embodiments, for example and without limitation, this data element may represent or be associated with a hash value, a priority, a relevancy, a market, a categorization, a classification, a rating, a grading, a ranking, a designation, an assessment, an evaluation, an appraisal, a mark, a score, a value, a reference, a color, a code, an icon, a position, a preference, a suggestion, a hint, a clue, a cross-reference, an alternate embodiment of the mobile content associated with the mobile content profile, a reference to such an embodiment, a reference to a Web service that provides such an embodiment, an alternate URI for the URI of the mobile content profile, a position in a hierarchy, a hierarchy, a compatibility flag, a flag, a tag, a keyword, a translation, a transliteration, a synonym, an antonym, a homonym, a measurement, a usage statistic, a popularity, a peer review, a point rating (such as on a ten-point scale), a star rating (such as on a five-star scale), a value, a future value, a past value, an estimate, a projection, a layman's term, a term of the art, a colloquialism, a preferred name, a nickname, a formal name, a source, a destination, a location, a time, a date, a creator, a modifier, a size, a file size, a resolution, a hue, an color, an intensity, a bit depth, a file type, a protocol, a requirement, an item, an action, a location, a reason, a method, and so forth.

A plurality of indexes may be generated. In some embodiments, the indexes may be ordered based upon the value of the index. In one example, the value is a rank and the indexes are ordered based upon the rank.

The index of the mobile content may be stored in a database or a data facility such as and without limitation any of the database or data facilities associated with the wireless search platform 100. The index of the mobile content may be stored in a unified or distributed fashion. The index of the mobile content may be replicated, archived, compressed, decompressed, transmitted, received, interpreted, processed, utilized, or otherwise associated with any of the elements of the wireless search platform 100. In one example, the index of the mobile content may represent relevant information that is provided to a user of the mobile communication facility 102 in response to a query submitted by or on behalf of this user.

It should be appreciated that numerous embodiments of the process for indexing content are possible. These embodiments without limitation include a single instance of a monolithic computer program that implements the entire method of indexing mobile content, including all of the processes thereof; multiple instances of the monolithic computer program, perhaps arranged in a load-balancing or failover configuration; an instance of each of a number of modular computer programs, wherein each computer program implements some but not all processes but when taken in the aggregate the computer programs implement all of the processes; at least one instance of each of the modular computer programs, wherein multiple instances of the same program are arranged in load-balancing or failover configuration; an instance of each of the modular computer programs, wherein the instances reside on the same facility or server 134; an instance of each of the modular computer programs, wherein some or all of the instances reside on different facilities or servers 134; at least one instance of each of the modular computer programs, wherein the instances reside on the same facility or server 134; at least one instance of each of the modular computer programs, wherein some or all of the instances reside on different facilities or servers 134; multiple instances of the monolithic computer program that reside on the same facility or server 134; multiple instances of the monolithic computer program, wherein some or all of the instances reside on different facilities or server 134; and so forth.

In embodiments web content is presented to mobile communication facilities based at least in part on the compatibility of the mobile content with the mobile communication facilities. The compatibility may be determined through an examination of information relating to the mobile communication facility (e.g. mobile subscriber characteristics, information stored by the wireless provider, or information stored locally on the mobile communication facility). Once information relating to the mobile communication facility is determined a comparison between the information relating to the mobile communication facility and the mobile content may be determined. In the event the mobile content is deemed compatible, the mobile content may be delivered to the mobile communication facility. The delivery of the mobile content may be the result of an auction for the placement of content to the mobile communication facility where the advertiser sponsoring the content pays for delivery of compatible content. This methodology may be used to improve the projected conversion rate of the mobile content because of its likely compatibility.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

In embodiments, the transaction history data may enumerate specific behavior for specific users. This may be used to compute popularity information and be used as an input to the recommendation engine. This data feed may be used whether or not the content index is built via regular data feeds or by spidering. A common format for this information is the Apache Log Format.

In embodiments, full-text relevance may compute a TFIDF metric in which the frequency of words within the overall item set influences the relevancy score. In embodiments, "stop words" may be used to improve search result relevancy. Stop Words may be words which do not contribute to the overall ranking of a document and are not searched, or not used in query formulation. The search facility 142 that does not use stop words explicitly may nonetheless specify certain words that influence relevance less than others. In embodiments, the search facility 142 may use query analysis to identify specific verticals with specific queries in certain contexts. Thus, it may be possible for a search for "ice cream" to prefer local listing results to general web pages.

In one embodiment the search function 142 is adapted based on services purchased from a carrier (e.g., phone lines, television packages, wireless services, DSL, cable services, broadband services, data services, and other services). The carrier-services-adapted search function 142 may be an implicit query 164, an active query, a disambiguation action, a retrieval function, a filtering function, a presentation function, a routing function, or another function or action relating to the initiation, processing, or completion of a search. Such information may be retrieved from a database of mobile subscriber characteristics 112, such as that stored by a wireless provider 108 who may also be a provider of various other services. The other services may be analyzed, such as by an algorithm facility 144, to infer information about a user's intent when executing a search function 142, including for presenting implicit queries, resolving ambiguous queries, or retrieving, sorting, filtering, presenting, or routing results. For example, if a user has DSL, has purchased a premium sports television package, and has bookmarked sports-related sites, then the user may be presented with implicit queries that retrieve sports results for that day. Similarly, upon entering "Jason", such a user might receive results on the Red Sox or Jason Varitek, while another user might receive information about the Friday the 13th series of movies, or the JASON foundation. Again, the algorithm facility 144 may use a wide range of techniques, including simple category-based inferences, learning algorithms, neural nets, regression analysis and other statistical techniques, or the like to draw inferences about how purchasing various services relates to query formation. Such techniques may include collaborative filtering techniques (as described elsewhere herein and in the documents incorporated by reference herein) for determining how a user's preferences align with other users having similar characteristics.

In one embodiment the search function 142 is adapted based on transaction history. The transaction history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of phone calls made using, for example, the telephone numbers or identities of called parties, or portions of telephone numbers such as area codes or exchanges. The call history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on phone calls received using, for example, the telephone numbers or identities of called parties, or portions of telephone numbers such as area codes or exchanges. The calls-received-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on the mobile subscriber characteristics 112 of the persons calling, or called by, the user. This may include, for example, usage patterns, usage plans, mobile device type, firmware, capabilities, and so forth, as well as demographic and other information concerning the parties, to the extent that it is available, and as described generally above. The characteristic-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on the duration of calls. The call-duration-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on a history of communications made via phone. The communications-history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on Internet usage. This may include, for example, histories of URLs or specific IP addresses, as well as topical or semantic information concerning same. The Internet-usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on email usage. The email usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on instant messaging. This adaptation (and other adaptations discussed herein) may be based on such usage specific to a particular device, a particular time of day, a particular day of the week, a particular season, or the like, or may be based on all traffic associated with the user, regardless of other factors. The IM-usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on chat (and the entities communicated with by these technologies). The chat usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of phone calls made linked with geographic/location information at the time of each call. The location- and call history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on log of phone numbers. The phone number log-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of clicks and clickthroughs (or other keystroke or user interface equivalents thereof, including voice-initiated actions). The user-action-history adapted search function 142 may be an implicit query 164, an active query, a disambiguation action, a retrieval function, a filtering function, a presentation function, a routing function, or another function or action relating to the initiation, processing, or completion of a search.

Figure 6:
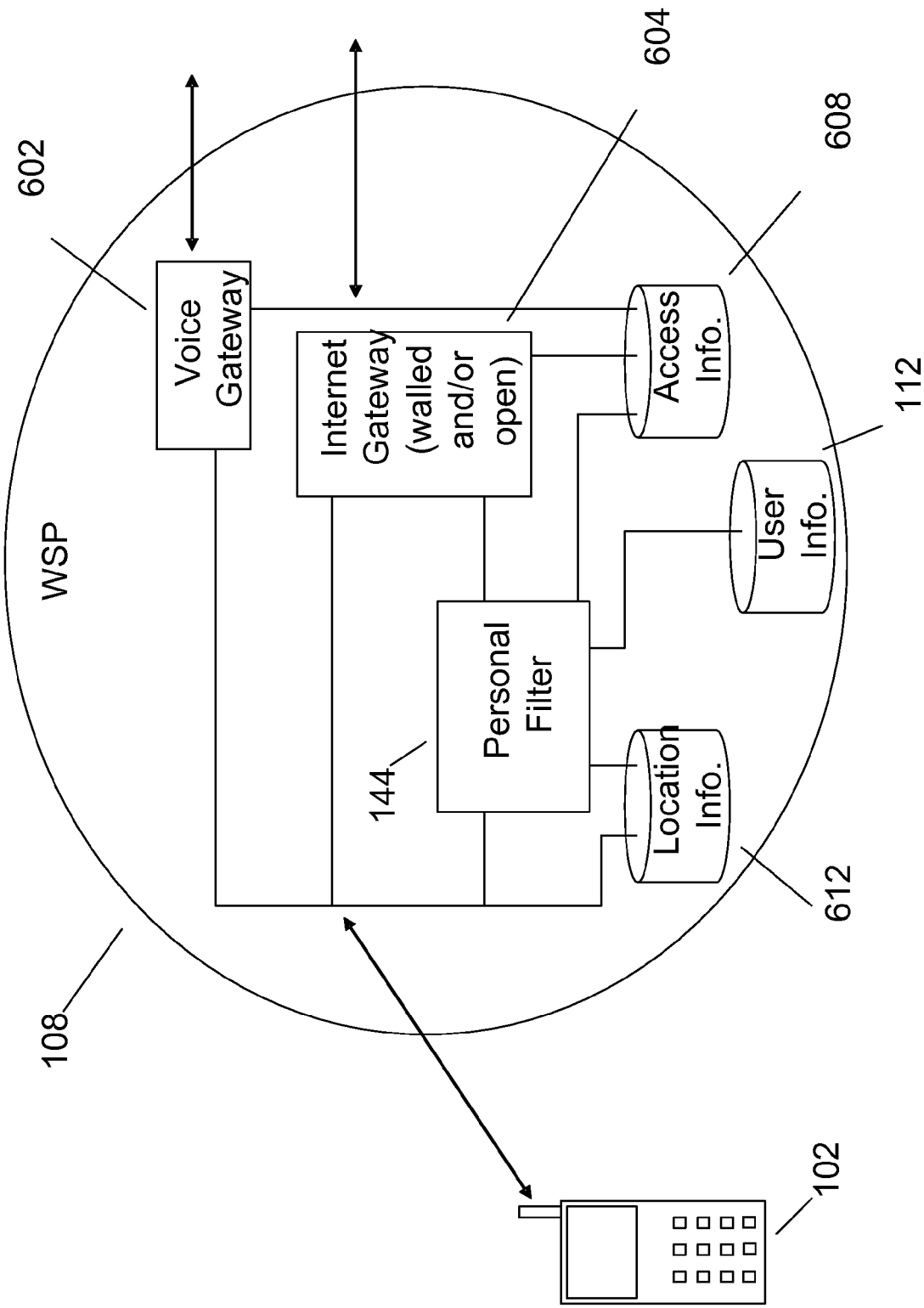
FIG. 6 illustrates a mobile communication search facility.

FIG. 6 illustrates a mobile communication search facility 142 according to the principles of the present invention. In this embodiment, the wireless provider 108 facilitates voice access from the mobile communication facility 102 through a voice gateway 602. The voice gateway 602 may be a telecommunication router for example. Information pertaining to what voice calls have been made or received by the mobile communication facility 102 may be stored in access information database 608. Once the voice access information is stored in the access information database 608, the information may be retrieved by the personal filter 144, and the personal filter 144 may also process the voice activation information to gain more information about the access. For example, the personal filter 144 may perform a reverse phone number process on calls received by or made from the mobile communication facility 102 to determine information about the establishments and individuals called. Such information may also be matched with the time of day the call was made, the duration of the call, who initiated the call, etc. The information relating to voice calls may be further processed or inferences may be made from the information indicating user preferences. For example, if the user is making calls most days at lunch time to take out restaurants, one may infer that the user is going to make more calls to take out places for lunch. Likewise, if the user has made ten phone calls to different new car dealers in the past two weeks, an inference may be made that the user is in the market for a car. The information may also be used in connection with a collaborative style filter (a process within the personal filter 144) to predict future behavior or likes and dislikes based on other people's similar behaviors.

Access information may also be collected based on internet activities through an internet gateway 604. Search queries, click-throughs, and the like may be tracked and stored in an access database 608 for retrieval from the personal filter 144. As with the voice information, the web interaction data may be manipulated, and predictions of future behavior, likes, and dislikes may be made. In the monitoring of internet behavior, in garden and out of garden activities may be tracked.

Location information and time of day information may also be tracked and stored in a location information database 612. A with the voice information and the web interaction information, the location and time of day information may also be used by the personal filter 144.

User information 112, such as personal information or information used to set up the user account with the wireless provider 108, may be kept in a database that is accessible by the personal filter 144.

The personal filter 144 may receive a search query from a mobile communication facility 102, extract information from each of the databases 612, 112, and 608, process all of the information through an optimization algorithm, and perform an optimized search for results. Likewise, results may be obtained, and the personal filter 144 may be used to process the results, along with the other mobile communication related information, and produce filtered results to the mobile communication facility 102.

While the databases 612, 112, and 608 are illustrated as separate databases, it should be understood that these may be combined into one or more databases, such as a relational database. While the personal filter 144 is illustrated as residing in the wireless provider 108 domain, it should be understood that the personal filter 144 may reside elsewhere, including on the mobile communication facility 102 or in another related facility.

Figure 7B:
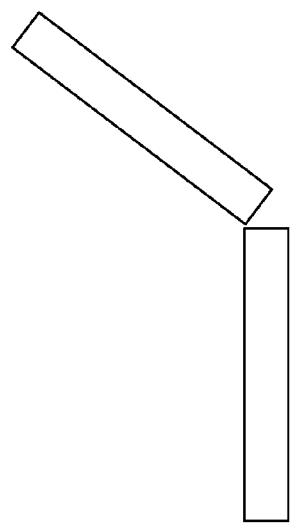
FIG. 7B illustrates a mobile communication facility.
Figure 7A:
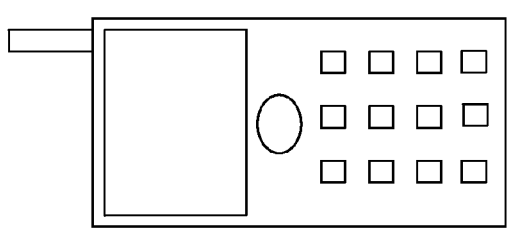
FIG. 7A illustrates a mobile communication facility.
Figure 7C:
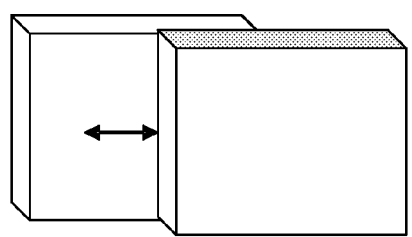
FIG. 7C illustrates a mobile communication facility.

FIGS. 7A-7C illustrate various form factors of mobile communication facilities that may be used with the systems described herein. FIG. 7A illustrates a candy bar or open faced fixed cell phone. FIG. 7B illustrates a flip phone and FIG. 7C illustrates a slide phone.

Figure 8A:
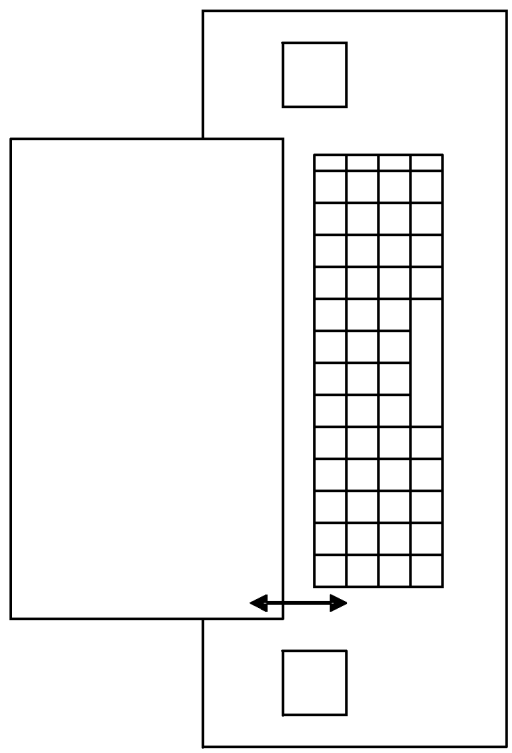
FIG. 8A illustrates a mobile communication facility.
Figure 8B:
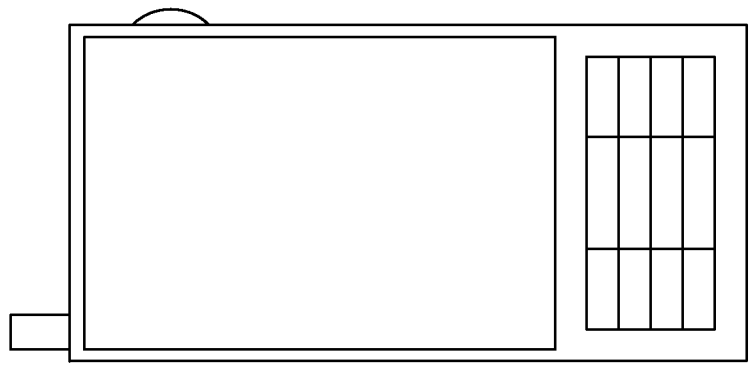
FIG. 8B illustrates a mobile communication facility.
Figure 8C:
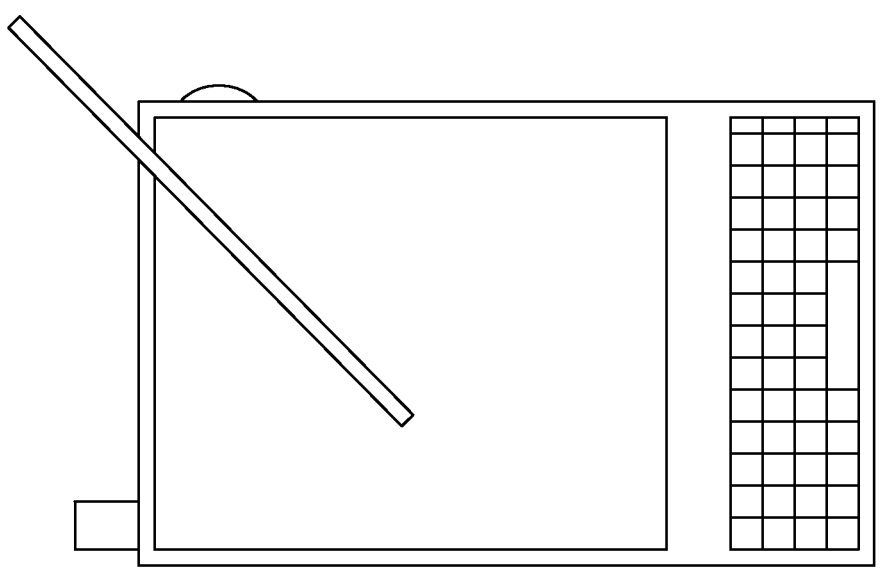
FIG. 8C illustrates a mobile communication facility.
Figure 9:
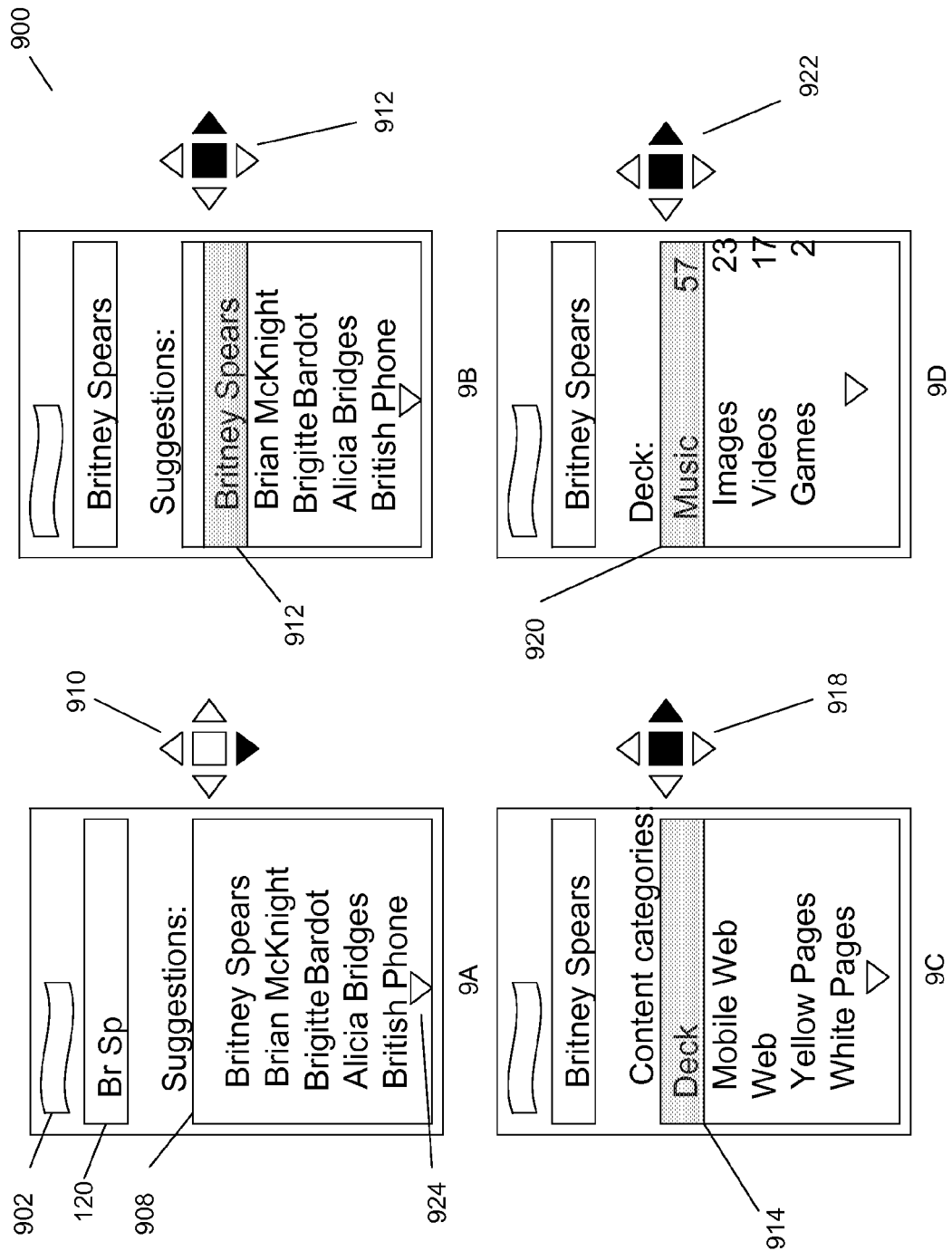
FIG. 9 illustrates a series of screen shots associated with a search on a mobile communication facility.

FIGS. 8A-8C illustrate various form factors of mobile communication facilities that may be used with the systems described herein. FIG. 8A illustrates a PDA phone with a touch screen and a full QWERTY keyboard. FIG. 8B illustrates a PDA phone with a two-letter-per-key keypad. FIG. 8C illustrates a slide-up phone revealing the keypad.

FIGS. 9A-9D illustrate a progression of user interface screens 400 associated with a search on a mobile communication device 102. The user interface screens may be generated by the client application interface described above. Beginning with screen shot 9A, a query entry facility 120 is provided. The screen may be labeled with a logo 902 and a suggestion box 908 may be provided. As an example based upon this interface, an abbreviated search query "Br Sp" may be typed into the search query entry facility 120. A disambiguation facility 140 (not shown in this figure) may operate in conjunction with a personal filter 144 (not shown in this figure) to disambiguate the partially entered terms. In addition, a suggestion facility may be operational (not shown in this figure) such that suggestions to the partially entered search query are presented in the search box 908. In the event that the first page of suggestions does not include the desired search query, more results may be displayed by activating the down arrow 924. A navigation facility 910 may be provided (e.g. a multi-directional joystick style keypad on the face of the mobile communication facility 102, a touch screen, keypad, or the like). The navigation facility 910 may be used (shown in the down position as indicated by the darkened arrow) to highlight "Britney Spears." Once "Britney Spears" is highlighted 910, the navigation facility 912 may be used to select (as indicated by the darkened center square) and expand the category (as indicated by the darkened right side arrow). Once the suggestion "Britney Spears" is selected and expanded, categories of search results 914 may be presented.

In embodiments, a user of the wireless search platform 100 may enter a query into a mobile communication facility 102. As the user is entering this query, a method of the wireless search platform 100 processes the portion of the query that the mobile communication facility 102 has received. This processing may take into account a context that is associated with the query. Based upon this processing, the wireless search platform 100 creates an ordered list of expected search queries that may be associated with a search vertical. The ordered list may be ordered, based at least in part, on a factor, such as an information relating to a mobile communication facility, a user characteristic, a user history, a user transaction, a geographic location, a user device, a time, and or a mobile communication facility characteristic. The ordering based on a factor may be performed based at least in part on a relevancy (e.g., a relevancy score) or some other value that may be used to express the association between a mobile content and a factor. The ordered list may be used as a suggestion dictionary in order to present suggested search queries to a user of a mobile communication facility.

For example, a user located in Boston in the evening may wish to locate a French restaurant. The user may enter the search vertical "Restaurants" on a mobile communication facility, and type "French" into the search box associated with this search vertical. The wireless search platform 100 may use factors associated with the mobile communication facility in order to determine which of the possible suggestions that are located in the suggestion dictionary may be appropriate for this user's search query. These factors may include: "Time=8 pm," "Location=Boston," The suggestion dictionary may have relevancy scores assigned to mobile content within the search vertical "Restaurants" based at least in part on the relevance of each to "Time" and "Boston." A restaurant located in Boston may be assigned a high relevance. A restaurant located in Missouri may be assigned a low relevance. Similarly, a restaurant that is open for business at 8 pm may be assigned a high relevance, whereas a restaurant not serving customers at 8 pm may be assigned a low relevance. Relevancy scores may also be combined in order to determine a cumulative relevance which takes into account a plurality of factors associated with the mobile communication facility and the pluralities association with a mobile content. Continuing the previous example, the ordered list of content for presentation to the user that is derived from the suggestion dictionary may rank the following restaurants in descending cumulative relevance to the user: (i) a restaurant in Boston that is open at 8 pm; a restaurant in Boston not open at 8 pm. The platform may either omit entirely restaurants that are not in Boston (and, hence, of minimal relevance to the user), or present them very low in the hierarchy of presented search results. Many other examples and embodiments of the method and system of presenting an ordered list of suggested search queries will be appreciated from this disclosure and such examples and embodiments are intended to be encompassed by the present invention.

Information regarding the current location of a mobile communication facility 102 may be used by a mobile search application for receiving search results that include mobile content relating to that location. As the mobile communication facility 102 enters a second location, the mobile search results may be updated based at least in part on the second location information and used to present search results relating to the second location. In embodiments, a mobile search application may include tracking a mobile communication facility, presenting search results based at least in part on a first location, and presenting updated search results based at least in part on a second location.

Mobile content may be a sponsored content, a sponsored link, a sponsored call, a downloadable content, an audio stream, a video, or a graphic element. The search request may be initiated by a mobile communication facility 102, including a phone, mobile phone, cellular phone, and or a GSM phone.

In embodiments, the location of the mobile communication facility 102 may be determined according to a unique identifier associated with the mobile communication facility 102. A unique identifier may include, but is not limited to, a phone number, an area code of a phone number, a billing address, and or a postal zip code of a billing address.

In embodiments, the location of the mobile communication facility 102 may be determined according to the location coordinates of a particular mobile communication facility 102. The location coordinates may be determined through GPS, triangulation, and or WiFi triangulation. The location may also be determined by a user-entered location or a plurality of locations, such as geographic regions including one or more states, or one or more cities.

In embodiments, the location of the mobile communication facility 102 may be determined by a distance from a specified location.

For example, a user of a mobile communication facility 102 may initiate a text search query titled "restaurant" from a first location. The wireless provider, wireless operator, and or telecommunications provider may locate the mobile communication facility 102 based upon information relating to the user's mobile communication facility 102. The user's home address may be on Hanover St. in Boston, Mass. A GPS location, triangulation, and or WiFi triangulation may indicate that the user is currently in the vicinity of Hanover St. in Boston, Mass. The user may be located a specific distance from cell towers located in Boston that are congruent with the user being in the vicinity of Hanover St. in Boston, Mass. Alternatively, the user may self-enter his current location as being Hanover St. Using this location information, the search results that pertain to restaurants that are on or near Hanover St. in Boston, Mass. may be presented exclusively or in priority to other restaurants that are distant from Hanover St. Continuing this example, later in the evening the user has now moved to a second location and would like to find a restaurant for dinner. Again a text entry of "restaurant" is entered into the query entry facility 120 of the mobile communication facility 102. Using one or all of the same means of determining the location of the mobile communication facility 102 described above, the search results may now display information regarding restaurants that are in the vicinity of the user's second location.

In embodiments, a mobile search application disclosed herein may include receiving a location of a mobile communication facility and presenting search results to the mobile communication facility based on a predicted future location. The location of the mobile communication facility may be determined by a predicted future location that is based at least in part on a relationship of prior locations. The relationship of the locations may be used to predict a travel trajectory. The travel trajectory may be coupled with information regarding time. The timing of the residence in the future locations, and their relationships, may be used to predict a travel speed that is, in turn, used to predict a time of arrival at a predicted future location. The predicted time of arrival at a predicted future location may be used to pre-load mobile content to a cache of the mobile communication facility for display upon arrival at the future predicted location, or its vicinity.

In embodiments, the location of the mobile communication facility may be determined based at least in part on as association with a route. A route may be a street, highway, railroad track, subway track, bus route, flight path, recreational course, and the like. A route may be established by repetition and associated with a user of a mobile communication facility. Such a repeated route may include, but is not limited to, a commute to a workplace, a commute form a workplace to a client's workplace, a commute to a friend's residence, a commute to a family member's residence, a commute to a place of business (e.g., a grocery store), and the like.

For example, a person traveling on an interstate highway may wish to find a restaurant at an upcoming exit. A wireless platform 100 may be able to record the location of a mobile communication facility 102, using any of the methods described above, at time intervals to establish a travel line or trajectory that the user of the mobile communication facility 102 is currently on. This trajectory may be compared to known routes, such as those described above. Here the route of the user may match an interstate highway route. This information may be used to predict the future locations of the mobile communication facility. Because the location is taken at a time interval, this information may be combined with the distance traveled between locations in order to predict a speed of travel. The predicted speed, coupled with the predicted future location, may enable the search results for "restaurant" entered by the interstate traveler to present exclusively or in priority, those restaurants that are along the route on which the user is traveling. Because the direction of travel is also known, those restaurants that may be close to the traveler in terms of distance, but whose exit the traveler has already passed may be excluded or given a lower priority due to the greater difficultly involved in returning to them rather than simply visiting a restaurant located at an upcoming exit.

In embodiments, the predicted time of arrival at a predicted future location may be used to pre-load mobile content to a cache of the mobile communication facility for display upon arrival at the future predicted location, or its vicinity.

The ordering of the generated search queries may be based at least in part on information relating to the mobile communication facility 102. The information relating to a mobile communication facility 102 may be a user characteristic selected from the group consisting of age, sex, race, religion, area code, zip code, home address, work address, billing address, credit information, family information, income information, birth date, birthplace, employer, job title, length of employment, and the like. Alternatively or additionally, the information may be a user history, a user transaction, a geographic location, a user device, a time, a mobile communication facility characteristic, provided by a wireless operator, provided by a wireless service provider, provided by a telecommunications service provider. The mobile communication facility characteristic may be selected from the group consisting of display capability, display size, display resolution, processing speed, audio capability, video capability, cache size, storage capability, memory capacity, and the like.

The mobile communications facility 102 may comprise a phone, a mobile phone, a cellular phone, a GSM phone, and so forth. The information relating to a mobile communication facility 102 may be provided by a wireless operator, a wireless service provider 108, a telecommunications service provider, and the like It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

In alternate embodiments, a user may provide a query entry as a barcode, image, scanned value, or any other input that may be received by the query entry system 120. In this case, a query may comprise one or more barcodes, one or more images, one or more scanned values, and/or one or more other values. As the query entry is being provided, the query entry system 120 receives a sequence of barcodes, images, scanned values, and other values. In this case, the "substring query entry" will be understood to be those things that have been received by the query entry system 120.

In embodiments, a method or system of the wireless search platform 100 may access the mobile search suggestion dictionary as the user of the wireless communication facility 102 provides the query. Here, accessing the mobile search suggestion dictionary is directed at creating a list of expect search queries associated with the query entry, which may be provided to the wireless search platform 100 via a client application running on the mobile communication facility 102 that is associated with the query entry system 120. The client application may include a search application, a location-based search application, a WAP application, a mobile application, or any other application associated with the mobile communication facility 102. In other embodiments, a method of the wireless search platform 100 may access the mobile search suggestion dictionary when the user has finished providing the query. In any case, the method or system receives an expected search query from the mobile search suggestion dictionary. This may take into account not just the query entry, but also a factor associated with that entry. In embodiments, this may be a search vertical, which may be a classification within a taxonomy of content. The factor may be a time, date, location, or any other temporal, geographic, physical, or conceptual context, an information relating to a mobile communication facility, a user characteristic, a user history, a user transaction, a user device, and or a mobile communication facility characteristic. By taking the factor(s) into account, the method or system may extract expected search queries from the mobile search suggestion dictionary that are associated with both the factor(s) and the mobile content relating to the query entry. This, in turn, yields suggested search queries that are associated with the same context as the substring query entry that the user is providing.

The search vertical may be associated with a taxonomy of content and may be a general search or related to a search, ringtones, images, games, yellowpages, weather, whitepages, news headlines, WAP sites, web sites, movie showtimes, sports scores, stock quotes, flight times, maps, directions, a price comparison, WiFi hotspots, package tracking, hotel rates, fantasy sports stats, horoscopes, answers, a dictionary, area codes, zip codes, entertainment, blogs, and so forth.

The ordering of the list of expected search queries may be based on a factor, such as a search query popularity or information relating to a mobile communication facility 102.

The information relating to a mobile communication facility 102 may be a user characteristic selected from the group consisting of age, sex, race, religion, area code, zip code, home address, work address, billing address, credit information, family information, income information, birth date, birthplace, employer, job title, length of employment, and the like. Alternatively or additionally, the information may be a user history, a user transaction, a geographic location, a user device, a time, a mobile communication facility characteristic, provided by a wireless operator, provided by a wireless service provider, provided by a telecommunications service provider. The mobile communication facility characteristic may be selected from the group consisting of display capability, display size, display resolution, processing speed, audio capability, video capability, cache size, storage capability, memory capacity, and the like.

The suggested search query may be associated with a human language; may be associated with a handset; may be associated with an input box; may be associated with a mobile communication facility type; may be a WAP query; a Java letter sequence; a BREW letter sequence; and so forth. The human language may, without limitation, be English, Spanish, German, French, Italian, Portuguese, Japanese, Chinese, Russian, Hindi, Urdu, and so forth. The input box may, without limitation, be an address box, a name box, an email box, a text box, a numeric box, an alphanumeric box, a search engine, a song name box.

The mobile communication facility may be a phone, a mobile phone, a cellular phone, a GSM phone, or any other form of tethered or wireless communications device.

The presentation of a suggested search query or a list thereof may be initiated by a query entry, a substring query entry, voice query, or by characters entered into a client application.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a wireless search platform and/or a computer in a number of ways, or all of the functionality may be integrated into a dedicated, standalone device or other hardware. All such permutations and combinations are intended to fall within the scope of the present disclosure.

It will also be appreciated that means for performing the steps associated with the processes described above may include any of the hardware and/or software described above.

In another aspect, each process, including individual process steps described above and combinations thereof, may be embodied in computer executable code that, when executing on one or more computing devices, performs the steps thereof.

Figure 10:
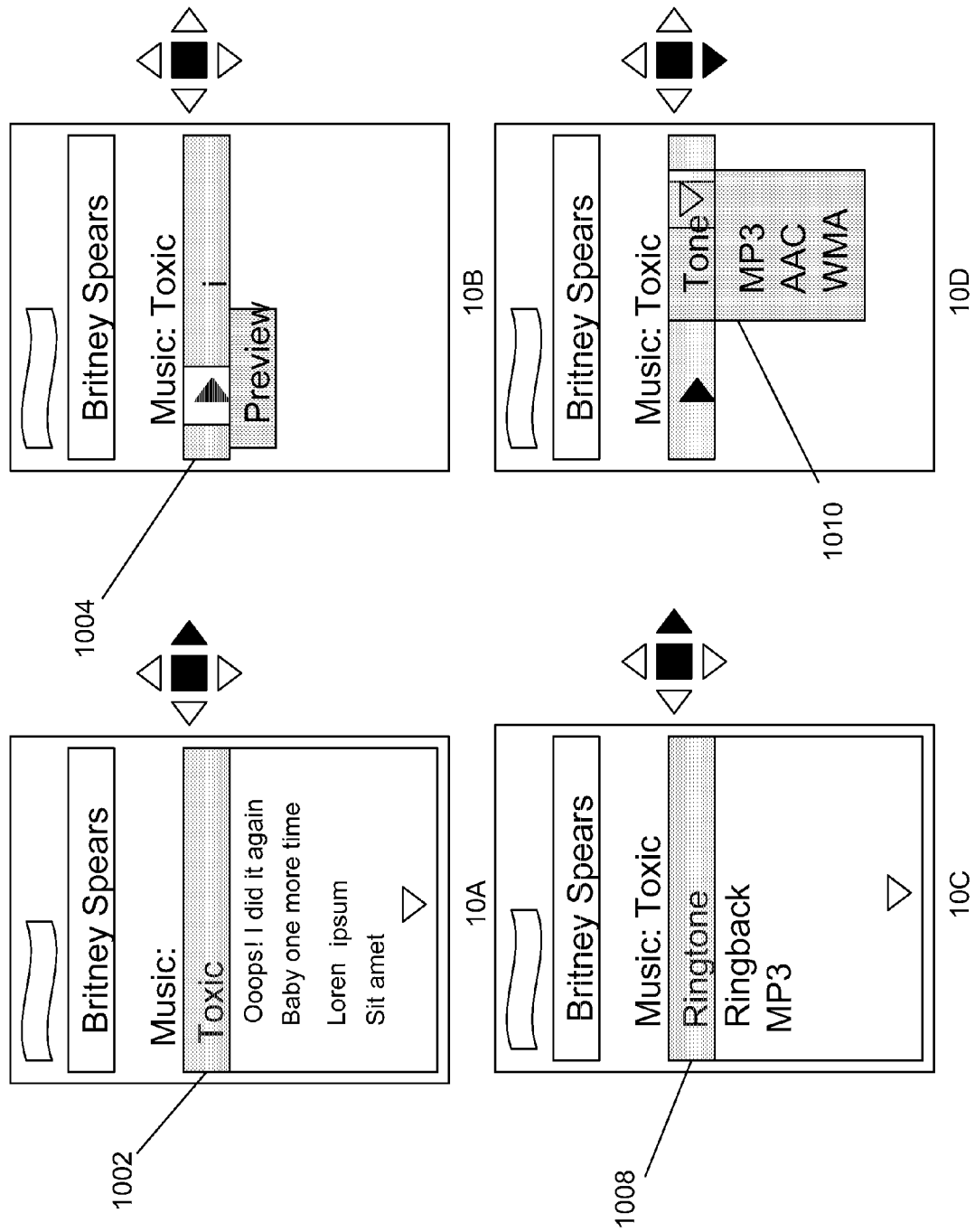
FIG. 10 illustrates screen shots associated with a mobile communication facility.

FIGS. 10A-10B illustrate several more screen shots in a progression of screen shots associated with a search from a user interface of a mobile communication facility 102. A search result is selected 1002, in this case a song related to Britney Spears; once the song is selected, the user may be presented with options of delivery. For example, the user may be provided with a preview option 1004 to sample the song. The user may also be presented with an option relating to the content, indicating the content use 1008, so it can be properly formatted, installed, and associated with the appropriate application(s) or device(s), and/or the user may be presented with an option of different file types 1010.

In embodiments, results may be presented to the mobile communication facility 102 as they are retrieved without waiting for the entire result set to be retrieved. In embodiments, certain results may be presented and displayed while other results are in the process of being presented or displayed This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is being locally loaded for presentation.

Figure 11:
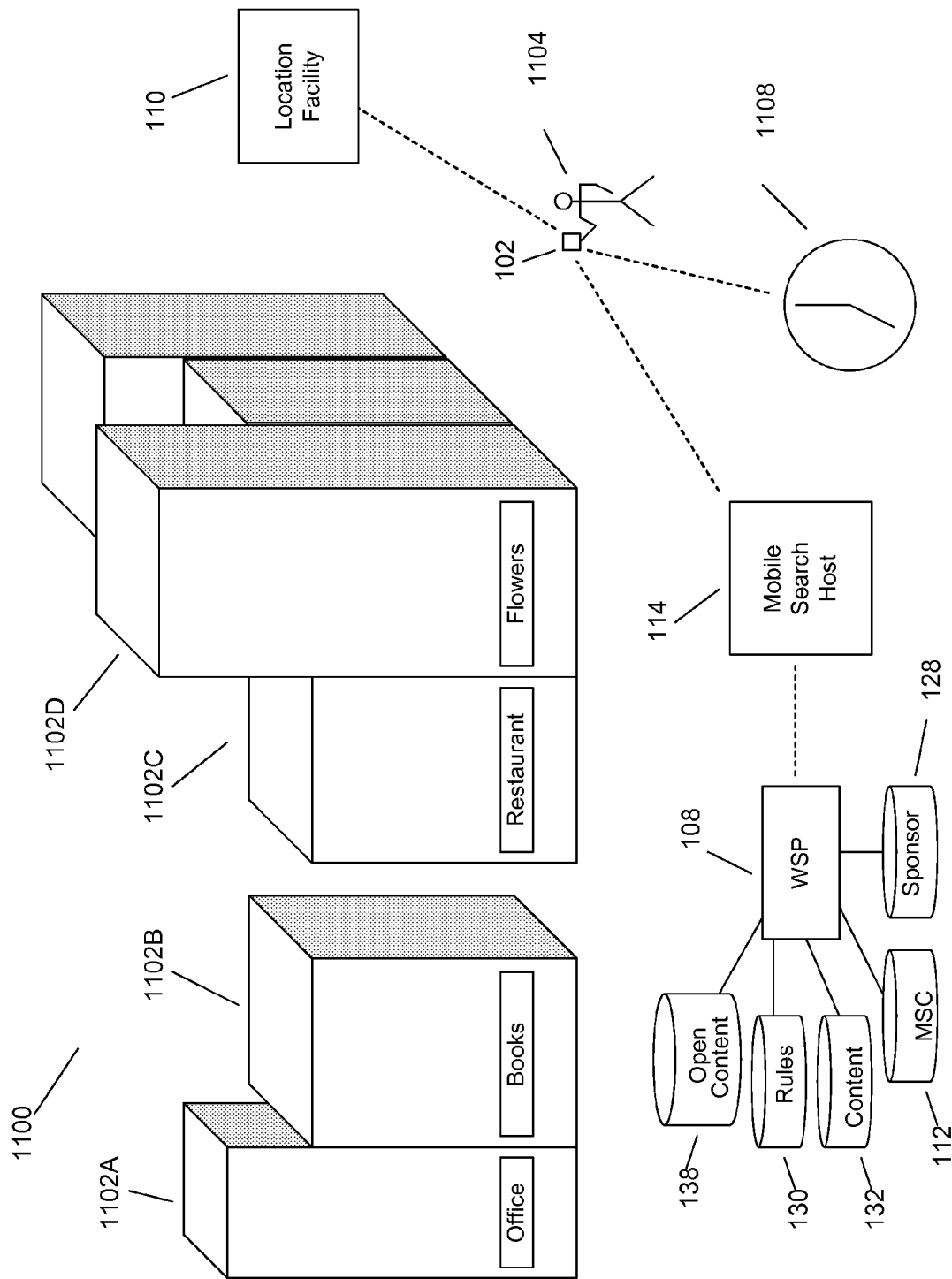
FIG. 11 illustrates a method of obtaining relevant search results for a user and displaying the results on a mobile communication facility.

FIG. 11 illustrates a scenario where a user 1104 of a mobile communication facility 102 would like to obtain relevant search results through the use of his mobile communication facility 102. Prior to making the search, there is already information relating to his presence, his person, his calling habits, his web habits, other people's habits, information relating to inferences about other people's behavior when presented with options, and other information that may be used in the development of results to this particular user 1104. For example, the user may be connected with a wireless service provider 108 either directly or through another facility. By interacting with the wireless service provider 108, the user can obtain information through the internet, such as open content 138, information within the confines of the wireless provider's 108 domain, walled garden content 132, carrier rules 130, mobile subscriber characteristic information 112, sponsor information 128, time of day (e.g. either local time, or time related to another region), and location information as indicated by or provided through a location facility 110. Any or all of this information may be processed through a personal filter 144 (e.g. a collaborative filter) within the mobile search host facility 114 to refine a search query or refine (filter) results before they are presented to the user 1104 on the mobile communication facility 102.

As described in connection with FIG. 1, the mobile search host facility 114 may include a personal filter 144 (e.g. a collaborative filter). The personal filter 144 may be used in conjunction with a search query entered and transmitted from the mobile communication facility 102 along with information from one of the associated databases and/or its location information. The personal filter 144 may use an algorithm that predicts the desired results based on information collected from other searchers (e.g. collaborative filtering), as well information relating to the user (e.g. mobile subscriber characteristic information from database 112, or location information).

An implicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An implicit search is initiated either because it is the time of day for the periodic implicit search, because user habits indicate the user is going to be looking for results soon, because there are advertisers 174 interested in pushing an advertisement, there is a local sale, there is an activity nearby, or there are other temporal, activity based, or other reasons to initiate the implicit search. Once the search is initiated, the stored location information may be transmitted to a mobile search host facility. The mobile host search facility 142 may also collect information from other associated sources (e.g. the mobile subscriber characteristics 112 database 112, the sponsor information database 128, carrier rules 130). The mobile search host facility is now prepared to perform a search based on the personal filter in the mobile search host facility 114 in conjunction with the user's location, time of day, and/or other information relating to the several data sources available to the mobile search host facility 114 (e.g. the mobile subscriber characteristics 112 database 112, the sponsor data base 128, the content 132, the carrier rules 130, and the open web content 138). All of the information may indicate that this is the general time when the user 1104 eats dinner, so the mobile search host facility 114 may provide results to the mobile communication facility 102 that pertain to dinner. In these results, a sponsor may have participated in a search marketing auction in an attempt to get his information onto the user's mobile communication facility 102. For example, a restaurant located in a building 1102C may be the high bidder on a keyword auction related to dinners within five miles of another building 1102C where the user 1104 is located, so the information the restaurant wanted sponsored and displayed on the mobile communication facility 102 will be displayed if the user 1104 interacts with the restaurant information presented. The information may not be presented until the user decides to look at search results, which may not ever happen. If the user 1104 does not interact with the sponsored result that was downloaded to the mobile communication facility 102, the sponsor may or may not have to pay a fee to the wireless provider 108 for the sponsored content. If the user 1104 does interact with the restaurant information that was downloaded on the mobile communication facility 102, the restaurant may or may not have to pay a fee to the wireless provider 108.

To continue with this implicit search scenario, the user may enter into a results mode or search mode on the mobile communication facility 102. In a results mode, results may appear without the need for a search. In this mode, the user may simply be presented with information that he may be interested in, given all of the prior information that is known about him (e.g. location, time of day, and mobile subscriber information). In a search mode, the user may enter a search query, and, if there is a relationship between the search query and the previously downloaded results, the previously downloaded results may be presented. The user may perceive this as a very fast search or a high bandwidth connection because the search results are presented from local memory.

The previously downloaded results presented may include a sponsored link from the restaurant, and the user may activate the sponsored link (e.g. by clicking on it). Once activated, or clicked or interacted with, the user may be presented with information relating to the restaurant. The information may include contact information (e.g. phone, address, email, URL) as well as a description of the restaurant. The user may be presented with a general section of the restaurant's website or a space tailored for the user 1104. For example, the restaurant may present users with a coupon or other sale if they arrive at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, or are frequent travelers).

A flower shop in a building 1102D may employ similar techniques to target suitable users in the area.

While embodiments involving implicit searching have been described in connection with FIG. 11, it will be appreciated that the same or similar techniques may be applied to explicit searches. For example, the user 1104 may be in the area of an office building 1102A and may be looking for the office building 1102A. The user 1104 may enter a search query with the name of the office building 1102B, and the name of the office building may be combined with the user's location and time of day to better target search results for the user.

An explicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An explicit search is initiated by the user 1104. Once the search is initiated, the stored location information may be transmitted to a mobile search host facility. The mobile host search facility 142 may also collect information from other associated sources (e.g. the mobile subscriber characteristics database 112, the sponsor information database 128, or carrier rules 130). The mobile search host facility is now prepared to perform a search based on the personal filter in the mobile search host facility 114 in conjunction with the user's location, time of day, and other information relating to the several data sources available to the mobile search host facility 114 (e.g. the mobile subscriber characteristics 112 database 112, the sponsor data base 128, the content 132, the carrier rules 130, and the open web content 138). The search may be performed in conjunction with the personal filter and other relevant filtering information to obtain results. In these results, a sponsor may have participated in a search marketing auction in an attempt to get his information onto the user's mobile communication facility 102. For example, the restaurant located in a building 1102C may be the high bidder on a keyword auction related to dinners within five miles of the building 1102C, so the information the restaurant wanted sponsored and displayed on the mobile communication facility 102 will be displayed if the user 1104 interacts with the restaurant information presented. If the user does not interact with the sponsored result that was downloaded to the mobile communication facility 102, the sponsor may or may not have to pay a fee to the wireless provider 108 for the right to post. If the user 1104 does interact with the restaurant information that was downloaded on the mobile communication facility 102, the restaurant may or may not have to pay a fee to the wireless provider 108.

The downloaded results presented may include a sponsored link from the restaurant, and the user may activate the sponsored link (e.g. by clicking on it). Once activated, or clicked or interacted with, the link may present the user with information relating to the restaurant. The information may include contact information (e.g. phone, address, email, URL) as well as a description of the restaurant. In one embodiment, the information may include a form or active control (such as a button) for making reservations. The user may be presented with a general section of the restaurant's website or a space tailored for the user 1104. For example, the restaurant may present the user with a coupon or other sale if he or she arrives at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, is a frequent traveler).

In embodiments, search results are presented to the user 1104 on the mobile communication facility 102 that are targeted to the user based on information relating to the user, the mobile communication facility 102, the location, and/or other information as described herein in conjunction with a personal filter. In embodiments, the information is also used to better target advertising, and sponsored advertisements may be provided to the mobile communication facility 102 through a pay for auction advertisement scheme. Such a scheme could be similar to the desktop featured Google AdWords and AdSense by Google, Inc. of Mountain View, Calif.

By way of another example made in connection with FIG. 11, the user 1104 may receive a search result that includes a pay per call link, where the vendor associated with the call (typically the company being called) pays a fee when receiving a call through the pay per call number. For example, the user 1104 may search for results related to flowers and receive back a phone number and possibly other contact information for the flower shop in building 1102D. The link may have been provided as a result of processing a search through a process involving a personal filter in conjunction with information relating to the user, the mobile communication facility 102, and/or the mobile subscriber characteristic information (as indicated in the implicit search example and the explicit search example illustrated in connection with FIG. 11). Once the user activates the phone number for the flower shop, the flower shop may be able to receive the call for a fee, or reject the call.

A wireless search platform 100 may use the keywords from a mobile communication facility 102 search query, and information stored in the wireless search platform 100, to display user-relevant sponsored mobile content on the mobile communication facility. Information stored in the wireless search platform 100 may include personal user information, user patterns of behavior with the mobile communications facility, characteristics of the mobile communications facility, and the like. Access to such user information, in combination with the keyword content of the search query, may increase the relevance of mobile content delivery to users, and increase the probability of user interaction with the sponsored mobile content. The sponsored mobile content may be displayed on the mobile communication facility 102 with a phone number to enable the user to place a call to the number in order to learn more about the displayed content, make a purchase, or carry out some other call-based activity. User interaction may then be tracked, and service providers may then charge the sponsors of the mobile content, and/or the users of the service, as a source of revenue on a per-interaction basis.

Sponsored mobile content may be an advertisement or some other form of sponsored content. Advertisements may relate to services provided by the sponsors of the wireless search platform 100, such as new cell phone models, additional services, accessories, and the like; or consumer products, such as electronics, household items, cars, beauty aids, and the like; or for other purchases such as real estate, college tuition, time-shares, vacations, and the like. Other forms of sponsored content may be political advertisements, religious messages, community programs, and the like. Sponsored content may be associated with a bid process. The wireless search platform 100 may use information gathered about the user, along with keywords in the search query to determine what mobile content would be most relevant to the user.

Relevance to the user may be based at least in part on the keywords in the search query. Examples of relevance to keywords may be a search query for a car show resulting in an advertisement for a car, or a search query for treatment of sun burn resulting in an advertisement for sun tan lotions, or a search query for information for ski conditions resulting in an advertisement for time-share condominiums in the mountains, or a search query for election results resulting in a sponsored content for a political party, and the like.

In embodiments, relevance to the user may be based at least in part on the information relating to the mobile communication facility, including user characteristics such as age, sex, race, religion, area code, zip code, home address, work address, billing address, credit information, family information, income information, birth date, birthplace, employer, job title, length of employment, and alike; user history, such as past interactions with mobile content, web sites visited, phone usage types, and alike; user transactions for purchases and services; geographic location; time of day and time of usage; mobile communication facility characteristics, such as display capability, video capability, cache size, storage capability, memory capacity, and alike; or other such information. Examples of relevance to information relating to the mobile communication facility may include a search query for a car show resulting in an advertisement for a sports car, because personal information about the user indicates that a sports car may be more relevant to the user because the user is young and male with an income that could afford a sports car; or a search query for treatment of arthritis resulting in an advertisement for an electric convertible bed, because information about the user indicates that the user is elderly, and the user has been also recently searching for sleeping aids and has been placing calls from hospitals; or a search query about interior design resulting in sponsored content for a university program for interior design, because information about the user indicates that the user is young, female, living at home, and has recently been searching and visiting universities, furthermore, the relevant advertisement that is selected may be presented on a mobile communication facility in a higher resolution format, because the user's mobile communication facility characteristics indicate that the user's mobile phone is newer model that can accept the higher resolution format of the advertisement.

When the user is persuaded to call the phone number provided by the mobile content, the user may click on a hyperlink to make the call, manually dial the number, enter the number into the mobile communication facility using a voice command, or use some other method to call the number provided. A hyper-link may involve clicking a hyper-linked phone number on the displayed content, or a hyper-linked image on the displayed content. The user may choose to store the displayed phone number for subsequent use, or dial the phone number manually. When the user places the call, the wireless search platform 100 may then store and track the interaction for subsequent billing to the sponsoring agent. The sponsored mobile content may require the user to pay a fee for placing the call. Examples of user-fee calls may be stock information, fan club updates, sports tips, and alike. In the case of user-fee calls, the wireless search platform 100 may directly bill the user's account as a part of the service provided to the sponsoring service.

Another example of a mobile pay-per-call interaction may be a user whose information stored in the mobile search platform 100 shows they are 42 years old, male, married, with three young children, and owns a house. The user's mobile communication facility 102 information shows that the user's device is older, and only capable of processing lower resolution mobile content. In addition, recent user activity shows search queries for toys. The user then inputs a new search query for tent rentals. The mobile search platform's 100 database indicates that it is also summertime. Given this information, the mobile search platform 100 shows a high relevance for supplies to support an outside birthday party for young children. The mobile search platform 100 than delivers an advertisement to the user's mobile communication facility 100 for an inflatable water slide from a local party rental store. The advertisement is displayed in a lower resolution format to coincide with the user's device capabilities. A phone number is provided in the advertisement that the user may now store for later use, click on to call immediately, dial manually, and so on. When the user places the call, the mobile search platform 100 tracks the interaction and directs charges to the party rental store for the user interaction with the displayed phone number.

Another example of a mobile pay-per-call interaction may be a user whose information stored in the mobile search platform 100 shows they are 18 years old, female, and living at home. The user's mobile communication facility 102 information shows that the user's device is new and capable of displaying video content. In addition, recent user activity shows search queries calling for information about members of various rock bands, and downloads of rock videos. The user then inputs a new search query for information about members of the Dave Matthew's Band. Given this information, the mobile search platform 100 shows a high relevance for advertisements for new music and concerts for rock bands. The mobile search platform 100 then delivers an advertisement to the user's mobile communication facility 100 for tickets to a local Dave Matthew's concert. The mobile content is delivered as a short music video, with audio and text that highlights the concert's date and time, and that tickets are still available. The mobile content indicates a hyperlink, with a phone number, to get more information about the purchase of concert tickets. The user may now store the mobile content for later retrieval, or connect immediately for more information. When the user places the call, the mobile search platform 100 may track the interaction and directs charges to the agency selling the concert tickets for the user interaction with the displayed phone number. The mobile search platform 100 may also direct charges to the user's mobile account as a service charge for purchasing the tickets using the mobile pay-per-call functionality.

In embodiments of the present invention, methods and systems may include presenting a link in a user interface of a mobile communication device, where the link is configured to link to a commercial item that is available via a computer network, thus enabling a party to sponsor the link. The link may be to an item of goods or services for sale, to a promotion, to a content item, to an advertisement, or to other material of a commercial provider, such as a vendor of goods or services. The link may, for example, be to an item on an electronic commerce site, to an auction site, to a reverse auction site, to a news site, to an information site, or to other content on a computer network, such as web content, content located on other networks, or the like. The link may include or be associated with various e-commerce features, such as those enabling single click purchasing, bidding, targeted advertising, instant purchasing (e.g., "buy it now"), tracking of clicks or transactions, tracking of referrals, affiliate program features, or the like. In embodiments the link is a sponsored link that is presented to a user on the user interface of a mobile communication facility 102, such as a cell phone. The sponsored link may be presented in association with an implicit query 164 (and may be related to such a query). The sponsored link may be presented in response to entering an explicit query (or partial entry of such a query). The sponsored link may be presented upon making of a telephone call or other action of a user of the mobile communication facility 102. The sponsored link may be presented upon retrieval of results, sorting of results, filtering of results, presentation of results, or routing of results, such as in response to a search function 142 that is executed in response to a query.

In embodiments the right to sponsor a link is obtained via a bidding process among a plurality of candidate sponsors. The bidding process may be automated, whereby a bid (or a reserve bid, reserve price, or the like) is automatically compared to other bids made by other candidate sponsors for a link in an auction format. In other embodiments bids need only meet a required price in order to be accepted. An algorithm facility 144 may determine what link or links relate to "winning" bids for sponsoring particular links. Bids can be for presenting links at a particular position in the user interface, at a particular point in a navigation sequence (such as on a home page, on a search screen, after a call has been made, after a transaction has been executed, after navigation to a particular screen, upon presentation of an implicit query 164, upon entry of an explicit query, upon retrieval of results, upon routing of results, and/or upon consummation of a transaction, or the like). Bids can be made for associating a link with particular content, such as particular forms of queries, particular results, or particular content items. For example, a sponsor who sells golf equipment might bid to sponsor links whenever an implicit or explicit query uses the terms "golf," "tee," or "par," while a sponsor who sells video content might seek to sponsor links when a query uses the terms "movie," "film," "cinema" or "show." In embodiments a bidding process may occur in close proximity in time to the presentation of the link.

In embodiments, an advertisement may be presented to a mobile communication facility based at least in part on receiving a webpage request from the query facility of a mobile communication facility, receiving information associated with the mobile communication facility, and associating at least one advertisement with a webpage at least in part based on the information relating to the mobile communication facility. For example, a user of a mobile communication facility may initiate a search query for "Sonny Rollins." The potential search results that may be presented to the user's mobile communication facility may include advertisements and websites for CD's of Sonny Rollin's music, videos of his performances, etc. Information about the mobile communication facility (e.g., its video streaming capabilities) may be used in order to determine which of the advertisement/webpage results may be presented successfully to the user's mobile communication facility. This information may, in turn, be used to pair webpages and advertisements that are each capable of presenting in the display of the user's mobile communication facility.

In certain embodiments, the right to sponsor the link is obtained via an auction, which may be an online auction.

In embodiments a link may be associated with a disambiguated version of a query, so that a link appears only after the relevancy of a query has been assessed.

In embodiments a sponsored link may be associated with a result that is retrieved via a search that is executed using the mobile communication device 102. For example, a link for a camera vendor may appear only when one of the highest-ranked search results uses the words "digital camera."

In embodiments, the sponsored link may be associated with the sorting of results that are retrieved via a search function 142 that is executed using the mobile communication device. For example, a link may be sponsored (including after a bidding process) only if associated results are ranked sufficiently high after they are sorted (such as being sorted as a result of a ranking or disambiguation process).

In embodiments, a sponsored link may be associated with the filtering of results that are retrieved via a search function 142 that is executed using the mobile communication device. For example, the sponsored link may only appear after certain types of results have been filtered out. For example, a sponsor of travel to Paris, France, might bid to sponsor a link only in situations where results relating to Paris Hilton have been filtered out before results are presented to the user.

In embodiments a sponsored link may be associated with the presentation of results that are retrieved via a search function 142 that is executed using the mobile communication device. For example, if certain results are modified or filtered, such as based on the capability of a particular device to present certain content, a sponsored link may be sponsored only for situations where relevant results can be presented on the mobile communications facility. For example, a sponsor may bid to sponsor links to instructional videos for yoga, but only for presentation on devices that are capable of rendering sample video.

In embodiments a sponsored link may be associated with the routing of results that are retrieved via a search function 142 that is executed using the mobile communication device. For example, if an algorithm facility 144 includes rules for routing certain types of results, a sponsored link may be associated with the execution of such rules. For example, rules related to parental controls 150 may route content or messages to parents if children appear to be attempting to access inappropriate content. A sponsored link may allow a provider of parental control software or services to present a link that is associated with the routed results.

In embodiments, a link may be provided to a commercial item of a party who has not yet sponsored the link. The party may then be offered the opportunity to sponsor the continued presentation of the link. In embodiments, the offer to continue to sponsor the link may be presented to a commercial entity contemporaneously with or upon a user's execution of the link. In embodiments such an offer may include an invitation for the commercial entity to participate in an auction or bidding process for continued sponsorship of the link or for sponsorship of at least one additional link.

In embodiments, the link to a commercial entity may include a phone number for a provider of the commercial item. In embodiments, the phone number may be a dedicated phone number, which, when called by a user, conveys an intermediate message to the commercial entity that includes an offer to continue the link in exchange for an agreement by the commercial entity to pay some consideration, which may be a sponsored link basis, an auction basis, a pay per call basis, or the like.

In embodiments, a generalized process may be used for disambiguating a user query entry 120 by pairing the query information with at least one element from the mobile subscriber characteristics 112 database 112. Once the user submits a query entry 120 via the mobile communication facility 102, the query is wirelessly routed to the wireless communication facility 104 and then to the wireless provider 108. The wireless provider 108 may then abstract data stored in the mobile subscriber characteristics 112 database 112 that is relevant to the user query entry 120. Relevance may be based upon semantic similarities, temporal factors, and geographic and/or demographic congruence between the substance of the query entry 120 and that found in the mobile subscriber characteristics 112 database 112. Once this information is linked, the disambiguation facility 140 may carry out operations to elucidate the probable best meaning of the user's query entry 120 and route the result(s) back through the wireless provider 108 and wireless communication facility 104 to the mobile communication facility 102 for display 172 to the user.

Representative elements that may be stored within the mobile subscriber characteristics 112 database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

Similarly, the query entry 120 may be disambiguated based upon characteristics of the user's mobile communication facility 102 (e.g., unique phone number, device identifier, or other unique identifier), information stored within the mobile communication facility 102 (e.g., information stored in the memory of the device), or information stored on a database associated with a server.

In embodiments, mobile search host facilities 114 may be used for providing mobile communications facility 102 users additional relevant result set(s) based upon a query entry 120. For example, the mobile communication facility 102 may have a cache 2300 of memory wherein salient information is stored, such as aspects of the mobile communication facility 102, the user's profile, and a user behavioral history (e.g., phone calls, websites visited, search queries, frequency of queries, frequency of downloading content, rate changes in the frequency of events, and frequency of purchases).

This information may be automatically refreshed and transferred, at set temporal intervals, from the mobile communication facility 102 to the wireless communication facility 104, and then on to either the user's wireless provider 108 or directly to the mobile search host facilities 114. Within the mobile search host facilities 114, the query content may be filtered by an algorithm facility 144 that scrutinizes the query content for the purpose of providing the user additional suggestions in the result set(s). For example, the frequency of terms used by the user in the query entry 120 may be used by the algorithm facility 144 to suggest related results based upon similar frequency indexing of key words or upon the popularity of query terms and results. As the user amends his query entry 120, the cache 2300 may implicitly transfer the content to the mobile search host facilities 114 for real time processing within the disambiguation facility 140, search facility 142, or other facility within the mobile host search facilities 114.

Additional facilities within the mobile search host facilities 114 may be used to add meaningfulness to the query entry 120. For example, the disambiguation facility 140 may categorize the query entry 120 based upon key words, word frequency, and/or word combinations, thereby enabling the resulting categories, such as title, artist, and yellow page-type categories. Carrier business rules 158, parental controls 150, and a sponsorship facility 162 may also be used to generate suggestions for these and related search query and/or result set(s).

An interactive process between the mobile communication facility 102 and the disambiguation step 210 may be used for unambiguous query formation 2400. Once a user submits a query entry 120 to the mobile communication facility 102, a process of correction 244 may be necessary or helpful for unambiguous query formation 2400 that is sufficient to yield intelligible and useful result set(s). As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112 or parental controls facility 150 may also be integral to the correction 244 process. In embodiments, the search engine may automatically suggest corrections for common misspellings, including those which are unique to the mobile experience (e.g., "2nite")

A user's query entry 120 may return a null result set or an improbable results set. In this case, the search facility 142, in conjunction with the mobile communication facility 102, could automatically trigger correction 244 and iteratively cycle through alternative query entries 120 until a non-null or higher probability result set is delivered.

In embodiments, items which have been more recently added or updated may receive a ranking priority indicative of their freshness.

In embodiments, additional recommendations may be made following a user's query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the query entry 120 search results or presented prior to, or following, the display of the search results.

A user's prior search activities and search results may also be used to create recommendations for the user. Prior search activities may include transactions, search queries, visits to websites, phone calls, and/or other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented that relate to the search query on a display associated with the mobile communication facility 102.

In embodiments, a query entry 120 may be mapped to a taxonomy of query categories and classification schema (e.g., the yellow pages phone book taxonomy).

In embodiments, results may be retrieved based on submitting a query entry 120 in conjunction with information relating to the mobile communication facility 102. This information may include the mobile subscriber characteristics 112, carrier business rules 130, and sponsor information. The additional information stored in these databases may form search parameters that limit the search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the query entry 120 based at least in part on information relating to the mobile communication facility 102. This information may include mobile subscriber characteristics 112, a search algorithm facility 144, parental controls 150, carrier business rules 130, and/or sponsor information. Ordering results related to a query entry 120 based on sponsor information may be done by associating sponsors with key words used in query entries, and/or associating query entries with sponsor content. When a query entry 120 matches a sponsor's keyword(s) or content, that sponsor's information may be prioritized in the search result display, highlighted, or otherwise given superiority over other content related to the query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the addition of multimedia content to the results display, such as adding graphics, audio, or a video stream.

Query results may also be ordered, at least in part, based on the capabilities of the mobile communication facility 102, wherein the capability is an audio, visual, processing, or screen capability.

In embodiments, a query entry 120 may be made by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility's 102 SMS conversion and/or keypad sequence conversion. Additionally, T9 errors may be corrected. For example, if a user seeks "Britney" and dials 2748639. T9 may interpret that as "Argumenw" instead.

In embodiments, a voice-based query entry 120 may be associated with information relating to the mobile communication facility 102, such as voice interpretation based, at least in part, on SMS conversion.

In embodiments, an auction may be associated with a query entry 120. Performing the auction may involve using information relating to the mobile communication facility 102, for example, mobile subscriber characteristics 112, a search algorithm facility 144, a personal filter, parental controls 150, or carrier business rules 130. The result set(s) display may prioritize or highlight sponsor results.

In embodiments, a search query may be entered on a mobile communication facility 102 and results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, aggregated content may be presented to the mobile communication facility 102. Content may be aggregated through a spider, including, for example, ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first, or extraction from content type sites first, where the content was aggregated in relation to information relating to the mobile communication facility 102.

In embodiments, spiders may be used to determine the compatibility between content and the capabilities of mobile communication facilities. For example, a spider may present to a content provider as a particular type of mobile communication facility in order to detect the level of compatibility between that type of mobile communication facility and the content offered by the content provider. Furthermore, a content provider, such as a mobile storefront, may provide different content for each type or class of mobile communication facility. The spider may be able to present to the content provider and determine the associations between a given provider's content classes and types or classes of mobile communication facilities.

In embodiments, spiders may be able to determine the compatibility of content with mobile communication facility types by detecting webpage content qualities that are specific to a type or class of mobile communication facility (e.g., HTML tags, color depth, number of images, size of images, etc). Once the compatibility data is compiled by a spider, the data may be stored in a database and used in conjunction with a search engine to optimize content presentation by sending only compatible content, or the most compatible content available, to the mobile communication facility from which the search query is sent.

Mobile content may require certain capabilities to be enabled on a mobile communication facility 102 for proper presentation of the mobile content to the user. However, at least some of the certain capabilities may not be available on all mobile communication facilities 102. Without proper presentation to the user, mobile content may lack value or interest to the user. It may alternatively cause an inconvenience for the user such as a presentation error, or may cause malfunction of the mobile communication facility 102. The malfunction may include improper actions in response to a user interacting with the mobile content through the mobile communication facility 102 user interface. Such a malfunction may result in a variety of downstream issues for the user as the improper response may include changes in the mobile communication facility 102 configuration, interface, or other aspects.

Aspects of mobile content may be analyzed with respect to compatibility with a mobile communication facility 102. Each aspect may also be ranked based on one or more measures of compatibility. As an example, an aspect of mobile content may involve a rudimentary function of wireless communication. Such an aspect may be ranked based only on meeting a minimum degree of compatibility. In another example, an aspect of mobile content that enables advanced capabilities if they are present in a mobile communication facility 102 may be ranked only for mobile communication facilities 102 that have the capabilities. Other aspects of the mobile content may be ranked for all mobile communication facilities 102.

Measures of mobile content compatibility may vary based on criteria such as mobile communication facility 102 manufacturer, or product line. For example, an aspect of mobile content that is directed toward a specific manufacturer or product line or even model number, such as a BIOS upgrade, may be unranked for use on mobile communication facilities 102 from other manufacturers.

A mobile content rank may include any and all rankings of aspects of the mobile content. The rankings of aspects of the content may be combined in a variety of ways including adding the rankings to generate a mobile content rank total. Each aspect may be weighted such that all aspects may not contribute equally to the total rank. A mobile content rank total may represent a single aspect rank.

Mobile content ranking may also provide an indication of the extent of compatibility based on a ranking range (such as 1 to 10). Alternatively, ranking may provide a binary yes or no measure of compatibility. The ranking may be associated with a specific mobile communication facility 102 model number such that a mobile content may have a plurality of rankings. In an example, a model A of a mobile communication facility 102 may support a subset of features present in a first mobile content, while model B supports all of the features present. In comparison with other mobile content, the first mobile content may be ranked higher than other mobile for model B, while other mobile content may be ranked higher than the first mobile content for model A.

A wireless provider 108 may use mobile content rankings for selecting mobile content to be provided to a mobile communication facility 102. Compatible mobile content may allow a user to interact with the content and thereby increase the chance of the user responding positively to the sponsored content. If the mobile content is not compatible or has poor compatibility, the user may not be able to interact with the content at all. Therefore, mobile content that has greater compatibility with a mobile communication facility 102 may have greater value to the wireless provider 108 because a content sponsor may pay a higher commission for delivering such content than for delivering content that has little or poor compatibility.

Mobile content may include features such as video and audio in a basic format that may be properly displayed on a wide variety of mobile communication facilities 102. However these features may also be adapted in mobile content such that mobile communication facilities 102 with capabilities that support the adapted video may offer the user more satisfaction, reduce time and frustration, or simply enable viewing the video.

Analyzing mobile content may include examining the source of the mobile content such as the HTML source. Syntax and constructs of the source may reveal information about aspects of the mobile content that may be compared to features or aspects of a mobile communication facility 102. Such a comparison may yield an assessment of the compatibility of the mobile content with the mobile communication facility 102. For example, links within the source of the mobile content that link to certain types of data files (such as video, audio, and the like) may indicate the need for certain capabilities in the mobile communication facility 102 to properly present the mobile content. Syntax of the mobile content source may represent specific functions or commands to resources of a mobile communication facility 102. These commands, and/or the arguments included with the commands may be compared to a list of commands and/or arguments supported by a mobile communication facility 102 resulting in analysis of compatibility.

Links and other references to mobile content may also provide information regarding compatibility. While the music file format MP3 is a standard and an iPod supports MP3 formatted files, music files provided on-line by the vendor for the ipod, are not fully compatible with the MP3 standard. This results in these files being incompatible with other vendor's mobile communication facilities 102 that support MP3 files. By examining the links to determine a potential owner of the mobile content, compatibility may be determined.

Links in mobile content may reference other portions of the mobile content and as such the link may not include a file type or owner. Therefore analyzing other aspects of the mobile content may provide a measure of compatibility. One such aspect is the size of the mobile content. A portion of the memory facility 118 on a mobile communication facility 102 may provide storage for mobile content. However the amount of mobile content that can be stored in a mobile communication facility 102 may be limited. Therefore, a measure of compatibility between mobile content and a mobile communication facility 102 may be the size of the mobile content. Mobile content that supports streaming to the mobile communication facility 102 for presentation to the user may overcome content storage limitations in mobile communication facilities 102 with small content storage capacity.

Mobile content may include metadata that may describe or include properties of the mobile content. The metadata may include information such as size, type of content (audio, video, and the like), specific features supported (such as streaming), and the like. Analysis of mobile content may be based, at least in part, on an examination of the metadata. The metadata may include rankings of compatibility with a variety of mobile communication facilities 102. The rankings may be generated by the owner of the content or by a third party such as a wireless provider 108.

Rankings of mobile content may be stored in one or more of the memory facilities of the mobile search platform 100. To ensure the rankings are up to date, the mobile content may be analyzed from time to time and the rankings may be updated. This analysis may be automated by processing the content with a computer program adapted to analyze mobile content. The computer program may execute on a server 134 as herein disclosed.

A mobile communication facility 102 may receive a ranking for mobile content along with the mobile content such that the mobile communication facility 102 may use the ranking to determine if the mobile content should be presented. The determination may be based, at least in part, on user preferences regarding presentation of ranked mobile content. The determination may also be based, at least in part, on a preference of the mobile content owner as it may be provided in the mobile content or the mobile content metadata. While a user may choose to allow the presentation of mobile content that has poor compatibility with an mobile communication facility 102, the content owner may prefer that the content not be presented to the user rather than the content being poorly presented to the user. The mobile content presentation resources (display resource, audio resource, and the like) of the mobile communication facility 102 as herein disclosed may evaluate any or all of the mobile content, the rankings, the metadata, user preferences, owner preferences and the like to make a determination of presentation.

In embodiments, a sponsored link may be displayed on a display associated with a mobile communication facility 102 that allows a vendor associated with the sponsored link to selectively receive a connection or receive search results (including a sponsored phone number) where an economic transaction takes place when the sponsored number is at least one of those called and answered.

In embodiments, content may be delivered to a mobile communication facility 102 based at least in part on information relating to the mobile communication facility 102, and later content may be produced as the result of a search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance following one or more search query entries on a mobile communication facility 102. The report may contain information relating to search result quality, keyword management, and revenue generation, and it may be segmented by the type of mobile communication facility 102 used.

In embodiments, a query entry 120 may be made in a search box of a mobile communication facility 102 where the search box is presented on an idle screen.

In embodiments, a search query may be entered into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship may be generated between a query entry 120 and at least one mobile subscriber characteristic. The mobile subscriber characteristics 112 may include location, personal information, history of the user's web interactions, and or other characteristics, which may also be used in combination with other data concerning the subscriber, the mobile device, and so forth.

In embodiments, a relationship may be generated between a query entry 120 and the location of a mobile communication facility 102 using a location-based service. The relationship may be between at least one query entry 120 and the location and a time of day. Location may be provided by a GPS system or a cell phone triangulation service.

In embodiments, results may be produced based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be processed through a results facility 148 in which the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 on a mobile communication facility 102 may be, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 on a mobile communication facility 102 may be processed in association with information relating to the mobile communication facility 102. This information may reside locally on the mobile communication facility 102, or it may be stored remotely, for example, in a mobile subscriber characteristics 112 database.

In embodiments, a query entry 120 may be processed on a mobile communication facility 102 that provides a parental control facility to regulate the results produced on the mobile communication facility 102. The parental controls 150 may be regulated through a server application or through the mobile communication facility 102.

Content that is available for viewing on a mobile communication facility 102 may include adult content that may be restricted for presentation only to a subset of users through the use of an authorization process. In one aspect, an authorization process for enabling or restricting the presentation of adult content may include receiving a search request, receiving information relating to a mobile communication facility, and determining, based at least in part on information relating to a mobile communication facility 102, if the mobile communication facility is authorized to receive a type of mobile content relating to the search request. Mobile content may be a sponsored content, a sponsored link, a sponsored call, a downloadable content, an audio stream, a video, a graphic element, or other form of adult content. Mobile content may be a blended content which combined non-adult and adult content. The search request may be initiated by a mobile communication facility, including a phone, mobile phone, cellular phone, and or a GSM phone.

In embodiments, adult content, such as pornographic content, gaming content, gambling content, lottery content, or other mobile content appropriate for adults may be restricted by monitoring information relating to a mobile communication facility 102 that is the intended recipient of such content. The information relating to a communication facility may be a user characteristic, such as age. The user characteristic may be selected from the group consisting of age, sex, race, religion, area code, zip code, home address, work address, billing address, credit information, family information, income information, birth date, birthplace, employer, job title, and length of employment. The user characteristic may be stored in a mobile subscriber characteristics database. The information relating to a mobile communication facility may also include a user history, user transaction, a geographic location, a user device or a time. The information relating to a communication facility may be provided by a wireless operator, a wireless service provider, and or a telecommunications provider.

In embodiments, the information relating to a communication facility may be mobile content authority information. The mobile content authority information may be derived from a mobile subscriber characteristic database 112. The mobile content authority information may be logged per an administrator's request.

In embodiments of the method and system, the determination if a mobile communication facility is authorized to receive a type of mobile content may be based at least in part on information relating to a user of a mobile communication facility. For example, a user of a mobile communication facility 102 may enter the text query entry 120 of "gambling." Information relating to the mobile communication facility 102 that may be stored in a mobile subscriber database 112 may indicate that the user has an age of 30 years. Because this age exceeds that age of maturity, the adult content related to gambling may be authorized to present to the user's mobile communication facility 102. Alternatively, a user characteristic such as age may be used to set an authority information in advance of a user's request for adult content. For example, in the previous example the user had an age in excess of the age of maturity. This information may permit a general authorization for this user to access adult content on the mobile communication facility 102 that is associated with the user, regardless of whether a search request for mobile content has been received. This authorization may be made by a wireless operator, wireless provider, telecommunications provider, an individual (e.g., a parent), or any other party interested in determining the content that is authorized to present to a mobile communication facility.

In embodiments, an authorization to view adult content may be used by an individual to set an authorization using a logged administrator's request. For example, a parent may want to ensure that their child is not able presented adult content on a mobile communication facility 102. The parent may be able to serve as an administrator of the child's phone and log onto an authorization facility that may be maintained by a wireless operator, wireless provider, and or a telecommunications provider, and the like. Once logged onto the authorization facility, the parent may be presented with a menu of content types and set a unique authorization level for each content type. For example, such a menu may include a taxonomy. Such a taxonomy may include, but is not limited to, a set of search verticals, such as, "sports," "weather," "blogs," "gambling," "news," "pornography," "health," "food," and so forth. Within such as taxonomy a parent may be able to select to authorize or not authorize the presentation of content from that search vertical, or category, to the child's mobile communication facility 102.

In embodiments, an authorization facility may have key words that an administrator can accept or block from a search query entered into the query entry facility 120 of the child's mobile communication facility 102. For example, an administrator may block a query entry facility from accepting query entries that include keywords that are commonly associated with adult content, such as, gambling terms of art like "team parlay" or "betting line," explicit references common to pornography, terms associated with lotteries, such as "power ball," "pick 3," and the like.

In embodiments, an authorization facility may combine elements of a taxonomy-based authorization with a keyword-base authorization. For example, an administrator may choose to block the presentation of search results derived from a search query naming genitalia which are related to the search vertical "pornography," but permit search results to present which are derived from the search vertical "Health."

In embodiments, a query entry 120 may be processed on a mobile communication facility 102 that provides a privacy facility 152 associated with the mobile communication facility 102 to protect a user from loss of personal or other sensitive information relating to the search query.

In embodiments, a query entry 120 may be processed on a mobile communication facility 102 that provides a transactional security facility 154 associated with the mobile communication facility 102, in which the transactional security facility 154 is adapted to enable secure transactions associated with the query entry 120. The transactional security facility 154 may involve the protection of privacy 152 and may be operated in association with parental controls 150 or digital rights management.

In embodiments, a query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be processed on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link, presented as text, as a picture, as a video, or as an interactive application. Content may be formatted for the mobile communication facility 102 and relate to webpage content or links for syndicated advertisements.

In embodiments, a query entry 120 may be disambiguated on a mobile communication facility 102 and a related query suggested based, in part, on information relating to a mobile communication facility 102. The information relating to the mobile communication facility 102 may be the frequency of queries, frequency of downloading content, rate changes in the frequency of events, and frequency of purchases. This information may be stored locally, on the mobile communication facility 102 in the device cache, or remotely. The cache may be updated during inactive search periods.

Disambiguation may occur by suggesting additional queries based upon the frequency of terms used in the initial query entry 120 or upon the category of terms used (e.g., title, artist, or yellow pages taxonomy). Suggestions may be updated following the entry of new keystrokes on the mobile communication facility 102. Disambiguation may also be based upon information contained in a mobile subscriber characteristics 112 database, the type of mobile communication facility 102 used to make the query, carrier business rules 130, a search algorithm facility 144, a term frequency algorithm (based upon the popularity of results or query terms), or parental controls 150.

In embodiments, a disambiguated query entry 120 may be corrected based, in part, on information relating to the mobile communication facility 102 (e.g., device capabilities), mobile subscriber characteristics 112, or parental controls 150. During disambiguation, if no results are received from the search facility 142, the query may be corrected automatically prior to displaying the results. If the received result from the search facility 142 is estimated as unlikely, the mobile communication facility 102 may present an indication of this result on its display, for example, the LCD screen of a cellular phone.

In embodiments, a query entry 120 may be disambiguated on a mobile communication facility 102 by making recommendations based, in part, on information relating to the mobile communication facility 102, such as the subscriber characteristics, carrier business rules 130, or sponsor information. The recommendation may be presented in coordination with presentation of the search results, in the same display as the search results, or prior to, or following, the presentation of the search results.

Disambiguating a query entry 120 on a mobile communication facility 102 may also occur by providing recommendations based upon the relationship between prior search activity and search results developed from the query entry 120. Prior search activity may include transactions, searches, or other query behavior. Carrier business rules 130 may also be used to disambiguate a query entry 120, as may the location of the mobile communication facility 102, the time of day, the time of a query entry 120, or personal filters (e.g., a collaborative filter). For example, the pairing of location and time of day information may offer recommendations to a user that is looking for transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, a query entry 120 may be disambiguated on a mobile communication facility 102 and classifications presented of search categories related to the disambiguated search query on a display associated with the mobile communication facility 102.

In embodiments, a query entry 120 may be disambiguated on a mobile communication facility 102 by mapping the disambiguated search query to a query classification of category taxonomies (e.g., the yellow pages taxonomy).

In embodiments, a query entry 120 may be disambiguated on a mobile communication facility 102 by retrieving results based on the disambiguated search query in conjunction with information relating to the mobile communication facility 102, such as mobile subscriber characteristics 112, carrier business rules 130, or sponsor information. Sponsor information may be used to determine the display parameters of the results. For example, results may be prioritized, highlighted, or restricted based upon sponsor information. Sponsor information may derive, in part, from a sponsor auction in which competitive bidding takes place to determine what sponsor information is associated with keywords that may be used in users' query entries.

In embodiments, a search query may be disambiguated on a mobile communication facility 102 by ordering the results based, in part, on information relating to the mobile communication facility 102, such as mobile subscriber characteristics 112, a search algorithm facility 144, parental controls 150, carrier business rules 130, or sponsorship information. Disambiguation based on sponsor information may be done by using the sponsor of the key word used in the query entry 120 or the sponsor of the resulting search content. The sponsored content may be prioritized or highlighted for display. Sponsor information used for this prioritizing may result from an auction in which sponsors bid for the right for their content to be associated with certain keywords that may be used in users' query entries.

Other disambiguation ordering rules may be related, in part, to the amount of content within a result category, the carrier business rules 130, mobile subscriber characteristics 112, a search algorithm facility 144, a personal filter, parental controls 150, sponsorship information, or the capabilities of the mobile communication facility 102, such as display screen size or audio, visual, or processing capabilities.

In embodiments, a query entry 120 may be disambiguated on a mobile communication facility 102 by producing predictive text based, in part, on information relating to the mobile communication facility 102, such as the carrier business rules 130, mobile subscriber characteristics 112, a search algorithm facility 144, a personal filter, parental controls 150, or sponsorship information. The predictive text may involve SMS conversion or keypad sequence conversion and may be based, in part, on a custom generated dictionary derived from information relating to the mobile communication facility 102.

In embodiments, an ambiguous voice query entry 120 may be disambiguated on a mobile communication facility 102 where the interpretation of the voice is based, in part, on information relating to the mobile communication facility 102, is based on weighted probabilities relating to a user, or is based on SMS conversion.

In embodiments, a query entry 120 may be disambiguated on a mobile communication facility 102 by performing an auction related to the query, where the results are based, in part, on the auction. Auction results may be used to prioritize the display of sponsor results or to highlight information from high-bidding sponsors. Performance of the auction may be based in part on mobile subscriber characteristics 112, a search algorithm facility 144, a personal filter, parental controls 150, or carrier business rules 130.

In embodiments, a query entry 120 may be disambiguated on a mobile communication facility 102 by presenting results on the screen of the mobile communication facility 102 and performing a transaction in association with a sponsored link. An economic transaction may arise from the user clicking on a sponsored link or purchasing downloadable content.

In embodiments, a query entry 120 may be disambiguated on a mobile communication facility 102 by presenting aggregated content to the mobile communication facility 102. Aggregation may occur through the use of a spider. Aggregated content may include ringtone content, music content, or video content. A spider may also be used to determine the compatibility between the available content and the capabilities of the user's mobile communication facility 102. Compatibility may be determined through mock mobile communication facility 102 trials during which the spider extracts results from sites on a preferred basis (based upon WAP compatible content or content type).

In embodiments, a query entry 120 may be disambiguated on a mobile communication facility 102 by selecting a sponsored link for display on the mobile communication facility 102 and allowing a vendor associated with the sponsored link to selectively receive a connection. Alternatively, a query entry 120 may be disambiguated by receiving search results that include a sponsored phone number, and an economic transaction takes place when the sponsored number is called and answered.

In embodiments, disambiguated content may be delivered to a mobile communication facility 102 based, in part, on information relating to the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance and, in turn, based in part on one or more disambiguated search query entries on a mobile communications facility. The report may contain information relating to search result quality, keyword management, and revenue generation, and it may be segmented by the type of mobile communication facility 102 used.

In embodiments, a query entry 120 may be disambiguated in a search box of a mobile communication facility 102 where the search box is presented on an idle screen.

In embodiments, a query entry 120 may be disambiguated that is entered into a query entry 120 facility on a mobile communication facility 102.

In embodiments, a query entry 120 may be disambiguated in a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship between a query entry 120 and at least one mobile subscriber characteristic may be disambiguated. The mobile subscriber characteristics 112 may include location, personal information, history of the user's web interactions, or a plurality of characteristics, such as location and the time of day.

In embodiments, a query may be disambiguated by generating a relationship between a query entry 120 and the location of a mobile communication facility 102 using a location-based service. The relationship may be between at least one query entry 120 and the location and a time of day. Location may be provided by a GPS system or a cell phone triangulation service.

In embodiments, results may be disambiguated based at least in part on a disambiguated query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a disambiguated query entry 120 may be processed through a results facility 148 where the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 may be disambiguated on a mobile communication facility 102 where the query is at least in part processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be disambiguated on a mobile communication facility 102 that processes the query in association with information relating to the mobile communication facility 102. This information may reside locally on the mobile communication facility 102, or it may be stored remotely, for example, in a mobile subscriber characteristics 112 database.

In embodiments, a query entry 120 may be disambiguated on a mobile communication facility 102 that provides a parental control facility to regulate the results produced on the mobile communication facility 102. The parental controls 150 may be regulated through a server application or through the mobile communication facility 102.

In embodiments, a query entry 120 may be disambiguated on a mobile communication facility 102 that provides a privacy facility 152 associated with the mobile communication facility 102 to protect a user from loss of personal or other sensitive information relating to the search query.

In embodiments, a query entry 120 may be disambiguated on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a disambiguating query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be disambiguated on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, pay-per-click and pay-per-call program integration onto mobile communication facilities 102 may enable a wireless provider 108 to deliver targeted, keyword-based ads and content to mobile users searching for specific goods and services at the precise moment a user expresses a need. Pay-per-click advertising, often referred to as "search engine marketing" or "keyword advertising," operates on the principle of pay-for-performance; through this channel, advertisers may pay only for the "clicks," or web site visits, they receive through their text-based advertisement. Businesses may place their ads for specific search phrases (or "keywords") that best describe their company or products. Advertisers generally use several different keywords for their ads, trying to maximize the number of searches for which they will appear (e.g., Sony may try to advertise for the search phrases "DVD player," "Television," "Mobile phone," etc.). Search engine marketing operates through a real-time auction-based pricing model in which advertisers "bid" to appear for their relevant keywords. The advertiser's position, or rank, in the paid listings is determined by the bid price, with the top position going to the highest bidder. Given the wide range of popularity for keywords, competition varies drastically for keywords; bid prices for the most popular keywords are driven up as they attract more advertisers. Keyword competition may be driven by several factors, including: a product's average sale price, customer acquisition cost, and number of competitors. Advertisers may create their own ads through a self-service or sales-assisted web interface. Examples of web-based pay-per-click products include Google AdWords, Yahoo! Search Marketing, MIVA and Lycos InSite™ AdBuyer.) When creating an ad, the advertiser may supply information, such as, an ad title, URL, description, and/or website URL. Pay-Per-Call advertising combines search functionality 142 with live on-the-phone interaction, resulting in a powerful marketing opportunity for local businesses.

Pay-per-call advertising operates on the same principle as pay-per-click, in that advertisers "bid" to appear in specific search results or directory categories, and are charged only when a consumer who sees their ad places a call to the advertiser's listed phone number (a system-generated toll-free number that redirects the user to the company's true number). An advertiser's position in the list of paid results is determined by the bid amount, with the highest bid yielding the top position. Unlike traditional search advertising, however, Pay-per-call advertising may be able to tap into the uniquely high level of user "intent," by connecting qualified mobile consumers directly with businesses—at the exact moment they are searching for specific goods and services. Pay-per-call listings may be presented above traditional directory or "yellow pages" results.

In embodiments, third-party pay-per-call inventory may be supplied to in the form of XML feeds, each of which returns specific results data on a per-query basis about the keyword match, the advertiser and ad information, bid price, and geographic filter settings. This information may then be parsed and packaged in a result set stacked on top of "natural" yellow page listings. A yield optimization algorithm may be used to ensure that each query is answered with a relevant and monetizable set of paid content. The yield optimization algorithm considers several variables to determine placement and rank simultaneously, including, relevancy, geography, click-through/call-through rate, and bid price. Relevancy may be, in part, determined by the query string including keyword, location, and ultimately demographic/behavioral factors that may be matched to information supplied in the advertisement and/or the assigned business categories. For geography, it may be possible to present only those businesses serving the respective geographical areas (zip code, city, state) as specified by the advertiser. The algorithm for the click-through/call-through rate may also consider the frequency with which users actually place the call to the advertiser in determining best query match. Bid price refers to the placement and rank of a given advertisement as determined, in part, by the amount paid by the advertiser.

In embodiments, advertisers may create and manage their mobile search pay-per-click advertising campaigns through a user interface that permits ad creation, selection of keywords to associate with the ad(s), and/or service area(s) in which to make the ad accessible, and place a bid for the service. For example the advertiser may begin by entering the ad creative content, including the ad title, a "Landing page" URL/address (page to which user will be brought—not displayed), the "Display" URL/address (address to be displayed in ad), and an ad description (1-2 lines; for display in ad). The advertiser may then enter keywords (search phrases) for which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). Finally, the advertiser may wish that the ad(s) target only a subset of users, such as, only users residing in a particular geographic region, meeting a set of demographic user characteristics, and/or users with a particular mobile communication facility 102.

Once an advertiser has selected one or more of the above criteria, the advertiser may then set a specific, or maximum, price that they are willing to pay for a click through to their web site. Bids may be for each keyword associated with a given ad, or any other criterion, or combination of criteria used by the advertiser to target the placement of their ad(s). Bids may be placed individually by keyword, or an advertiser can apply one bid price across all new keywords for the new ad. Advertisers will also be able to view the top bids for each keyword directly through the user interface, in order to gauge keyword competition and to ensure their ad appears in the desired position. The bidding process may also include "Auto-Bid" functionality that allows the platform to manage an advertiser's bids directly. For instance, by specifying the desired position for the ad and a maximum amount that an advertiser is willing to pay for each click, the advertiser may allow the system to monitor the competitive landscape and adjust the advertiser's bids to pay only the minimum that is required to secure the desired spot (up to but not exceeding the specified maximum).

In embodiments, advertisers may create and manage their mobile search pay-per-call advertising campaigns through a user interface that permits ad creation, selection of details to associate with the ad(s), and/or service area(s) in which to make the ad accessible, and place a bid for the service. The advertiser may begin by entering the general contact information for the business, including: the business name, mailing/contact address, phone number (number where advertiser wishes to receive call; ad may display system-generated toll-free number), and/or the ad description. The advertiser may also enter additional pieces of information and functionality pertaining to each ad, including: setting the daily callable hours/schedule (the advertiser may specify a time of day when it wants an ad to appear), upload company logo to appear with ad, enter coupon information (e.g., the advertiser may set campaign-specific discounts for users who reach a specific ad. The advertiser may then enter keywords (search phrases) in response to which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). The advertiser may choose that the ad(s) target only a subset of users such as users residing in a particular geographic region, meeting a set of demographic user characteristics, and/or having particular types of a mobile communication facility 102. Advertisers may set the specific price they will be charged whenever they receive a call through the pay-per-call system. They may have the ability to view in real-time competitors' prices per category in order to ensure their ad appears in the desired position and to optimize their performance.

In embodiments, keyword sales sponsored listings (both pay-per-click and pay-per-call) may go through an administrative and editorial review to ensure an ad pertains to the business and the categories selected by the advertiser, and that the ad will be deemed appropriately relevant by a yield optimization algorithm.

In embodiments, pay-per-click and pay-per-call advertisements may be priced as "pay-for-performance," in that the advertiser is charged only for those calls successfully placed through the mobile communication facility 102 interface. It may be possible to configure the platform such that advertisers are not charged for repeat calls, short calls (e.g., a wrong number or other unintentional call), and/or hang-ups or disconnections. In addition to flat per-call charges, some specific calls (e.g., calls exceeding a given time threshold) may be subject to overage fees.

A mobile content website may contain web pages including text. The text may be unrelated to navigation or activation links on the web page, yet may provide valuable insight into the value and purpose of the website. Alternatively the text may be related to navigation links which, when clicked by a user or search engine, may open a different web page within the mobile content website (an internal link). Text may be related to navigation links which, when clicked by a user or search engine may open a web page outside of the mobile content website (an external link). The text may also be related to action links such as links for ordering products, enrolling in email lists, viewing videos, selecting one or more options, and the like.

The various texts on a mobile content website may include terms (words, phrases, expressions, and the like) which are relevant in one or more ways to the product, service, business, function, or purpose of the mobile content website. If the text is presented in substantially complete sentences, it may also include terms which, while important to the readability of the text, are not relevant to the mobile content website. The text may also include terms that are relevant to one or more action links (such as ordering, or a user name input window, and the like), yet may not provide substantially valuable insight into the value or purpose of the mobile content website.

Another text aspect associated with a mobile content website is the inbound links to the website on other website pages. These in-bound links and their associated text may also include terms that are highly relevant to the value and/or purpose of the mobile content website.

Yet another text aspect associated with the mobile content website is a telephone listing. A phone number listing, in a white or yellow pages, or other directory such as an on-line directory, may also include terms (and contact information) relevant to the mobile content website.

Sponsors of mobile content websites may be desirous of promoting their websites to mobile communication users. Mobile communication users may be desirous of learning about the mobile content website, so they may use a mobile search service to help them identify websites in which they may be interested. A technique used by search services, particularly those associated with websites, is to match keywords input by a user to relevant terms associated with websites. Therefore a sponsor may prefer to have a method or system to analyze their mobile content website to identify relevant terms, and perhaps rank the terms to identify the most popular or useful terms. A sponsor may further use the analysis system or method to improve website text such that relevant terms more closely match popular or useful keywords.

In embodiments, a method or system may be used to analyze a mobile content website to identify keywords that represent relevant terms used on the mobile content website. As an example, an automated system may process each page of the mobile content website counting terms in the text, resulting in counts of each term on the website. Further processing through one or more filters for filtering out common terms (such as prepositions) may result in a count of unique, relevant terms in the text. Further processing the words into groups such as those terms related to action links, internal links, external links, and the like may result in an analysis of relevant terms of a mobile content website. The result may be summarized as a report and may be presented to the sponsor.

In embodiments, a mobile content website may be periodically analyzed for changes in content for purposes of assessing the relevance of keywords previously generated. For example, a sponsor may update a website to such an extent that the website content that was previously associated with keywords is no longer reliable (i.e., the updated content and existing keywords no longer have high relevancy). When this occurs, the system may send an alert to the sponsor indicating that the relevance of the keywords is reduced and may recommend revising the keywords being financed in the marketing program.

In embodiments, a search query may be suggested by correcting the suggested search query based, in part, on information relating to a client device. Once a user receives a suggested query entry 120, a process of correction may be necessary for unambiguous query formation that is sufficient to yield intelligible and useful result set(s). As part of the correction process, information specific to the type of mobile communication facility 102 may be used; for example, if the device has unique delivery capabilities, the suggested query may need correction in order to derive a result set compatible with these capabilities. Information stored in the mobile subscriber characteristics 112 database or parental controls 150 facility may also be integral to the correction process.

It is possible that a suggested query returns a null result set or improbable results set. In this case, the search facility 142, in conjunction with the mobile communication facility 102, could automatically trigger correction and iteratively cycle through alternative suggested queries until a non-null or higher probability result set is delivered.

In embodiments, additional recommendations may be made following a suggested query entry 120 based upon the information related to the mobile communication facility 102. For example, mobile subscriber characteristics 112, carrier business rules 130, or sponsor information, in conjunction with the suggested query entry 120, may suggest relevant recommendations for the user. The recommendations may be paired with the suggested query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented related to the suggested search query on a display associated with the mobile communication facility 102.

In embodiments, a suggested query entry 120 may be mapped to a taxonomy of query categories and classification schema (e.g., the yellow pages phone book taxonomy).

In embodiments, results may be retrieved based on submitting a suggested query entry 120 in conjunction with information relating to the mobile communication facility 102. This information may include the mobile subscriber characteristics 112, carrier business rules 130, and sponsor information. The additional information stored in these databases may form search parameters that limit the suggested search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the suggested query entry 120 based at least in part on information relating to the mobile communication facility 102. This information may include mobile subscriber characteristics 112, a search algorithm facility 144, parental controls 150, carrier business rules 130, and/or sponsor information. Ordering results related to a suggested query entry 120 based on sponsor information may be done by associating sponsors with key words used in suggested query entries and/or associating suggested query entries with sponsor content. When a suggested query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the option to add multimedia content to the results display, such as graphics, audio or a video stream.

Suggested query results may also be ordered, in part, on the capabilities of the mobile communication facility 102, wherein the capability is an audio, visual, processing, or screen capability.

In embodiments, a query entry 120 may be suggested by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a query entry 120 may be suggested by associating a voice-based query entry 120 with information relating to the mobile communication facility 102, such as voice interpretation based, at least in part, on SMS conversion.

In embodiments, an auction may be associated with a suggested query entry 120. Performing the auction may involve using information relating to the mobile communication facility 102, such as mobile subscriber characteristics 112, a search algorithm facility 144, a personal filter, parental controls 150, or carrier business rules 130. The result set(s) display may prioritize or highlight sponsor results.

In embodiments, a search query may be suggested on a mobile communication facility 102, results presented on a screen associated with the mobile communication facility 102, and a transaction performed in association with a sponsored link, where the transaction may occur by the user clicking on a sponsored link or engaging in a commercial transaction, such as purchasing downloadable content.

In embodiments, a search query may be suggested by presenting aggregated content to the mobile communication facility 102. Content may be aggregated through a spider, for example ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a query entry 120 may be suggested by displaying a sponsored link on a display associated with a mobile communication facility 102 that allows a vendor associated with the sponsored link to selectively receive a connection or receive search results (including a sponsored phone number) wherein an economic transaction takes place when the sponsored number is at least one of those called and answered.

In embodiments, content may be delivered to a mobile communication facility 102 based at least in part on information relating to the mobile communication facility 102 and later produce content as a result of a suggested search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102. For example, it may be cached locally with the cache memory and blended with server updates and/or periodically updated in the background (i.e., without requiring user keystrokes) according to the time of day and/or changes in location of the mobile communication facility 102.

In embodiments, a wireless carrier report may be generated based upon the click through performance following one or more suggested search query entries on a mobile communications facility. The report may contain information relating to search result quality, keyword management, or revenue generation, and it may be segmented by the type of mobile communication facility 102 used.

In embodiments, a query entry 120 may be suggested in a search box of a mobile communication facility 102 where the search box is presented on an idle screen.

In embodiments, a search query may be suggested related to a query entered on a mobile communication facility 102, where the suggestion is a plurality of suggestions that may be presented on a display associated with the mobile communication facility 102.

In embodiments, a query entry 120 may be suggested that is entered into a query entry 120 facility on a mobile communication facility 102.

In embodiments, a search query may be suggested into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a search query may be suggested by generating a relationship between a query entry 120 and at least one mobile subscriber characteristic. The mobile subscriber characteristics 112 may include location, personal information, history of the user's web interactions, or a plurality of characteristics, such as location and the time of day.

In embodiments, a search query may be suggested by generating a relationship between a query entry 120 and the location of a mobile communication facility 102 using a location-based service. The relationship may be among at least one query entry 120 and the location and a time of day. Location may be provided by a GPS system or a cell phone triangulation service.

In embodiments, a query may be suggested by producing results based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be suggested by processing a query entry 120 through a results facility 148 where the results facility 148 is associated with information derived from the mobile communication facility 102, such as mobile subscriber characteristics 112 information. Suggested queries and their corresponding results may adapt to changes in the popularity rank of content, the frequency of queries regarding content, acceleration/deceleration in query activity associated with content, frequency of purchases, high/low sales conversion rate, and any change in these measures associated with content. Content may also be "de-duped" with frequent terms, such as "Tyra Banks out of 1, 2, 3," and categorized by title, artist, and/or a yellow pages taxonomy.

In embodiments, a search query may be suggested on the mobile communication facility 102. Disambiguation of the suggested query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, query entries may be suggested on a mobile communication facility 102 where an original search query related to the suggested search query is, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be suggested on a mobile communication facility 102 that processes the suggested query in association with information relating to the mobile communication facility 102. This information may reside locally on the mobile communication facility 102, or it may be stored remotely, for example, in a mobile subscriber characteristics 112 database.

In embodiments, a query entry 120 may be suggested on a mobile communication facility 102 that provides a parental control facility to regulate the results produced on the mobile communication facility 102 based. The parental controls 150 may be regulated through a server application or through the mobile communication facility 102.

In embodiments, a query entry 120 may be suggested on a mobile communication facility 102 that provides a privacy facility 152 associated with the mobile communication facility 102 to protect a user from loss of personal or other sensitive information relating to the search query.

In embodiments, a query entry 120 may be suggested on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a query may be suggested by processing a query entry 120 in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information 112.

In embodiments, a query entry 120 may be suggested on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, additional recommendations may be made following a corrected query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the corrected query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products that may be used independently or in relationship to one another, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.) By combining such information, cross-selling opportunities may exist between products (e.g., recording artists of a similar genre), as well as better targeting new products to users based on predicted needs (e.g., recommending a taxi service when a user purchases movie tickets).

In embodiments, classifications of search categories may be presented related to the corrected search query on a display associated with the mobile communication facility 102.

In embodiments, a corrected query entry 120 may be mapped to a taxonomy of query categories and classification schema (e.g., the yellow pages phone book taxonomy).

In embodiments, results may be retrieved based on submitting a corrected query entry 120 in conjunction with information relating to the mobile communication facility 102. This information may include the mobile subscriber characteristics 112, carrier business rules 130, and sponsor information. The additional information stored in these databases may form search parameters that limit the corrected search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the corrected query entry 120 based at least in part on information relating to the mobile communication facility 102. This information may include mobile subscriber characteristics 112, a search algorithm facility 144, parental controls 150, carrier business rules 130, and/or sponsor information. Ordering results related to a corrected query entry 120 based on sponsor information may be done by associating sponsors with key words used in corrected query entries and/or associating corrected query entries with sponsor content. When a corrected query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio or a video stream.

Corrected query results may also be ordered, at least in part, on the capabilities of the mobile communication facility 102, wherein the capability is an audio, visual, processing, or screen capability.

In embodiments, the mobile communication facility 102 may be able to display certain Internet content without having to launch a WAP browser. In such cases, content may be directly displayed. Such content may optionally receive a preferential ranking, particularly on devices with relatively slow processing of WAP content.

In embodiments, content may be recommended in relation to a search query on a mobile communication facility 102 where the recommendation is presented in classifications of search categories. The recommendation may optionally specify the category rather than particular results.

In embodiments, an auction may be performed related to a search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, alternative content may be recommended that is related to search results received through a mobile communication search, and a transaction related to the alternative content may be performed. The transaction may occur by the user clicking on a sponsored link or engaging in a commercial transaction, such as purchasing downloadable content.

In embodiments, recommendations of alternate content may be aggregated in relation to search results associated with a mobile communication search query. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for extraction from a WAP compatible content site first or extraction from content type sites first, where the content was aggregated in relation to information relating to the mobile communication facility 102.

In embodiments, alternate content may be recommended that is related to search results associated with a mobile communication query 120, where the content is associated with outbound pay per call marketing.

In embodiments, content may be downloaded that is related to information associated with a mobile communication facility 102 by making a recommendation of alternate content related to the downloaded content. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of recommended alternate content. The report may contain information relating to search result quality, keyword management, or revenue generation, and it may be segmented by the type of mobile communication facility 102 used.

In embodiments, alternative content may be recommended in relation to an open web search result on a mobile communication facility 102. The alternative content may be ringtones, music, video, and downloadable content or purchasable downloadable content.

In embodiments, a query may be entered in a query entry 120 facility associated with a mobile communication facility 102 and present recommended alternative content relating to results received.

In embodiments, content may be recommended in relation to search results associated with a mobile communication facility 102 query, where the alternative content is based at least in part on mobile compatible page rank. The mobile compatible page rank may derive from the page's compatibility with the screen, processing capability of the mobile communication facility 102, or upon the complexity of the page(s).

In embodiments, alternative content may be recommended in relation to search results associated with a mobile communication facility 102 query, where the alternative content is provided by a data facility (e.g., a WAP facility or a carrier facility).

In embodiments, content may be recommended in relation to search results associated with a mobile communication facility 102 query, where the recommendation is, in part, related to a mobile subscriber characteristic. The mobile subscriber characteristics 112 may include location, personal information, history of the user's web interactions, phone calls, or a plurality of characteristics, such as location and the time of day.

In embodiments, an action bar may provide functionality to be performed on an item on both the results listing page and the results detail page. These actions may include: buy, preview, call, and more information. With the exception of more information, which displays the item details page, the actions may be available both on the result listings page as well as the item details page. Pressing left and right inside the action bar moves focus between actions. Pressing up and down moves focus from the action bar to whatever item is above or below. Pressing select may execute the action or display a confirmation screen. If a confirmation screen is displayed, pressing select may then execute the action and pressing left may return to the previous screen.

In embodiments, the search history may provide a means of navigating to the results of specific queries that have been performed in the past. Pressing select on a search history item may perform a search query with the elements of the original search and display the results.

In embodiments, there may be application background activity performed, such as a throbber, suggestions, results, previews, and a hint-of-the-day and/or other promotional material. A throbber refers to a graphical notification to the user that data traffic is occurring and that the screen will change as more content is received. In general, a throbber indicates data retrieval in the following ways: On the suggestion screen, the throbber may run until all suggestions are fully downloaded; on the results categories screen until the full list of categories have been received; on a results listing screen the throbber may run until all results, minus previews, are downloaded. The throbber may also run while an audio or video preview is being downloaded once the user has selected the Preview action from the Action Bar.

Suggestions may be retrieved from the cache on text entry input. If the cache cannot provide a full list of suggestions, a request may be sent to the server. These updated suggestions may then be cached to speed up future suggestion queries. Independent of the suggestions retrieved from the cache and server are the suggestions provided by searching the Personal Information Manager (PIM) data. This may include Contacts, Events, and Notes entries. The suggestion cache may also be updated during idle time by asking the server for an updated set of suggestions to store in the cache. Idle time may be defined as any point at which the application is running but not making other HTTP requests.

Results may be downloaded when the user requests the list of results. The results may come in two parts, a categories header and the results body. The header may be parsed first to show users the categories in which their results will return, and then each result entry placed into one or more of those categories.

Previews may be downloaded in one of two ways: a direct user request (e.g. the user pressing play on a preview), or pre-fetching after the result stream has ended. If the user has not directly requested the preview to be downloaded, the throbber may not be animated and the user may have no indication that the preview is being fetched in the background.

The hint-of-the-day or other promotional content may be downloaded during idle time of the application. This content may consist of text and/or images that are saved to the phone's memory for display on the next time the application launches.

In embodiments, content may be downloaded to a mobile communication facility 102 based, in part, on information relating to the mobile communication facility 102, classifying a search query, and displaying the results within the search query class(es). The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of classified search queries on a mobile communications facility. The report may contain information relating to search result quality, keyword management, or revenue generation, and it may be segmented by the type of mobile communication facility 102 used.

In embodiments, a query entry 120 may be classified on a mobile communication facility 102 that is based, in part, on an interaction with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a query entry 120 may be mapped on a mobile communication facility 102 based in part on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be a link presented as text, as a picture, as a video, or as an interactive application. Content may be formatted for the mobile communication facility 102 and relate to webpage content or links for syndicated advertisements.

In embodiments, the results of a search query may be retrieved and entered on a mobile communications facility and the results ordered and displayed on a mobile communication facility 102 associated with the mapped query. This information may include mobile subscriber characteristics 112, a search algorithm facility 144, parental controls 150, carrier business rules 130, and/or sponsor information. Results related to a mapped query entry 120 based on sponsor information may be ordered by associating sponsors with key words used in query entries and/or associating query entries with sponsor content. When a mapped query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio, or a video stream.

Results based on a mapped search query may also be ordered, in part, on the capabilities of the mobile communication facility 102, wherein the capability is an audio, visual, processing, or screen capability.

In embodiments, the results of a query entry 120 may be retrieved by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a search query may be entered on a mobile communication facility 102 using voice recognition and retrieve results based on the search query.

In embodiments, results may be retrieved based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, the results of a search query may be retrieved on a mobile communication facility 102 based, in part, on information relating to the mobile communication facility 102, and a transaction may be performed in relation to the received results. The transaction may occur by the user clicking on a sponsored link or engaging in a commercial transaction, such as purchasing downloadable content. The transaction may also be a non-economic transaction.

In embodiments, a plurality of results may be retrieved based, in part, on a search query entered on a mobile communications facility and the results aggregated. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be retrieved based, in part, on a search query entered on a mobile communications facility and associated with at least one result within the search results with an outbound PPC.

In embodiments, content may be retrieved relating to information associated with a mobile communication facility 102 before a search query relating to the information is entered. This search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to retrieved results based, in part, on a search query entered on a mobile communications facility. The report may contain information relating to search result quality, keyword management, or revenue generation, and it may be segmented by the type of mobile communication facility 102 used.

In embodiments, a search query may be entered in a search box on a mobile communication facility 102 and the search query associated with mobile communication information. The retrieved results may be based at least in part on a search query entered on a mobile communications facility.

In embodiments, results may be retrieved based, in part, on a search query entered on a mobile communications facility and, in part, based on mobile communication facility 102 information.

In embodiments, a query may be entered in a search query entry facility 120 and associate the query with mobile communication information. The retrieved results may be based, in part, on a query and based, in part, on the mobile communication information.

In embodiments, a search query may be processed through a search algorithm facility 144 and mobile communication optimized results retrieved based at least in part on the search query. The search query may be entered on a mobile communications facility, where the results are optimized based on information relating to the mobile communication facility 102.

In embodiments, results may be retrieved based, in part, on a search query entered on a mobile communications facility and based, in part, on a mobile subscriber characteristic. The mobile subscriber characteristics 112 may include location, personal information, history of the user's web interactions, or a plurality of characteristics, such as location and the time of day.

In embodiments, results may be retrieved based, in part, on a search query entered on a mobile communications facility and based, in part, on a location based service. The relationship may be among at least one query entry 120 and the location and a time of day. Location may be provided by a GPS system or a cell phone triangulation service.

In embodiments, a search query may be processed and entered on a mobile communication facility 102 through a filter algorithm facility 144. The retrieved results may be based, in part, on a filter algorithm, where the filter algorithm uses information related to the mobile communication facility 102. The algorithm facility 144 may be a collaborative filter where the search is an open web search, or it may be a recommendation system.

In embodiments, results may be retrieved from a results facility 148 based, in part, on a search query entered on a mobile communications facility. The results facility 148 may be associated with information relating to the mobile communication facility 102, such as mobile subscriber characteristics 112 information.

In embodiments, a mobile browser facility may be used in the process of retrieving results from a results facility 148, where the results facility 148 is adapted to produce results related to carrier premium content and an open web search. Carrier premium content may include ringtones, ringbacks, downloaded content, or purchased content. The results facility 148 may also be adapted to produce results related to a mobile communication facility 102, such as subscriber characteristic information.

In embodiments, results may be retrieved based, in part, on a search query entered on a mobile communications facility. The results may be, in part, related to information associated with a query processed through a disambiguation facility 140. Disambiguation of the mapped query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be retrieved based, in part, on a search query entered on a mobile communications facility using a voice recognition facility 160. The original search query may be entered through a voice recognition facility 160 residing on the mobile communication facility 102. Alternatively, the voice recognition facility 160 may reside on a remote server or in part on the mobile communication facility 102 and in part on a server.

In embodiments, results may be retrieved based, in part, on a search query entered on a mobile communications facility, where the results are, in part, related to information associated with the mobile communication facility 102. This information may reside locally on the mobile communication facility 102 or it may be stored remotely, for example in a mobile subscriber characteristics 112 database.

In embodiments, results may be retrieved based, in part, on a search query entered on a mobile communication facility 102 that provides a parental control facility to regulate the results produced on the mobile communication facility 102 based. The parental controls 150 may be regulated through a server application or through the mobile communication facility 102.

In embodiments, results may be retrieved based, in part, on a search query on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be retrieved based, in part, on a search query entered on a mobile communication facility 102, and the results may be associated with a transaction security facility to enable secure transactions associated with the classification. The transactional security facility 154 may be adapted to enable secure transactions associated with the query. The transactional security facility 154 may involve the protection of privacy 152 and may be operated in association with parental controls 150 or digital rights management.

In embodiments, results may be retrieved based, in part, on a search query in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be retrieved based, in part, on a search query entered on a mobile communication facility 102 based, in part, on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, results may be ordered and displayed based on a search query by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, results may be ordered and displayed by associating a voice-based query entry 120 with information relating to the mobile communication facility 102, such as voice interpretation based, at least in part, on SMS conversion.

In embodiments, results may be ordered and displayed based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, results may be ordered and displayed based, in part, on a search query on a mobile communication facility 102 and the results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, results may be ordered and displayed on the mobile communication facility 102 and the results aggregated by relating to a search query for display on a mobile communication facility 102. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be ordered and displayed based, in part, on a search query entered on a mobile communications facility and associated with at least one result within a search result relating to the query with an outbound PPC.

In embodiments, content may be retrieved relating to information associated with a mobile communication facility 102 before a search query relating to the information is entered. Following the entry of the search query the information may be ordered and displayed. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to the ordering of results retrieved on a mobile communications facility. The report may contain information relating to search result quality, keyword management, or revenue generation, and it may be segmented by the type of mobile communication facility 102 used.

In embodiments, a search query may be entered in a search box on a mobile communication facility 102, the search query associated with mobile communication information, and results ordered and displayed based, in part, on a search query entered and based, in part, on the mobile communication information.

In embodiments, results may be ordered and displayed based, in part, on a search query entered on a mobile communications facility and, in part, based on mobile communication facility 102 information.

In embodiments, a query may be entered in a search query entry 120 facility, the query associated with mobile communication information, and the results ordered and displayed based, in part, on a query and based, in part, on the mobile communication information.

In embodiments, a search query may be processed through a search algorithm facility 144 and mobile communication optimized results retrieved based, in part, on the search query, where the optimized results are optimized based on information relating to the mobile communication facility 102. The information relating to the mobile communication facility 102 may be screen size, screen shape, processing capability, processing speed, audio system, visual system, aural system, mobile subscriber characteristics 112, and location.

In embodiments, search results may be received from a delivery facility and the results ordered and displayed on a display associated with a mobile communication facility 102, where the ordering is made in association with information relating to the mobile communication facility 102. The information relating to the mobile communication facility 102 may be screen size, screen shape, processing capability, processing speed, audio system, visual system, aural system, mobile subscriber characteristics 112, and location.

In embodiments, results may be ordered and displayed on a mobile communication facility 102 display based on at least one mobile subscriber characteristic. The mobile subscriber characteristics 112 may include location, personal information, history of the user's web interactions, or a plurality of characteristics, such as location and the time of day.

In embodiments, search results may be ordered and displayed on a mobile communication facility 102 display based on the location of a mobile communication facility 102 using a location-based service. The relationship may be among at least one query entry 120 and the location and a time of day. Location may be provided by a GPS system or a cell phone triangulation service.

In embodiments, a search query may be processed and entered on a mobile communication facility 102 through a filter algorithm facility 144 and order the results based, in part, on the filter algorithm, where the filter algorithm uses information related to the mobile communication facility 102. The algorithm facility 144 may be a collaborative filter where the search is an open web search, or it may be a recommendation system.

In embodiments, results may be ordered from a results facility 148 based, in part, on a search query entered on a mobile communications facility. The results facility 148 may be associated with information derived from the mobile communication facility 102, such as mobile subscriber characteristics 112 information.

In embodiments, a mobile browser facility may be used in the process of ordering and displaying results from a results facility 148. The results facility 148 may be adapted to produce results related to carrier premium content and an open web search. The results facility 148 may also be associated with information derived from the mobile communication facility 102, such as mobile subscriber characteristics 112 information.

In embodiments, results may be ordered based, in part, on a search query entered on a mobile communications facility. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be ordered based, in part, on a search query entered on a mobile communication facility 102 through a voice recognition facility 160 residing on the mobile communication facility 102. Alternatively, the voice recognition facility 160 may reside on a remote server or in part on the mobile communication facility 102 and in part on a server.

In embodiments, results may be ordered based, in part, on a search query entered on a mobile communication facility 102 where the results are based, in part, on information stored in a data facility associated with the mobile communication facility 102. This information may reside locally on the mobile communication facility 102, or it may be stored remotely, for example in a mobile subscriber characteristics 112 database.

In embodiments, results may be ordered and displayed based, in part, on a search query entered on a mobile communication facility 102 that provides a parental control facility to regulate the results produced on the mobile communication facility 102. The parental controls 150 may be regulated through a server application or through the mobile communication facility 102.

In embodiments, results may be ordered and displayed based, in part, on a search query entered on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be ordered and displayed based, in part, on a search query entered on a mobile communication facility 102 and associate the results with a transaction security facility to enable secure transactions associated with the results. The transactional security facility 154 may be adapted to enable secure transactions associated with the query classification. The transactional security facility 154 may involve the protection of privacy 152 and may be operated in association with parental controls 150, digital rights management, or identity protection.

In embodiments, results may be ordered and displayed based, in part, on a search query entered on a mobile communications facility in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be ordered and displayed based, in part, on a search query entered on a mobile communication facility 102 associated with a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered on a mobile communication facility 102 using voice recognition and an auction for search marketing performed that is associated with the search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, a search query may be entered on a mobile communication facility 102 using voice recognition and a transaction made in association with results received based at least in part on the search query. The transaction may occur by the user clicking on a sponsored link or engaging in a commercial transaction, such as purchasing downloadable content or performing a non-economic transaction.

In embodiments, a search query may be entered on a mobile communication facility 102 using voice recognition and the results aggregated based, in part, on the search query. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a search query may be entered on a mobile communication facility 102 using voice recognition and an activity performed in relation to outbound PPC marketing based at least in part on the search query.

In embodiments, results may be downloaded to a mobile communication facility 102 based at least in part on information relating to the mobile communication facility 102 and, later, a search query entered using voice recognition to receive the results. Following the predictive text step, the results may be presented on a display associated with the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to predicting text associated with a search query entered through voice recognition on a mobile communication facility 102. The report may contain information relating to search result quality, keyword management, revenue generation, and it may be segmented by the type of mobile communication facility 102 used.

In embodiments, a search query may be entered on a mobile communication facility 102 using voice recognition. The voice activation may be activated using a search box entry, button, or other suitable activation technique. The voice recognition facility 160 may include a query entry 120 facility. The search query may be processed through a search algorithm facility 144, a delivery facility, and/or any other facility suitable for processing searches as described herein. The search query may be associated with a mobile subscriber characteristic. The mobile subscriber characteristics 112 may include location, personal information, history of the user's web interactions, or a plurality of characteristics, such as location and the time of day.

In embodiments, a search query may be entered on a mobile communication facility 102 using voice recognition, where the search query is associated with a location as determined by a location based service. The relationship may be among at least one query entry 120 and the location and a time of day. Location may be provided by a GPS system or a cell phone triangulation service.

In embodiments, a search query may be entered on a mobile communication facility 102 using voice recognition and associating the search query with a filter algorithm facility 144. The algorithm facility 144 may be a collaborative filter where the search is an open web search, or it may be a recommendation system.

In embodiments, a search query may be entered on a mobile communication facility 102 using voice recognition and the search query presented to a results facility 148.

In embodiments, a search query may be entered on a mobile communication facility 102 using voice recognition and the search query processed using a mobile browser facility.

In embodiments, a search query may be entered on a mobile communication facility 102 using voice recognition, where the search query is processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search query may be entered on a mobile communication facility 102 using voice recognition facility 160 residing on the mobile communication facility 102. Alternatively, the voice recognition facility 160 may reside on a remote server or in part on the mobile communication facility 102 and in part on a server.

In embodiments, a search query may be entered on a mobile communication facility 102 using voice recognition, where the voice recognition process uses information relating to the mobile communication facility 102 that may reside in a data facility. This information may reside locally on the mobile communication facility 102, or it may be stored remotely, for example in a mobile subscriber characteristics 112 database.

In embodiments, a search query may be entered on a mobile communication facility 102 using voice recognition, where the search query is associated with a parental control parameter. The parental controls 150 may be regulated through a server application or through the mobile communication facility 102.

In embodiments, a search query may be entered on a mobile communication facility 102 using voice recognition, where the search query is associated with a privacy 152 parameter. The privacy facility 152 may be adapted to protect information during a transaction.

In embodiments, a search query may be entered on a mobile communication facility 102 using voice recognition, where the search query is associated with a security facility. The transactional security facility 154 may be adapted to enable secure transactions associated with the query classification. The transactional security 154 facility may involve the protection of privacy 152 and may be operated in association with parental controls 150, digital rights management, or identity protection.

In embodiments, a search query may be entered on a mobile communication facility 102 using voice recognition, where the search query is associated with a carrier business rule. Carrier business rules 130 may include walled garden results, presenting out of garden content, sponsor information, or auctions. Information relating to the mobile communication facility 102 may be mobile subscriber characteristic information.

In embodiments, a search query may be entered on a mobile communication facility 102 using voice recognition, wherein the search query is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, an auction for search marketing may be performed related to a presentation of sponsored content on a mobile communication facility 102, where the sponsored content is adapted to be associated with a transaction. The transaction may occur by the user clicking on a sponsored link or engaging in a commercial transaction, such as purchasing downloadable content or performing a non-economic transaction.

In embodiments, an auction for search marketing may be performed related to a presentation of sponsored content on a mobile communication facility 102, wherein the sponsored content is related to aggregated content. Content, for example ringtone content, music content, or video content, may be aggregated through a spider, and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an auction for search marketing may be performed related to a presentation of sponsored content on a mobile communication facility 102, where the sponsored content is related to PPC marketing.

In embodiments, an auction for search marketing may be performed related to a presentation of sponsored content on a mobile communication facility 102; the sponsored content may be downloaded to the mobile communication facility 102 and, later, a search performed wherein the sponsored content is then presented. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to auctions for search marketing related to a presentation of sponsored content on a mobile communication facility 102. The report may contain information relating to search result quality, keyword management, revenue generation, and it may be segmented by the type of mobile communication facility 102 used.

In embodiments, an auction for search marketing may be performed related to a presentation of sponsored content on a mobile communication facility 102, where the auction is related at least in part to a search query entered in a search box on a mobile communication facility 102.

In embodiments, an auction for search marketing may be performed related to a presentation of sponsored content on a mobile communication facility 102.

In embodiments, an auction for search marketing may be performed related to a presentation of sponsored content on a mobile communication facility 102, where the auction is, in part, based on a search query entered on the mobile communication facility 102.

In embodiments, an auction for search marketing may be performed related to a presentation of sponsored content on a mobile communication facility 102, where the auction is, in part, related to a search algorithm facility 144. The search algorithm facility 144 may produce a search algorithm, and the search algorithm may be provided to an auction facility.

In embodiments, an auction for search marketing may be performed related to a presentation of sponsored content on a mobile communication facility 102, where auction results are provided through a delivery facility associated with the mobile communication facility 102.

In embodiments, an auction for search marketing may be performed related to a presentation of sponsored content on a mobile communication facility 102, wherein the auction is associated with a mobile subscriber characteristic. The mobile subscriber characteristics 112 may include location, personal information, history of the user's web interactions, or a plurality of characteristics, such as location and the time of day.

In embodiments, an auction for search marketing may be performed related to a presentation of sponsored content on a mobile communication facility 102, where the auction is associated with a location as determined by a location based service. The relationship may be among at least one query entry 120 and the location and a time of day. Location may be provided by a GPS system or a cell phone triangulation service.

In embodiments, an auction for search marketing may be performed related to a presentation of sponsored content on a mobile communication facility 102, where the auction is associated with a filter algorithm facility 144. The algorithm facility 144 may be a collaborative filter where the search is an open web search, or it may be a recommendation system.

In embodiments, an auction for search marketing may be performed related to a presentation of sponsored content on a mobile communication facility 102, where the results produced by the auction are presented to the mobile communication facility 102 through a results facility 148.

In embodiments, an auction for search marketing may be performed related to a presentation of sponsored content on a mobile communication facility 102, where the auction results are presented to the mobile communication facility 102 through a mobile browser facility.

In embodiments, an auction for search marketing may be performed related to a presentation of sponsored content on a mobile communication facility 102, where the auction is the result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, an auction for search marketing may be performed related to a presentation of sponsored content on a mobile communication facility 102, where the auction is the result of a query processed through a voice recognition facility 160 residing on the mobile communication facility 102. Alternatively, the voice recognition facility 160 may reside on a remote server or in part on the mobile communication facility 102 and in part on a server.

In embodiments, an auction for search marketing may be performed related to a presentation of sponsored content on a mobile communication facility 102, where the auction is performed in coordination with information relating to the mobile communication facility 102 that resides in a data facility. This information may reside locally on the mobile communication facility 102, or it may be stored remotely, for example in a mobile subscriber characteristics database 112.

In embodiments, an auction for search marketing may be performed related to a presentation of sponsored content on a mobile communication facility 102, where the auction is associated with a parental control parameter. The parental controls 150 may be regulated through a server application or through the mobile communication facility 102.

In embodiments, an auction for search marketing may be performed related to a presentation of sponsored content on a mobile communication facility 102, where the auction is associated with a privacy 152 parameter.

In embodiments, an auction for search marketing may be performed related to a presentation of sponsored content on a mobile communication facility 102, where the auction is associated with a security facility. The transactional security 154 facility may be adapted to enable secure transactions associated with the query classification. The transactional security facility 154 may involve the protection of privacy 152 and may be operated in association with parental controls 150, digital rights management, or identity protection.

In embodiments, an auction for search marketing may be performed related to a presentation of sponsored content on a mobile communication facility 102, where the auction is associated with a carrier business rule. Carrier business rules 130 may include walled garden results, presenting out of garden content, sponsor information, or auctions. Information relating to the mobile communication facility 102 may be mobile subscriber characteristic information.

In embodiments, an auction for search marketing may be performed related to a presentation of sponsored content on a mobile communication facility 102, where the auction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a transaction may be made on a mobile communication facility 102, where the transaction is related to aggregate results relating to mobile communication information. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an action may be performed relating to PPC marketing on a mobile communication facility 102, wherein the PPC marketing is related to mobile communication information.

In embodiments, a transaction may be made on a mobile communication facility 102, wherein the transaction is related to content previously downloaded to the mobile communication facility 102 in anticipation of a search. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to transactions made on a mobile communication facility 102. The report may contain information relating to search result quality, keyword management, revenue generation, and it may be segmented by the type of mobile communication facility 102 used.

In embodiments, a transaction may be made on a mobile communication facility 102, where the transaction is related to results associated with mobile communication information and related in part, to a query entered in a search box associated with the mobile communication facility 102.

In embodiments, a transaction may be made on a mobile communication facility 102, where the transaction is, in part, related to mobile communication information, such as mobile subscriber characteristic information.

In embodiments, a transaction may be made on a mobile communication facility 102, where the transaction is, in part, related to a query entered in a query entry 120 facility and, in part, related to mobile communication information, such as mobile subscriber characteristic information.

In embodiments, a transaction may be made on a mobile communication facility 102, where the transaction is, in part, related to result obtained through a search algorithm facility 144. The search algorithm facility 144 may use mobile communication information in the performance of a search. For example, the search algorithm facility 144 may produce a search algorithm and provide it to an auction facility.

In embodiments, a transaction may be made on a mobile communication facility 102, where the transaction is at least in part related to a delivery facility type.

In embodiments, a transaction may be made on a mobile communication facility 102, where the transaction is at least in part related to a mobile subscriber characteristic. The mobile subscriber characteristics 112 may include location, personal information, history of the user's web interactions, or a plurality of characteristics, such as location and the time of day.

In embodiments, a transaction may be made on a mobile communication facility 102, where the transaction is associated with a location as determined by a location based service. The relationship may be among at least one query entry 120 and the location and a time of day. Location may be provided by a GPS system or a cell phone triangulation service.

In embodiments, a transaction may be made on a mobile communication facility 102, where the transaction is associated with a filter algorithm facility 144. The algorithm facility 144 may be a collaborative filter where the search is an open web search, or it may be a recommendation system.

In embodiments, a transaction may be made on a mobile communication facility 102, where results produced by the auction are presented to the mobile communication facility 102 through a results facility 148.

In embodiments, a transaction may be made on a mobile communication facility 102, where the transaction at least is processed through the mobile communication facility 102 through a mobile browser facility.

In embodiments, a transaction may be made on a mobile communication facility 102, where the transaction is at least in part related to a result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a transaction may be made on a mobile communication facility 102, where the transaction is a related to a query processed through a voice recognition facility 160 residing on the mobile communication facility 102. Alternatively, the voice recognition facility 160 may reside on a remote server or in part on the mobile communication facility 102 and in part on a server.

In embodiments, a transaction may be made on a mobile communication facility 102, where the transaction is performed in coordination with information relating to the mobile communication facility 102 that may reside in a data facility. This information may reside locally on the mobile communication facility 102, or it may be stored remotely, for example in a mobile subscriber characteristics database 112.

In embodiments, a transaction may be made on a mobile communication facility 102, where the transaction is associated with a parental control parameter. The parental controls 150 may be regulated through a server application or through the mobile communication facility 102.

In embodiments, a transaction may be made on a communication facility, where the transaction is associated with a privacy 152 parameter.

In embodiments, a transaction may be made on a mobile communication facility 102, where the transaction is associated with a security facility. The transactional security facility 154 may be adapted to enable secure transactions associated with the query classification. The transactional security facility 154 may involve the protection of privacy 152 and may be operated in association with parental controls 150, digital rights management, or identity protection.

In embodiments, a transaction may be made on a mobile communication facility 102, where the transaction is associated with a carrier business rule. Carrier business rules 130 may include walled garden results, presenting out of garden content, sponsor information, or auctions. Information relating to the mobile communication facility 102 may be mobile subscriber characteristic information.

In embodiments, a transaction may be made on a mobile communication facility 102, where the transaction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a vendor may be selected in association with a sponsored link and the sponsored link presented in association with aggregated results. The vendor may be presented with an option of receiving further leads, such as phone or web leads.

In embodiments, results may be aggregated in association with a mobile communication facility 102, the aggregated results downloaded to the mobile communication facility 102, and the aggregated results presented to a user of the mobile communication facility 102 as a result of a search query entered following the download. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to aggregated results presented on a mobile communication facility 102. The report may contain information relating to search result quality, keyword management, revenue generation, and it may be segmented by the type of mobile communication facility 102 used.

In embodiments, a search query may be entered in a search box on a mobile communication facility 102, the aggregated results associated with the search query, and aggregated results presented on the mobile communication facility 102. The aggregated results may be presented in an aggregated form that includes a high level descriptor that may be activated to reveal the results. Activation may be a link. A second set of results may also be aggregated and presented on the mobile communication facility 102. The second aggregated results may be presented associated with high level descriptors.

In embodiments, results may be aggregated and the aggregated results categorized into a plurality of aggregated results, where the plurality of aggregated results are presented on a mobile communication facility 102.

In embodiments, an aggregation facility may be associated with a query entry 120 facility of a mobile communication facility 102, where the aggregation facility is adapted to present categorized aggregated results. The mobile communication facility 102 may be adapted to facilitate selection of the categorized aggregated results and reveal individual results within the aggregated results. Facilitation may involve the presentation of a link.

In embodiments, a search query may be produced in association with a search algorithm facility 144, the results retrieved based on the search query, and the results aggregated into categories for presentation on a mobile communication facility 102.

In embodiments, content may be delivered from a delivery facility, the content aggregated into categories, and the categories presented on a mobile communication facility 102.

In embodiments, at least one mobile subscriber characteristic may be used as a parameter for aggregating search results into categories. The mobile subscriber characteristics 112 may include location, personal information, history of the user's web interactions, or a plurality of characteristics, such as location and the time of day.

In embodiments, location as determined by a location based service may be used as a parameter for aggregating search results into categories. Location may be provided by a GPS system or a cell phone triangulation service.

In embodiments, a search query may be produced in association with a filter algorithm facility 144, the results aggregated in association with the search query, and the aggregated results presented on a mobile communication facility 102. The algorithm facility 144 may be a collaborative filter where the search is an open web search, or it may be a recommendation system. The aggregated search results may be filtered through an algorithm facility 144 and the results presented on a mobile communication facility 102.

In embodiments, results may be aggregated and produced by a results facility 148 and the aggregated results presented on a mobile communication facility 102, where the results facility 148 operates in association with information relating to the mobile communication facility 102. Information relating to the mobile communication facility 102 may be mobile subscriber characteristics 112 information.

In embodiments, results may be aggregated into categories of results and the categories of results presented through a mobile browser facility.

In embodiments, results may be aggregating based, in part, on a search query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be aggregated based, in part, on a search query processed through a voice recognition facility 160 residing on the mobile communication facility 102. Alternatively, the voice recognition facility 160 may reside on a remote server or in part on the mobile communication facility 102 and in part on a server.

In embodiments, results may be aggregated based at least in part on information relating to the mobile communication facility 102, where the information resides in a data facility. This information may reside locally on the mobile communication facility 102, or it may be stored remotely, for example in a mobile subscriber characteristics 112 database.

In embodiments, search results may be aggregated into categories, where the aggregation is based at least in part on a parental control parameter and the aggregated results presented on a mobile communication facility 102. The parental controls 150 may be regulated through a server application or through the mobile communication facility 102.

In embodiments, search results may be aggregated into categories, where the aggregation is based at least in part on a privacy 152 control parameter and the aggregated results presented on a mobile communication facility 102.

In embodiments, search results may be aggregated into categories, where the aggregation is associated with a transaction security facility and the aggregated results presented on a mobile communication facility 102. The transactional security 154 facility may be adapted to enable secure transactions associated with the query classification. The transactional security 154 facility may involve the protection of privacy 152 and may be operated in association with parental controls 150, digital rights management, or identity protection.

In embodiments, search results may be aggregated into categories, where the aggregation is based at least in part on carrier business rules 130 and the aggregated results presented on a mobile communication facility 102. Carrier business rules 130 may include walled garden results, presenting out of garden content, sponsor information, or auctions. Information relating to the mobile communication facility 102 may be mobile subscriber characteristic information.

In embodiments, search results may be aggregated into categories, where the aggregation is based at least in part on a sponsor facility and the aggregated results presented on a mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a wireless carrier report may be generated in relation to implicit search results. The report may contain information relating to the success of the implicit search (e.g., based upon click activity and related searches), search result quality, keyword management, revenue generation, and it may be segmented by the type of mobile communication facility 102 used.

In embodiments, a result may be downloaded to a mobile communication facility 102, where the result is selected based, in part, on information relating to the mobile communication facility 102. Following this, a search may be performed on the mobile communication facility 102 and the results presented in response to the search entered in a search box on a mobile communication facility 102. The information relating to the mobile communication facility 102 may be mobile subscriber characteristic information, such as location and time of day or a user interface. The user interface may be adapted to facilitate a user's selection of what type of results to download or further adapted to facilitate the selection of at least one of keywords and other information to select the results to download automatically.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a search algorithm facility 144. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a delivery facility. Following this, a search may be performed on the mobile communication facility 102 and the results presented in response to the search entered in a search box on a mobile communication facility 102.

In embodiments, a result may be downloaded to a mobile communication facility 102, wherein the result is selected based at least in part on information relating to a mobile subscriber characteristic. Following this, a search may be performed on the mobile communication facility 102 and the results presented in response to the search entered in a search box on a mobile communication facility 102. The mobile subscriber characteristics 112 may include location, personal information, history of the user's web interactions, or a plurality of characteristics, such as location and the time of day.

In embodiments, a result may be downloaded to a mobile communication facility 102, where the result is selected based, in part, on information relating to a location as determined by a location based service. Location may be provided by a GPS system or a cell phone triangulation service. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a filter algorithm facility 144. The algorithm facility 144 may be a collaborative filter where the search is an open web search, or it may be a recommendation system. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a results facility 148. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102. The presentation may be facilitated by a mobile browser facility.

In embodiments, a result may be downloaded to a mobile communication facility 102, where the result is selected based at least in part on information relating to the mobile communication facility 102. Following this, a search may be performed on the mobile communication facility 102 and the results presented in response to the disambiguated search. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a result may be downloaded to a mobile communication facility 102, where the result is selected based, in part, on information relating to the voice recognition facility 160 of the mobile communication facility 102. Following this, a search may be performed on the mobile communication facility 102 and the results presented in response to the search. The voice recognition facility 160 may reside on the mobile communication facility 102, on a remote server, or, in part, on a mobile communication facility 102 and, in part, on a remote server.

In embodiments, a result may be downloaded to a mobile communication facility 102, where the result is selected based, in part, on information relating to the mobile communication facility 102. This information may reside locally on the mobile communication facility 102, or it may be stored remotely, for example in a mobile subscriber characteristics 112 database. Following this, a search may be performed on the mobile communication facility 102 and the results presented in response to the search In embodiments, a result may be downloaded to a mobile communication facility 102, where the result is selected based, in part, on information relating to a parental control parameter. The parental control parameter may be regulated through a server application or through the mobile communication facility 102. Following this, a search may be performed on the mobile communication facility 102 and the results presented in response to the search.

In embodiments, a result may be downloaded to a mobile communication facility 102, where the result is selected based, in part, on information relating to a privacy 152 parameter.

In embodiments, a result may be downloaded to a mobile communication facility 102, where the result is selected based, in part, on information relating to the mobile communication facility 102. A search may be performed on the mobile communication facility 102 and the result associated with a transactional security facility 154. The transactional security 154 facility may involve the protection of privacy 152 and may be operated in association with parental controls 150, digital rights management, or identity protection.

In embodiments, a result may be downloaded to a mobile communication facility 102, where the result is selected based at least in part on information relating to carrier business rules 130, a search performed on a mobile communication facility 102, and the result presented in response to the search. Carrier business rules 130 may include walled garden results, presenting out of garden content, sponsor information, or auctions. Information relating to the mobile communication facility 102 may be mobile subscriber characteristic information.

In embodiments, a result may be downloaded to a mobile communication facility 102, where the result is selected based at least in part on information relating to a sponsor facility, a search performed on a mobile communication facility 102, and the result presented in response to the search. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered in a search box on a mobile communicating facility and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a search query may be entered in a query entry 120 facility on a mobile communication facility 102 and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising results are produced in association with a search algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a delivery facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with mobile subscriber characteristic information. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The mobile subscriber characteristics 112 may include location, personal information, history of the user's web interactions, or a plurality of characteristics, such as location and the time of day.

In embodiments, a syndicated advertising result may be produced on a mobile communication facility 102, where the syndicated advertising result is produced in association with a location as determined through the use of a location based service. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Location may be provided by a GPS system or a cell phone triangulation service.

In embodiments, a syndicated advertising result may be produced on a mobile communication facility 102, where the syndicated advertising result is produced in association with a filter algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The algorithm facility 144 may be a collaborative filter where the search is an open web search, or it may be a recommendation system.

In embodiments, a syndicated advertising result may be produced on a mobile communication facility 102, where the syndicated advertising result is produced in association with a results facility 148. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a mobile browser facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a search query processed through a disambiguation facility 140. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a syndicated advertising result may be produced on a mobile communication facility 102, where the syndicated advertising result is produced in association with a query entered through a voice recognition facility 160. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The voice recognition facility 160 may reside on the mobile communication facility 102, on a remote server, or, in part, on a mobile communication facility 102 and, in part, on a remote server.

In embodiments, a syndicated advertising result may be produced on a mobile communication facility 102, where the syndicated advertising result is produced in association with information relating to the mobile communication facility 102. The information relating to the mobile communication facility 102 may be stored in a data facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. This information related to the mobile communication facility 102 may reside locally on the mobile communication facility 102, or it may be stored remotely, for example in a mobile subscriber characteristics 112 database.

In embodiments, a syndicated advertising result may be produced on a mobile communication facility 102, where the syndicated advertising result is produced in association with a parental control parameter. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The parental control parameter may be regulated through a server application or through the mobile communication facility 102.

In embodiments, a syndicated advertising result may be produced on a mobile communication facility 102 where the syndicated advertising result is produced in association with a privacy 152 facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The privacy facility 152 may be adapted to provide secure search transaction and secure economic transactions.

In embodiments, a syndicated advertising result may be produced on a mobile communication facility 102, where the syndicated advertising result is associated with a transactional security 154 facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The transactional security 154 facility may involve the protection of privacy 152 and may be operated in association with parental controls 150, digital rights management, or identity protection.

In embodiments, a syndicated advertising result may be produced on a mobile communication facility 102, where the syndicated advertising result is produced in association with a carrier's business rules. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Carrier business rules 130 may include walled garden results, presenting out of garden content, sponsor information, or auctions. Information relating to the mobile communication facility 102 may be mobile subscriber characteristic information.

In embodiments, a syndicated advertising result may be produced on a mobile communication facility 102, where the syndicated advertising result is produced in association with a sponsor facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query entry 120 facility may be associated with a mobile communication facility 102 where the search query entry 120 facility is further associated with information relating to the mobile communication facility 102, such as mobile subscriber characteristic information.

In embodiments, a search algorithm facility 144 may be associated with a mobile communication facility 102 where the search algorithm facility 144 is further associated with information relating to the mobile communication facility 102.

In embodiments, a results delivery facility may be associated with a mobile communication facility 102 where the delivery facility is further associated with information relating to the mobile communication facility 102.

In embodiments, a search may be performed on a mobile communication facility 102, where the search is at least in part based on a mobile subscriber characteristic. The mobile subscriber characteristics 112 may include location, personal information, history of the user's web interactions, or a plurality of characteristics, such as location and the time of day.

In embodiments, a search may be performed on a mobile communication facility 102, where the search is at least in part based on a location as determined by a location based service. Location may be provided by a GPS system or a cell phone triangulation service.

In embodiments, a search may be performed on a mobile communication facility 102, where the search is, in part, based on a location as determined by a location based service. Location may be provided by a GPS system or a cell phone triangulation service. A search may also be performed on a mobile communication facility 102, where the search is at least in part based on a filter algorithm facility 144. The algorithm facility 144 may be a collaborative filter where the search is an open web search, or it may be a recommendation system.

In embodiments, a results facility 148 may be associated with a mobile communication facility 102, where the results facility 148 is adapted to produce results, in part, based on information relating to the mobile communication facility 102.

In embodiments, a mobile browser facility may be associated with a mobile communication facility 102, where the mobile browser facility is adapted to facilitate the selection of results, in part, based on information relating to the mobile communication facility 102.

In embodiments, a disambiguation facility 140 may be associated with a mobile communication facility 102. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a voice recognition search query entry 120 facility may be associated with a mobile communication facility 102. The voice recognition facility 160 may reside on the mobile communication facility 102, on a remote server, or, in part, on a mobile communication facility 102 and, in part, on a remote server.

In embodiments, a data facility may be associated with a mobile communication facility 102, where the data facility stores information relating to the mobile communication facility 102 and the data facility is adapted to be accessed in relation to providing search results to the mobile communication facility 102. The data facility may reside locally on the mobile communication facility 102, or it may be stored remotely, for example in a mobile subscriber characteristics 112 database.

In embodiments, a parental control facility may be associated with a mobile communication facility 102. The parental control parameter may be regulated through a server application or through the mobile communication facility 102.

In embodiments, a privacy facility 152 may be associated with a mobile communication facility 102. The privacy facility 152 may be adapted to provide secure search transactions and secure economic transactions.

In embodiments, a transactional security facility 154 may be associated with a mobile communication facility 102, where the transactional security facility 154 is adapted to provide secure transactions associated with search results obtained on the mobile communication facility 102. The transactional security facility 154 may involve the protection of privacy 152 and may be operated in association with parental controls 150, digital rights management, or identity protection.

In embodiments, a carrier business rule facility may be associated with a mobile communication facility 102, where the carrier business rule facility is adapted to be accessed in the process of providing search results to the mobile communication facility 102. Carrier business rules 130 may include walled garden results, presenting out of garden content, sponsor information, or auctions. Information relating to the mobile communication facility 102 may be mobile subscriber characteristic information.

In embodiments, a mobile communication facility 102 may be located through the use of a location based service and the location used in association with a filter algorithm facility 144 to perform a search. The algorithm facility 144 may be a collaborative filter where the search is an open web search, or it may be a recommendation system.

In embodiments, a mobile communication facility 102 may be located through the use of a location based service and the location used in association with a result facility to obtain search results.

In embodiments, a mobile communication facility 102 may be located through the use of a location based service and the location used in association with a mobile browser facility to obtain search results.

In embodiments, a mobile communication facility 102 may be located through the use of a location based service and the location used in association with a disambiguation facility 140 to obtain search results. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile communication facility 102 may be located through the use of a location based service and the location used in association with a voice recognition facility 160 to obtain search results. The voice recognition facility 160 may reside on the mobile communication facility 102, on a remote server, or, in part, on a mobile communication facility 102 and, in part, on a remote server.

In embodiments, a mobile communication facility 102 may be located through the use of a location based service and the location used in association with a data facility to obtain search results. The data facility may reside locally on the mobile communication facility 102, or it may be stored remotely, for example, in a mobile subscriber characteristics 112 database.

In embodiments, a mobile communication facility 102 may be located through the use of a location based service and the location used in association with a parental control facility to obtain search results. The parental control parameter may be regulated through a server application or through the mobile communication facility 102.

In embodiments, a mobile communication facility 102 may be located through the use of a location based service and the location used in association with a privacy 152 facility to obtain search results. The privacy 152 facility may be adapted to provide secure search transactions or secure economic transactions.

In embodiments, a mobile communication facility 102 may be located through the use of a location based service and the location used in association with a search facility 142 to obtain a search result, where the search result is associated with a transactional security 154 facility. The transactional security 154 facility may involve the protection of privacy 152 and may be operated in association with parental controls 150, digital rights management, or identity protection.

In embodiments, a mobile communication facility 102 may be located through the use of a location based service and the location used in association with a carrier business rule to obtain search results. Carrier business rules 130 may include walled garden results, presenting out of garden content, sponsor information, or auctions. Information relating to the mobile communication facility 102 may be mobile subscriber characteristic information.

In embodiments, a mobile communication facility 102 may be located through the use of a location based service and the location used in association with a sponsor facility to obtain search results. Sponsor results may be paid inclusion results, auction results, or pay-per-click results (in connection with a WAP site or a phone number). A sponsor of the sponsored result may receive compensation as a result of activity associated with a mobile communication facility 102 phone number.

The presentation of the sponsored results may be formatted as a link or presented as text, as a picture, as a video, or as an interactive application. Content may be formatted for the mobile communication facility 102 and relate to webpage content or links for syndicated advertisements.

In embodiments, a filter algorithm facility 144 may be associated with a mobile communication facility 102 and the filter algorithm facility 144 may be used in the process of obtaining a search result.

In embodiments, a filter algorithm facility 144 may be associated with a mobile browser facility and the filter algorithm facility 144 used in the process of obtaining a search result.

In embodiments, a filter algorithm facility 144 may be associated with a mobile communication facility 102 and a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a filter algorithm facility 144 may be associated with a mobile communication facility 102 and a voice recognition facility 160. The voice recognition facility 160 may reside on the mobile communication facility 102, on a remote server, or, in part, on a mobile communication facility 102 and, in part, on a remote server.

In embodiments, a filter algorithm facility 144 may be associated with a mobile communication facility 102 and a data facility. The data facility may reside locally on the mobile communication facility 102, or it may be stored remotely, for example, in a mobile subscriber characteristics 112 database.

In embodiments, a filter algorithm facility 144 may be associated with a mobile communication facility 102 and a parental control facility. The parental control parameter may be regulated through a server application or through the mobile communication facility 102.

In embodiments, a filter algorithm facility 144 may be associated with a mobile communication facility 102 and a privacy 152 facility. The privacy 152 facility may be adapted to provide secure search transactions or secure economic transactions.

In embodiments, a filter algorithm facility 144 may be associated with a mobile communication facility 102 and a transactional security facility 154. The transactional security facility 154 may involve the protection of privacy 152 and may be operated in association with parental controls 150, digital rights management, or identity protection.

In embodiments, a filter algorithm facility 144 may be associated with a mobile communication facility 102 and a carrier business rule. Carrier business rules 130 may include walled garden results, presenting out of garden content, sponsor information, or auctions. Information relating to the mobile communication facility 102 may be mobile subscriber characteristic information.

In embodiments, a filter algorithm facility 144 may be associated with a mobile communication facility 102 and a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a mobile browser facility may be associated with a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile browser facility may be associated with a voice recognition facility 160, and the mobile browser facility may be used in the process of obtaining search results. Additionally, a filter algorithm facility 144 may be used in the process of obtaining results. The voice recognition facility 160 may reside on the mobile communication facility 102, on a remote server, or, in part, on a mobile communication facility 102 and, in part, on a remote server.

In embodiments, a mobile browser facility may be associated with a data facility, where information relating to a mobile communication is stored in an associated data facility. The data facility may reside locally on the mobile communication facility 102, or it may be stored remotely, for example in a mobile subscriber characteristics 112 database.

In embodiments, a mobile browser facility may be associated with a parental control facility, and the mobile browser facility may be used in the process of obtaining search results. The parental control parameter may be regulated through a server application or through the mobile communication facility 102.

In embodiments, a mobile browser facility may be associated with a privacy 152 facility, and the mobile browser facility may be used in the process of obtaining search results. The privacy 152 facility may be adapted to provide secure search transactions or secure economic transactions.

In embodiments, a mobile browser facility may be associated with a transactional security facility 154. The transactional security facility 154 may involve the protection of privacy 152 and may be operated in association with parental controls 150, digital rights management, or identity protection.

In embodiments, a mobile browser facility may be associated with a carrier business rules facility 130. Carrier business rules 130 may include walled garden results, presenting out of garden content, sponsor information, or auctions. Information relating to the mobile communication facility 102 may be mobile subscriber characteristic information.

In embodiments, a mobile browser facility may be associated with a sponsor facility, and the mobile browser facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a disambiguation facility 140 may be associated with a voice recognition facility 160 and a mobile communication facility 102, and a disambiguation facility 140 or algorithm facility 144 may be used in the process of obtaining search results. The voice recognition facility 160 may reside on the mobile communication facility 102, on a remote server, or, in part, on a mobile communication facility 102 and, in part, on a remote server.

In embodiments, a disambiguation facility 140 may be associated with a voice data facility, where information relating to a mobile communication facility 102 is stored in the data facility. The data facility may reside locally on the mobile communication facility 102 or it may be stored remotely, for example in a mobile subscriber characteristics 112 database.

In embodiments, a disambiguation facility 140 may be associated with a voice parental control facility and a mobile communication facility 102, and the disambiguation facility 140 may be used in the process of obtaining search results. The parental control parameter may be regulated through a server application or through the mobile communication facility 102.

In embodiments, a disambiguation facility 140 may be associated with a voice privacy 152 facility and a mobile communication facility 102, and the disambiguation facility 140 may be used in the process of obtaining search results. The privacy 152 facility may be adapted to provide secure search transactions or secure economic transactions.

In embodiments, a disambiguation facility 140 may be associated with a voice transactional security facility 154 and a mobile communication facility 102, and the disambiguation facility 140 may be used in the process of obtaining search results. The transactional security facility 154 may involve the protection of privacy 152 and may be operated in association with parental controls 150, digital rights management, or identity protection.

In embodiments, a disambiguation facility 140 may be associated with a voice carrier rules facility and a mobile communication facility 102, and the disambiguation facility 140 may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a disambiguation facility 140 may be associated with a voice sponsor facility and a mobile communication facility 102, and the disambiguation facility 140 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a voice recognition facility 160 may be associated with a data facility, where information relating to a mobile communication facility 102 is stored in the data facility, and the voice recognition facility 160 is used in the process of obtaining search results. The data facility may reside locally on the mobile communication facility 102, or it may be stored remotely, for example, in a mobile subscriber characteristics 112 database.

In embodiments, a voice recognition facility 160 may be associated with a parental control facility and a mobile communication facility 102, and the voice recognition facility 160 may be used in the process of obtaining search results. The parental control parameter may be regulated through a server application or through the mobile communication facility 102.

In embodiments, a voice recognition facility 160 may be associated with a privacy facility 152 and a mobile communication facility 102, and the voice recognition facility 160 may be used in the process of obtaining search results. The privacy facility 152 may be adapted to provide secure search transactions or secure economic transactions.

In embodiments, a voice recognition facility 160 may be associated with a transactional control facility and a mobile communication facility 102, and the voice recognition facility 160 may be used in the process of obtaining search results. The transactional security facility 154 may involve the protection of privacy 152 and may be operated in association with parental controls 150, digital rights management, or identity protection.

In embodiments, a voice recognition facility 160 may be associated with a carrier business rules 130 facility and a mobile communication facility 102, and the voice recognition facility 160 may be in the process of obtaining search results. Carrier business rules 130 may include walled garden results, presenting out of garden content, sponsor information, or auctions. Information relating to the mobile communication facility 102 may be mobile subscriber characteristic information.

In embodiments, a voice recognition facility 160 may be associated with a sponsor facility and a mobile communication facility 102, and the voice recognition facility 160 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a parental control facility may be associated with a privacy 152 facility and a mobile communication facility 102 and use the parental control facility in the process of obtaining search results. The privacy 152 facility may be adapted to provide secure search transactions or secure economic transactions.

In embodiments, a parental control facility may be associated with a transactional security facility 154 and a mobile communication facility 102, and the parental control facility may be used in the process of obtaining search results. The transactional security facility 154 may involve the protection of privacy 152 and may be operated in association with parental controls 150, digital rights management, or identity protection.

In embodiments, a parental control facility may be associated with a carrier business rules 130 facility and a mobile communication facility 102, and the parental control facility may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a parental control facility may be associated with a sponsor facility and a mobile communication facility 102, and the parental control facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a privacy 152 facility may be associated with a transactional security 154 facility and a mobile communication facility 102, and the privacy 152 facility may be used in the process of obtaining search results. The transactional security facility 154 may involve the protection of privacy 152 and may be operated in association with parental controls 150, digital rights management, or identity protection.

In embodiments, a privacy 152 facility may be associated with a carrier business rules 130 facility and a mobile communication facility 102, and the privacy 152 facility may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a privacy 152 facility may be associated with a sponsor facility and a mobile communication facility 102, and the privacy 152 facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, mobile communication facility 102 compatible content may be identified by tracking a plurality of web interactions from a mobile user device and storing information pertaining to the web interaction in a database, where at least a portion of the information comprises identification of the mobile device. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number that is also associated with a user. A mobile communication facility 102 may be a cell phone, satellite phone, PDA, combination PDA/cell phone, web device, and/or web appliance.

In embodiments, a method of determining mobile communication facility 102 compatible content may include tracking a plurality of mobile communication facility 102 interactions with network content. Information may be stored pertaining to the web interactions in a database, where a portion of the information comprises identification of at least one mobile communication facility 102 from the plurality of mobile communication facilities and predicts the compatibility of the mobile communication facility 102 with the network content based, in part, on how many content interactions there were. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number, that is also associated with a user. A mobile communication facility 102 may be a cell phone, satellite phone, PDA, combination PDA/cell phone, web device, and/or web appliance.

In embodiments, a method of determining mobile communication facility 102 compatible content may include identifying a mobile communication facility 102 by its association with a phone number, identifying a first network content interaction of the mobile device, and identifying a second network content interaction of the mobile device, wherein the second interaction is associated with the first interaction. The prediction of compatibility of the first network content with the mobile communication facility 102 may be based, in part, on the existence of the second interaction. The first interaction may be downloading content from a website, interacting with a website, downloading a program, viewing video (streaming video or downloading a video file), or listening to audio (streaming audio or downloaded audio files or music).

In embodiments, a method of providing a mobile communication facility 102 compatible content may include collecting click histories from a plurality of mobile content users, analyzing the click histories for repeat user visits, analyzing the repeat user visits for type of mobile communication facility 102 used, and generating a list of repeat user visited sites on corresponding mobile communication facilities to create a compatibility list. The type of mobile communication facility 102 may be identified, in part, from an associated phone number. The click histories may be collected by the wireless provider 108, processed as a batch, processed in real-time, or processed in quasi-time. This method may be used to develop a user specific content compatibility list which may be stored on the user's mobile communication facility 102 or stored on a server.

In embodiments, a method for providing only device compatible search results to a mobile communication facility 102 may include deriving compatibility from web interactions of similar mobile communication facilities.

In embodiments, a method for providing verified device search results compatible with a mobile communication facility 102 may include verified device compatible results that are highlighted on a user interface of the mobile communication facility 102.

In embodiments, a method for locating a mobile communication facility 102 may include providing a personal search filter, searching for information on a network using the mobile communication facility 102, or providing results based, in part, on the mobile communication facility 102 location and the personal search filter. The personal search filter may reside within the mobile communication facility 102, on a server, or on a network (e.g., the Internet). A personal search filter may be a collaborative filter and may also include at least two sub filters, such as filters related to personal information, business information, selectable filters, or filters based, in part, on the time of day or time of year. Personal filters may be configurable to include a local services search engine, a local product search engine, a business search engine, personal search engine, travel search engine, financial search engine, news search engine, video search engine, music search engine, and/or restaurant search engine. The mobile communication facility 102 may be a cell phone, satellite phone, PDA, combination PDA/cell phone, web device, and web appliance. The mobile communication facility 102 may include an SMS search interface, a voice recognition search interface, or wireless applications protocol. The search may be performed, in part, through a carrier website or through a carrier partner's website.

In embodiments, a method may be used for searching for network content using a mobile communication facility 102, where the mobile communication facility 102 connects to a network through a wireless communications service provider and is provided search results. A portion of the search results may be from an open network search and another portion of the search results may be based on content controlled by the wireless communications service provider. Search results may be provided in a predetermined order, where the predetermined order places the search results based on content controlled by the wireless communications service provider first. The method may also include highlighting the search results based on content controlled by the wireless provider 108, where the highlighted results are provided first. The content controlled by the wireless communications service provider may include ringtones, video, music video, music, music formatted for download, and video games. The content may be transcoded for wireless communication facilities in general or for specific wireless communication facilities. Transcoded content may be highlighted on a user interface of the wireless communication facility 104. The method may also include highlighting the open network search results and highlighting sponsor links, where the sponsored links are paid inclusion links (e.g., resulting from a competitive bid auction process). A mobile communication facility 102 may be a cell phone, satellite phone, PDA, combination PDA/cell phone, web device, and/or web appliance.

In embodiments, a method may be used for providing walled garden search results and open network search results to a mobile communication facility 102 as a result of a search performed on the mobile communication facility 102. The walled garden search results may be highlighted and listed prior to other content. The walled garden search results may include provider content that is not included within an initial amount of content provided from the open network search results, where the provider content includes music, games, video, ringtones, downloads, or other content adapted for purchase.

In embodiments, a method of optimizing search results for mobile users may include tracking the on-line interactions of a mobile communication facility 102, where the tracking involves, in part, identifying an identification number associated with the mobile communication facility 102, generating a filter based, in part, on the tracked on-line interactions, and applying the filter to a search performed on the mobile communication facility 102. The identification number may include a phone number. The tracked on-line information may include tracking clicks, clickthroughs, queries, clicks following queries, WAP sites visited, WAP portals visited, information reviewed from a DEC directory (e.g., a carrier's catalog), information reviewed from a billing history associated with a user, information about payment methods, purchases, payment timing, timing of online interactions and/or the location, and speed and direction of the mobile communication facility 102 at the time of the online interaction.

Filters may include a collaborative filter, personal filter, a filter generated through a click analysis, a filter based, in part, on carrier information associated with a mobile communication facility 102, a filter based on payment method for a carrier service (e.g., pre-payment or post-payment), a filter based on the type of mobile communication facility 102 used (cell phone, PDA, etc.), and/or a filter based on demographics. Filters may also be generated, in part, based upon information specific to a user's mobile communication facility 102, for example whether it has address book information, SMS logs, email logs, or IM logs. The descriptive information stored regarding the mobile communication facility 102 may include the cost of the facility and information about whether it has a music player as a primary function, a video player as a primary function, an instant messenger or chat facility as a primary function, and whether it is a type that is marketed to a particular customer demographic (e.g., children, young adults, adults).

In embodiments, the mobile communication facility 102 may be able to update an address book. For example users may add white pages and business listings to their address book. Businesses may be charged an additional fee for the permanent adding of a listing to a local address book.

The interactions of the mobile communication facility 102 may be tracked and stored on a server, where the stored information is transferable between carriers. Similarly, filters may be stored on a server in a manner that permits their transfer between carriers and/or between mobile communication facilities.

In embodiments, the presence of an application on a mobile communication facility 102 may be enhanced by working with the wireless provider 108.

In embodiments, mobile wallet/billing-on-behalf-of may be enabled to allow users to make purchases at paid search and shopping comparison vendors.

In embodiments, data feed files may be pushed by the wireless provider 108 to a provided FTP location. This may trigger the feed processing. Data feed files may be pulled from a wireless provider 108-supplied FTP location. This may be done on a predefined schedule.

In embodiments, deck content may be used for indexing via spidering. Spidering is the process of traversing web pages, WAP pages, or other online content in an automated fashion and extracting relevant content. A spider may start at one or more root nodes and traverse the links from those pages following a set of rules. Spidering may occur on a predefined schedule and may be invoked manually when requested by the wireless provider 108. The wireless provider 108 may also request a manual spidering run if an immediate update is necessary, or if specific links or locations are identified for additional searching. A spider may traverse a WAP deck and retrieve the necessary metadata from which a search index is built. If the WAP page for a content item enumerates comprehensive mobile communication facility 102 compatibility information, the information may be retrieved and indexed. If the WAP pages are restricted to only handsets which are compatible, the spider may emulate each known mobile communication facility 102 type to derive compatibility information.

For a WAP deck search, the wireless provider 108 may provide one or more entry points to the spider. This may be a list of one or more URLs representing content roots. The wireless provider 108 may provide the necessary access privileges to the WAP pages. This may entail providing information about private headers (e.g., X-Request) that may be supplied with the HTTP requests for authentication purposes or configuring the mobile application gateway such that a spider may pass through.

In embodiments, data received from the wireless provider 108 via a data feed or spidering may be maintained on equipment which is not accessible to unauthorized personnel. Thus, this data may not be directly accessible to end users. Metadata may be extracted, and indexes prepared, from this data, which may in turn be deployed in a production environment for use with services.

In embodiments, quality assurance of the platform may be attained through unit tests, integration tests, automated regression tests for resolved issues, and/or manual testing of mobile communication facilities 102. Testing of the platform servers may be accomplished though automated testing or manual testing. Continuous testing may be used during the development stage of a project. Release qualification testing may be used when a release has entered code-freeze. A process of continuous testing may ensure that behavioral changes are intentional and that quality does not degrade over time. This may be accomplished through a combination of development policies and automated testing. Each class in the server may have unit test coverage written and maintained by developers. A specific unit test may not need to be written for each and every method since some are too small to require it and some may be difficult to test in isolation. Some or all of the individual components may be tested in isolation. Unit tests may include several groups, such as, smoke tests (a limited set of tests intended to test the most important features and run in a small amount of time), exhaustive tests (a larger set of tests intended to test all areas of the product fully), and performance tests (a set of tests that take longer to run due to the nature of the tests being performed).

In embodiments, to assist identification of quality issues a continuous build process may be used. Before each submission of code change to source control, developers may run the set of smoke tests and fix any unit tests that have been broken (if those changes are expected and desired). An automated build machine process may watch for changes in the source control system and initiate a smoke test build anytime it notices changes that have not been tested. This process may act as a consistency check for the checked-in source code. Failures in this build may be considered emergencies and may be fixed immediately by the developer who introduced the failure. Another automated build process may build the server and run the exhaustive and regression unit test suites on scheduled intervals. Failures in this automated build may be sent to the developers who have made changes since the previous run so that issues are known about as quickly as possible. Additional automated builds include: code coverage (compute and calculate coded coverage metrics), code analysis (check for questionable code constructs and style), and performance unit test suite (run the long running performance unit tests).

In embodiments, the platform 100 may render to all versions of WAP (and CHTML or iMODE) through the use of the WALL/WURFL toolkit which detects the phone version from the user and then renders appropriately. The WAP site may take advantage of capabilities of newer WAP versions and therefore render differently on different WAP versions. Testing may be used to verify that the WAP appears and functions appropriately on different phone versions. Minimal acceptance testing may be used on previously untested phones to evaluate the phone and to locate bugs. Minimal acceptance testing may also be used on phones that have previously passed full acceptance testing after small WAP site changes. Full acceptance testing may be run on mobile communication facilities 102 that have not previously passed full acceptance testing or after major WAP changes. Testing may include, but is not limited to, the following steps: verify basic page layout, verify that the numbering is correct, that the table or list is laid out properly, and that the link traversal is correct, check that the content item names are indented correctly, verify that the Artist Name is in the correct location, verify that search term matches are highlighted, check that the colors of links are correct, follow every link and validate that page (Full Test Only), and verify the numeric access keys work. The testing protocols may include the use of emulators, profilers, debuggers, and/or network monitors.

In embodiments, search metric and business reporting may include report interpretation and product recommendations based on search data patterns and behavior. Custom reports and alternative delivery options may also be available. A search summary report may provide roll up data to view the search usage across all platforms (e.g., mobile web search, gateway error traffic and paid search). The report may include total volume, day and time of day reporting, and usage of each search system. A search volume report may indicate intraday and intraweek search volume to monitor mobile search usage. A search query stream report may detail each query and the number of times the query is sent to the search engine during the period. This report may be used for understanding the overall search behavior of the user population. An emerging queries report may indicate queries that are rapidly accelerating or decelerating in volume. This report may be used for merchandising purposes and for identifying the content, products, or services to source and promote to the user base.

In embodiments, a WAP usage report may detail the WAP search site usage patterns available in aggregate, by phone model, and by content provider (when more than one content provider is indexed.) A WAP usage report may contain the following data elements: # of Searches, # of times the search engine has at least one result, average # of results for each search, # of times each content category responds to a search, # of clicks per search result page, # of pages viewed per search, # of unique users, # of sessions, session length in time, session length in page views, total # of page views, and/or the conversion rate from search to content purchase.

In embodiments, application usage reports may detail the application usage in the aggregate and by phone model and by content provider (when more than one content provider is indexed. The report may contain the following data elements: # of searches, # of times the search engine has at least one result, average # of results for each search, # of times each content category responds to a search, # of clicks per search result page, # of pages viewed per search, # of unique users, of sessions, session length in time, session length in page views, total # of page views, and/or the conversion rate from search to content purchase.

In embodiments, a paid search performance report may provide the performance of the paid search engine directly in response to request from the system. Reports may be segmented between WAP and application usage and include: # of requests to paid search database, # matches, match rate—% of time a paid listing is available, fill rate—% of paid listings requested that are filled by the paid search engine, click-through rate, average cost-per-click, clicks per advertiser, gross revenue per advertiser, total gross revenue, total net revenue In embodiments, application adoption reports may detail the adoption of the downloadable application during the period, including # of promotional impressions served, # of clicks to learn more, # of downloads, and the # of active applications.

In embodiments, service metrics reports may detail and summarize data regarding the operation of servers, including, average requests per second, peak requests per second, requests/second distribution, maximum request size, and/or the average response time.

In embodiments, for each report type the wireless provider 108 may request different levels of specificity for different purposes, for example, executive summaries that present a small amount of data in an aggregated way intended to give a high-level overview; a detailed summary that presents a larger set of data aggregated to provide more detailed information. This type of report may be used in circumstances where the wireless provider 108 wants analysis of the raw data and provided with digested information; and/or transaction logs that present raw data collected. This type of report may be used when the wireless provider 108 would like to do its own analysis.

In embodiments, reports may be formatted using raw line-based log file (mostly used for transaction logs), XML, HTML (formatted by applying XSL to the XML), and/or plain text (formatted by applying XSL to the XML).

In embodiments, reports may be delivered using email, where the wireless provider 108 provides an email address. The subject of the message may include the name of the report and a timestamp. Reports may also be delivered by FTP, where the wireless provider 108 provides a host name, user name, password, and directory name. Reports are then delivered as file drops into the given directory. The filenames include the name of the report, a timestamp and sequence number.

An aspect of the present invention relates to providing useful responses to information entered into an address bar 174 of a mobile communication facility when the information does not properly correspond with an existing URL or other website reference. In embodiments, a user of a mobile communication facility may enter information into an address bar 174 on the mobile communication facility and the information may be a misspelled URL, an unknown URL, or the like. In other situations, the user may have been entering search terms rather than a URL thinking the address bar 174 was the search query entry facility. There are many reasons that misinformation may be entered into an address bar 174 on a mobile communication facility and embodiments of the present invention serve to provide a user with useful information even after entering such misinformation.

In embodiments, misinformation entered into the address bar of a mobile communication facility may be a wrong URL, a mis-typed URL, may not correspond with a presently active webpage, may be a broken link, missing page, or other information that cannot be matched with a website, URL, or other site indication.

Figure 12:
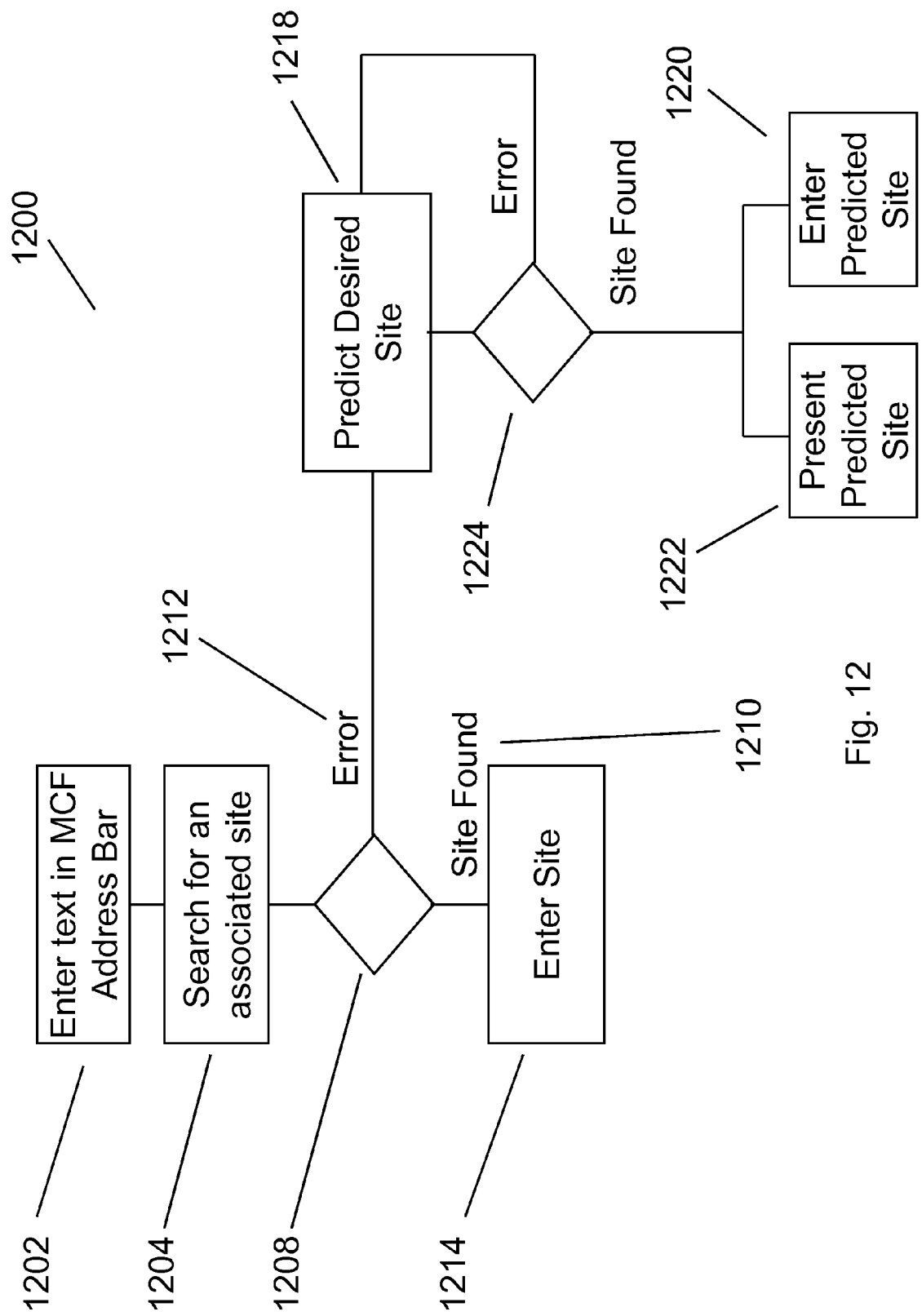
FIG. 12 illustrates a website prediction process based on misinformation entered in a mobile communication facility address bar.

FIG. 12 illustrates a prediction process associated with misinformation entered into an address bar 174 of a mobile communication facility 102. In this prediction process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the prediction of the desired site may be employed. The site prediction facility may reside in the mobile communication facility, in the wireless provider, or in another related facility, for example.

The prediction associated with step 1218 may be based on a disambiguation facility (e.g. as described herein in connection with FIG. 1), a correction facility (e.g. as described herein in connection with FIG. 1), or other facility designed to predict what site the user intended to visit. For example, the text entered into the address bar 174 may have been correctly associated with a URL except for the fact that the ".com" was not included, it was mistyped, misspelled, or the true extension was ".net" or it otherwise included erroneous extension information. A prediction facility associated with step 1218 may go through a process of including or replacing extensions to find associated web sites. As another example of misinformation included in the address bar 174, the text may have included mistyping and the like associated with the prefix (e.g. typing "wwe." instead of "www." or entering a comma instead of a period before the URL). A prediction facility associated with step 1218 may go through a process of including or replacing the prefix information to find associated websites. As yet another example of misinformation included in the address bar 174, the user may have misspelled the URL, entered an abbreviated URL, entered search terms instead of a URL or the like. A prediction facility associated with step 1218 may go through a process of spell checking and correcting the text with what is perceived as the intended target site. In the course of predicting and correcting the text to associate the mis-directed text entry, the prediction facility may use other techniques for aiding the user (e.g. those described in connection with correcting, disambiguating, and otherwise aiding the user in better targeting search query, as described herein (e.g. as described herein in connection with FIG. 1)).

Once a site is predicted through step 1218, the predicted site may be entered 1220 and presented on the mobile communication facility 102. The process of predicting the desired site 1218 may also involve predicting and then searching for the predicted site 1224. If the predicted site does not exist or respond, a prediction facility associated with the prediction step 1218 may refine the prediction and search again. This process may be undertaken several times until a predicted site is located or until the process times out due to some preset timeout period, for example.

In embodiments, a process for predicting the desired site from misinformation entered into an address bar 174 of a mobile communication facility may involve the steps of predicting the desired site 1218 after receiving an indication 1212 that no site exists or responds to the misinformation. The prediction 1218 may involve correction, disambiguation or other such techniques as described herein. For example, the prediction may involve using information related to the mobile communication facility (e.g. mobile subscriber characteristic information) to assist the disambiguation or correction of the misinformation. Once a prediction is made, the prediction may be tested 1224 (e.g. a search for a related URL may be conducted), the prediction may be presented to the user as a suggestion 1222, or the site associated with the prediction may be entered and presented 1220, for example.

Figure 13:
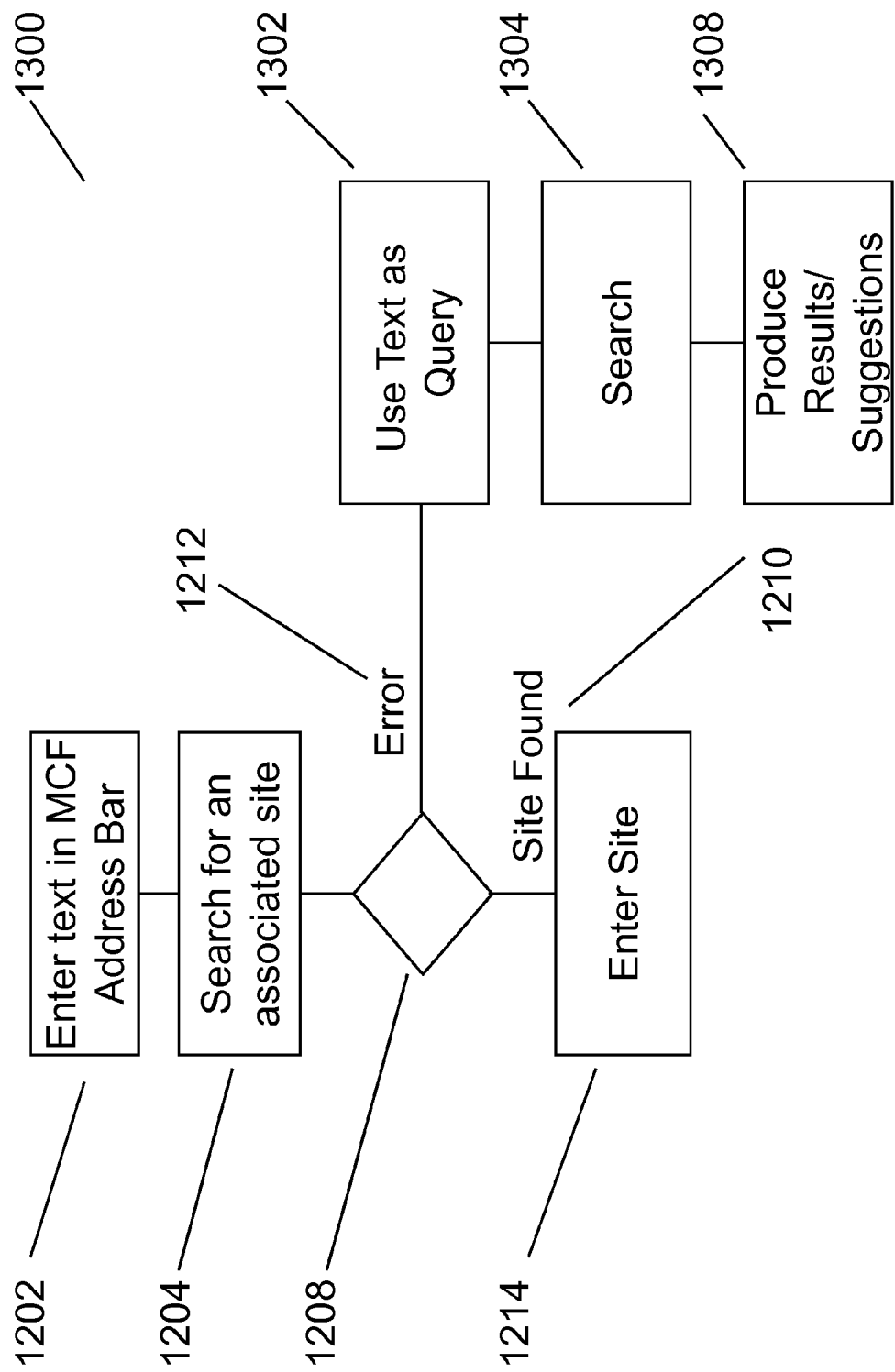
FIG. 13 illustrates a search query process based on misinformation entered in a mobile communication facility address bar.

FIG. 13 illustrates a search process based on misinformation 1300 entered into an address bar 174 associated with a mobile communication facility 102. In this search process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

Once an error 1212, or other indication the desired site is unavailable, is produced, the text entered into the address bar 174 may be used as a search query 1302 (e.g. in a similar fashion as if the text were entered into a search query facility as described in connection with FIG. 1). For example, the text may be disambiguated if it is ambiguous; it may be corrected (e.g. the spelling may be checked and corrected); or suggestions related to the query, disambiguated query, or corrected query may be produced for the user. Once the search query, corrected search query or disambiguated search query is determined, it may then be used to perform a search for results 1304. The search may produce results and or produce suggestions or other related information 1308. For example, as disclosed in connection with other embodiments herein (e.g. in connection with FIG. 1), the search results or suggestions may be produced in coordination with information relating to the mobile communication facility 102 (e.g. mobile subscriber characteristic information). In embodiments, an algorithm facility 144 (e.g. as illustrated in connection with FIG. 1) may be used in connection with information relating to the mobile communication facility to better predict what the user is looking for.

In embodiments, a process for searching for information relating to misinformation entered into an address bar 174 of a mobile communication facility may involve the steps of producing a search query from the text entered in the address bar 174 1302 after receiving an indication 1212 that no site exists or responds to the misinformation. The search query 1302 may involve correction, disambiguation or other such techniques as described herein. For example, the development of the search query may involve using information related to the mobile communication facility (e.g. mobile subscriber characteristic information) to assist the disambiguation or correction of the misinformation. Once a search query is made, search results and or suggestions and or recommendations or other information relating to the text entered in the address bar 174 may be presented to the user on the mobile communication facility.

Figure 14:
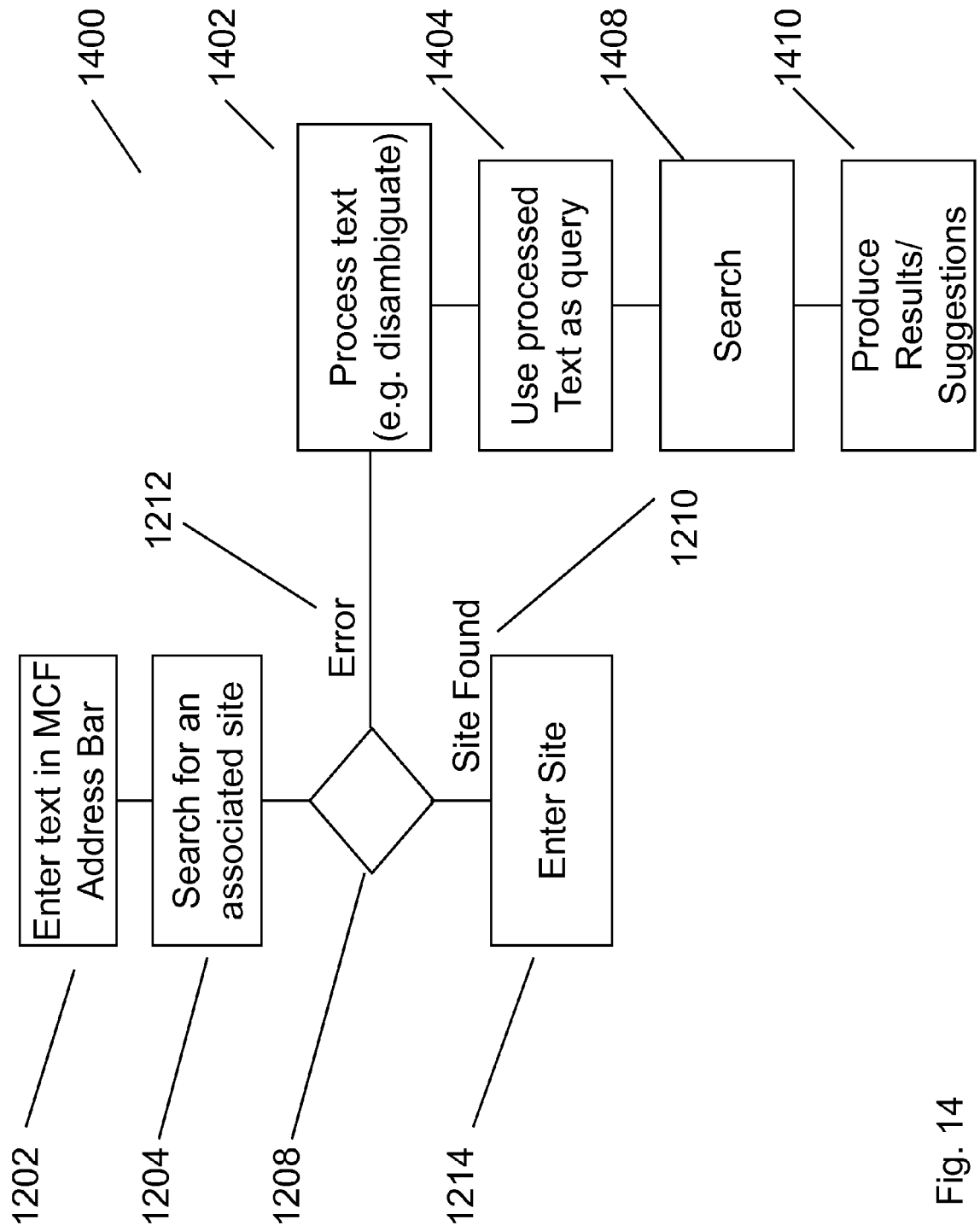
FIG. 14 illustrates a search query process based on misinformation entered in a mobile communication facility address bar.

FIG. 14 illustrates a processed search query process based on misinformation 1400 entered into an address bar 174 associated with a mobile communication facility 102. In this search process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

The text entered from the address bar 174 may be processed 1402 through a disambiguation facility, correction facility, or other facility adapted to modify the text into a form more appropriate for a search on the mobile communication facility. The processed query may then be used as a search query 1404 and a search may be performed. Results, suggestions, and or other information pertaining to the processed query may be produced and displayed on a display associated with the mobile communication facility 102.

Figure 15:
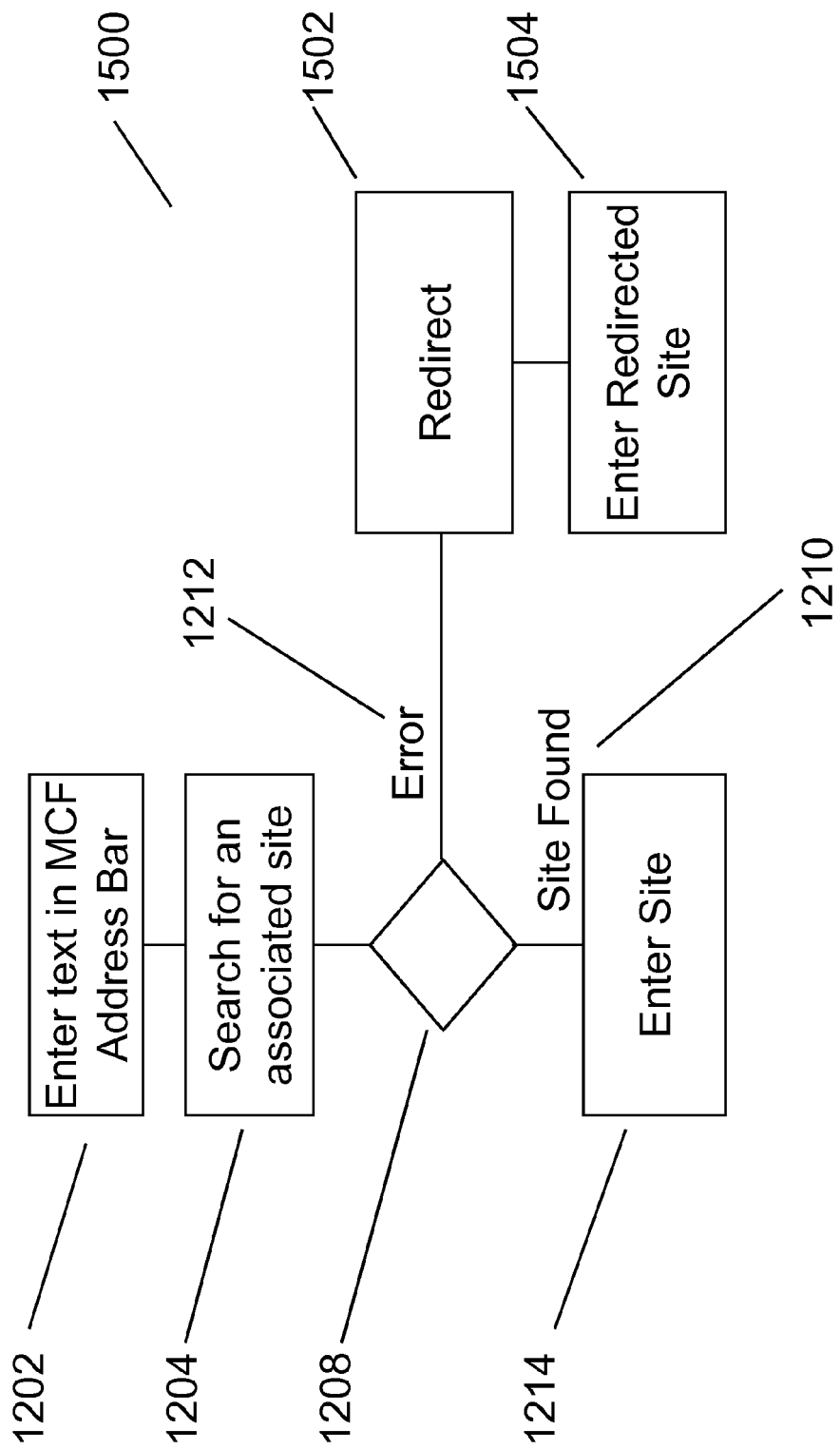
FIG. 15 illustrates a redirection process based on misinformation entered in a mobile communication facility address bar.

FIG. 15 illustrates a redirection process based on misinformation 1400 entered into an address bar 174 associated with a mobile communication facility 102. In this redirection process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

Following the error, or other indication that the site is unavailable, 1212, a redirected site may be chosen 1502. The redirection 1502 may be based on a table, algorithm, or information relating to the originally unavailable site indicating the correct site. For example, the unavailable site may produce information indicating there is a related site. A referenced URL may be provided for example. Given this redirection information, the mobile communication facility may be redirected to the new site.

In embodiments, information relating to the mobile communication facility may be used to redirect the user to a redirected site. For example, a user may misspell a URL and information relating to the mobile communication facility may indicate what the user intended to enter. For example, mobile characteristic information may contain information showing that the user has recently viewed a site with a very similar URL to the mistyped URL entered and the previously visited site may be presented to the user. In embodiments, an indication that the URL as entered was unavailable may also be presented to the user indicating a process of suggesting alternatives was used.

In embodiments, the redirection, search, text processing, results presentation, suggestions or other methods of managing information entered into the address bar of a mobile communication facility may be aided through an algorithm facility 144. The algorithm facility 144 may use information relating to the mobile communication facility 102 in the process of determining what information the user is most interested in. The algorithm facility may be a collaborative filter or personal, for example, and the filter may use information from the mobile characteristics database in the process of delivering user targeted results.

Another aspect of the present invention relates to processing errors related to search queries and address queries entered on a mobile communication facility. In embodiments, the error processing may be accomplished through software on the mobile communication facility. In embodiments, the error processing may be accomplished through software remote from the mobile communication facility (e.g. on a server associated with a wireless provider 108 or associated with the wireless communication facility 104). In embodiments, the error processing may be done using software processing in part on the mobile communication facility and in part on a platform remote from the mobile communication facility.

Figure 16:
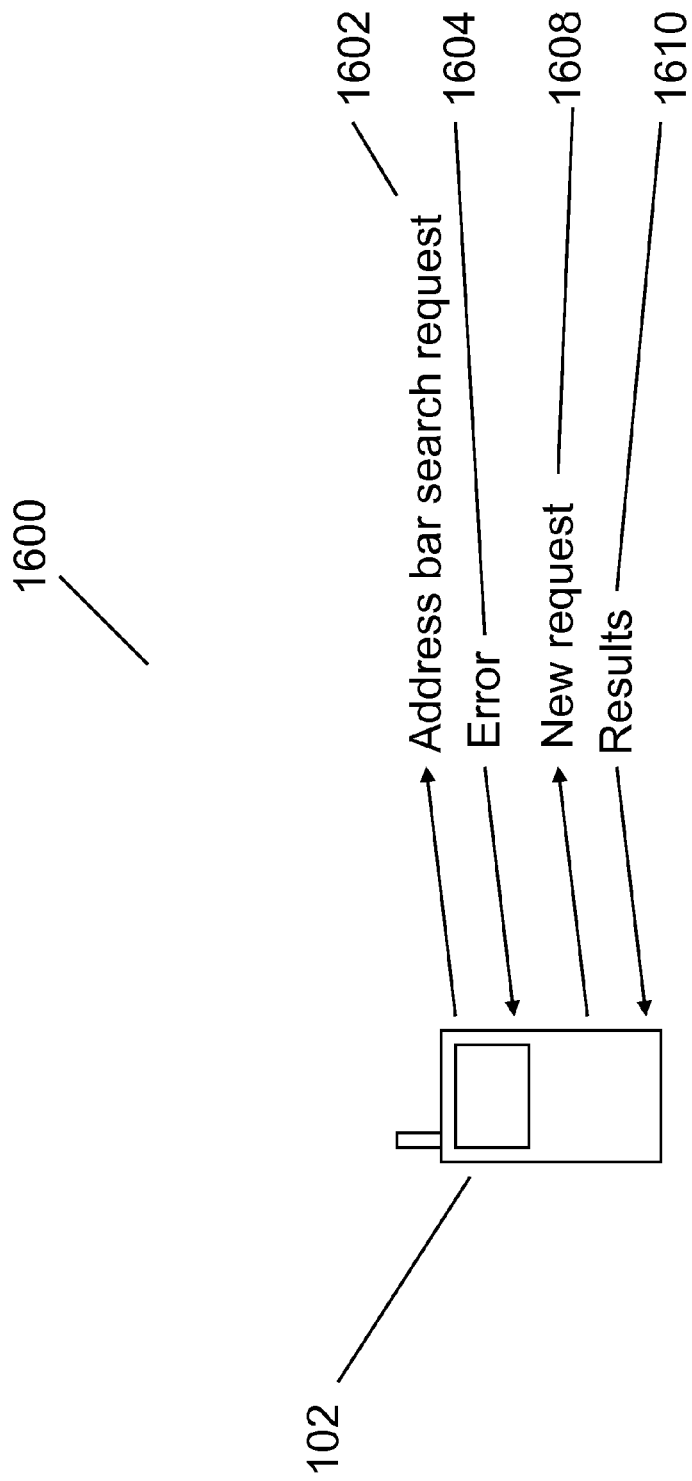
FIG. 16 illustrates a mobile communication process for managing misinformation entered in a mobile communication facility address bar.

FIG. 16 illustrates an error processing method 1600 wherein the error processing is performed, at least in part, on the mobile communication facility 102. In this embodiment, the mobile communication facility may be used to communicate an address search request (e.g. associated with an address entered into an address search bar on the mobile communication facility) to a server facility 1602. The server may be a server associated with a wireless provider for example. In the event there is no such address or URL located, or the located address is inactive or otherwise produces an error, an error 1604 may be produced in the mobile communication facility indicating such. This error may be a similar error to that described in connection with FIGS. 12-15 as error 1212.

Once an error 1604 or the like is produced, the software platform on the mobile communication facility 102 may respond to the error in a variety of ways (e.g. the error processing associated with FIGS. 12-15). For example, as indicated in connection with FIGS. 12-15, the software on the mobile communication facility 102 may predict a desired site 1218, use the text as a search query 1302, further process the text entered 1402, redirect the mobile communication facility to another website 1502 or otherwise perform a process in response to the error 1604. Following the error processing, the mobile communication facility may generate and communicate an additional request for information 1608. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented. As another example, the new request 1608 may be formed as a search query, or a processed query (e.g. disambiguated) intended to be fed into a search engine, as described in connection with FIGS. 13-14. As yet another example, the new request 1608 may be a redirected request as described in connection with FIG. 15. It should be noted that a user may intend to place a search query into the location box intentionally.

Figure 17:
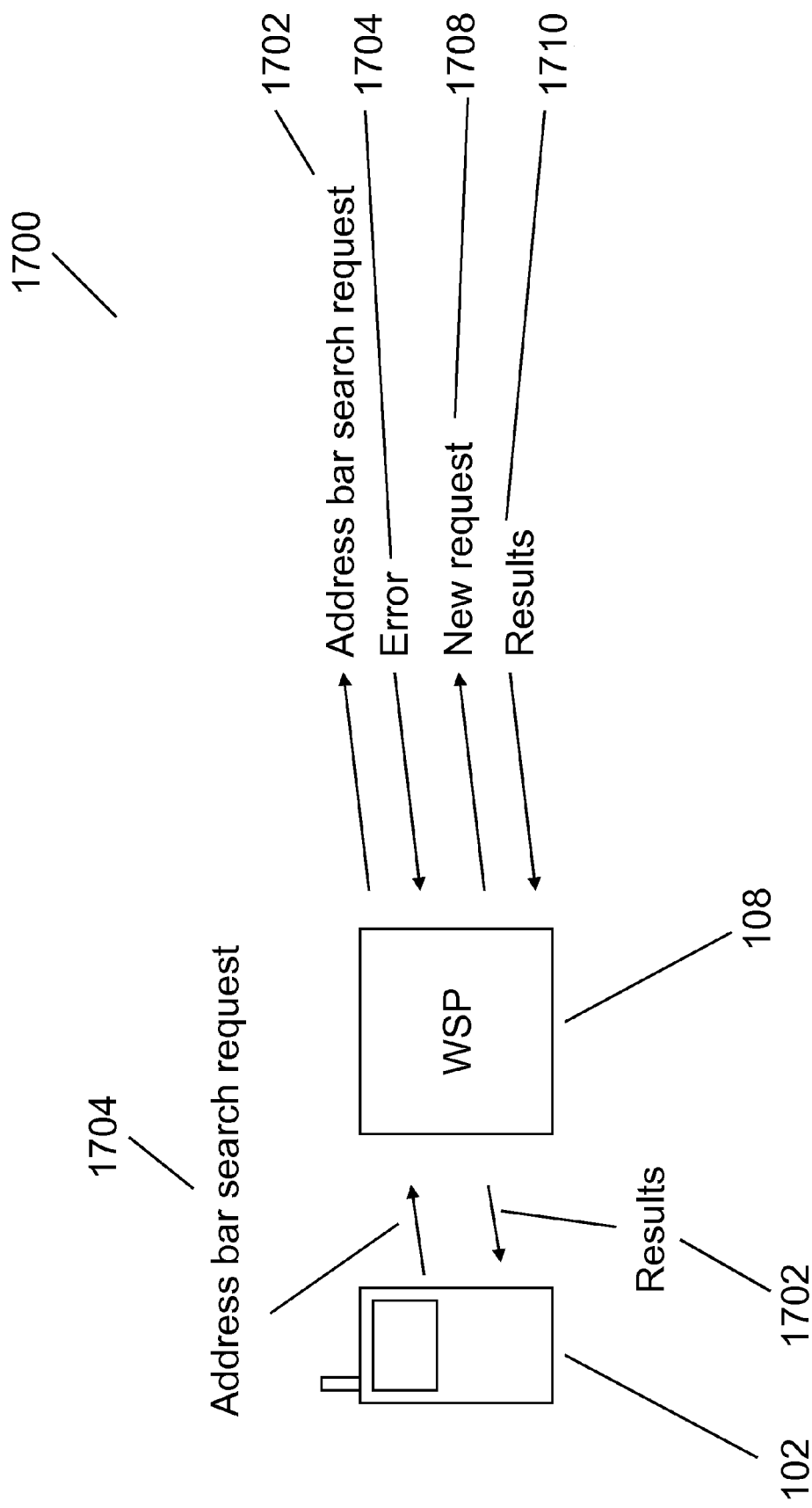
FIG. 17 illustrates a mobile communication process for managing misinformation entered in a mobile communication facility address bar, wherein at least a portion of the management is provided in association with a wireless provider.

FIG. 17 illustrates an error processing process 1700 wherein the error processing is performed, at least in part, remote from the mobile communication facility 102. In this embodiment, the mobile communication facility may be used to communicate an address search request 1704 (e.g. associated with an address entered into an address search bar on the mobile communication facility) to a server facility associated with a wireless provider 108. The server may be a server under the control of the wireless provider or it may be otherwise associated, for example. In the event there is no such address or URL located, or the located address is inactive or otherwise produces an error, an error 1704 may be produced at the server associated with the wireless provider 108 indicating such. This error may be a similar error to that described in connection with FIGS. 12-15 as error 1212.

Once an error 1704 or the like is produced, the software platform on the server associated with the wireless provider 108 may respond to the error in a variety of ways (e.g. the error processing associated with FIGS. 12-15). For example, as indicated in connection with FIGS. 12-15, the software on the server may predict a desired site 1218, use the text as a search query 1302, further process the text entered 1402, redirect the mobile communication facility to another website 1502 or otherwise perform a process in response to the error 1704. Following the error processing, the server may generate and communicate an additional request for information 1708. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented. As another example, the new request 1708 may be formed as a search query, or a processed query (e.g. disambiguated) intended to be fed into a search engine, as described in connection with FIGS. 13-14. As yet another example, the new request 1608 may be a redirected request as described in connection with FIG. 15.

An aspect of the present invention relates to providing sponsored links. In embodiments a sponsor may be provided with an interface to allow it to enter sponsor information, such as bidding information, content to be presented in the event a bid is won, contact information, device compatible information, profiles the sponsor is targeting, locations the sponsor is targeting and the like. For example, a sponsorship facility 162 (e.g. as described in connection with FIGS. 1 and 2) may be adapted with a sponsorship entry facility. The sponsorship facility 162 may perform other functions in connection with providing sponsored links on a mobile communication facility as well. For example, the sponsorship facility 162 may facilitate a bidding process and/or present the sponsored content to the mobile communication facility. In embodiments, information relating to the mobile communication facility (e.g. mobile subscriber characteristic information) may be used in the sponsored link process.

Figure 18:
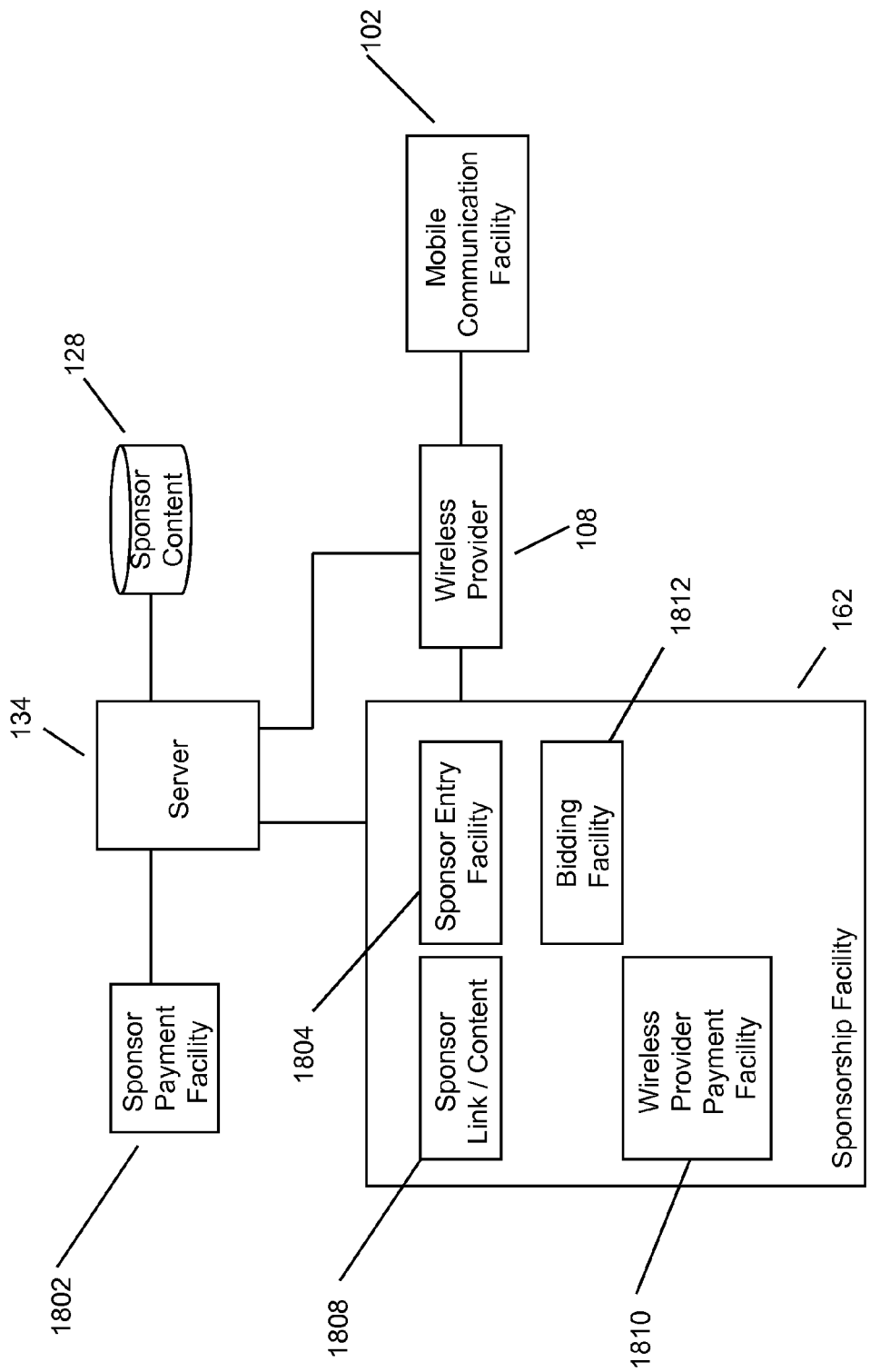
FIG. 18 illustrates a sponsored links platform.

FIG. 18 illustrates a sponsored content facility 1800 wherein a mobile communication facility 102 is in communication with a wireless provider 108. The sponsorship facility 162, which may be part of a mobile search host facility 114, includes a sponsor entry facility 1804 where a sponsor may begin the process of entering information relating to sponsored content, bids, search criteria and the like. The sponsorship facility 162 may include a bidding facility 1812 to handle a bidding process between several sponsors; a payment system 1810 to handle payment transactions associated with the sponsored content; and a sponsored link/content facility 1808 adapted to direct and/or provide the sponsored content. A sponsor may be associated with a server 134 application that is adapted to access sponsored content database 128 and a sponsor's payment facility 1802.

In embodiments, the sponsor may enter a bidding process to provide certain sponsored content to a mobile communication facility 102 through a sponsor entry facility 1804. The sponsor may provide bid information (such as max bids for certain keyword matches), content information, compatibility information and the like. Once the sponsor has entered the sponsor process through the sponsor entry facility 1804, it may be in a position to display the sponsored content on a mobile communication facility in exchange for a bid amount. A user may enter a search query on the mobile communication facility 102, the query may be transmitted to a bidding facility 1812 where a bidding process may take place to determine which sponsor's content is going to be provided to the mobile communication facility 102. The bidding process may result in the award of certain sponsored content 128 as identified in the awardees information it originally indicated during the entry process. For example, the sponsor may have indicated that upon an award, a link or other content 1808 should be presented to the mobile communication facility.

A sponsor may present the mobile communication facility 102 with purchasable content and a user may purchase the content through the mobile communication facility 102 and make payment for the content through the wireless provider 108. For example, the content may be a downloadable ringtone, music file, video file, wallpaper, or the like. The sponsor may elect to provide billing for such content through the wireless provider billing facility 1810. This may provide a convenient, secure, and/or trusted user transaction. The user may be comfortable in purchasing the content through his wireless provider as it may provide more of an appearance that it is provided from a known source. This may generate more of a 'walled garden' feel from the user's perspective while allowing the user to search for and/or receive such content on the open web. When the sponsor allows for payment of the content through the wireless provider payment facility 1810, the wireless provider 108 may receive a portion of the user's payment (or some other compensation) in return for the billing service.

In embodiments, the sponsor payment facility 1802 may be used to pay for sponsored links that were awarded and/or presented to a mobile communication facility 102. For example, once sponsored content is awarded and/or presented to the mobile communication facility 102, the bidding facility 1812 may request payment for the bid amount from the sponsor payment facility 1802. The sponsor payment facility 1802 may then process payment to the wireless provider payment facility 1810, for example.

Figure 19:
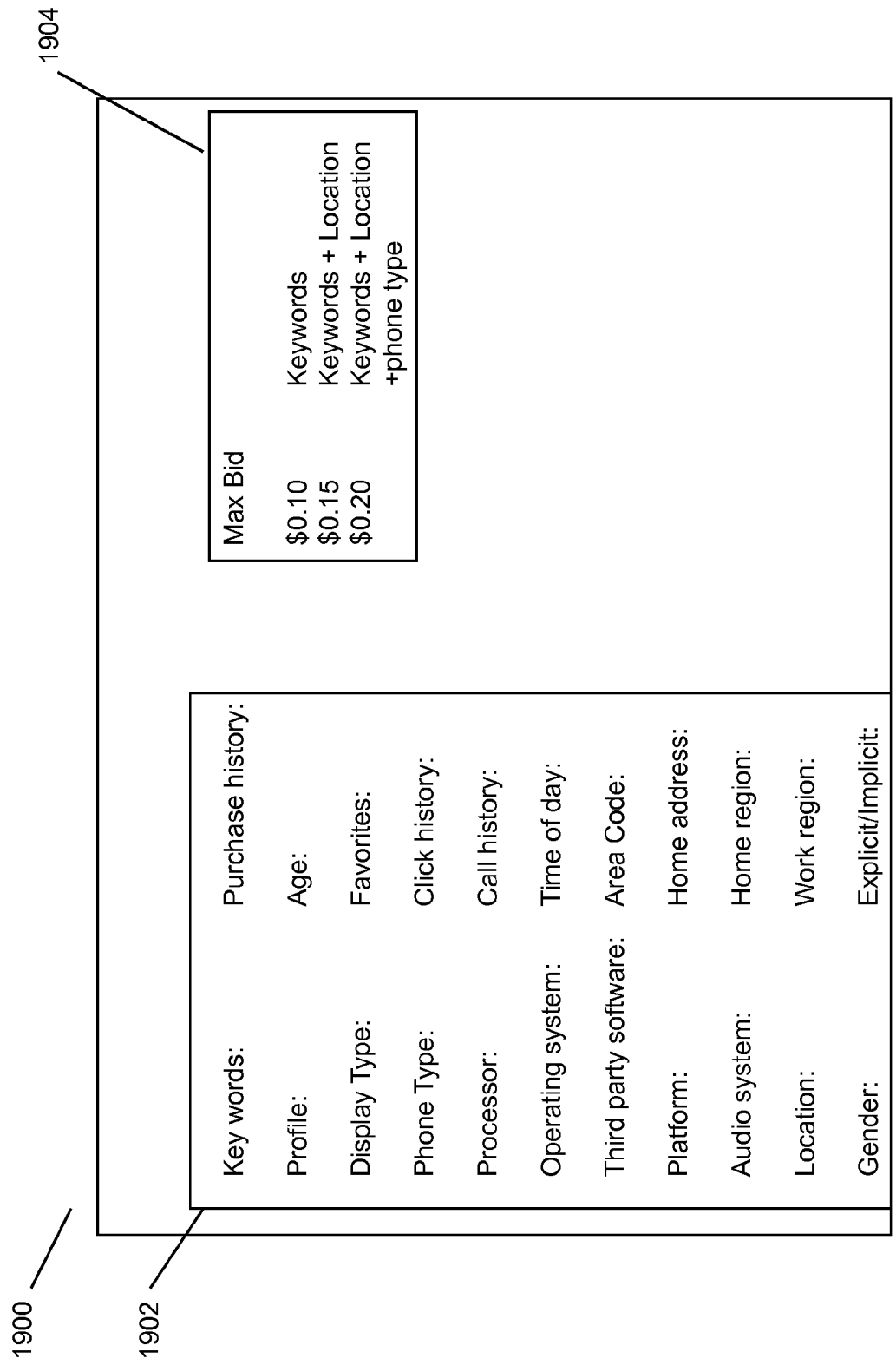
FIG. 19 illustrates a sponsor entry facility user interface.

FIG. 19 illustrates a sponsor entry facility user interface 1900 that may be provided to a sponsor when the sponsor interacts with the sponsor entry facility 1804. The user interface 1900 may include a criteria entry facility 1902 where the sponsor may enter criteria that are important to its bid for placing sponsored content. For example, the criteria entered in the criteria entry facility 1902 may relate to key words, phrases, terms, lingo, sms codes, user profile, mobile communication facility display type, mobile communication facility type, phone type, mobile communication facility, mobile communication facility processor type or capability, mobile communication facility operating system, mobile communication facility third party software, mobile communication facility platform characteristics, mobile communication facility audio system, location, user gender, user purchase history, user age, favorites, click history, call history, time of day, day of year, mobile communication facility area code, user home address, home region, work address, work region, mobile subscriber characteristics and the like.

The user interface 1900 may also include a bid entry facility 1904. The bid entry facility may provide a sponsor with the ability to enter bid amounts and corresponding bid criteria. For example, a maximum bid amount may be associated with criteria such as keyword relevancy match. In embodiments the maximum bid may be associated with simple matching criteria (e.g. such as matching a keyword) or it may be associated with a more complicated sting or weighted string of terms, events, or characteristics. For example, while a sponsor may provide a maximum bid of $0.10 for a keyword match, it may provide a bid of $0.15 for a combination of keyword and location, or $0.20 for a combination of keyword, location and phone type. As another example, the sponsor may bid $0.15 for a bid associated with a location and time of day if the search is an implicit search. While certain illustrations of bid criteria associated with bid amounts have been provided, it should be understood that the criteria matching may be any type of matching including without limitation weighted function matching, algorithm-based matching or any other type of rule-based, algorithmic, heuristic, or other matching.

In embodiments, a sponsor desirous of presenting its content on a mobile communication facility may be presented a plurality of menu formats with which to create sponsor content including, but not limited to, advertisements, promotional notices, offers, and so on. For example, the menu system may provide a sponsor an entry menu within which it may be possible for the sponsor to create a title for sponsor content, include an URL, street address, phone number, or other contact information. It may be possible to enter additional descriptive text, by line, by paragraph, and/or page.

In embodiments, a sponsor desirous of presenting its content on a mobile communication facility may be presented a plurality of menu formats with which to select the types of mobile communication facilities on which the sponsor would like to present the sponsor content. For example, the sponsor may wish to select a subset of mobile communication facility models that are best suited for presentation of the sponsor's content due to technological requirements for the content to optimally present. A sponsor may choose to present only on mobile communication facility models that are associated with other user characteristics that the sponsor would like to target (e.g., a cell phone model known to have high usage among college students).

In embodiments, a sponsor desirous of presenting its content on a mobile communication facility may be presented a plurality of menu formats with which to select the mobile communication facility platform and/or software types on which the sponsor would like to present the sponsor content. For example, a sponsor may have content that requires a Java-enabled device. Therefore, it may be desirable for the sponsor to select to present its content only on those mobile communication facilities that are Java-enabled.

In embodiments, a sponsor desirous of presenting its content on a mobile communication facility may be presented a plurality of menu formats from which to select key words and/or key phrases to associate with the sponsor's information. The menus may present individual words, lists of words, and/or phrases for which a sponsor may enter a bid amount. The bid amount may be a specific price, a price range, or a maximum price that the sponsor is willing to pay in order to have its content associated with the language.

In embodiments, a sponsor desirous of presenting its content on a mobile communication facility may be presented with keyword suggestions based upon keywords entered and/or selected by the sponsor. For example, a thesaurus may be employed to automatically present sponsors with additional keywords that are related to the keywords in which a sponsor manifests an interest in bidding.

In embodiments, a sponsor desirous of presenting its content on a mobile communication facility may be presented a plurality of menu formats from which to select geographic variables to associate with the sponsor's information. The menus may present individual area codes, city names, state names, country names, location entered by a user and/or be based upon GPS information derived from a location facility. Geographic information may also be presented in relation to other mobile subscriber characteristics. For example, a sponsor in the hotel business may be interested in having its content present to only those users that are outside of their hometown and/or normal work region.

In embodiments, a sponsor desirous of presenting its content on a mobile communication facility may be presented a plurality of menu formats from which to select demographic variables to associate with the sponsor's information. The menus may present individual demographic variables contained in the mobile subscriber characteristics database, such as, age, sex, race, address, income, billing history, purchase history, and so forth.

In embodiments, sponsors' content may be displayed on a mobile communication facility in a descending rank order based upon the sponsors' bid amounts.

In embodiments, sponsors' content may be displayed on a mobile communication facility in a descending rank order based upon the amount of shared revenue derived from sponsors.

In embodiments, sponsors' content may be displayed and/or ordered on a mobile communication facility 102 based at least in part on using time as a criteria.

In embodiments, sponsors' content may be displayed and/or ordered on a mobile communication facility 102 based at least in part on a mobile subscriber characteristic, such as, the user, device type, geography, transaction, and/or history.

In embodiments, sponsors' content may be displayed and/or ordered on a mobile communication facility 102 based at least in part on the relevancy of the sponsored content. For example, relevancy may be based upon the information contained in a sponsor's content and keywords entered by a user in a query entry facility 120. Relevancy may be based upon the sponsor's content and mobile subscriber characteristics, such as, user, device type, geography, transaction, and/or history.

In embodiments, sponsors' content may be displayed and/or ordered on a mobile communication facility 102 based at least in part on a grouping or aggregation of mobile subscriber characteristics. For example, sponsors' content may be displayed on the basis of users' age ranges (e.g., 20-30 year olds).

In embodiments, the amounts payable as a result of the sponsor billing process may be processed within the billing system of a wireless provider. For example, when the sponsor enters a wireless provider's bidding system it may enter into an agreement with the wireless provider such that any presented sponsored content is paid for. The payment may come directly from the sponsor to the wireless provider, for example. In embodiments, a user of the mobile communication facility may interact with sponsored content (e.g. click on a sponsored line) and make a transaction within the sponsored content (e.g. the user may purchase a music download, ringtone, wall paper or the like). In such embodiments, the purchase price of the purchased content may appear on the user's wireless provider bill, as opposed to being billed from the sponsor.

In embodiments, mobile communication facility users may be classified on a combination of mobile subscriber characteristics, device type, location, behavioral history, transaction history, or other parameters and the resulting classes presented in a menu format to sponsors for bidding. For example, it may be possible to statistically model the user characteristics within a population of a wireless provider's customer base that are most likely to purchase tickets for a Caribbean cruise. Once this model is known, all customers with approximately the profile described by the model could be grouped in a "Caribbean Cruisers" category. This category may then be included in a menu system, along with other categories, and presented to sponsors for bidding. Swimwear companies, sunglass companies, etc. may have an increased interest in bidding for access to the Caribbean Cruisers category because of the increased probability that users in this category have a need for their products. Summary of the many characteristics (variables) used in the model into a single category may make the bidding process less time-consuming to sponsors and may constitute a proprietary product. Furthermore, the statistical model may be continually updated to accommodate changing user preferences.

In embodiments, a sponsor's website may be evaluated to determine the frequency of the appearance of key words and/or key phrases. Once the keyword and/or key phrase frequency is known, a site relevancy score may be derived indicating the relevance of keywords to the content of a sponsor's website. This relevancy score may then be used to assist sponsors in their bidding, making it easier for sponsors to focus their finances on keywords and/or key phrases with the greatest relevancy to their content.

In embodiments, the behaviors of mobile communication facility users may be automatically collected and the bid values in the bidding system adjusted to reflect user behaviors. For example, user calls, clicks, clickthroughs, purchases, and yield optimization may be automated and used to change the value of minimum or maximum bid values associated with a keyword.

In embodiments, an editorial review process may be used to evaluate the appropriateness of sponsors' selections of criteria with which to associate their content. For example, it may be inappropriate to have a sponsor associate adult content with keywords commonly associated with the interests of children. The editorial process may assist in locating and remedying such incongruities.

In embodiments, an automated spidering tool may be used to periodically monitor changes in sponsors' content and determine the reliability of the sponsor links. For example, a sponsor may update a website to such an extent that the sponsor's content that was previously associated with keywords through a bidding process is no longer reliable (i.e., the content is no longer located where the links direct a user). When this occurs, the system may send an alert to the sponsor indicating that the reliability of the sponsor content links is insufficient. They may serve to improve the overall reliability of the system.

Figure 20:
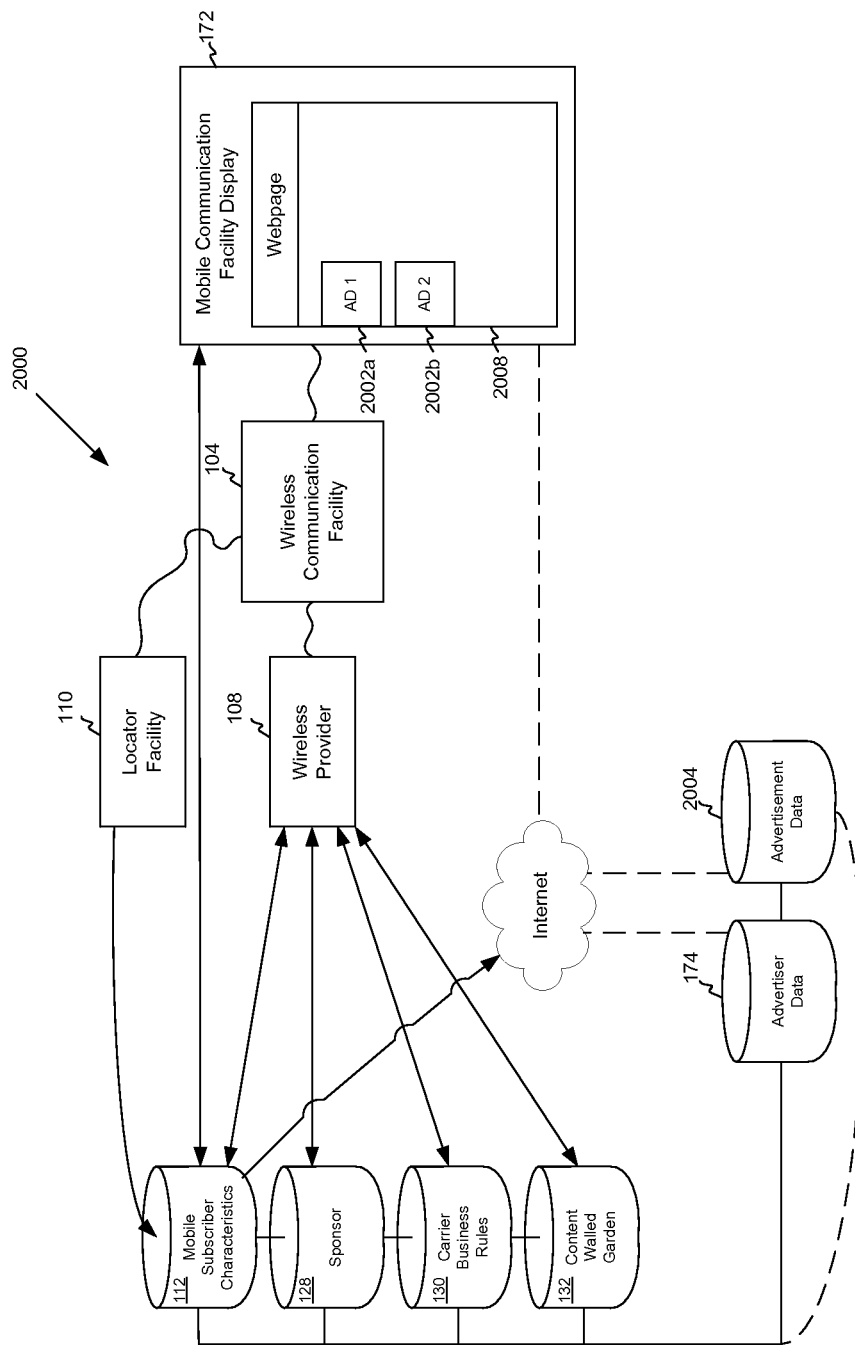
FIG. 20 illustrates a process for mobile advertisement syndication.

As illustrated in FIG. 20, an advertisement 2004 may be presented to a mobile communication facility 102 based at least in part on receiving a webpage request from the query facility of a mobile communication facility 102, receiving information associated with the mobile communication facility 102, and associating at least one advertisement 2002a with a webpage at least in part based on the information relating to the mobile communication facility 102. For example, a user of a mobile communication facility 102 may initiate a search query consisting of an explicit text query spelling a musician's name. The potential search results that may be presented to the user's mobile communication facility 102 may include advertisements 2002a, 2002b and websites for the musician's CD's, videos of his performances, etc. Alternatively, a mobile communication facility user may enter an address request (e.g., an internet URL) requesting a specific website devoted to a musician. This address request may in turn be associated with advertisements and other websites related to the musician's CD's, videos of his performances, etc. Information about the mobile communication facility 102 (e.g., its video streaming capabilities) may be used in order to determine which of the advertisement/webpage 2008 results may be presented successfully to the user's mobile communication facility 102. This information may, in turn, be used to pair webpages and advertisements 2004 that are each capable of presenting in the display of the user's mobile communication facility 102.

In embodiments, an implicit query may be received from a user of a mobile communication facility 102 and used at least in part to derive associations with advertisements 2004. For example, mobile subscriber characteristics 112, carrier business rules 130, or mobile communication facility 102 information, in conjunction with time, location, or similar situation, may suggest relevant advertisement-webpage 2008 pairing recommendations for the user. The recommended advertisements 2002 may be paired with webpages presented prior to, during, or following, the display of the advertisement 2002 results. A content request may be made by an implicit query request based at least in part on a mobile subscriber characteristic 112. For example, a user's mobile subscriber characteristics 112 may include the user's date of birth. Thus, an implicit query may be generated on the user's birthday in order to cull advertisements 2004 related to celebration of a birthday, discounts for customers on their birthdays, etc. A content request may be made an implicit query request based at least in part on a characteristic of a user's mobile communication facility 102. For example, if a mobile communication facility 102 type is associated with a demographic (e.g., age), an implicit query may be initiated to cull advertisements 2004 of probable relevance to the user of that mobile communication facility 102 type.

In embodiments, a user's prior search activities and search results may also be used to create implicit query requests for the user. Prior search activities may include transactions, search queries, visits to websites, and other acts initiated by the user on the mobile communication facility 102. The geographic location of the mobile communication facility 102 may foster implicit queries including, but not limited to, products and services in the user's current geographic vicinity. The current time may be used independently or in conjunction with other information to create implicit queries. For example, the independent fact that it is noon, may initiate an implicit query for restaurants serving lunch. As with the above restaurant example, similar processes for generating meaningful recommendations may be applied to other services and products, including, transportation, food, theater, sports, entertainment, movies, corporations, work, bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2002 may be presented to a mobile communication facility 102 based at least in part on information relating to mobile subscriber characteristics 112. This information may include a user's individual demographic variables contained in the mobile subscriber characteristics database 112, such be age, sex, race, religion, an area code, zip code, a home address, a work address, a billing address, credit information, family information, income range, birth date range, birthplace, employer, job title, length of employment, an affiliation or other such information as described herein. The mobile subscriber characteristic 112 may be associated with a personal filter. The mobile subscriber characteristic may be used in conjunction with a collaborative filter. The mobile subscriber characteristic 112 may include an aggregate of user characteristics or include a range of values. The range of values of a user characteristic may be a range of a user demographic. The range of values of a user characteristic may be a range of behaviors, or a range of age.

In embodiments, mobile subscriber characteristics 112 may form parameters that limit the advertisement 2002 search results to those relevant to a mobile subscriber characteristic 112 or profile of multiple characteristics. The display of advertisement 2002 result set(s) may, thus, omit information, prioritize information (e.g., presenting sponsor links prior to all others), highlight a subset of the search result set, or order the display of information based upon the presence or absence of mobile subscriber characteristics 112. Examples of representative elements that may be stored within the mobile subscriber characteristics database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

In embodiments, at least one advertisement 2004 may be associated with at least one webpage at least in part based on the information relating to a mobile subscriber characteristic 112 and mobile communication facility 102 characteristic combination. This information may provide an indication as to what the user may be looking for at a given time and location. For example, a user may be looking for transportation, food, a theater, sports, entertainment, movies, corporations, work, a bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2004 may be presented to a mobile communication facility 102 based at least in part on information relating to a mobile communication facility 102. This information may form parameters that limit the advertisement 2002 search results to those compatible with, relevant to, or preferred for presentation on a given type of mobile communication facility 102. The display of advertisement 2002 result set(s) may, thus, omit information, prioritize information (e.g., presenting sponsor links prior to all others), highlight a subset of the search result set, or order the display of information based upon the presence or absence of a mobile communication facility 102 or a feature of a mobile communication facility 102. Examples of representative elements that may be stored within the mobile subscriber characteristics database 112 include search history, a parental control, or a carrier business rule 130, display resolution, processing speed, audio capability, visual capability, and other technical characteristics. For example, an advertisement 2004 may be associated with only the subset of mobile communication facility 102 models that are best suited for presentation of the advertisement's 2004 content due to technological requirements for the content to optimally present. For example, an advertisement 2004 may have content that requires a Java-enabled device. Therefore, it may be desirable for the advertisement 2004 to present its content only on those mobile communication facilities that are Java-enabled.

In embodiments, advertising and webpage content compatibility with a type of mobile communication facility 102 may be determined at least in part by tracking a plurality of mobile communication facility 102 interactions with such content. Information may be stored pertaining to the advertising and web interactions in a database, where a portion of the information comprises identification of at least one mobile communication facility 102 from the plurality of mobile communication facilities, and predicting the compatibility of the mobile communication facility 102 with the content based, in part, on how many content interactions there were. The prediction of compatibility of the mobile communication facility 102 with content may be based, in part, on how many interactions there were in the user's past. Content may be a download, program, file, executable file, zipped file, compressed file, audio, and video. An advertising or web interaction may be a click on a hyperlink, an indication of downloaded content, and/or an indication of a downloaded program.

In embodiments, advertising content may be associated with webpage content and the at least one mobile subscriber characteristic 112 and or the at least one mobile communication facility 102 characteristic.

In embodiments, an advertisement 2004 may be associated with at least one webpage based at least in part on information relating to a mobile communication provider. The information relating to a mobile communication provider may include, but is not limited to, a graphical trademark, audible signal, a recording of a person reading the slogan trademark of a mobile communication provider, a distinctive audio tone or combinations of tones associated with a mobile communication provider, or a video stream, such as an audio-visual commercial.

In embodiments, the past performance or other information relating to a mobile communication facility may be stored, aggregated, and analyzed on a remote server 134 and database 138, wireless provider data facility 124, the mobile communication facility, or other similar facilities. Past performance may include, but is not limited to, past content interaction, content download, audio content streaming, video content streaming, content contained in java cookies, content contained in temporary internet files stored on the mobile communication facility, past transaction information, and the like.

In embodiments, an algorithm facility 144 may perform algorithms including algorithms for associating information relating to the past performance of a mobile communication facility or other information relating to the mobile communication facility. For example, an algorithm facility may include an algorithm to determine the cumulative frequency of a given past performance (e.g., downloading an MP3 file) within a single mobile communication facility 102 or group of mobile communication facilities. Content may be categorized into a yellow-pages like taxonomy and this taxonomy mapped onto the past performance of a mobile communication facility 102 or group of mobile communication facilities. The taxonomies may then be ordered according a descending order of the cumulative rank associated with the mobile communication facility or group of mobile communication facilities. For example, applying such an algorithm to a user's mobile communication facility past performance may result in a content taxonomy cumulative frequency rank similar to the following (e.g., where each number represents the cumulative, discrete content interactions): MP3: 92; Ringtones: 43; Online Musical Instrument Sites: 16; Newspaper websites; 2; Business Week Magazine Website; 1. Based on this array of data, the relevancy of content may be inferred and, as a result, content related to music (listening to and playing) given a higher priority rank than content related to news.

In embodiments, an algorithm may also correlate past performances within a single mobile communication facility 102 or group of mobile communication facilities. For example, an algorithm may compute a correlation coefficient to describe the association between the past performance of downloading an MP3 file and purchasing a concert ticket online, using a mobile communication facility 102. This coefficient may, in turn, form the basis for ordering content for presentation to a mobile communication facility 102. For example, it may be found that within a single mobile communication facility past performances, or a group of such facilities, the download of MP3 files is positively correlated with online concert ticket purchases, with a coefficient of 0.23, whereas download of MP3 files is positively correlated with the download of real estate listings with only a coefficient of 0.04. This information may be used to rank the relevancy of content such that a person with a past performance of an MP3 download is presented content related to concert ticket purchases more frequently than, with preference to, with prioritized placement within the mobile communication facility display 172 over, to the exclusion of, and so on, any content related to real estate listings. This information may also be used to infer the appropriateness and likelihood of content interaction. For example, a mobile communication facility 102 with many past performances of MP3 downloads, but no online concert ticket purchases may be a prime candidate to receive ticket purchase content and or receive ticket purchase content with priority over news content, and so forth.

In embodiments, the algorithm types described above may also be used to assess the relevancy, priority, positioning, placement, and so forth of content based upon information associated with the mobile communication facility, a capability of the mobile communication facility, a user associated with the mobile communication facility, an owner of the mobile communication facility, mobile subscriber characteristic(s), carrier information or other information that may be used as a predictor of the likelihood of an interaction with the sponsored content. The capability of a mobile communication facility may include, but is not limited to, audio capabilities, video capabilities, visual capabilities, processing capability, screen capability, and the like. User characteristics may include, but are not limited to, user history information, demographic information, transaction history, location information, user billing information, personal filters, and the like. A mobile subscriber characteristic may include, but is not limited to, user transaction history, user location, personal information relating to a user, user web interactions, email interactions, messaging interactions, billing history, payment history, typical bill amount, time of day, duration of on-line interactions, number of on-line interactions, family status, occupation, previous search queries, history of locations, phone number, device identifier, type of content previously downloaded, previous content viewed, websites visited, and the like. Mobile subscriber characteristics may also include demographic information. Demographic information may include, but is not limited to, age, sex, race, religion, an area code, zip code, a home address, a work address, a billing address, credit information, family information, income range, birth date range, birthplace, employer, job title, length of employment, or an affiliation, and the like. A mobile service provider characteristic may include, but is not limited to, a carrier business rule, the geographic region in which the mobile service provider's service is available to consumers, walled-garden content, and the like.

An aspect of the present invention involves a method for receiving a website request 100 from a mobile carrier gateway 110, receiving contextual information 120 relating to the requested website 100, associating the received contextual information 120 with a mobile content 130, and displaying the mobile content 130 with the website 180 on a mobile communication facility 150.

A mobile communication facility 150 used to make a website request 100 may be one or more of a phone, a mobile phone, a cellular phone, a GSM phone, a GPRS phone, a WAP-enabled phone, a satellite phone, a WiFi phone, a wireless device, a pager, a personal digital assistant, or the like. The website request 100 may be sent through a mobile carrier gateway 110 which then initiates a context review request 160 of the requested website 180. The requested website 180 may be one or more of the following: a webpage, a document, an image, video, audio, or some other website. A server 140 may respond to the context review request 160 by accessing the website 180 and performing a context review 170 of the website 180. The result of the context review 170 may be the identification of contextual information 120 associated with the website 180. The identified contextual information 120 may then be sent back to the server 140. The contextual information 120 may include one or more of the following: a link, a link structure, an inbound link to the website, an outbound link from the website, a reciprocal link, text, a keyword, metadata, website usage patterns, website usage statistics, or the like. For example, a user of a mobile communication facility 150 may execute a website request 100 for a website 180 containing the Amtrak schedule for trains from Boston, Mass. to New York City, N.Y. Contextual information 120 associated with the Amtrak schedule website may include, for example, keywords such as 'travel', 'train', 'vacation', 'Boston', and 'New York', outbound links to local weather in Boston and New York City, or an inbound link from a travel agency website. Once identified, one or more pieces of contextual information 120 related to the Amtrak schedule website may be sent back to a server 140.

The server 140 may receive contextual information 120 and then associate it with a mobile content 130. Optionally, the server 140 may store contextual information 120 associated with a particular website 180 to facilitate subsequent context review requests 160 originating from either the same or a different mobile subscriber. The mobile content 130 may relate to one or more of the following: an advertisement, sponsored content, a sponsored call, an image, a video, text, a search box, a pay-per-click link, a pay-per-call link, or some other mobile content 130. For instance, if the contextual information 120 is the keyword 'vacation', the associated mobile content 130 may be a search box for an airfare metasearch engine, an advertisement for an all-inclusive resort in Cancun, or a review of an exotic destination. When the mobile content 130 is a search box, the search box may relate to a local site search box, an advertisement search box, a carrier portal search box, or some other such search box. For example, the local site search box may only query the requested website 180 while the carrier portal search box may provide for queries of a greater collection of websites.

The mobile content 130 may also be optionally branded using a wireless carrier brand. For example, the mobile content 130 may be a search box that employs the technology of a third-party search engine but bears a name, a logo, a trademark, a slogan, a graphic, audio, video, an image, or some other representation of the wireless carrier brand.

In order to deliver pertinent mobile content 130 with the requested website to the mobile communication facility 150, the association between the received contextual information 120 and mobile content 130 may be based at least in part on a relevance. For example, the relevance may be related to a mobile subscriber characteristic. For instance, if a subscriber who is a senior citizen requests a website 180 for which derived contextual information 120 includes the term 'vacation', relevant associated mobile content 130 may be an advertisement for a seniors' cruise and not one for spring break in Cancun.

Relevance may also be based at least in part on the relationship between the contextual information 120 and the mobile content 130. For example, the relationship may be a similarity or dissimilarity of the contextual information 120 and the mobile content 130. Mobile content 130 that exhibits greater similarity to the contextual information than other mobile content 130 may be considered more relevant and, therefore, more likely to be displayed along with the website 180 on the mobile communication facility 150. In contrast, mobile content 130 that is dissimilar to the contextual information 120 may not be deemed relevant and may be lowered in priority for display. For example, the contextual information 120 may be an outbound link to a bookstore's website (e.g.: Barnes & Noble, Border's). A link to a bookstore may be considered similar to mobile content 130 that includes an Amazon.com search box or an advertisement for a popular author's latest release. A link to a bookstore may be considered dissimilar to mobile content 130 that includes an advertisement for a flat-screen television.

Relevance may also be based at least in part on the relationship between stored contextual information 120 and/or mobile content 130 originating from a previous website request 100 by the mobile subscriber and the current pool of mobile content 130. Mobile content 130 to be delivered to the mobile communication facility 150 may be identified as relevant by association to contextual information 120 from a previously viewed website 180. For example, even though the current website request 100 is for an international news website, based on previous derived contextual information 120 which included 'shopping' and 'home furnishings', the delivered mobile content 130 may be a search box for Target.com.

Once a mobile content 130 has been associated with the received contextual information 120, the mobile content 130 may be displayed with the website 180 on the mobile communication facility 150. The mobile content 130 may be displayed interstitially or concomitantly with the website 180. Optionally, the mobile content 130 displayed may be stored on a server 140.

In some embodiments of the method, an opt-in function may be provided to an entity associated with the website 180, wherein the opt-in function registers the website 180 for automatic contextual syndication. The contextual information 120 may be provided by a server 140 involved in sending the mobile communication facility 150 the website 180. The server 140 may be one or more of the following: a WAP server, a mobile application gateway, a WAP gateway, a proxy server, a web server, or the like.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

A user generally may perceive relevant mobile content as more beneficial than random mobile content. Therefore, mobile content that is relevant to a user may have a greater value to the content provider because the user may be more likely to interact with the content in a way that is favorable to the objectives of the provider, such as making a purchase or opting-in for an offer. Consequently, delivering relevant mobile content to a user of a mobile communication facility 102 may provide benefits for the user, mobile service provider, and content provider.

Delivering relevant mobile content to a user may be associated with the delivery of a website or webpage content to a mobile communication facility 102. By associating the delivery of relevant content with deliver of a webpage, a user of a mobile communication facility 102 may already be anticipating new information being displayed on the mobile communication facility 102. Also the relevant mobile content may be relevant to the delivered webpage, thereby reinforcing the relevance of the mobile content with the user.

A website or webpage (and associated mobile content) may be delivered to and displayed (or played such as for video or audio) on a mobile communication facility 102 based on a variety of actions or conditions. One such action is the user explicitly requesting the website or from the wireless provider 108. As a result of the request, the wireless provider 108 may select mobile content from a variety sources of mobile content such that the selected mobile content may have a relevance to the user and/or the website.

The variety of sources of mobile content may include without limitation, the internet, a data facility 124 of the wireless provider 108, a content walled garden 132, an advertiser data 174, a sponsor 128, a server 134, a search facility 142, and a sponsorship facility 162. As herein described, the sponsorship facility 162 may provide some relevance matching of mobile subscriber characteristics 112 (e.g. user behavioral information) to sponsored mobile content. To facilitate relevance matching in the sponsorship facility 162, the wireless communication facility 104 may provide criteria such as mobile subscriber characteristics 112 or user behavioral information, or location information 612, and requested URL to the sponsorship facility 162.

The mobile content may interact with the mobile communication facility 102 such that certain user interface elements of the mobile communication facility 102 may allow a user to directly respond to the source of the mobile content. Such interaction may allow the mobile communication facility 102 to directly interact with the source of the mobile content even while the mobile communication facility 102 is performing other functions such as web browsing, audio calling, and the like.

In an example, a mobile communication facility 102 may have a variable function key included with the user interface. When mobile content is received by the mobile communication facility 102, the variable function key may become an opt-in key for an offer of the mobile content. The user may automatically opt-in to an offer of the mobile content by activating the variable function key. Appropriate user information may be provided to the website or provider of the mobile content to activate the user's subscription or agreement to opt-in to the offer.

A webpage may be delivered to a mobile communication facility 102 based on actions or conditions other than a user request. A webpage may be delivered based on actions such as a call being received or initiated by the mobile communication facility 102, a location change of the mobile communication facility 102, a power-on of the mobile communication facility 102, and many other actions or conditions, described herein, that may be associated with a mobile communication facility 102 in a wireless search platform 100. Mobile content may also be selected based at least in part on information related to the action or condition. In an example, as a result of a user completing a phone call with an electronics retailer, a webpage and associated mobile content inviting the user to view current special offers from a competitive electronics retailer may be displayed on the mobile communication facility 102. In another example, the wireless provider 108 may detect the location change of the mobile communication facility 102 and deliver a webpage with associated mobile content containing a local weather forecast and local restaurants based on a relevance to a user characteristic.

A server 134 may be used to select mobile content such that it has a relevance to the user for delivery. In an example, a user's history may include some or substantially all transactions that the user has initiated from a mobile communication facility 102. In this user history, the user may have demonstrated a preference or tendency to interact with mobile content that is associated with jazz music. The user may also have executed a plurality of queries related to jazz music. Therefore, delivering mobile content that is associated with jazz music may have a relevance to the user. A server 134 may select and store a variety of mobile content based on such types of relevance and make it available to a wireless provider 108 to facilitate delivering relevant mobile content to a user.

The behavioral information to which the mobile content may be associated to establish relevance may be based on an individual user or a group of users. The group of users may be users with one or more characteristic in common. The characteristic may be related to the user (user characteristic), the mobile communication facility 102, a location of the mobile communication facility 102, a time, or some other characteristic.

The relevant mobile content may be an advertisement or another type of mobile content such as sponsored content, a sponsored call, a search box, and the like. The relevant mobile content format may be selected based at least in part on a relevance to the user behavioral information. A user may have indicated explicitly or through specific actions with the mobile communication facility 102 a preference for mobile content that includes both audio and video. This user behavioral information may be used to select between similar mobile content to provide the most relevant mobile content to the user. Methods and systems for associating mobile content with behavioral information related to a user of a mobile communication facility 102, as herein disclosed may also be applied to selecting the mobile content in association with a website.

In embodiments, interaction information relating to a mobile communication facility may be used to weight content, and the content may be ordered for presentation on a mobile communication facility 102 based at least in part on the weighting. For example, interaction information may be based on transaction events, purchase history, user history, user characteristic, user device, geographic location, time, expertise, occupation, income bracket, home address, and the like. A user who has made several online book purchases during the past week related to baseball may, as a result of this past behavior, have sports content weighted favorably and prioritized for placement on his mobile communication facility 102. This interaction information may also be used to weight and prioritize content for other mobile communication facility users who share some attribute or plurality of attributes (e.g., age, income, etc.) with the user who purchased the baseball books. As interaction information is collected, it may be stored and analyzed in the aggregate in order to derive weights for mobile content and prioritize the presentation of content based upon information relating to mobile subscriber characteristics, mobile communication facility characteristics, and other information relating to users.

In embodiments, mobile content may include, but is not limited to, downloadable content, sponsored links, a URL, an email address, an FTP address, a phone call, and webpage address, an advertisement, a sponsored content, an audio stream, a video, a graphic element, and the like. In embodiments, information that may be related to interaction information may be segmented (e.g. an age range, income range, etc.).

In embodiments, mobile content interaction information may be derived from mobile communication facilities, such as, a phone, a cell phone, a mobile phone, a GSM phone, a personal digital assistant, a "pocket" personal computer, and the like.

In embodiments, the mobile content interaction information may be a plurality of mobile content interaction information. The weighting of mobile content may be based upon a plurality of mobile content interaction information.

Interaction information relating to mobile content (e.g. a website, downloadable content, sponsored link, sponsored call, sponsored content, advertisement, search result, etc.) may be used to weight the content. In situations, the weighting is similar in nature to a link analysis but here the number of separate interactions with the content may be used in a calculation to judge how popular or otherwise relevant the mobile content is. In embodiments, not every interaction with the mobile content is weighted equally. An interaction from a user that has a greater authority may be deemed more relevant or it may be deemed more as an indication of the actual value of the mobile content and therefore the interactions from this particular user may be provided a greater weight. For example, two users may interact with a particular piece of mobile content. The first user may have a little on-line history because he is a relatively new user of the web service provided through his mobile communication facility. The first user may interact with the mobile content many times and this many interactions may be logged and used in a calculation to determine how popular the mobile content is. The second user may be a frequent user of web services through his mobile communication facility (e.g. as determined through mobile subscriber characteristics as described herein elsewhere). This user may interact with the mobile content a limited number of times (e.g. once or twice). The limited number of interactions may be used, in conjunction with the first users many interactions, to judge the popularity of the mobile content. The second users few interactions may, however, be given a higher weight because he may be considered to have more authority in the calculation because of his status as a frequent web services user as compared with the beginner status of the first user. The result may be to significantly discount the first user's interaction history with the mobile content and increase the reliance on the few interactions from the second user. This may effectively reduce the popularity ranking of the mobile content as compared to a calculation simply based on the number of interactions with the mobile content.

In embodiments, it is the user's apparent authority in predicting the value of the interaction that provides a weighting to the user's actual interaction with mobile content. This user's authority can be used to decrease or increase the weighting of his interaction such that the popularity, relevance or other such parameter of the mobile content is based more heavily on interactions from authoritative users as opposed to just any user that happens to interact with the content. A user's authority may be based on their user history, transaction history, online behavior, web services usage, type of mobile communication facility or other parameter which is tracked, monitored, evaluated, measured, recorded or otherwise stored in relation to the mobile communication facility (e.g. mobile subscriber characteristics), for example. The information relied on to evaluate the authority of the user may be stored in the mobile communication facility associated with the user or it may be stored remotely (e.g. in a mobile subscriber characteristics database associated with the wireless provider). When stored with the wireless provider, or other third party, the wireless provider may be the entity providing the authority information or performing the authority calculation.

In embodiments, each mobile communication facility user may be rated with a general and/or specific authority ranking. For example, a user may have a history of using web services through his mobile communication facility and be deemed to have a high general authority ranking. The same user may have a history that suggests he is a frequent user of local search systems so he may receive a specific high authority ranking for local mobile content interactions. In embodiments, the general authority ranking may be based on the user's use of web services, web content, websites, transactions, purchases, downloads, views, listens, streaming viewing or other such general web interactions. In embodiments, the specific authority ranking may be based on more specific categories of interactions such as local interactions, implicit interactions (interactions resulting from an implicit search), pay per call interactions, sponsored links interactions, advertisement interactions, search result interactions or other such specific category of interaction. In embodiments, the specific authority ranking may be based on a specific interaction such as an interaction with a specific phone number, specific piece of content (e.g. such as the highest ranked content known, such as the highest ranked advertisement).

A sponsor using mobile content to sell its products or services within a wireless platform 100 may find it advantageous to have information regarding the expected value that it may derive from sponsoring a mobile content. By knowing an expected value associated with a mobile content, a sponsor may be able to select those sponsorship opportunities from which it is most likely to derive revenue. The expected value may assist a sponsor in budgeting for an advertising program based on the total expected revenue to be derived from an advertising program. Behavioral metrics, such as clickthrough volume, and conversion volume may be used to predict future consumer interactions with mobile content. Financial metrics, such as product price, profit margin, and the like, may be used to indicate the financial results of associating a given product with the behavioral metrics related to a mobile content. Expected value calculations may be beneficial for sponsors such as advertisers, wireless information providers, wireless carriers, wireless operators, telecommunications providers, and the like.

In embodiments, an expected value calculation may indicate to a sponsor the expected revenue that it may be predicted to receive from a sponsorship, such as an advertising program. Such an expected revenue calculation may be performed by multiplying a clickthrough parameter associated with a mobile content by the conversion associated with that content by the purchase price of the product that is the subject of the content. In this calculation, the clickthrough parameter may represent the cumulative number of times the content is accessed (i.e., "clicked"), the click through rate, or other parameter associated with the interactivity with the content. The conversion may represent the cumulative number of transactions, such as a purchase, associated with the content, the transaction rate associated with the content, or other parameter associated with the transactions associated with the content. The purchase price may be a manufacturer's suggested retail price, a price explicitly set by the content provider, a price unique to a specific user's conversion, or a product price resulting from some other price setting protocol. The expected revenue may also be calculated as a bid-weighted revenue in which the expected revenue is multiplied by a bid amount.

In embodiments, an expected value calculation may indicate to a sponsor, or wireless carrier, the expected margin that it may be predicted to receive from a sponsorship, such as an advertising program. Such an expected margin calculation may be performed by multiplying the clickthrough associated with a mobile content by the conversion associated with that content by the margin of the product that is the subject of the content. Margin may include, but is not limited to, an expected advertiser margin, an expected wireless carrier's margin, the profit margin associated with a product, and the like. The expected margin may also be calculated as a bid-weighted margin in which the expected margin is multiplied by a bid amount.

In embodiments, an expected value calculation may indicate to a sponsor, or wireless carrier, the expected yield that it may be predicted to receive from a sponsorship, such as an advertising program. Such an expected yield calculation may be performed by multiplying a bid associated with a mobile content by the clickthrough associated with that content. Similarly, an expected conversion yield may be calculated by multiplying a yield associated with a mobile content by the conversion associated with that content.

In embodiments, an expected value calculation may indicate to a sponsor, wireless carrier, wireless operator, or telecommunications provider the average time spent on a target website and the average depth of use a target website by users visiting the website.

In embodiments, an expected value calculation related to a mobile content may be segmented by a characteristic associated with a mobile communication facility. For example the expected value may be segmented by a characteristic including, but not limited to, a display capability, display size, display resolution, processing speed, audio capability, video capability, cache size, storage capability, memory capacity, and the like. In embodiments, the expected value may also be segmented by a mobile subscriber characteristic including, but not limited to, age, sex, race, religion, area code, zip code, home address, work address, billing address, credit information, family information, income information, birth date, birthplace, employer, job title, length of employment, user history, user transactions, geographic location, time, and the like. The segmented expected value may provide information relating to the expected value within a given segmentation.

One example, of many potential examples, of how an expected value may be used by a sponsor is described below. Content sponsors may seek to sponsor content that they believe is most likely to be accessed by persons or entities interested enough in their products or services that a conversion (e.g., purchase) will result. One of the primary functions of market research is to gain insight into consumer profiles that are most associated with past conversions and to provide information on other consumer profiles that may represent the untapped market share of consumers currently unfamiliar with, but likely to purchase the provider's products. For example, in a traditional medium such as television, a sponsor may purchase market research regarding the demographic profile, number of viewers, length of average viewing time, etc. associated with a particular primetime situation comedy. Based on prior market research a sponsor may have regarding the profiles of its past consumers, the sponsor may make an educated guess as to the appropriateness of sponsoring content (e.g. advertising) during the sitcom based on the level of concurrence between the sitcom viewers and the sponsor's past consumers. The higher the level of concurrence the greater the probability that purchases will result from the advertising, and the greater the expected value that the company may presume it will receive on its advertising expenditures. Furthermore, the greater specificity with which a consumer profile may be described (e.g., not "California," but rather "Area Code=90210"), the more accurately a sponsor may potentially target its intended consumers and increase its expected value.

In response to a mobile content search initiated by a user of a mobile communication facility 102, a mobile content provider may deliver sponsored content, advertisements, sponsored call numbers, or other sponsored content to the mobile communication facility 102 based at least in part on a relevance to the search query. In addition to selecting among a variety of sponsored advertisements, a mobile content provider may also select a sponsored content, such as an advertisement, from a variety of sources or mobile content inventories. Different sources of sponsored content may have unique arrangements relating to cost, derived revenues, wall-garden restrictions, blacklisted content, whitelisted content, and the like. Therefore, it may be advantageous for a mobile content provider to select mobile content from the available mobile content inventories based at least in part on optimizing the benefits for the mobile content provider.

In one embodiment, a cross inventory yield optimization method may include determining which mobile content inventory provides the greatest clickthrough value. As an example, a first mobile content inventory may pass through a higher percentage of an advertisement impression bid than a second inventory. Therefore, by selecting the mobile content from the first inventory, greater revenues may be generated when the content is presented to a mobile communication facility.

Cross inventory yield optimization of mobile content may assist in generating greater revenue for a presenter of the content than non optimized content. Methods and systems of optimizing the yield of presenting mobile content on a mobile communication facility 102 may include a variety of factors. One or more of the factors may be evaluated in the context of an objective of the optimization. For example, one objective of optimizing yield may be to generate the greatest likelihood of receiving clickthrough revenue associated with the presentation of mobile content. As such, content may be preferentially selected based at least in part on factors that advance this objective, such as the clickthrough rate associated with a mobile content, or the revenue derived per click of the mobile content, cost-per-thousand revenue, cost-per-acquisition, and so forth. In another example, an objective of the cross inventory yield optimization may be to preferentially select mobile content that is the most compatible with a mobile communication facility 102, based upon criteria, such as screen resolution, memory capacity, video capability, and the like.

A method for determining which among a plurality of content inventories provides the greatest value may include comparing the impression bid offering from each inventory provider and selecting the highest bid offering. Alternatively, an advertisement with a lower impression revenue may be selected if it pays a higher clickthrough revenue and the clickthrough rate results in greater revenue. In these examples, one can appreciate how the objective of optimization may impact which factors associated with an advertisement are preferred.

There may be available a choice of mobile content, such as advertisements, for different products or services, each of which may have a relevance to a mobile search. Determining which of the advertisements may generate the greatest revenue may include factors related to the advertisement. Factors may include, without limitation, popularity of the advertisement, clickthrough rate, and freshness of the content, advertisement, or call number, and so forth. As an example, a very popular advertisement that is relevant to the search may provide a more optimal revenue opportunity than a less popular, yet relevant advertisement due to the increased odds that the popular advertisement will be viewed, interacted with, will produce a clickthrough, and the like. In another example, an advertisement with a higher clickthrough rate may present a more optimal revenue opportunity than an advertisement with a lower clickthrough rate since the advertiser pays the clickthrough bid for a higher percentage of impressions. An advertisement, sponsored call number, or other sponsored content that is freshest (i.e. has been more recently updated or verified) may also provide a greater revenue opportunity. In an example, advertisements may present an event that has recently had a change in venue. An advertisement that has been updated since the venue change may be more likely to provide clickthrough revenue than one that presents the obsolete venue. Therefore a method for optimizing cross inventory yield may include assessing advertisement popularity, clickthrough rate, or freshness of content.

Optimizing cross inventory yield may include factors associated with a user of a mobile communication facility 102, such as a user characteristic as herein described. A user history utilized in optimizing cross inventory yield is described in the following example. A user history may include metrics associated with a user's actions when presented with advertisements, sponsored content, and/or sponsored call numbers. The history may indicate that a user more often follows through with a sponsored call number than with a sponsored advertisement. Therefore, presenting a sponsored call number to this user may optimize the revenue generated. Consequently, a cross inventory yield optimization method may preferentially select a sponsored call number to present to this user instead of a non-call-number-based mobile content item.

The mode in which a mobile communication facility 102 user enters a search query may also be factored into optimizing cross inventory yield. Since a mobile communication facility 102 may have multiple independent modes of entry (e.g. voice, keypad, touchscreen, camera, and the like), the selection of a mobile content, advertisement, sponsored content, or sponsored call number may optimized based at least in part on the mode of query entry. For example, a user who issues a search query using a keypad entry may be more likely to be viewing the mobile communication facility 102 than listening to it. As a result, selecting an advertisement with little display content and significant audio content may reduce the yield associated with the content relative to a more visually-based mobile content. However, voice entry of a search query may be indicative of a user that prefers an audio based mobile content.

A cross inventory yield optimization method or system may combine factors to optimize revenue for mobile content, advertisements, sponsored content, or sponsored call number presentation. Yield optimization may include factors associated with a user, a mobile communication facility 102, a location, the advertisement/content/number, revenue (e.g. impression and clickthrough bids), payment terms, and the like. In an example, an English speaking user may be traveling to Paris and may enter a search query. An optimization method may combine factors such as user language preference (English) with location (Paris) with payment terms (pay in USD) and popularity (French current events) and revenue (impression bid). The above is only an example and many other combinations of factors are possible and may be used singly, or in combination, as part of an cross inventory yield optimization method and system.

As previously described, a wireless search platform 100 may be associated with a plurality of datasets from which consumer profiles may be derived for use in targeting content (e.g. advertisements, sponsored content, sponsored call numbers), deriving estimates of the expected value associated with content, and expected value estimates for content segmented by information relating to a mobile communication facility. By receiving information on the clickthrough volume and conversion volume associated with content, a sponsor may forecast based upon it's products' purchase prices, profit margins and the like an appropriate bid amount for a content and the probable financial results it will derive from sponsoring the content. A wireless platform 100 may include information relating to a wireless provider 108, a mobile communication facility 102, mobile subscriber characteristics 112, location 110, and so forth. Thus, a sponsor may receive an expected value for mobile content that it may want to sponsor that is segmented by information relating to a mobile communication facility in order to identify the most profitable population within which to sponsor content.

For example, a sponsor specializing in Boston Red Sox memorabilia may use expected value data segmented by information such as a user's device characteristics, demographics, and current location, to predict which content and which population of mobile users may be associated with the greatest expected value. The memorabilia company may find that there is a high expected value for sponsoring content that is associated with a high clickthrough and conversion volume among "men," making ">$100,000 per annum," and whose current location is the "zip code" of Boston. This level of expected value segmentation may allow the company to identify and sponsor that content with a greater likelihood of financial benefit and minimize sponsorship of content that may be associated with little or no likely benefit to the company.

In embodiments, sponsors may be offered an opportunity to bid for the placement of content on a mobile communication facility display 172 and user interface based upon an anticipated expected value that is associated with the placement of the content. Such a bid may occur in the form of an auction, a reverse auction, or a partially randomized auction. The content that is the subject of a bidding process may include, but is not limited to, an advertisement, a sponsored link (such as an URL, email address, FTP address, or phone call), an advertisement, a sponsored call, an audio stream, a video, a graphic element, and the like.

In embodiments, content that is the subject of the bidding process may be placed on a query page, home page, search page, on a sponsored links portion of the user interface, or on a page of the user interface that may be associated with a set of search results or a specific result.

The anticipated expected value may be determined by an expected value estimation facility. The expected value estimation facility may be based on an expected value calculation associated with a variable or variables selected from the group consisting of the amount of the bid, the location of the media item in the user interface, the duration of the presentation of the media item in the user interface, the probability that a user will view the media item if placed in the user interface, the probability that the user will interact with the media item if placed in the user interface, the probability that the user will view, interact with and/or execute a transaction associated with the media item, and the value of the transaction to the bidder, for example. In embodiments, the expected value estimation facility may be dynamic in that a change of a bid amount automatically adjusts the expected value estimation based on this new economic data.

In embodiments, a bidder may be able to pre-select the location within the mobile communication facility display 172 that it seeks to place content. Similarly, duration of the time that the content displays may also be selected.

In embodiments, the probability that a user will view, interact with, and/or execute a transaction in association with content may be based upon mobile subscriber characteristics 112, mobile communication facility 102 type, mobile communication facility 102 characteristics, and other data types that may be part of, or related to, a wireless platform 100. Examples of mobile subscriber characteristics includes, but is not limited to, age, sex, race, religion, area code, zip code, home address, work address, billing address, credit information, family information, income information, birth date, birthplace, employer, job title, length of employment, and the like. Examples of mobile communication facility 102 type includes, but is not limited to, a phone, cellular phone, mobile phone, GSM phone, a personal digital assistant, and or a "pocket" personal computer. Examples of mobile communication facility 102 characteristics includes, but is not limited to, display capability, display size, display resolution, processing speed, audio capability, video capability, cache size, storage capability, memory capacity, and the like.

In embodiments, the value of a transaction to a bidder (i.e. the expected value to the bidder) may be based on one or more of the price of an item described in the media item, the net price of an item described in the media item, the cost of the item described in the media item, the value of the attention of a user to the media item, the value of the brand presented in the media item, value attributed to the goodwill of the mobile subscriber, value attributed to multiple items presented in the media item, the revenue associated with a transaction executed by a mobile subscriber in connection with interaction with the media item, the net revenue associated with a transaction executed by a mobile subscriber in connection with interaction with the media item, and the probability that executing a transaction associated with the media item will result in another transaction with the bidder. Value may be expressed as a net present value, a discounted rate, or a discounted value. A bidder may be able to personally adjust the discount rate.

In embodiments, a bidder may be able to enter an item of data associated with one or more of the amount of the bid, the location of the media item in the user interface, the duration of the presentation of the media item in the user interface, the probability that a user will view the media item if placed in the user interface, the probability that the user will interact with the media item if placed in the user interface, the probability that the user will execute a transaction associated with the media item, and the value of the transaction to the bidder.

As was described above for the process of bidding on the presentation of content based at least in part on the anticipated expected value associated with the content's display, so too may a bidding process present an opportunity to bid based upon an anticipated yield associated with the display of a given content. A yield estimation facility may be based on an yield calculation associated with a variable selected from the group consisting of the amount of the bid, the location of the media item in the user interface, the duration of the presentation of the media item in the user interface, the probability that a user will view the media item if placed in the user interface, the probability that the user will interact with the media item if placed in the user interface, and the probability that the user will execute a transaction associated with the media item.

In embodiments, a method and system may be provided for the indexing, searching, and displaying of WAP and Web results (URLs) in a unified result set by a search engine. For this, the search result page may provide a single and unified results set that may consist of only WAP URLs, only Web URLs, or a combination of both based on factors including, but not limited to, information relating to a mobile communication facility. The order and blend of WAP URLs and Web URLs may be based at least in part on information relating to the mobile communication facility from which the search query originates. Individual search results may be identified as WAP or Web on the search results page.

In embodiments, a method and system may be provided for accepting, converting, and storing user generated content based on the voice capture capabilities of a mobile communication facility. The captured voice data may be stored as audio or converted to text based on the capabilities of the mobile communication facility, network, or some other factor. The conversion and storage of the data may take place on either the client mobile communication facility or on a network based server. Captured review data may be associated with any URL, set of URLs, or provided meta-data displayed to the mobile communication facility user. Converted text based data and associated URL(s) or meta-data may be made available to search applications on the mobile communication facility, server, or wireless platform.

In embodiments, a method and system may be provided for algorithmic and editorial detection of correspondence between WAP and Web sites. The method and system may identify any Web sites and/or URLs associated with the indexed WAP sites and/or URLs and may use this relationship to enhance the meta-data for the WAP site and/or URL. Information obtained from Web sites/URLs, and related back the WAP site/URLs, may include web page text, anchor text, titles, descriptions of the page, or some other information. This additional information may then be used to help calculate a relevancy between mobile search queries and corresponding WAP URLs. The system may also use analysis of the Web linking structure to augment and alter any linking structure derived from a crawl of WAP sites.

In embodiments, a method and system may be provided for accessing, analyzing, and applying the usage of a mobile device to create and enhance the relationships within a social network. The system may access user specific usage patterns on the mobile communication facility, including, but not limited to, inbound calls, outbound calls, phonebook, or other information, to establish new connections and to augment the strength of existing connections in a social networking application. The information may be accessed, stored, and shared based on rules defined by a mobile communication facility user and/or mobile operator.

In embodiments, a method and system of query classification may be used to identify user intent in order to assist navigation to a specific vertical of content and/or to flash in content from a likely answer source. A user's search behaviors may be analyzed and monitored on a consistent basis to understand what the user is searching for and selecting as a result of a search. In embodiments, a search engine may classify different types of queries to connect user's searches to the right content in the shortest distance. Thus, a search for "ice cream boston" may give preference to local listing results to general web pages, and the search "UA 123" may return flight arrival and departure information.

In embodiments, a search engine may use query classification to identify the intent and specificity of a user's search to either redirect the user to the best individual results, or to prioritize categories of results answering the user's query. In embodiments, both language-specific rules and statistical methods may be used to identify user intent. Language-specific rules may identify narrow searches and re-direct the user to specific results. For example if a user searches for "maps nyc," language-specific rules may identify the operative term "maps," and a specific location, "nyc" and infer that the user is looking for a map of New York. In this example, the user may be directed to a map of New York provided by a maps vertical. Statistical methods, a second query classification tool, may rank different categories of results for broader queries. For example, if a user is searching for a celebrity name, such as "Naomi Campbell," a model, through historical behavior it may be inferred that the user is more likely to be looking for images or news articles, rather than for music, and thus return these categories at the top of the results set on the first page.

In embodiments, the heuristics of query classification engine may be adjusted globally, on a per language or per-operator basis. Query classification may identify different patterns of search behavior that assists the correct display for a given query. The classification may become more granular as the system learns more user behavior.

In embodiments, the display of a mobile communication facility may include a "widget" to answer a user's query, help a user to disambiguate their query, guide a user deeper into content properties, and bubble up the most popular and/or relevant content. Widgets may utilize structured and semi-structured data to help users to minimize searching for content and answer a user's queries directly. In addition to the query classification, a 'learning' algorithm may use click and impression analysis to determine when an answer/result should be shown, where on the page it should be shown, and/or how much content from a given source should be displayed. While the algorithm may determine the correct results set, it may be possible to inject editorial overrides and influence the display of content for queries based at least in part to actively manage/merchandise query results.

In embodiments, editors may import/export common format feeds, keywords, choose display templates, and assign a content component type a relevancy weight. For example, the query "music" may be too broad to rely entirely on algorithms; instead an editorial or business review may be required. Through session, and user behavior analysis editors may identify content that will help narrow the search and get closer to what the user actually intended. In the case of the query "music", an editor may build a smart component to expose genre links, navigational links that take users deeper into the music vertical, and a video link. If these links don't perform well, then the editor may make adjustments.

In embodiments, a popularity management tool may allow an editor to review algorithm weightings and adjust thresholds for a smart component and its affiliated content.

In embodiments, a method and system of query classification may affect the display logic that is associated with a mobile communication facility. In an example, a search query may be classified according to a query classification scheme. A query classification scheme may include, but is not limited to, classes such as Vertical Class, Navigational Class, Definition Class, Category Class, Specific Class, Query+Modifier Class, Reference Class, Adult Class, or some other query class.

In embodiments, a Vertical Class may include a search vertical. A search vertical may be associated with a taxonomy of content and may be a general search or related to a search, ringtones, images, games, yellowpages, weather, whitepages, news headlines, WAP sites, web sites, movie showtimes, sports scores, stock quotes, flight times, maps, directions, a price comparison, WiFi hotspots, package tracking, hotel rates, fantasy sports stats, horoscopes, answers, a dictionary, area codes, zip codes, entertainment, blogs, or some other search vertical.

In embodiments, a Navigational Class may be an identified domain name, URL, website, IP address, or some other navigational location.

In embodiments, a Definition Class may be associated with a query that includes the term "define," "definition," "meaning," "means," or some other term associated with a request for a definition.

In embodiments, a Category Class may be associated with a deeper taxonomy present within the search query (e.g., hip hop, NFL, soccer, cameras) and include bubble up content/topics that may help users to disambiguate a query.

In embodiments, a Specific Class may be a list of structured data, extracted data, or the like from various categories (e.g., Gunners, Hinder, Sagittarius, Smallville, Nikon coolpix) that may be indicative of user intent.

In embodiments, a Query+Modifier Class may be a combination of a sub-category, genre, and/or specific source.

In embodiments, a Reference Class may be data that is extracted from a reference source, such as an online encyclopedia.

In embodiments, an Adult Class may related to adult content, such as gaming, gambling, pornography, lottery, or some other form of adult content.

In embodiments, query classifications may be associated with indicator inputs. Indicator inputs may include current content popularity, current query popularity, current emerging queries, current location, previous location, user characteristics, editorial work, or some other indicator associated with a mobile communication facility, its user, and/or query content.

In embodiments, the query classification that is associated with a search query, and/or the indicator inputs, may influence the formatting of the results that are displayed to a mobile communication facility. For example, the formatting may expand category results, order the results according to the indicator inputs (e.g., by decreasing order of popularity), by category, or according to some other schema.

In embodiments, user behaviors (e.g. clicking on a content) relating to the formatting of the results that are displayed on a mobile communication facility may be analyzed and used to further refine, structure, index, and/or order the query classifications and/or indicator inputs.

In embodiments, by associating a query with indicator inputs and/or query classifications it may be possible to determine an optimal rank order of content to display to a user's mobile communication facility, based at least in part on the user's interaction with content and the history of interactions by other users. For example, it may be possible to determine a threshold for presenting a content to a mobile communication facility (e.g., popularity rank); it may be possible to determine which content type to expand, and so forth.

In embodiments, business rules may be associated with a query classification engine. Business rules may include popularity rules, location rules, mobile communication facility type rules, keyword matching rules, parental control rules, spelling and spelling-correction rules, recommendation rules, rules relating to user characteristics, or some other business rule.

In embodiments, a user of a mobile communication facility may be able to pin or tag a mobile content, and store tagged mobile content in a repository that functions as a "mobile briefcase." In embodiments, the tag associated with a mobile content may include information about the content, such as subject matter, location, genre, date, or some other information. In embodiments, the tag associated with a mobile content may include information about the user who tagged the content, such as name, location, demographic information, social networks in which the user is a participant, or some other information about the user.

In an example, a user may type a query, such as "New York," and see a result in the search results that they would like to remember. An icon, link, or some other facility may be provided that indicates that a result may be tagged. Interacting with this icon, link, etc. may permit the user to tag the result. The user may then be prompted to name or label the result in some manner (e.g., New York City Hotels). The user may be able to save the result to a mobile briefcase.

In embodiments, this tagged data may be used at the subscriber level. For example, when a subscriber types in "New York" he may see results that he pinned ranked higher, and/or with a different look, to indicate to the user that the result is his tagged result. The result may have an icon, or some other distinctive aesthetic, that differentiates it from the normal (i.e., non-tagged) results.

In embodiments, metadata associated with content that has been tagged by a user, or plurality of users, may be used to improve the overall tagged-ranking algorithm.

In embodiments, the tagged results may also be included in creating a subscriber's personal index of content that they may search against.

In embodiments, the mobile briefcase may be cached. In embodiments, an index of the mobile briefcase may be cached.

In embodiments, tagged results may be available to a user when the user is offline.

In embodiments, content may be implicitly tagged based at least in part on repeated user behavior(s).

In embodiments, tagged content may be shared within the context of a limited social network, unlimited social network, or some other social network format.

In embodiments, a tag associated with a mobile content may be associated with other mobile content tags. In an example, a user may tag a mobile content, such as a photo, in part with tag information indicating that the photo relates to the saxophonist Eric Dolphy. Other mobile content tags by the same user, or other users, may have tags that also indicate a relation to Eric Dolphy. In embodiments, the tags that are associated with mobile content may be searchable so that, for example, it is possible to find all mobile content in a mobile briefcase, or plurality of mobile briefcases, relating to Eric Dolphy by querying the mobile briefcase(s).

In embodiments, a user's mobile briefcase may be associated with a security facility. A sign in process may be required to access content within a mobile briefcase. A security facility may include functionality that permits a user to restrict a tagged mobile content in his mobile briefcase for viewing only by himself. A security facility may include functionality that permits a user to release a tagged mobile content in his mobile briefcase for viewing by all members of a social network. A security facility may include functionality that permits a user to release a tagged mobile content in his mobile briefcase for viewing by named members of a social network. A security facility may include functionality that permits a user to release a tagged mobile content in his mobile briefcase for viewing by the general public.

In embodiments, a tagged mobile content may be associated with a sponsored content. In embodiments, a tagged mobile content may be a sponsored content. In embodiments, a tagged mobile content may be associated with a subscription content. A tagged subscription content may be associated with an offer to users viewing the tagged subscription content to subscribe to the subscription content provider.

In embodiments, a user viewing the content within another user's mobile briefcase may "pin" a content of interest. A process of pinning a mobile briefcase content may include, but is not limited to, adding a tag to the content that indicates an association with the user placing the pin; saving the pinned mobile content to the user's personal mobile briefcase; or some other method of marking the mobile content for the user's later reference.

In embodiments, mobile gateway data may be used to improve the relevancy of mobile search results. Gateway data may be used to create authority scores, to establish related sites, to improve personalization of the search results, or improve the relevance of mobile search results in some other manner. In embodiments, the usage of gateway data may include a relevancy based at least in part on site access and usage statistics (e.g., number and length of visits); scoping based at least in part on user groups; content relationships based at least in part on the progression of user sessions; content discovery (e.g., new URLs/Sites); site quality (e.g., access and usage statistics); determining behavioral targeting conditions based at least in part on the content being accessed; determining the stage of a buying process based at least in part on the content being accessed (e.g., research vs. purchase); advertiser quality based on interaction with a site following a click; SPAM detection based at least in part on interaction with site following a click; navigation popularity and clusters; or some other usage of gateway data.

In embodiments, gateway data may be used to determine, in part, the relevancy of a mobile content. Gateway data may associated with information relating to a mobile communication facility 102 in order to determine a relevancy. This information may relate to a user characteristic. User characteristics may include a user's age, sex, race, religion, area code, zip code, home address, work address, billing address, credit information, family information, income information, birth date, birthplace, employer, job title, length of employment, and other information associated with user characteristics. For example, the user characteristic, home address, may be used to determine, in part, the relevancy of news headlines that derive from news websites using IP addresses associated in some manner with the user's home address.

In embodiments, the association of gateway data to a user history may be used to determine a relevancy. User history may include, but is not limited to, a user transaction, a geographic location, geographic proximity, a user device, a time, and or other user characteristics.

In embodiments, the association of gateway data with a mobile communication facility characteristic may be used to determine a relevancy. A mobile communication facility characteristic may include, but is not limited to, a display capability, display size, display resolution, processing speed, audio capability, video capability, cache size, storage capability, memory capacity, and other mobile communication facility characteristics. The information relating to a mobile communication facility 102 may be provided by a wireless operator, a wireless service provider 108, a telecommunications service provider, or other providers associated with a mobile communication facility 102.

In embodiments, relevance may be based at least in part on a statistical association. The relevance may be a score. The statistical association may relate to an association between the gateway data and the information relating to a mobile communication facility 102. The statistical association may relate to an association between the gateway data and a performance criterion. A performance criterion may include processing speed, or some other performance criterion.

In embodiments, gateway data may be processed either in batch or in real-time.

In embodiments, mobile-specific content and transcoded webpage content may be blended within a content repository based at least in part on a relevancy. In embodiments, the content may be blended using an algorithm. In embodiments, the content may be blended using a combination of an algorithmic and editorial review.

In embodiments, the blended content may be stored in repository and indexed according to a relevancy to a mobile communication facility characteristic. A mobile communication facility characteristic may include, but is not limited to, a display capability, display size, display resolution, processing speed, audio capability, video capability, cache size, storage capability, memory capacity, and other mobile communication facility characteristics.

In an example, for a mobile communication facility of Type 1, all content, or a subset of content, in the blended content repository may be ranked according to a relevance that is based at least in part on how well each content will present on the Type 1 mobile communication facility. In embodiments, the content that is presented to the mobile communication facility Type 1 may be selected based at least in part on meeting or exceeding a relevancy rank. In embodiments, the content presented to the mobile communication facility may be ordered according to the relevancy rank, such that the most relevant content is presented first, most prominently, or based on some other preferential display.

In embodiments, "targeted transcoding" may be used to provide the most appropriate result set for a given handset's capabilities. Targeted transcoding may identify high-quality web sites without a mobile presence to include in a mobile search index and offer a high-quality editorially reviewed/improved transcoded version of these websites. These transcoded sites may be identified in a search index. In embodiments, transcoded sites may be normalized and blended based on a relevancy with existing mobile-friendly results. In embodiments, transcoded sites may be identified to the user as a 'transcoded result' on the search engine results page. In embodiments, transcoded sites may be excluded completely from the search results for devices that do not support the display of transcoded pages In embodiments, general transcoding may be used to present results to a user that is served from a generic web search backfill. These results may be presented as an alternative results category or as the primary results when no relevant mobile-friendly or targeted transcoded results exist. In embodiments, these generic web search results may be excluded from any search result set as desired.

In embodiments, a mobile content site and a non-mobile content site bearing a relationship may be associated with one another. A relationship may include common ownership by an entity, for example, a newspaper's mobile content site and its non-mobile content site. A relationship may include a common subject matter, for example weather information.

In embodiments, the relationship between a mobile content site and a non-mobile content site may be discovered, based at least in part on spidering. An autonomous agent or software agent may provide the spidering. This agent may be a web crawler, a web spider, an ant, and the like. For example, spidering may begin with the agent retrieving a webpage at a known URL. That webpage may contain metadata, hyperlinks or reference to other webpages. Spidering may continue with the agent retrieving the other webpages, which may also contain metadata, hyperlinks or references to other webpages.

In embodiments, the process of deriving the relationship between a mobile content site and a non-mobile content site may include processing gateway data (e.g. WAP gateway data, mobile server gateway data, server gateway data, and/or wireless provider gateway data). Gateway data may be associated with a WAP gateway, or other such facility, the wireless communication facility 104, the additional or remote server 134, or any other server or facility associated with the wireless search platform 100.

In embodiments, the process of deriving the relationship between a mobile content site and a non-mobile content site may comprise self-submission. A provider of a mobile content site may submit an identifier, or plurality of identifiers, of non-mobile content sites with which it has a relationship.

In embodiments, a mobile communication facility user seeking to access content using a non-mobile content site may instead be directed to the mobile content site with which the non-mobile content site has a relationship. In an example, a mobile communication facility user may submit a query for the non-mobile website www.espn.com. This website may be associated with a mobile content site counterpart, for example, "mobile.espn.go.com." The provider may direct the content from the mobile site to present to the user's mobile communication facility, rather than the worse-performing non-mobile content site.

In embodiments, a method or system may be used to analyze a mobile content website to identify the predominant language used on website. In embodiments, a content may include keywords presented on the mobile content website. As an example, an automated system (e.g., spidering) may process each page of a mobile content website, processing each through one or more filters for filtering out common language-specific terms. The automated system may further process the words into groups such as those terms related to action links, internal links, external links, and the like may indicate the predominant language of a mobile content website.

In embodiments, gateway data may be used to determine the predominant language of a mobile content website. Gateway data may include WAP gateway data, mobile server gateway data, server gateway data, and/or wireless provider gateway data.

In embodiments, the predominant language of a mobile content website may be determined using a combination of an algorithmic and editorial review.

In embodiments, gateway data may be used to determine the quality of content located on a website. In embodiments, quality may be associated with the markup used, the number of visits to a site, the length of visits to a site, the popularity of a site, word repetition, outbound links, inbound links, the age of a page, the age and growth of inbound links, inbound link usage, or some other quality indicator. In embodiments, low quality may be associated with unwanted content, such as spam (i.e., unwanted solicitations).

In embodiments, information relating to a website, for example keywords, anchor text, referring sites, internal links, external links, and other information may be used to determine the quality of content located on a website.

In embodiments, gateway data may include WAP gateway data, mobile server gateway data, server gateway data, and/or wireless provider gateway data.

In embodiments, the quality of the content located on a website may be determined using a combination of an algorithmic and editorial review. Algorithmic review may include the use of tools, such as spidering.

In embodiments, a mobile communication facility user may be associated with content to which the user has a subscription. In embodiments, a process may be provided for identifying subscribers who have purchased subscription content and integrating the subscription content into mobile search results for those subscribers. In embodiments, a query result presented to a user having a content subscription may include subscription and non-subscription content. In embodiments, non-subscription content may include a solicitation to subscribe to a subscription content. A solicitation may include a sponsored link or other promotional content included in the search results. A user may be able to subscribe to content in response to a solicitation included in the results.

In embodiments, subscription content may include, but is not limited to, a magazine subscription, newspaper subscription, RSS feed, or some other type of subscription content.

In embodiments, a user's subscription data may be associated with a user account, a mobile communication facility, or some other data.

In embodiments, information regarding the current location of a mobile communication facility 102 may be used in a competitive bidding process in which sponsors place a bid amount based at least in part on a user's current location, past location, future location, and the like. As a user's mobile communication facility 102 enters a location, a sponsor, or plurality of sponsors, may be presented with an opportunity to place a bid amount for the right to have their content presented to the user. In another example, sponsors may place bids in advance relating to the future right to present sponsored content to users reaching a target location (e.g., within one mile of the sponsor's store location), and so forth.

In embodiments, sponsored content may be presented on a mobile communication facility in conjunction with a game. In an example, the sponsored content may be a banner placed next to the gaming display, the sponsored content may be embedded in the gaming content, wrap around the visual display of the gaming content, or bear some other proximity to the game.

In embodiments, sponsored content may be presented on a mobile communication facility in conjunction with a video. In an example, the sponsored content may be a banner placed next to the video display, the sponsored content may be embedded in the video content, wrap around the visual display of the video content, or bear some other proximity to the video display.

In embodiments, sponsored content may be presented in the form of an interactive banner. In an example, an interactive banner may provide a mobile communication facility user an opportunity to choose content from a list, complete a survey, view offline content (e.g., an offline newspaper advertisement), or some other opportunity.

In embodiments, a sponsored banner content may include dynamic text insertion. In an example, a sponsored banner advertising a television may dynamically insert text that is obtained from a retailer's database indicating the current price, number of units available, or some other text-based data.

In embodiments, a sponsored content may present to a mobile communication facility based at least in part on a variable that is associated with, but external to, the mobile communication facility. In an example, a location of a mobile communication facility may be associated with a news event occurring at or near the same location (e.g., an interstate car crash that has delayed traffic). In response to this external variable, the user's mobile communication facility may present a sponsored content through which the user may obtain alternate traffic route information in order to avoid the traffic delay.

In embodiments, a promotion may be presented to a user of a mobile communication facility in which the promotion requires the user to search for a content, solve a puzzle, break a code, follow a clue, or perform some other activity in order to derive the promotional benefit.

In embodiments, a coupon may be presented to a mobile communication facility in the form of a code that may be presented to an offline location to derive the coupon's benefit. The act of the user presenting the coupon may be entered and stored in a data storage facility. This stored data may be associated with user characteristics, mobile communication facility characteristics, and the like, and these associations may be used to present targeted advertisements, coupons, cross-sell, up-sell, and so forth to users. A sponsor may be charged a fee by a mobile service provider for each instance of its mobile subscribers presenting such a coupon.

In embodiments, the most influential members of a social network may be identified, and sponsored content directed to them. Influential members of a social network may be identified by the number of persons listed as members of their network, the number of other social network members listing a social network member within their personal network, SMS traffic, number of purchases, or based on some other measure of personal influence. In embodiments, sponsors may bid on the right to provide their sponsored content to members of a social network based at least in part on a social network member's level of influence. The level of influence of social network members may be indexed and stored in a data storage facility. The content of the index of social network members' influence may be licensed to mobile service providers, third parties, and the like.

In embodiments, sponsors may be able to bid for the exclusive right to have their content associated with a keyword, location, or some other data.

Figure 21:
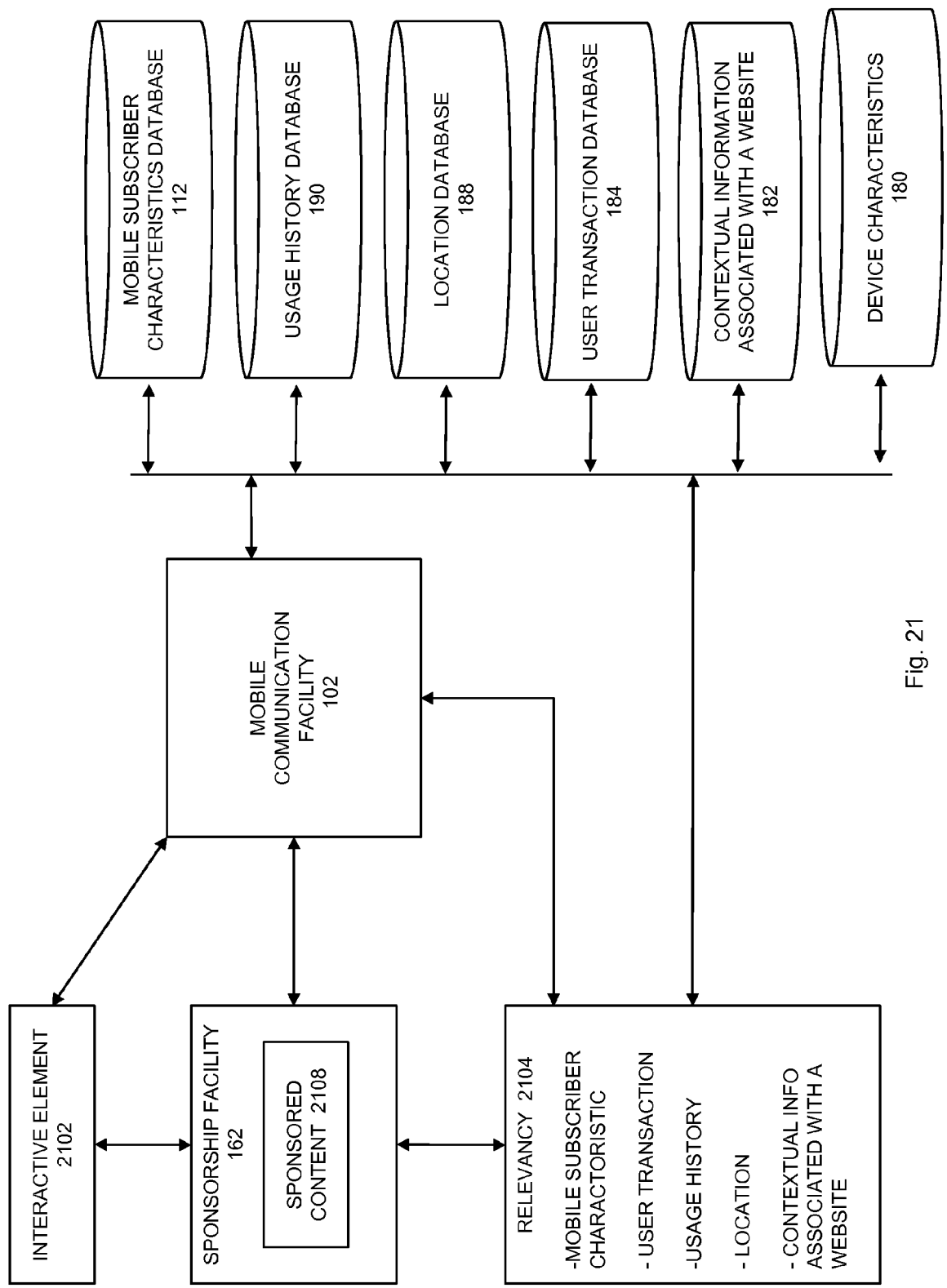
FIG. 21 illustrates a process for interactive mobile advertisement banners.

Referring to FIG. 21, in embodiments an interactive element 2102 may be associated with sponsored content 2108 and presented to a mobile communications facility 102, where the interactive element 2102 may be a game, a search facility, a text box, and the like, and the sponsored content 2108 may be an advertisement. The user may then be allowed to engage the interactive element 2102 on the mobile communication facility 102, where the interactive element 2102 may have been presented within the sponsored content 2108. In addition, the presentation of the sponsored content 2108 may be in association with a mobile communications facility relevancy 2104, based on information such as a mobile subscriber characteristic 112, a user transaction 184, usage history 190, location 188, contextual information associated with a website 182, device characteristics 180, and the like. For example, a male teenager may be talking on the phone or text messaging as part of their mobile communication facility 102, and an indication is displayed that a free electronic game is available to play. The user may then click on the link, and the game is delivered to them along with an advertisement that is relevant to a male teenager. The relevancy 2104 of the advertisement to the user may have been determined through mobile subscriber characteristics that specify the age of the user, a mobile communication facility 102 usage history that matches the profile of teenage male, or the like. The delivered game may be embedded in the advertisement, next to the advertisement, or the like, such that the advertisement may be visually apparent to the teenager as they play the game. In embodiments, because the teenager is forced to see the advertisement as they play the game, the game may be free of charge to play. In embodiments, it may be due to the fact that the game was free of charge to play that the teenager was willing to download the game, and that the presence of the advertisement is acceptable to the teenager due to the free nature of the game. In embodiments, the relevancy 2104 matching of sponsored content 2108, embedded along with a interactive element 2102, may provide an effective delivery vehicle for advertisements that are both relevant and acceptable to the user.

In embodiments, data associated with the user's mobile communication facility 102 may provide information that may aid in determining relevancy 2104, such as from a mobile subscriber characteristic database 112, a usage history database 190, a location database 188, a transaction database 184, contextual information associated with a website 182, device characteristics 180, and the like.

In embodiments, relevancy 2104 matching may be an important aspect in the effective delivery of sponsored content 2108, allowing the sponsored content 2108 to be better targeted to the intended audience. One way to better ensure relevancy 2104 to the user is to utilize mobile subscriber characteristic data 112 from the user's mobile communication facility 102, including user profile information, demographic information, billing information, and the like. By using such information it may be possible to relevancy 2104 match sponsored content to personal attributes of the user, such as their age, address, gender, and the like. For instance, advertising for clothing can be matched to the age, gender, and whether they live in an urban or rural setting. Advertisements for middle aged males may target sports, cars, home improvement, and the like. Advertisements for young girls may target clothing, and the like. Advertisements for seniors may target health products, travel, and the like. In embodiments, information derived from mobile subscriber characteristic information may prove effective for matching not only the advertisement delivered, but also the interactive element. For example, an electronic game depicting spaceships shooting on-coming targets may be a relevant 2104 interactive element 2102 for the younger audience, but other interactive elements 2102 may be better matched to an older audience, such as mortgage adds with links to current rates, dating adds with links to personal ads, puzzles, crosswords, humorous interactive cartoons, political messages during elections, other games more suited to an older audience, and the like. In embodiments, profile data such as age, gender, and address, may be sufficient for an initial relevancy 2104 matching of sponsored content 2108 and interactive elements 2102 to users of mobile communication facilities 102.

In embodiments, relevancy 2104 may be derived from user transaction data 2122 associated with the mobile communication facility 102, such as an online product purchase, the filling of an online shopping cart, an ad conversion, and the like. For instance, the user of the mobile communication facility 102 may have just purchased some women's seasonal clothing. Now, the user may not be interested in purchasing more seasonal clothing, and so the relevancy 2104 for seasonal clothing may be significantly reduced as a result of the purchase, but since the user is a woman, and hasn't yet purchased any seasonal shoes, the relevancy 2104 for shoes may be elevated as a result of the purchase. In another example, a user may be purchasing new floor mats for a late model car, which may indicate that the user has just purchased a late model car. As a result, this may lower the relevancy 2104 for car ads, but may elevate the relevance 2104 of car care products. In addition, user transactions may be indicative of the user's interests, and provide a better relevancy 2104 matching of the interactive element 2102 to the user. For instance, a user may purchase electronic games online, indicating that an interactive element 2102 that is a game may be a relevant 2104 match. A user may purchase a plane ticket, indicating they may want a new game or puzzle to play when on the plane. A user may be purchasing home improvement materials, indicating they may be interested in a home equity loan interactive element 2102 for more exploring the possibility of more extensive home improvements. In embodiments, user transactions associated with the mobile communication facility 102 may be effectively used in determining the relevancy 2104 of sponsored content 2108 and interactive elements 2102 for user interaction.

In embodiments, relevancy 2104 may be derived from usage history data 190 associated with the mobile communication facility 102, such as a browse history, an ad conversion history, from wireless carrier data, and the like. For instance, a user may be browsing for plasma televisions, and as a result, the relevancy 2104 for ads associated with plasma televisions, as well as other similar products such as LCD televisions, may be elevated. This elevation of relevance 2104 may become diminished over time if the browsing discontinues, which may indicate that the user subsequently made the purchase.

In another example, a user may be browsing through the websites of college campuses, and as a result may be targeted with electronic games embedded in ads for colleges and college related consumer products, such as laptop computers and the like. In embodiments, usage history may also track ad conversion history, as well as the types of ads that have been converted. For instance, the user may be converting ads for mortgage rates, and as a result, the user may be targeted with ads or interactive elements 2102 related to mortgage rates. Wireless carrier data may also be tracked and provide information that leads to increased relevancy 2104 matching. For instance, the user may make a large number of calls from the financial district in New York City, and result in an increased relevancy 2104 for ads relating to finances, and interactive elements 2102 that are fast action electronic games, or the like. In embodiments, usage history may be used to improve relevancy 2104 in the selection of sponsored content 2108 and interactive elements 2102 being presented to users of mobile communication facilities 102.

In embodiments, relevancy 2104 may be derived from location data 188 associated with the mobile communication facility 102, such as a location history, a previous location, a current location, a location determined according to location coordinates of a particular mobile communication facility, a location determined by a user entered location, a location as a plurality of geographic regions, location determined according to a distance from a specified location, and the like. For instance, if a user of a mobile communications facility 102 is at a location in proximity to a shopping area for clothing, the relevancy 2104 for ads related to clothing may elevate. If a user is in proximity of a series of car dealerships, the relevancy 2104 for car ads may elevate, and perhaps the relevancy 2104 for car related interactive elements, such as car race games, may also be elevated. In embodiments, location may be used to improve relevancy 2104 in the selection of sponsored content 2108 and interactive elements 2102 being presented to users of mobile communication facilities 102.

In embodiments, relevancy 2104 may be derived from contextual information associated with a website 182, such as in a link structure, in an inbound link, in an outbound link, in a link, as text, as a keyword, as metadata, and the like. For example, a user may be browsing a gardening website with their mobile communication facility 102, where they are seen to be selecting content relating to outdoor plantings and garden designs. In embodiments, the user's selection of this content may lead to an increased relevancy 2104 for outdoor garden supplies, landscape architects, outdoor home improvement, and the like, where sponsored content 2108 relating to these content subjects may be accompanied by interactive elements 2102 relating to the content mater, such as gardening puzzles, home improvement loan rates, and the like. In another example, website may have inbound or outbound links that may suggest a relevancy 2104 for a subject, such as links to woodworking sites, indicating that the user may be interested in the tools and supplies associated with the making of furniture. This may also be an indication of the gender and age of the user, as woodworking may generally be an interest for an older, middle-middle class male. This in turn may generate age and gender appropriate interactive elements 2102, delivered with ads focused on the power tools associated with woodworking as a home activity. In embodiments, contextual information associated with a website may be used to improve relevancy 2104 in the selection of sponsored content 2108 and interactive elements 2102 being presented to users of mobile communication facilities 102.

In embodiments, a user of a mobile communication facility 102 may be delivered sponsored content 2108, such as advertisements, in conjunction with an interactive element 2102, such as a game or animated set of content links, in order to improve the time the sponsored content 2108 may spend in front of the user. That is, if a user is delivered a game that they want to play, and an advertisement is visible on the display of the mobile communication facility 102 along with the game, there may be resulting increased ad effectiveness on the user. Further, ad effectiveness may be increased by increasing the relevancy 2104 of the sponsored content 2108 and the interactive element 2102 with the user. That is, if the advertisement presented is relevant 2104 to the user, then the user is more likely to be affected by it, and if the interactive element 2102 is more relevant 2104 to the user, then the user is more likely to play the game longer, and thus increase the time the ad is in front of them, which then may also increase the effectiveness of the advertisement. In embodiments, improved relevancy 2104 in the selection of sponsored content 2108 and interactive elements 2102 being presented to users of mobile communication facilities 102 may increase the effectiveness of sponsored content 2108, which may additionally increase the number of sponsors associated with the sponsorship facility 162.

While the invention has been disclosed in connection with the preferred embodiments shown and described in detail, each of the technologies described herein may be incorporated, associated with, combined, and the like with each of the use scenarios described herein, and each of the applications described herein, including market applications.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system for interactive mobile advertisement banner presentation, the system comprising one or more computers having computer readable mediums having stored thereon instructions which, when executed by one or more processors of the one or more computers, causes the system to perform the steps of:

(a) receiving an advertisement request associated with a web page request from a cellular phone operated by a user, wherein the advertisement request is received over a cellular telephony infrastructure provided by a carrier, wherein the user is paying for use of the cellular phone with the carrier;

(b) receiving contextual information from a web page corresponding to the web page request;

(c) receiving information relating to a plurality of mobile subscriber characteristics derived from information obtained from the carrier via the user subscribing for service for the cellular phone with the carrier, wherein the plurality of mobile characteristics include age and gender of the user;

(d) selecting an interactive element and an advertisement and associating the interactive element with the advertisement in response to receiving the advertisement request, wherein the interactive element is a game embedded in the advertisement and the advertisement is visually apparent during a playing of the game by the user, wherein the selection and association is based at least in part on:
  (i) a relevancy of the advertisement and the interactive element to the plurality of mobile subscriber characteristics; and
  (ii) a relevancy of the advertisement and the interactive element to the contextual information associated with the web page; and
  (iii) a compatibility of the advertisement and the interactive element with a rendering capability of the cellular phone as defined by a model thereof; and (e) transmitting the advertisement with the associated interactive element to the cellular phone; and (f) allowing the user of the cellular phone to engage the interactive element within the advertisement.

* * * * *